United States Patent
Deering

(10) Patent No.: US 6,924,816 B2
(45) Date of Patent: Aug. 2, 2005

(54) COMPENSATING FOR THE CHROMATIC DISTORTION OF DISPLAYED IMAGES

(75) Inventor: Michael F. Deering, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 257 days.

(21) Appl. No.: 09/809,829

(22) Filed: Mar. 16, 2001

(65) Prior Publication Data

US 2003/0206179 A1 Nov. 6, 2003

Related U.S. Application Data

(60) Provisional application No. 60/190,711, filed on Mar. 17, 2000.

(51) Int. Cl.[7] .............................. G09G 5/02; H04N 3/22; H04N 9/31; G06T 15/00
(52) U.S. Cl. ....................... 345/589; 345/613; 348/745
(58) Field of Search ............................... 345/611, 613, 345/589; 348/745, 746, 747, 806; 353/69, 70

(56) References Cited

U.S. PATENT DOCUMENTS 5,339,092 A * 8/1994 Johnson et al. ............. 345/611
6,310,650 B1 * 10/2001 Johnson et al. ............. 348/745
6,424,343 B1    7/2002 Deering et al.
6,456,339 B1 *  9/2002 Surati et al. ................ 348/745
6,489,956 B1 * 12/2002 Deering ...................... 345/611

* cited by examiner

Primary Examiner—Jeffery A. Brier
(74) Attorney, Agent, or Firm—Meyertons Hood Kivlin Kowert & Goetzel, P.C.; Jeffrey C. Hood; Mark K. Brightwell

(57) ABSTRACT

A graphics system comprises pixel calculation units and a sample buffer which stores a two-dimensional field of samples. Each pixel calculation unit selects positions in the two-dimensional field at which pixel values (e.g. red, green, blue) are computed. The pixel computation positions are selected to compensate for image distortions introduced by a display device and/or display surface. Non-uniformities in a viewer's perceived intensity distribution from a display surface (e.g. hot spots, overlap brightness) are corrected by appropriately scaling pixel values prior to transmission to display devices. Two or more sets of pixel calculation units driving two or more display devices adjust their respective pixel computation centers to align the edges of two or more displayed images. Physical barriers prevent light spillage at the interface between any two of the display images. Separate pixel computation positions may be used for distinct colors to compensate for color distortions.

27 Claims, 55 Drawing Sheets

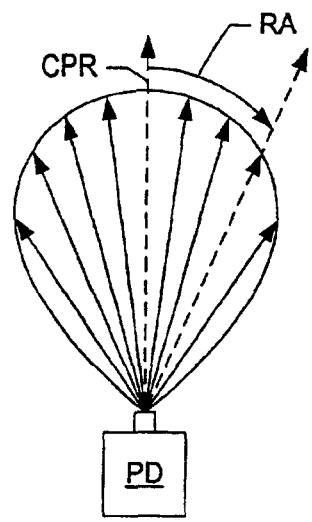
FIG. 4A
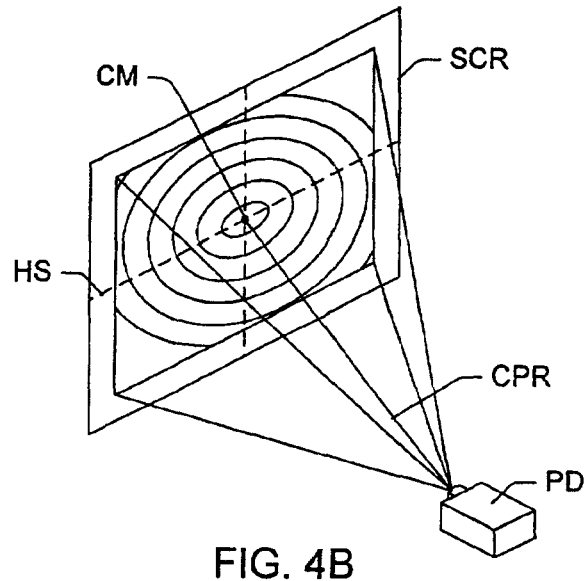
FIG. 4B
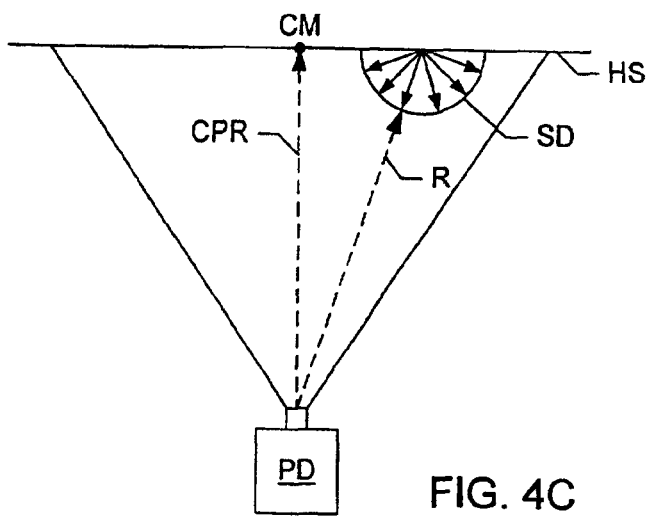
FIG. 4C

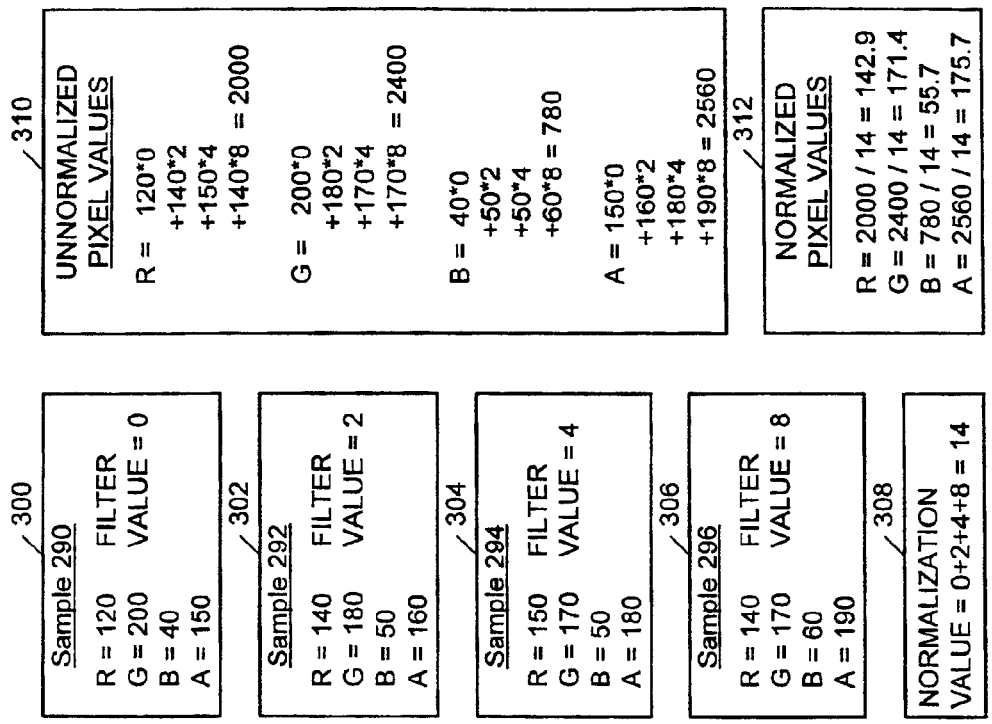
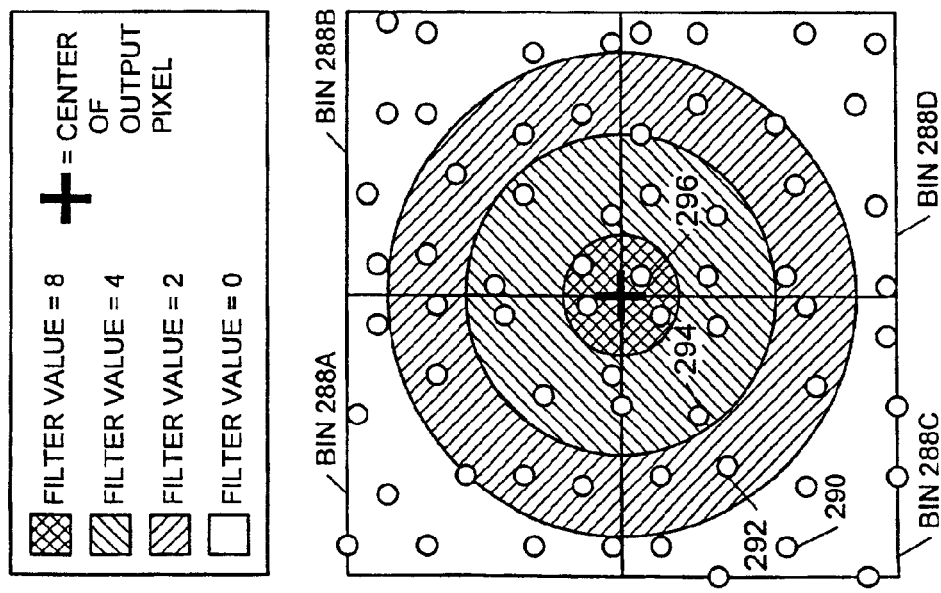
FIG. 22

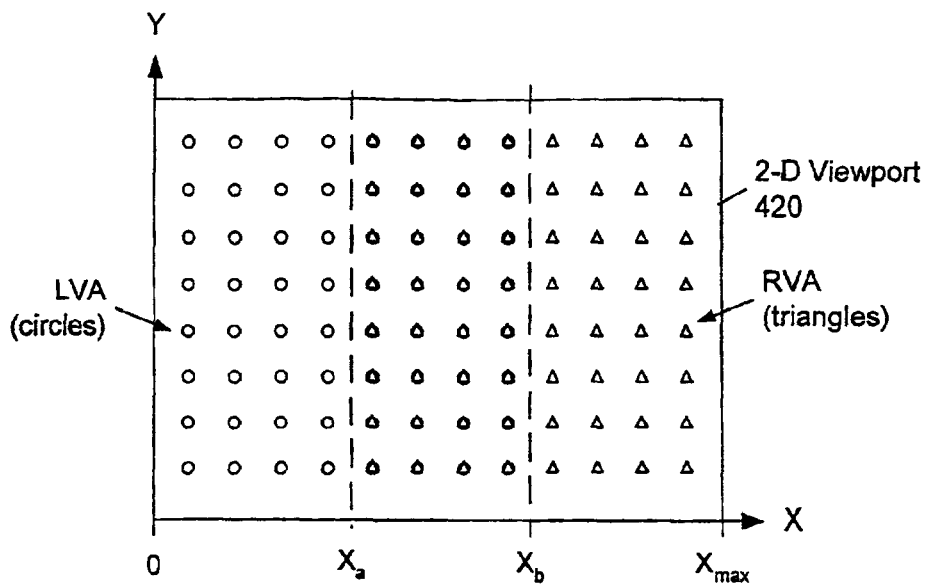
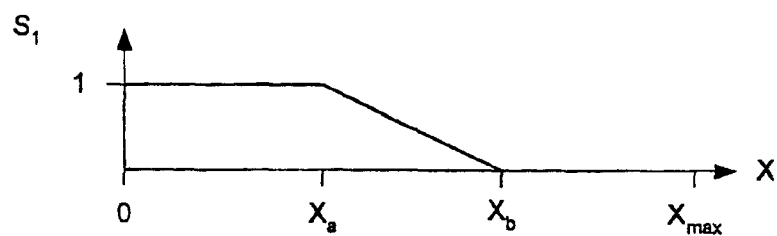
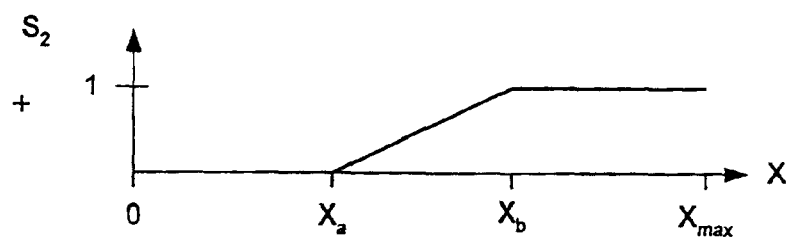
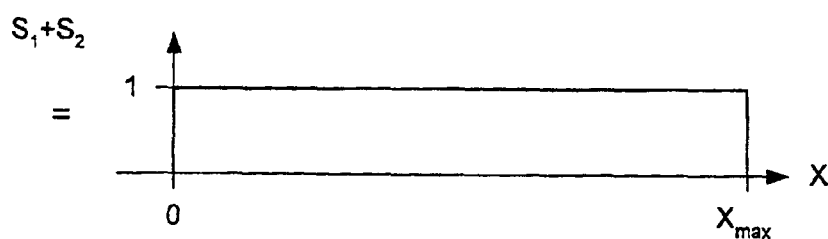
FIG. 32A

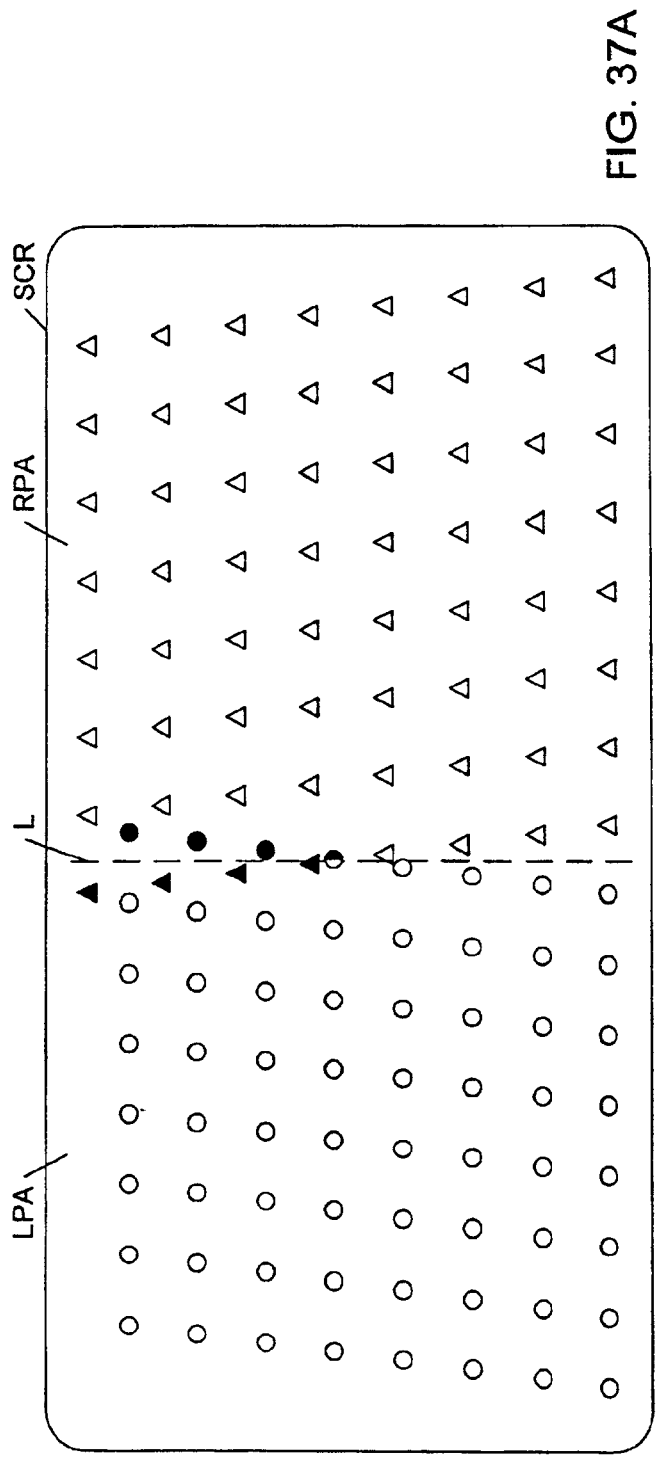
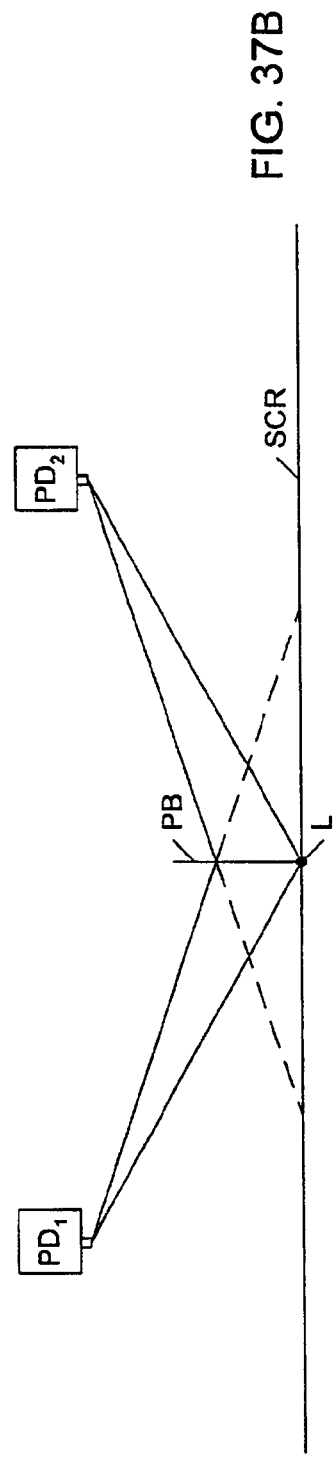
FIG. 37A
FIG. 37B

COMPENSATING FOR THE CHROMATIC DISTORTION OF DISPLAYED IMAGES

CROSS-REFERENCE TO RELATED APPLICATIONS

This application claims the benefit of U.S. Provisional Application Serial No. 60/190,711 filed on Mar. 17, 2000 titled "Graphics System Having a Super-Sampled Sample Buffer with Improved Hot Spot Correction, Edge Blending, Edge Matching, Distortion Correction, and Chromatic Distortion Compensation".

BACKGROUND OF THE INVENTION

1. Field of the Invention

This invention relates generally to the field of computer graphics and, more particularly, to high performance graphics systems which generate images for display via one or more display devices, including projection devices.

2. Description of the Related Art

Multiple projection devices may be used to display a single integrated image as shown in FIG. 1. Each of the projection devices may display a portion of the integrated image. For example, projection devices P1 and P2 may target a common display screen SCR, and may generate the left and right portions respectively of an integrated image. The projection devices may use any of a variety of technologies. For example, the projection devices may be based on cathode ray tubes (CRTs), liquid crystal displays (LCDs), digital micro-mirror displays, or liquid crystal on silicon (LCOS) displays, etc.

A computer system CS may be used to drive the multiple projection devices P1 and P2. The computer system CS may provide analog or digital video signals to drive the projection devices P1 and P2. The computer system CS may include a graphics system for the rendering and display of 2D graphics and/or 3D graphics. The graphics system may supply the video signals which drive the projection devices P1 and P2. In addition, the computer system CS may include a monitor device MD, a system unit SU, and input devices such as a keyboard KB and mouse MS. Monitor device MD and projection devices P1 and P2 may be referred to generically as display devices.

It is often necessary to overlap the images generated by the two projection devices P1 and P2 as shown in FIG. 2A. A front view of the two overlapped images as they might appear on the display screen SCR is shown in FIG. 2B. The left image represented by rectangle ABCD overlaps the right image represented by rectangle EFGH.

FIG. 2C illustrates a fundamental problem associated with the overlapping of two projected images. The function I1 represents the distribution of light intensity across the screen SCR due to projection device P1. Similarly, function I2 represents the distribution of light intensity across the screen SCR due to projection device P2. In the overlap region (i.e. rectangle EBCH) the intensity functions add. Thus, the intensity in the overlap region may be larger than in the non-overlap regions than in the non-overlapped regions of the screen. The increased brightness of the overlap region may be annoying to a viewer of the integrated image AFGD.

The overlap-brightness problem exists when any number of projected images are overlapped. For example, FIG. 3 illustrates the overlapping of four projected images generated by four projection devices in a "two by two" configuration. One of the projected images is represented by rectangle JLTR. The other three projected images have the same size as rectangle JLTR and are displaced to the three remaining corners M, V and Y. Exactly two of the projected images overlap in regions KLPO, NOSR, STXW and PQUT, and thus, these regions may exhibit a light intensity which is double that of the non-overlap regions JKON, LMQP, RSWV and TUYX. All four projected images overlap in the center region OPST, and thus, the center region may exhibit a light intensity which is four times larger than the intensity of the non-overlap regions.

There currently exist analog systems called "video boxes" which address in some measure the overlap-brightness problem. A video box may couple between computer system CS and projection devices P1 and P2 as shown in FIG. 1, and may reduce the intensity of the projected images in the overlap region. Thus, the total intensity in the overlap region may be more nearly equal to the intensity of the non-overlap regions after installation of a video box. Although, video boxes provide some measure of correction to the overlap-brightness problem, they may be expensive and may not be easy to configure. Furthermore, their functionality may be limited. Thus, there exists a need for a system and method which could provide an improved blending of the light intensity in the overlap regions. More generally, there exists a need for a system and method which could uniformize the intensity distribution of an integrated image generated by multiple projection devices.

In FIG. 2C, the intensity distributions I1 and I2 are illustrated as having rectangular profiles. In reality, the intensity distribution of a projected image may be highly non-uniform for a number of different reasons. First, a typical projection device PD radiates light with a non-uniform radiation intensity pattern as shown in FIG. 4A. The radiation intensity pattern may have a maximum in the on-axis direction, i.e. the direction of central projection ray CPR, and may decrease as a function of the radiation angle RA measured with respect to the central projection ray CPR.

Thus, as shown in FIG. 4B, a more realistic screen intensity distribution for a projected image may have a maximum at the point CM where the central projection ray intercepts the screen SCR, and may decrease as a function of horizontal and vertical screen displacements from the central maximum CM. Several level curves of the screen intensity distribution are superimposed on the projected image. FIG. 4C illustrates the screen intensity distribution $I_D$ along a horizontal slice HS of the screen through the central maximum CM.

If the screen material is highly diffusive, the screen intensity distribution $I_D$ may be relatively independent of the viewing angle and/or position. Diffusivity means that a generic ray R impinging on the screen is scattered with a hemispherical scattering distribution SD. However, if the screen material has high gain, i.e. is more reflective (or transmissive in the rear-projection case), the screen intensity distribution may be highly dependent on the viewer's position with respect to the projector-screen system.

For example, FIG. 5A illustrates the screen intensity distributions $I_{V1}$ and $I_{V2}$ perceived by viewers V1 and V2 respectively situated on opposite sides of projection device PD in a front-projection scenario. The screen intensity distribution $I_{V1}$ for the first viewer V1 may attain a maximum value at the point P1 where the source ray S1 emanating from the projection device has a reflection ray R1 which intercepts the viewer V1. Thus, the viewer V1 perceives a "hot spot" on the screen at point P1. Similarly, the screen intensity distribution $I_{V2}$ for the second viewer V2 may attain a maximum value at the point P2 where the source ray S2 emanating from the projection device has a reflection ray R2 which intercepts the viewer V2. Thus, viewer V2 perceives a hot spot at point P2 on the screen SCR.

FIG. 5B illustrates the screen intensity distributions $I_{V_1}$ and $I_{V_2}$ perceived by viewers V1 and V2 respectively situated at different positions with respect to a high gain screen in a rear-projection scenario. The screen intensity distribution $I_{V_1}$ for the first viewer V1 may attain a maximum value at the point Q1 where the direct ray D1 from the projection device to the viewer V1 intercepts the screen. Similarly, the screen intensity distribution $I_{V_2}$ for the second viewer V2 may attain a maximum value at the point Q2 where the direct ray D2 from the projection device to the viewer V2 intercepts the screen.

Multiple projector devices may be used to generate an integrated image on the projection screen SCR. Thus, an observer may observe two or more hot spots on the screen, i.e. the intensity distribution may have two or more local maxima. Thus, there exists a need for a system and method which could correct the hot spots perceived by the observer on screen SCR.

Projection devices generally attempt to project a rectangular array of physical pixels on the projection screen SCR. However, many distortion mechanisms conspire to defeat this desired end. For example, the physical pixel array may exhibit a keystone distortion KST, a pincushion distortion PNC or a barrel distortion BRL as suggested by FIG. 6A. Fundamental distortion modes may combine to form more complex distortions as suggested by combined distortion CDST.

A keystone distortion is synonymously referred to herein as a trapezoidal distortion. As used herein the term "keystone distortion" is intended to include any distortion where the nominally rectangular pixel array is deformed into a trapezoid. The parallel edges of the trapezoid may be either the top and bottom edges, or, the right and left edges. The terms "pincushion distortion" and "barrel distortion" are terms which are familiar from fields such as optics and video projection. Thus, the exact definition of these terms may depend on the context in which they are used. As used herein, the term "pincushion distortion" is intended to include any distortion where the right and left edges, and/or, the top and bottom edges, of the nominally rectangular pixel array experience an inward bending as presented on screen SCR. For example, a CRT display distortion where the right and left sides are bent inwardly while horizontal lines remain relatively straight is referred to herein as a pincushion distortion. As another example, a lens-induced distortion where all four edges are bent inwardly is also referred to herein as a pincushion distortion. As used herein, the term "barrel distortion" is intended to include any distortion where the right and left edges, and/or, the top and bottom edges, of the nominally rectangular pixel array experience an outward bending. For example, a CRT distortion where the right and left sides are bent outwardly, and a lens-induced distortion where all four sides are bent outwardly, are both referred to herein as barrel distortions.

Distortions of the displayed pixel array may arise from a variety of physical mechanisms and have a large variation in magnitude. For example, in a scenario where a projection device projects onto a screen which is not centered on or perpendicular to the projection axis, the resulting geometric distortion may amount to a significant fraction of the displayed pixel array. Other distortions of the displayed pixel array may be subtle, i.e. small in magnitude. Thus, there exists a need for a graphics system and methodology which could compensate for arbitrary physical pixel distortions so that rendered objects would appear undistorted on the screen SCR.

As noted above, multiple projection devices may be used to generate an integrated image or integrated sequence of video images on screen SCR as shown in FIG. 1. In general, the physical pixel arrays generated by the projection devices are overlapped as suggested by the example of FIG. 6B. The left physical array LPA (denoted by small circles) is generated by a first projection device, and the right physical array RPA (denoted by small triangles) is generated by a second projection device. Each physical array may be distorted in an arbitrary manner. Thus, images displayed in the left and right physical arrays may appear distorted. For example, the left physical array LPA is illustrated with a barrel distortion, and the right physical array is illustrated with a keystone (i.e. trapezoidal) distortion.

Even if the distortion of each physical array is small, there may be relative distortions between the left and right physical arrays. For example, the left and right physical arrays may not have the same vertical and/or horizontal size, or one physical array may be translated with respect to the other. As another example, the distortions of the left and right physical arrays may arise from manufacturing imperfections in the light processing chips of each projection device. Thus, images (or portions of images) appearing in the overlap region may appear blurred (i.e. fuzzy). Thus, there exists a need for a graphics system which could compensate for arbitrary physical distortions (including relative distortions) inherent in multiple projection configurations so that the integrated image generated by the multiple projection devices may appear undistorted and consistent, especially in overlap regions. In other words, there exists a need for a system and method which could correct for the independent physical distortions arising in multiple projector scenarios.

The area covered by the left physical array LPA and right physical array RPA on the screen SCR is the effective viewing area. In order to maximize the viewing area, it would be desirable to minimize the size of the overlap between the left physical array LPA and the right physical array RPA. However, if the overlap region is minimized, it becomes difficult to perform edge blending with the prior art video box technology. Thus, there may appear an uneven line of brightness along the interface of the physical arrays. The brightness is due to a higher density of physical pixels. Thus, there exists a need for a system and method which could neatly match the boundaries of physical images generated by multiple projection devices configured with minimum overlap and without generating a line of bright distortion along the interfaces.

Modern projection devices generate color images by a variety of different mechanisms which lead to different modes of chromatic distortion. As used herein the term "chromatic distortion" is intended to include any distortion which results in a spatial separation of displayed color components of physical pixels on a screen. The following is a discussion of several economically viable projection technologies and their chromatic distortion modes.

According to one model, a projection device may comprise three separate color beams which are projected through three respective lenses (or lensing systems) onto the screen SCR. For example, a CRT-based projector may have separate red, green and blue displays, i.e. three separate guns targeting corresponding phosphor surfaces. Each display generates a source image of the corresponding color which is projected onto the screen SCR through a corresponding lens. The projection of each source image onto screen SCR is referred to herein as a physical image. For example, the red source image from the red display is projected onto a red physical image on screen SCR. Ideally, the red, green and blue physical images on screen SCR would exactly overlay one another, generating a single rectangular array of pixel positions. Corresponding pixels in each of the three physical images would cover the same area on screen SCR. However, real projection devices depart from this ideal behavior because of distortions inherent in the displays, the lenses, the alignment of the displays with respect to the lenses, the alignment of the lenses with respect to the screen, etc. Thus, the red, green and blue physical images are independently distorted on SCR, and corresponding pixels of the three physical images fail to overlap on screen SCR.

According to a second model, a projection device may include a single embedded display (e.g. an integrated LCD display) and an optical subsystem. The embedded display generates a source image comprising an array of source pixels. The optical subsystem projects the source image onto screen SCR. Each source pixel may radiate a combination of red, blue and green light spectra. Because optical materials (such as lenses) in the optical subsystem bend light rays in a wavelength dependent fashion, a single source pixel may be fragmented into separate red, green and blue physical pixels on screen SCR. This effect is known as chromatic aberration. Chromatic aberration is responsible for a blurring of images on screen SCR.

According to a third model, a high performance projector may use dichroic optics as follows. A single source beam of white light may be separated into three subbeams. The three subbeams are independently modulated with color information resulting in a red subbeam, a green subbeam and a blue subbeam. For example, the three white subbeams may be transmitted through three corresponding LDC panels, or refracted from three corresponding digital micromirror chips. The red, green and blue subbeams may be combined using dichroic mirrors, and the combined beam may be projected through a single lens onto screen SCR. Under ideal conditions, corresponding pixels in the modulated red, green and blue subbeams would be aligned in the combined beam. However, in actual practice, one may observe independent distortions and separation of the red, green and blue pixels in the combined beam because of various manufacturing imperfections. For example, the cells in each light processing chip may be independently distorted away from a nominal rectangular array. There may be slight variations in the alignment and pathlength calibration of the light processing chips with respect to the dichroic optics, etc. The distortions and separation of the red, green and blue pixels in the combined beam may be exacerbated as the combined beam passes through the lens and is projected onto screen SCR due to chromatic aberration (i.e. wavelength dependent refraction). Thus, the red, green and blue physical images on screen SCR are independently distorted away from an ideal rectangle, and corresponding pixels in the three physical images fail to overlap. Furthermore, the relative displacements between corresponding pixels in the three physical images are likely to vary in magnitude and direction across the screen.

According to a fourth model, a projection device may employ a single light processing chip (such as a digital micromirror chip) with a color modulation device (such as a color wheel) to generate a single output beam bearing all three colors in a time multiplexed fashion. The human visual system performs the color integration. The single output beam is projected onto the screen SCR through a single lens (or lensing system). The red, green and blue pixels in the single output beam are distorted due to chromatic aberration in the lens. However, because the source light beam is not split and recombined, many of the distortion mechanisms of the third model above are avoided.

According to a fifth model, a projection device may employ two light processing chips. A source light beam may be split into two subbeams. The first subbeam may be modulated with color information for a first color using the first light processing chip. The second subbeam may be modulated with the color information for the two remaining colors using the second light processing chip and a color wheel. The two modulated subbeams may be recombined using dichroic optics. The combined beam is then projected onto the screen SCR through a single lens (or lens system). The red, green and blue pixels in the combined beam experience chromatic aberration in passage through the lens. However, prior to interaction with the lens, the distortions and separation of the red, green and blue pixels in the combined beam may have magnitudes that are less than in the third (three-way split and recombine) model and larger than in the fourth (no split) model.

Thus, there exists a need for a system and method which could compensate for arbitrary chromatic distortions (i.e. distortions which separate the color components of a composite physical image) independent of the mechanisms by which such distortions arise within a projection device.

Computer system CS may rely on a graphics system to generate output video signals for projection devices P1 and P2 (and/or monitor device MD). Early graphics systems were only responsible for receiving data produced by the host processor and displaying it on monitor device MD. In essence, they acted as simple translators or interfaces. Modern graphics systems, however, incorporate graphics processors with a great deal of processing power. They now act more like coprocessors rather than simple translators. This change is due to the recent increase in both the complexity and amount of data being sent to monitor device MD and/or the projection devices. For example, modern display devices have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the host processor would spend a great deal of time performing graphics calculations. This could rob the host processor of the processing power needed for performing other tasks associated with program execution, and thereby dramatically reduce the overall performance of computer system CS. With a powerful graphics system, however, when the host processor is instructed to draw a box on the screen, the host processor may send a request to the graphics system stating "draw a box at these coordinates." The graphics system may then compute the position and color of each pixel comprising the box. The host processor is thus liberated from the time consuming draw or render process.

Generally, a graphics system is a type of video adapter that contains its own processor to boost performance levels. These processors are specialized for computing graphical transformations, and thus, they tend to achieve better results than the general-purpose CPU used by computer system CS. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their computer systems.

Since graphics systems typically perform only a limited set of functions, they may be customized and therefore are far more efficient at graphics operations than the computer's general-purpose CPU. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

Prior art graphics systems use a conventional frame buffer for refreshing pixel/video data on a display device (e.g. monitor device MD, or projection device P1 or P2). The frame buffer stores rows and columns of pixels that exactly correspond to respective row and column locations on the display device. Prior art graphics system render 2D and/or 3D images or objects into the frame buffer in pixel form, and then read the pixels from the frame buffer during a screen refresh to refresh the display device. Thus, the frame buffer stores the output pixels that are provided to the display device. To reduce visual artifacts that may be created by refreshing the screen at the same time the frame buffer is being updated, frame buffers in most graphics systems are double-buffered.

To obtain more realistic images, some prior art graphics systems have gone further by generating more than one sample per pixel. As used herein, the term "sample" refers to information calculated at a particular point on an object or image, i.e. information such as one or more of color, depth (z), transparency, etc. For example a sample may comprise the following component values: a red value, a green value, a blue value, a z value, and an alpha value (e.g., representing the transparency of the sample). A sample may also comprise other information, e.g., a z-depth value, a blur value, an intensity value, brighter-than-bright information, and an indicator that the sample partially or completely comprises control information rather than color information (i.e., "sample control information"). By calculating more samples than pixels (i.e., super-sampling), a more detailed image is calculated than can be displayed on the display device. For example, a graphics system may calculate four samples for each pixel to be output to the display device. After the samples are calculated, they are then combined or filtered to form the pixels that are stored in the frame buffer and then conveyed to the display device. Using pixels formed in this manner may create a more realistic final image because overly abrupt changes in the image may be smoothed by the filtering process.

These prior art super-sampling systems typically generate a number of samples that are far greater than the number of pixel locations on the display. These prior art systems typically have rendering processors that calculate the samples and store them into a render buffer. Filtering hardware then reads the samples from the render buffer, filters the samples to create pixels, and then stores the pixels in a conventional frame buffer. The conventional frame buffer is typically double-buffered, with one side being used for refreshing the display device while the other side is updated by the filtering hardware. These systems, however, have generally suffered from limitations imposed by the conventional frame buffer, and by the added latency caused by the render buffer and filtering hardware. Therefore, an improved graphics system is desired which includes the benefits of pixel super-sampling while avoiding the drawbacks of the conventional frame buffer.

U.S. patent application Ser. No. 09/251,844, now U.S. Pat. No. 6,466,206, titled "Graphics System with a Variable Resolution Sample Buffer" discloses a computer graphics system that utilizes a super-sampled sample buffer and a sample-to-pixel calculation unit for refreshing a display device. The graphics processor generates a plurality of samples and stores them into a sample buffer. The graphics processor preferably generates and stores more than one sample for at least a subset of the pixel locations on the display device. Thus, the sample buffer is a super-sampled sample buffer which stores a number of samples that may be far greater than the number of pixel locations on the display device. The sample-to-pixel calculation unit is configured to read the samples from the super-sampled sample buffer and filter or convolve the samples into respective output pixels, where the output pixels are then provided to refresh the display device. The sample-to-pixel calculation unit selects one or more samples and filters them to generate an output pixel. The sample-to-pixel calculation unit may operate to obtain samples and generate output pixels which are provided directly to the display device with no frame buffer therebetween.

Thus, a system and method is desired for providing improved display capabilities including improved edge blending, hotspot correction, edge matching, distortion correction, and chromatic distortion compensation in a system having a super-sampled sample buffer.

SUMMARY OF THE INVENTION

A graphics system according to the present invention may comprise a graphics processor, a super-sampled sample buffer, and one or more sample-to-pixel calculation units. The graphics processor generates a plurality of samples and stores them into the sample buffer. Each sample-to-pixel calculation unit operates on sample values to generate pixel values. The graphics processor preferably generates and stores more than one sample per pixel for at least a subset of the pixel locations on a display surface. Thus, the sample buffer is a super-sampled sample buffer which stores a number of samples that, in some embodiments, may be far greater than the number of pixel locations on the display surface. In other embodiments, the total number of samples may be closer to, equal to, or even less than the total number of pixel locations on the display surface. In addition, the samples may be more densely positioned for certain areas of the display surface and less densely positioned in other areas.

The sample-to-pixel calculation unit is configured to read the samples from the super-sampled sample buffer, and to filter the samples in order to generate respective output pixel values. The output pixel values are then provided to refresh a display device (e.g. monitor or projection device). The sample-to-pixel calculation unit selects one or more samples and filters them to generate an output pixel value. Note the number of samples selected and or filtered by the sample-to-pixel calculation unit may be greater than one (as in the preferred embodiment), equal to one, or less than one.

The sample-to-pixel calculation unit may access the samples from the sample buffer, perform a real-time filtering operation, and then provide the resulting output pixel values to the display device, preferably in real-time. The graphics system may transmit computed pixel values to a display device without storing them in an intervening frame buffer. Thus, the large latency of a frame buffer may be avoided. It is noted that some display devices may have internal frame buffers, but these are considered an integral part of the display device, not the graphics system. Thus, the sample-to-pixel calculation units may calculate each pixel for each video frame on a real time basis or on an on-the-fly basis.

In one embodiment, the graphics system may be configured to perform edge blending by flattening the distribution of light energy perceived by a viewer of two or more images generated on a display surface by two or more corresponding projection devices. The graphics system may comprise a first sample-to-pixel calculation unit and a second sample-to-pixel calculation unit. The first sample-to-pixel calculation unit may be configured to generate a first plurality of first virtual pixel positions in a two-dimensional viewport which is populated with samples, to compute first pixel values by filtering the samples at the first plurality of first virtual pixel positions, to scale a first subset of the first pixel values by first intensity scaling values, and to provide the first pixel values to a first projection device. The second sample-to-pixel calculation unit may be similarly configured to generate a second plurality of second virtual pixel positions in the two-dimensional viewport, to compute second pixel values by filtering the samples at the second plurality of second virtual pixel positions, to scale a second subset of the second pixel values by second intensity scaling values, and to provide the second pixel values to a second projection device.

The first projection device may be configured to generate a first array of first physical pixels on the display surface in response to the first pixel values. Similarly, the second projection device may be configured to generate a second array of second physical pixels on the display surface in response to the second pixel values. The first subset of the first pixel values which are scaled using the first intensity scaling values may control intensities of a first subset of the first physical pixels in a first overlap region between the first array and the second array. The second subset of the second pixel values which are scaled using the second intensity scaling values may control intensities of a second subset of the second physical pixels in the first overlap region.

The first intensity scaling values may transition from one to zero from a first side of the first overlap region to a second side of the first overlap region. Conversely, the second intensity scaling values may transition from zero to one from the first side of the first overlap region to the second side of the first overlap region. The first intensity scaling values may transition linearly (piecewise linearly, non-linearly, etc.) from one to zero from the first side of the first overlap region to the second side of the first overlap region. Conversely, the second intensity scaling values may transition linearly (piecewise linearly, non-linearly, etc.) from zero to one from the first side of the first overlap region to the second side of the first overlap region.

The first intensity scaling values and the second intensity scaling values may be assigned numeric values so that the total light intensity in the first overlap region is approximately equal to the light intensity in the non-overlap regions of the first array and the second array. The first intensity scaling values may be computed based on a first intensity scaling function, and the second intensity scaling values may be computed based on a second intensity scaling function. Preferably, the first intensity scaling function and the second intensity scaling function add up to one on the first overlap region. The intensity scaling described above in terms of two projection devices may be generalized to an arbitrary number of projection devices whose screen images overlap, perhaps with multiple overlappings.

In an alternative embodiment, the graphics system comprises a first calculation unit and a second calculation unit. The first calculation unit may be configured to generate first pixel values, and to provide the first pixel values to a first projection device. The first projection device may be configured to generate a first array of first physical pixels on a display surface. The second calculation unit may be configured to generate second pixel values, and to provide the second pixel values to a second projection device. The second projection device may be configured to generate a second array of second physical pixels on the display surface. The first physical pixel array and the second physical pixel array overlap in a first overlap region on the display surface. The first pixel values control intensities of first physical pixels. The second pixel values control intensities of the second physical pixels. The first calculation unit is configured to multiply a first subset of the first pixel values which correspond to the first overlap region by first intensity scaling values prior to providing the first pixel values to the first projection device. The second calculation unit is configured to multiply a second subset of the second pixel values which correspond to the first overlap region by second intensity scaling values prior to providing the second pixel values to the second projection device. In this alternative embodiment, the first calculation unit and second calculation unit may compute pixel values in response to 3D graphics data by any conventional means.

In a second embodiment, the graphics system may be configured to perform hotspot correction by flattening the distribution of light energy perceived by a viewer of a displayed image generated on a display surface by one or more display devices. The graphics system may comprise a first sample-to-pixel calculation unit configured to generate a first plurality of first virtual pixel positions in a two-dimensional viewport which is populated with samples, to compute first pixel values by filtering the samples at the first plurality of first virtual pixel positions, to multiply the first pixel values by first intensity scaling values to produce first scaled pixel values, and to provide the first scaled pixel values to a first projection device. The first intensity scaling values may be configured to correct for a non-uniformity (e.g. a hotspot) in the perceived distribution of light intensity by a viewer.

The first sample-to-pixel calculation unit may be configured to determine the viewer's perceived distribution (of light intensity from the screen surface SCR) in response to received sensor data. The sensor data may be received from a position sensing device located at the viewer (e.g. on the user's head). The viewer's position in the projector-screen geometric system may be used to compute the viewer's perceived distribution based on known and/or measured optical properties of the projection device and screen SCR. Furthermore, the viewer's perceived distribution may be used to generate the first intensity scaling values. For example, the first sample-to-pixel calculation unit may be configured to normalize a minimum of the viewer's distribution to one, to invert the normalized distribution, and to evaluate the inverted normalized distribution in order to generate the first intensity scaling values. The first sample-to-calculation unit may be configured to repeatedly receive the sensor data, and to repeatedly generate the first intensity scaling values based on the sensor data as the viewer moves with respect to the display surface.

The first intensity scaling values may be between zero and one inclusive, and may be used to attenuate a first subset of the first pixel values which map onto a first hot spot region of the display surface. A first subset of the first intensity scaling values may be stored in a memory, and a second subset of the first intensity scaling values may be interpolated based on the first subset of the first intensity scaling values stored in the memory.

The graphics system embodiment described above may be generalized to operate with any number of projection devices. For example, the graphics system may further comprise a second sample-to-pixel calculation unit configured to generate a second plurality of second virtual pixel positions in the two-dimensional viewport, to compute second pixel values by filtering the samples at the second plurality of second virtual pixel positions, to multiply the second pixel values by second intensity scaling values to produce second scaled pixel values, and to provide the second scaled pixel values to a second projection device. The first intensity scaling values and the second intensity scaling values may be configured to correct the non-uniformity in the perceived distribution of light by the viewer. The second intensity scaling values may be configured to attenuate the second pixel values in the neighborhood of a second hot spot generated by the second projection device.

In a third embodiment, the graphics system may be configured to correct arbitrary display distortions, i.e. to compensate for arbitrary distortions of physical pixels (i.e. displayed pixels) on a display surface regardless of the mechanisms by which these distortions arise. The graphics system may comprise a graphics processor, a sample buffer, and a first sample-to-pixel calculation unit. The graphics processor may be operable (a) to receive graphics data, (b) to select sample positions in a two-dimensional viewport, and (c) to compute sample values at the sample positions based on the received graphics data. The sample buffer may be coupled to the graphics processor and configured to store the sample values. The first sample-to-pixel calculation unit may be coupled to the sample buffer and operable to select a first plurality of first virtual pixel positions in the two-dimensional viewport. For each first virtual pixel position in the first plurality, the first sample-to-pixel calculation unit may be operable (d) to access a first subset of the sample values corresponding to a first neighborhood of the first virtual pixel center, (e) to filter the first subset of the sample values to generate a first pixel value, and (f) to provide the first pixel value as output to a first display device. The first sample-to-pixel calculation unit may select the first plurality of first virtual pixel positions in the two-dimensional viewport in order to correct for a physical distortion of a first set of physical pixels generated by the first display device on a display surface.

The physical distortion of the first set of physical pixels may be determined relative some nominal set of screen positions (e.g. a rectangular array, a hexagonal array, etc.). The physical distortions treated by the methodologies herein disclosed may have arbitrary magnitudes. In other words, subtle physical distortions on the order of a fraction of a pixel distance may be compensated as well as large physical distortions that cover a large number of pixel distances. While small distortions on the order of a fraction of a pixel distance may not be noticeable to the viewer in a single mono-video projection scenario, such distortions have a detrimental impact on the visual quality of overlapping video and stacked video from multiple projectors. The treatment of overlapping video and stacked video will be described below.

The first sample-to-pixel calculation unit may be configured to receive calibration signals from a user/operator, and to adapt the first plurality of first virtual pixel positions in the 2-D viewport in response to the calibration signals. The first sample-to-pixel calculation unit may be configured to adapt the first plurality of first virtual pixel positions in the 2-D viewport along a one parameter family of geometric distortions in response to the calibration signals. The first sample-to-pixel calculation unit may be configured to expansively (and/or contractively) adapt the first plurality of first virtual pixel positions.

The first sample-to-pixel calculation unit may be further configured to receive sensor data indicating the physical positions of the first set of physical pixels on the display surface, and to compute the first plurality of first virtual pixel positions in response to the sensor data.

A manufacturer of display devices (e.g. monitors or projection devices) may calibrate the first virtual pixel positions for the first display device at manufacture time. The calibrated first virtual pixel positions for the first display device may be stored on a memory medium internal or external to the first display device. The manufacturer may ship the memory medium to a user along with the first display device. The user may transfer the calibrated first virtual pixel positions from the memory medium to the graphics system. The calibrated first virtual pixel positions may allow the user to immediately (or more quickly) achieve undistorted presentation of images using the graphics system and the first display device. It is noted that the need for manufacture-time calibration depends on the magnitude of variations in display distortions from unit to unit.

A trained worker at a manufacturing facility may calibrate the first virtual pixel positions by selecting one or more calibration modes (e.g. keystone mode, barrel mode, pincushion mode, etc.), and supplying plus/minus adaptation inputs for each calibration mode, until displayed objects appear undistorted. Alternatively, the manufacturer's calibration may be automated. For example, an adaptive control system may be configured to replace the trained worker.

In addition to, or perhaps, instead of, manufacture-time calibration, the graphics system may provide a mechanism (such as those suggested above) for user calibration of the first virtual pixel positions. The need for a user calibration mechanism may depend on the magnitude of time-variation in the display distortions.

If the time variation of display distortions is sufficiently large, the graphics system may be configured for continuous (e.g. real-time) calibration. For example, the graphics system may be configured to intermittently display subliminal calibration pat terns via the first display device. A video camera may monitor the presentation of the calibration patterns on the first display device (or screen SCR). The graphics system may analyze the video images, and may generate corrected first virtual pixel positions in the 2-D viewport in response to the video images. Such continuous calibration may facilitate the use of high-drift display devices which would otherwise be disturbing to viewers.

The present invention contemplates various embodiments of the graphics system where any combination of manufacture-time calibration, user calibration and/or continuous calibration may be supported.

The first sample-to-pixel calculation unit may include a first cache memory. The first cache memory may be configured to store a first number of memory bins, where the first number of memory bins depends on a maximum expected displacement of the first plurality of first virtual pixel positions from corresponding positions in a rectangular array.

The first sample-to-pixel calculation unit may select the first plurality of first virtual pixel positions with a first distortion pattern which is geometrically similar (or approximately similar) to the physical distortion of the first set of physical pixels on the display surface.

In addition, the graphics system may be configured to correct for arbitrary distortions of the physical pixels generated by multiple display devices. Thus, the graphics system may also include a second sample-to-pixel calculation unit coupled to the sample buffer and operable to select a second plurality of second virtual pixel positions in the two-dimensional viewport. For each second virtual pixel position in the second plurality, the second sample-to-pixel calculation unit may be operable (g) to access a second subset of the sample values corresponding to a second neighborhood of the second virtual pixel center, (h) to filter the second subset of the sample values to generate a second pixel value, and (i) to provide the second pixel value as output to a second display device. The second sample-to-pixel calculation unit may select the second plurality of second virtual pixel positions in the two-dimensional viewport in order to correct for a physical distortion of a second set of physical pixels generated by the second display device on the display surface. The first sample-to-pixel calculation unit and second sample-to-pixel calculation unit may be configured to receive calibration inputs from a user, and to respectively adapt the first virtual pixel positions and the second virtual pixel positions in the 2-D viewport. The first and second display devices may be projection devices.

The second sample-to-pixel calculation unit may select the second virtual pixel positions with a second distortion pattern which is geometrically similar (or approximately similar) to the physical distortion of the second set of physical pixels on the display surface.

The first sample-to-pixel calculation unit and second sample-to-pixel calculation unit may be configured to adapt the first virtual pixel positions relative to the second virtual pixel positions in the 2-D viewport in response to the calibration inputs. For example, the first sample-to-pixel calculation unit and second sample-to-pixel calculation unit may be configured to translate and/or scale (vertically and/or horizontally) the first virtual pixel positions relative to the second virtual pixel positions in the 2-D viewport in response to the calibration inputs.

A manufacturer of multi-projector (or multi-display) display systems may calibrate the virtual pixel positions for each projection device in a display system at manufacture time. The set of calibrated virtual pixel positions for each projection device in the display system may be stored in a memory medium internal to or external to the projection device. The manufacturer may ship the memory medium to a user along with the display system. The user may transfer each set of calibrated virtual pixel positions from the memory medium to the graphics system. The sets of calibrated virtual pixel positions may allow the user to immediately (or more rapidly) achieve undistorted presentation of integrated images on screen SCR using the graphics system to drive the multiple projection devices comprising the display system.

In addition to, or perhaps, instead of, manufacture-time calibration, the graphics system may provide a mechanism for user calibration of the virtual pixel positions for each projection device. The need for a user calibration mechanism may depend on the magnitude of time-variation in the physical display distortions.

If the time variation of physical display distortions is sufficiently large, the graphics system may be configured for continuous (e.g. real-time) calibration. For example, the graphics system may be configured to intermittently display subliminal calibration patterns via the multiple projection devices. A video camera may monitor the presentation of the calibration patterns generated on screen SCR by the multiple projection devices. The graphics system may analyze the video images, and may generate a corrected set of virtual pixel positions for each projection device in response to the video images.

The present invention contemplates various embodiments of the graphics system where any combination of manufacture-time calibration, user calibration and/or continuous calibration may be supported.

In a fourth embodiment, the graphics system may be configured to perform edge matching (i.e. to align the boundaries of images generated by two or more projection devices on a display surface). The graphics system may comprise a first sample-to-pixel calculation unit and a second sample-to-pixel calculation unit. The first sample-to-pixel calculation unit may be configured (i) to select a first plurality of first virtual pixel positions in a two-dimensional viewport, (ii) to generate a first stream of first pixel values by filtering samples, distributed in the two-dimensional viewport, at the first plurality of first virtual pixel positions, and (iii) to provide the first stream of first pixel values to a first projection device. The first projection device may be configured to generate a first physical pixel array on the display surface in response to receiving the first stream of first pixel values.

The second sample-to-pixel calculation unit may be configured (iv) to select a second plurality of second virtual pixel positions in the two-dimensional viewport, (v) to generate a second stream of second pixel values by filtering the samples, distributed in the two-dimensional viewport, at the second plurality of second virtual pixel positions, and (vi) to provide the second stream of second pixel values to a second projection device. The second projection device may be configured to generate a second physical pixel array on the display surface in response to receiving the second stream of second pixel values. A first physical barrier may be positioned normal to the display surface and along the interface of the first physical pixel array and the second physical pixel array. The first physical barrier may be a thin strip of light absorbing material. The first physical barrier may be in physical contact with the display surface (e.g. a projection screen).

The first sample-to-pixel calculation unit may select a subset of the first plurality of first virtual pixel positions in the two-dimensional viewport in order to correct for a first physical distortion of the first physical pixel array on the display surface. Similarly, the second sample-to-pixel calculation unit may select a subset of the second plurality of second virtual pixel positions in the two-dimensional viewport in order to correct for a second physical distortion of the second physical pixel array on the display surface. Subsets of the first and second virtual pixel positions may be selected along the edge of the first and second pixel arrays to perform edge matching.

The first projection device and the second projection device may be configured so that the overlap of the first physical pixel array and the second physical pixel array is less than a predetermined maximum value. In particular, the first projection device and the second projection device may be configured so that the first physical pixel array and the second physical pixel array overlap minimally.

The first sample-to-pixel calculation unit and second sample-to-pixel calculation unit may be configured to receive calibration signals from a user, and to adapt a subset of the first plurality of first virtual pixel positions and a subset of the second plurality of second virtual pixel positions respectively in the two-dimensional viewport in response to the calibration signals. The first sample-to-pixel calculation unit and second sample-to-pixel calculation unit may be configured to translate (vertically and/or horizontally) and/or scale (vertically and/or horizontally) the first virtual pixel positions relative to the second virtual pixel positions in the two-dimensional viewport in response to the calibration inputs.

In addition, the first sample-to-pixel calculation unit and second sample-to-pixel calculation unit may be configured to receive sensor data indicating physical positions of physical pixels comprising the first physical pixel array and the second physical pixel array on the display surface; and to compute the first virtual pixel positions and the second virtual pixel positions respectively in response to the sensor data.

The first sample-to-pixel calculation unit may select the first plurality of first virtual pixel positions with a first distortion pattern which is geometrically similar (or approximately similar) to a first physical distortion expressed by the first physical pixel array. Similarly, the second sample-to-pixel calculation unit selects the second plurality of second virtual pixel positions with a second distortion pattern which is geometrically similar (or approximately similar) to a second physical distortion expressed by the second physical pixel array.

In one embodiment, the graphics system may be configured to compensate for chromatic distortion mechanisms (such as chromatic aberration). Thus, the first sample-to-pixel calculation unit may be configured to use a separate set of virtual pixel positions for each color. The first sample-to-pixel calculation unit may select $N_C$ sets of virtual pixel positions in the two-dimensional viewport, where $N_C$ corresponds to the number of colors used by a display device. For each virtual pixel position in the $K^{th}$ set, the first sample-to-pixel calculation unit is operable to access samples in the neighborhood of the virtual pixel position, to filter the neighborhood samples to generate a corresponding pixel value, and to provide the pixel value as output to the display device. The pixel values generated in response to the $K^{th}$ set of virtual pixel positions control the $K^{th}$ color of the $N_C$ colors. The first sample-to-pixel calculation unit may select the $N_C$ sets of virtual pixel positions in the two-dimensional viewport in order to correct for arbitrary chromatic distortions arising in the display device.

Each set of virtual pixel positions may be computed in response to sensor data indicating physical positions of the physical pixels on the display surface when excited with the corresponding color. The first sample-to-pixel calculation unit selects each set of virtual pixel positions to be geometrically similar to the measured physical pixel positions when the first display device is excited only with the corresponding color. Alternatively, each set of virtual pixel positions may be computed in response to calibration inputs.

BRIEF DESCRIPTION OF THE DRAWINGS

The foregoing, as well as other objects, features, and advantages of this invention may be more completely understood by reference to the following detailed description when read together with the accompanying drawings in which:

FIG. 4A illustrates the nonuniformity of radiation intensity pattern generated by a projection device;

FIG. 4B illustrates a hot spot induced by the radiation pattern of FIG. 4A on screen SCR;

FIG. 4C illustrates an intensity distribution as a function of horizontal position along a horizontal slice HS of screen SCR;

FIG. 22 illustrates details of one embodiment of a convolution for an example set of samples at a virtual pixel center in the 2-D viewport;

FIG. 32A illustrates the definition of scaling functions used in one embodiment of graphics system 112 configured for performing edge blending over a nominally rectangular overlap region;

FIGS. 37A & 37B illustrate the control of pixel cross over by the use of a physical barrier normal to screen SCR and lying on top of boundary line L;

Figure 1:
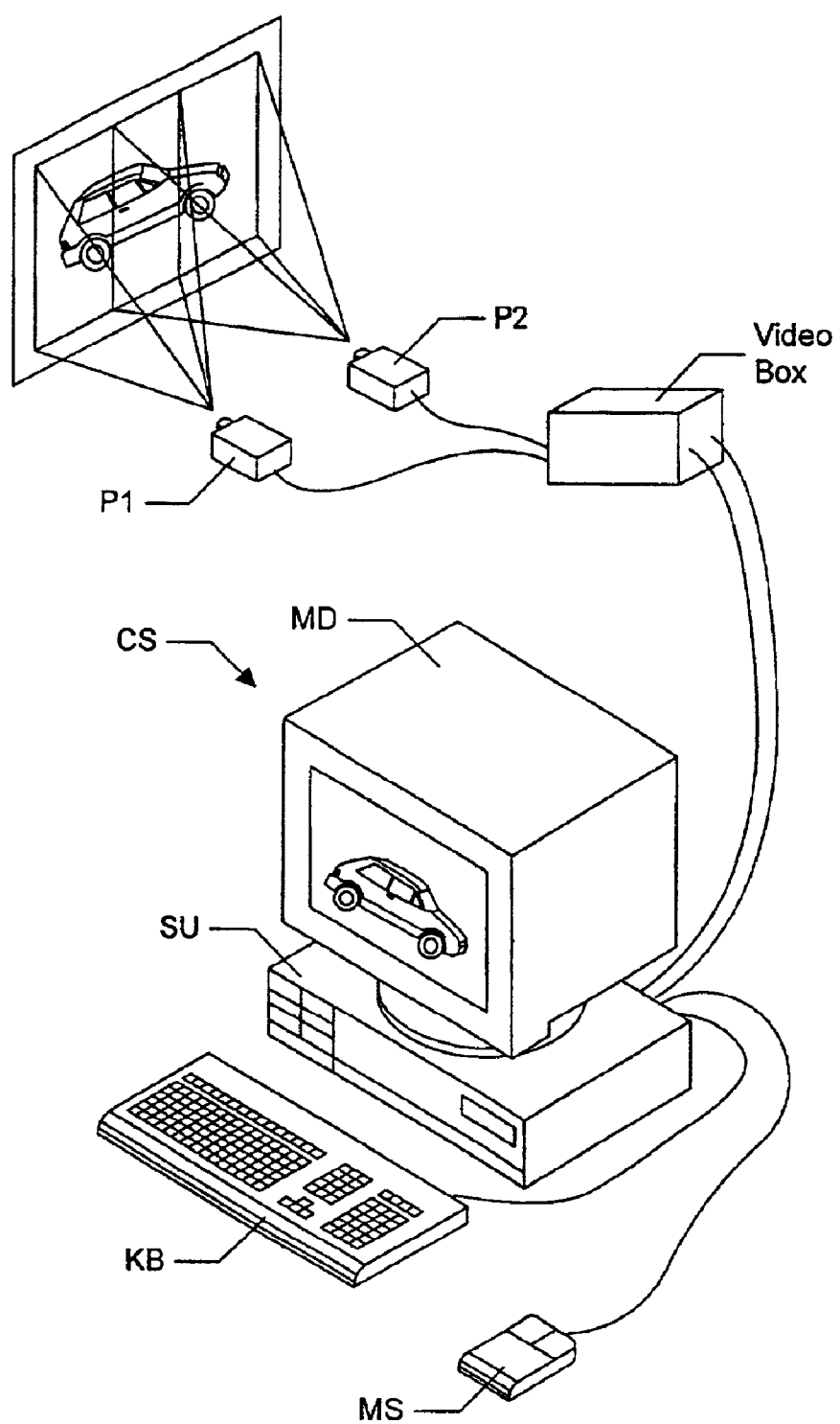
FIG. 1 illustrates computer system CS according to the prior art configured for driving one or more display devices (including projection devices P1 and P2) to form an combined image on screen SCR.
Figure 2A:
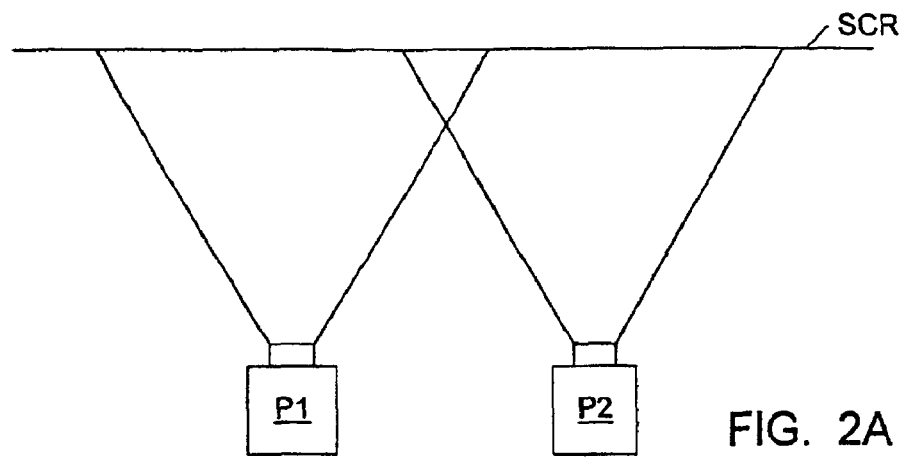
FIG. 2A illustrates the overlap of two images generated by two projection devices.
Figure 2B:
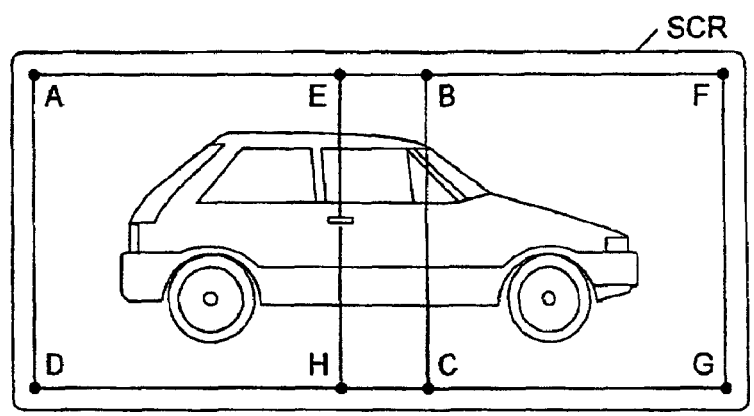
FIG. 2B illustrates a composite image generated by the two overlapped images on a projection screen SCR.
Figure 2C:
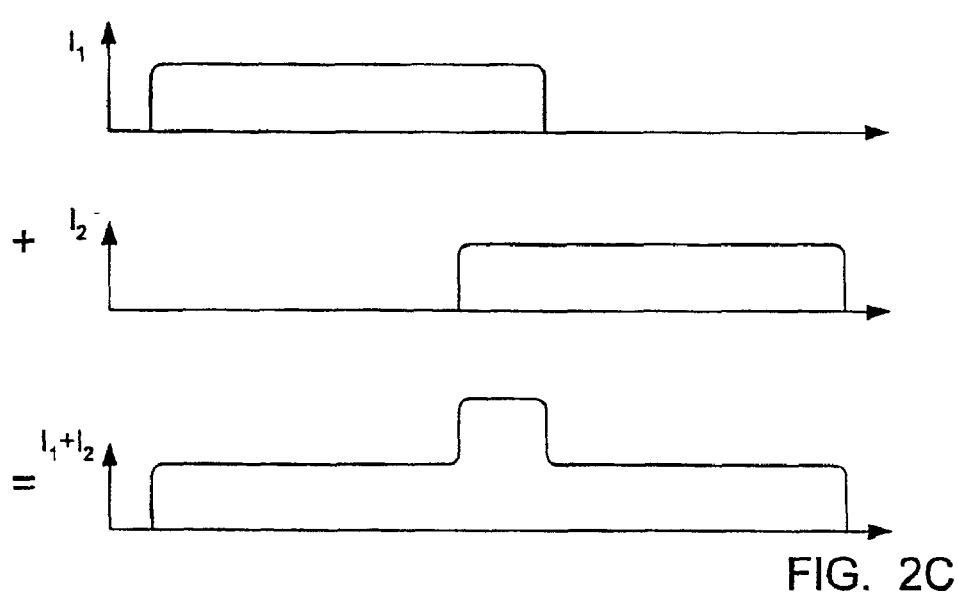
FIG. 2C illustrates the intensity distribution due to each projection device on screen SCR as a function of horizontal position, and the combined intensity distribution which exhibits added brightness in the overlap region.

While the invention is susceptible to various modifications and alternative forms, specific embodiments thereof are shown by way of example in the drawings and will be described in detail herein. It should be understood, however, that the drawings and detailed description thereto are not intended to limit the invention to the particular forms disclosed, but on the contrary, the intention is to cover all modifications, equivalents, and alternatives falling within the spirit and scope of the present invention as defined by the appended claims. Please note that the headings are for organizational purposes only and are not meant to limit the description or claims. The word "may" is used in this application in a permissive sense (i.e., having the potential to, being able to), not a mandatory sense (i.e., must). Similarly, the word "include", and derivations thereof, are used herein to mean "including, but not limited to."

DETAILED DESCRIPTION OF SEVERAL EMBODIMENTS

Figure 7:
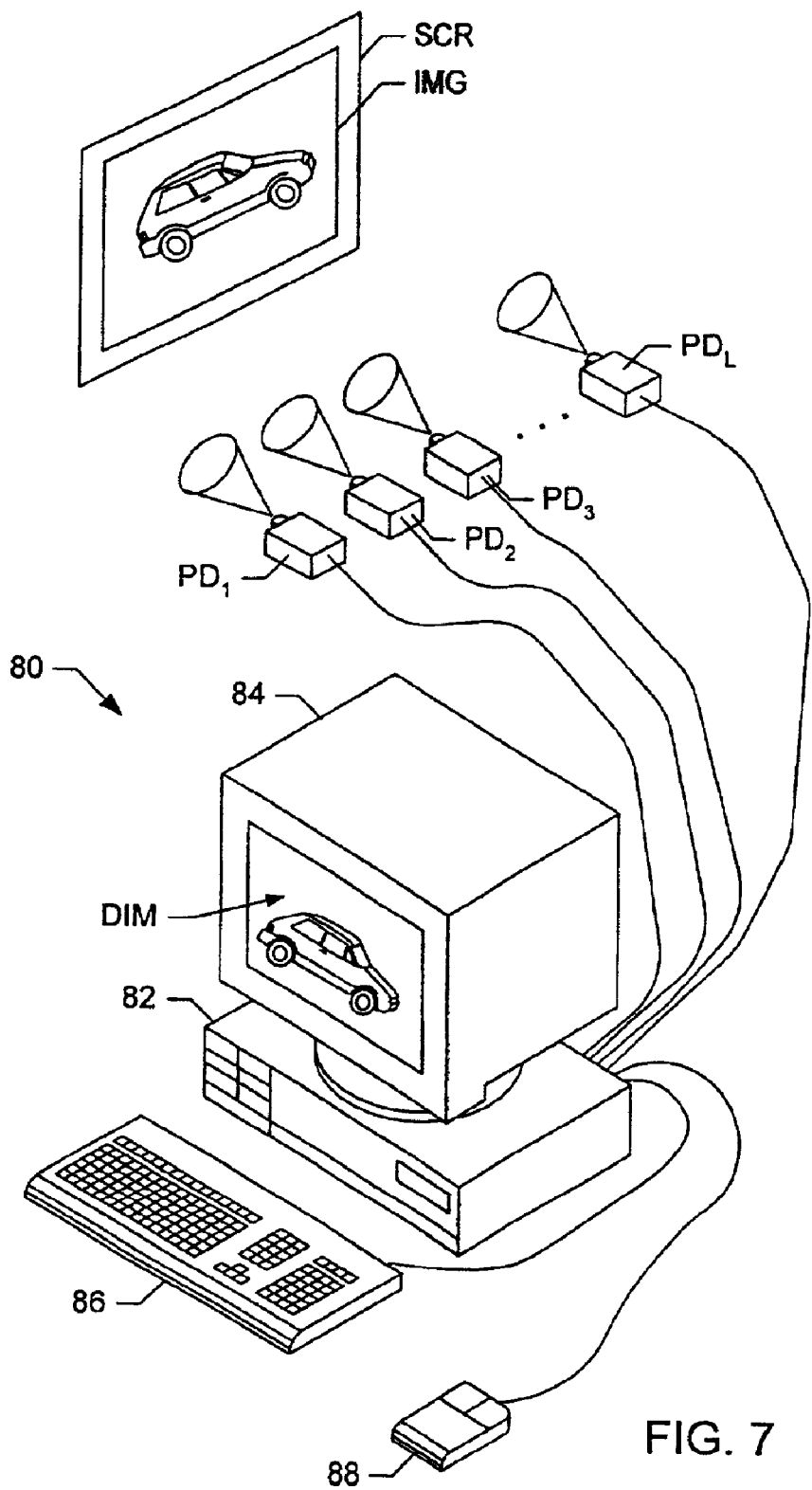
FIG. 7 illustrates a computer system which includes a graphics system 112 according to the present invention for driving one or more display devices (including monitor device 84 and/or projection devices $PD_1$ through $PD_L$)

Computer System—FIG. 7

FIG. 7 illustrates one embodiment of a computer system 80 which performs three-dimensional (3-D) graphics according to the present invention. Computer system 80 comprises a system unit 82 which may couple to a display device 84 and/or one or more projections devices $PD_1$ through $PD_L$. Projection devices $PD_1$ through $PD_L$ may be realized by any of a variety of projection technologies. For example, projection devices $PD_1$ through $PD_L$ may be CRT-based projectors, LCD projectors, LightValve projectors, gas-plasma projectors, digital micromirror (DMM) projectors, LCOS projectors, etc., or any combination thereof. Similarly, display device 84 may be realized by any of a variety of display technologies. For example, display device 84 may be a CRT display, an LCD display, a gas-plasma display, a digital micromirror display, an LCOS display, etc.

A graphics system comprised within computer system 80 drives projection devices $PD_1$ through $PD_L$ with video signals. Each of projection devices $PD_1$ through $PD_L$ receives a corresponding video signal, and displays a portion of the integrated image IMG on projection screen SCR. It is noted that projection devices $PD_1$ through $PD_L$ may project their respective component images onto a surface other than a conventional projection screen, and onto surfaces that are curved. For example, in one embodiment, screen SCR may have optical elements which are configured to assist in focussing or directing light to the viewer. In another embodiment (not shown), the projection devices $PD_1$ through $PD_L$ are mounted on a viewer's head and project their component images directly into the viewer's eyes. Thus, screen SCR represents the viewer's retinas. Multiple projection devices (e.g. linear arrays of LEDs with oscillating mirrors) may be used for each eye. The multiple projection devices which correspond to a single eye may be configured so their component images cover separate portions of the retina.

Various input devices may be connected to computer system 80, including a keyboard 86, a mouse 88, a video camera, a trackball, a digitizer, a tablet, a six-degree of freedom input device, a head tracker, an eye tracker, a data glove, body sensors, etc. Application software may be executed by computer system 80 to display 3-D graphical objects on projection screen SCR and/or display device 84.

As described further below, the 3-D graphics system comprised in computer system 80 may include a super-sampled sample buffer and a plurality of programmable sample-to-pixel calculation units to improve the quality and realism of images displayed by projection devices $PD_1$ through $PD_L$ and display device 84. Each sample-to-pixel calculation unit may include a filter (e.g. convolution) pipeline or other hardware for generating pixel values (e.g. red, green and blue values) based on samples in the sample buffer. Each sample-to-pixel calculation unit may obtain samples from the sample buffer and generate pixel values which are provided to any of projection devices $PD_1$ through $PD_L$ or display device 84. The sample-to-pixel calculation units may operate in a "real-time" or "on-the-fly" fashion.

As used herein, the term "real-time" refers to a process or operation that is performed at or near the refresh rate of projection devices $PD_1$ through $PD_L$ or display device 84. The term "on-the-fly" refers to a process or operation that generates images at a rate near or above the minimum rate required for displayed motion to appear smooth (i.e. motion fusion) and for the light intensity to appear continuous (i.e. flicker fusion). These concepts are further described in the book "Spatial Vision" by Russel L. De Valois and Karen K. De Valois, Oxford University Press, 1988.

Figure 8A:
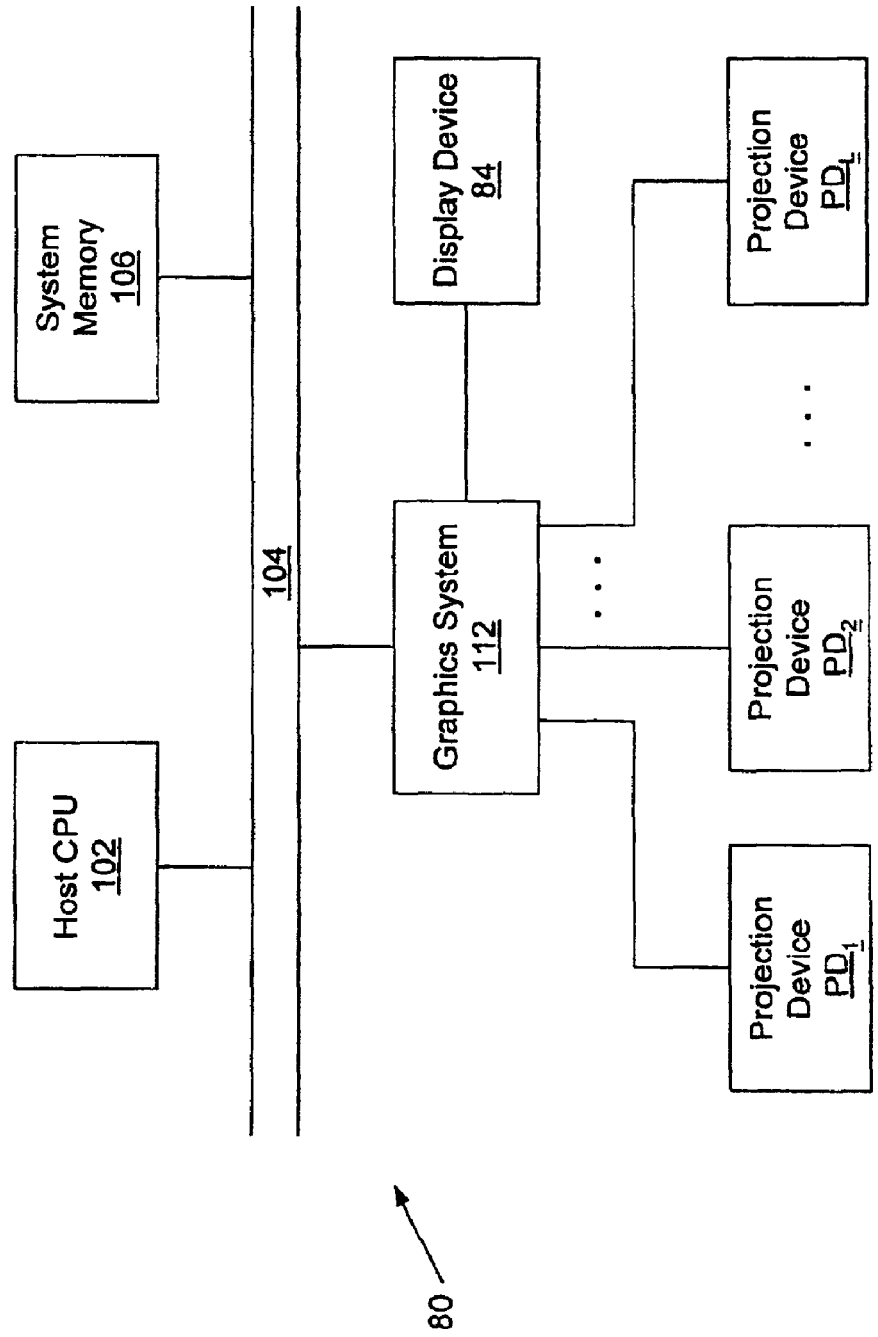
FIG. 8A is a simplified block diagram of the computer system of FIG. 7.

Computer System Block Diagram—FIG. 8A

FIG. 8A presents a simplified block diagram for computer system 80. Elements of computer system 80 that are not necessary for an understanding of the present invention are suppressed for convenience. Computer system 80 comprises a host central processing unit (CPU) 102 and a 3-D graphics system 112 coupled to system bus 104. A system memory 106 may also be coupled to system bus 104. A non-volatile memory (not shown) may also be coupled to system bus 104.

Host CPU 102 may be realized by any of a variety of processor technologies. For example, host CPU 102 may comprise one or more general purpose microprocessors, parallel processors, vector processors, digital signal processors, etc., or any combination thereof. System memory 106 may include one or more memory subsystems representing different types of memory technology. For example, system memory 106 may include read-only memory (ROM), random access memory (RAM)—such as static random access memory (SRAM), synchronous dynamic random access memory (SDRAM), or Rambus dynamic access memory (RDRAM).

System bus 104 may comprise one or more communication buses or host computer buses (for communication between host processors and memory subsystems). In addition, various peripheral devices and peripheral buses may be connected to system bus 104.

Figure 8B:
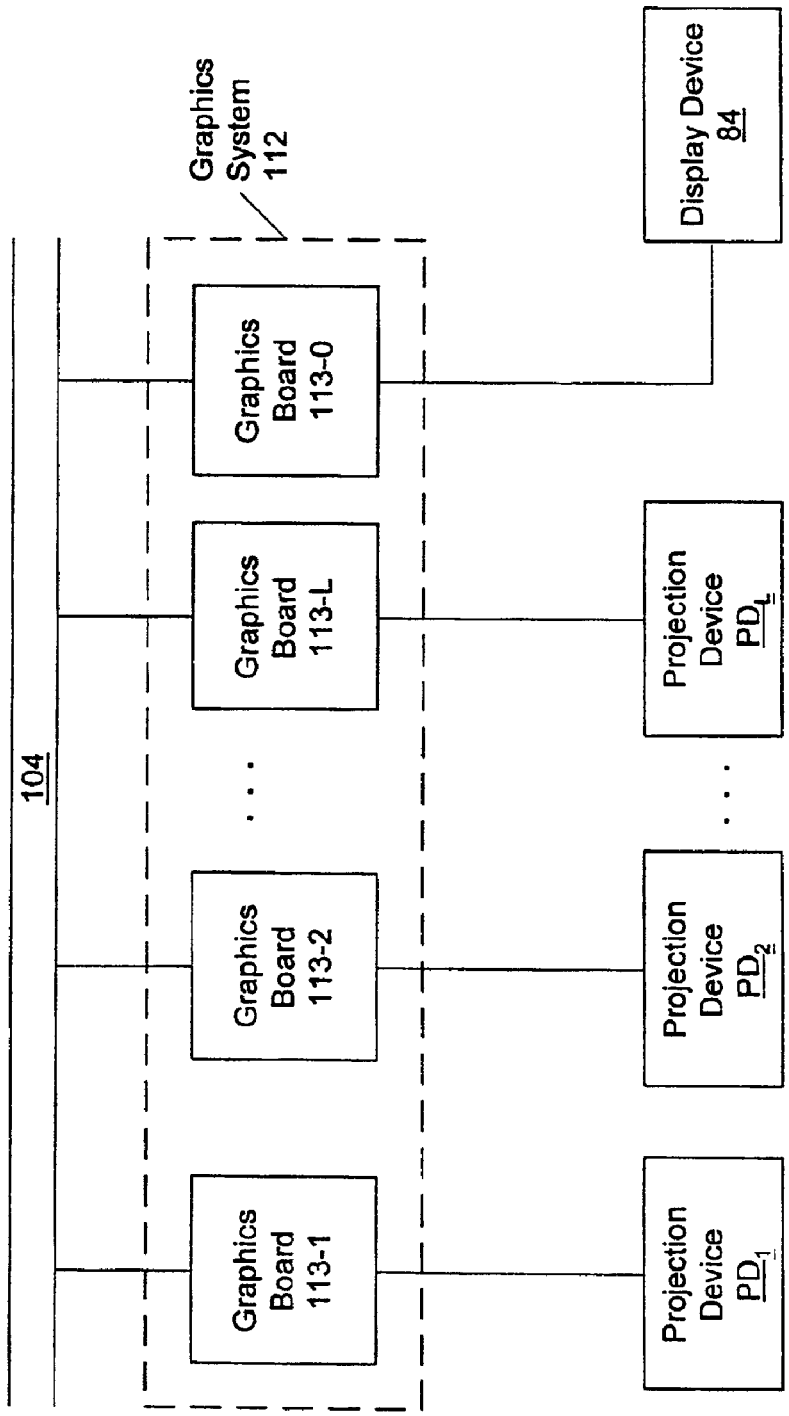
FIG. 8B illustrates one embodiment of graphics system 112 in which graphics cards correspond to projection devices in a one-to-one fashion.

Graphics system 112 comprises one or more graphics boards configured according to the principles of the present invention. The graphics boards may couple to system bus 104 by crossbar switches or any other type of bus connectivity logic. The graphics boards generate a set of video signals, i.e. one video signal for each of projection devices $PD_1$–$PD_L$ and display device 84. In one embodiment, graphics system 112 comprises graphics boards 113-1 through 113-L which couple to projection devices $PD_1$–$PD_L$ in a one-to-one fashion, i.e. generic graphics board 113-I couples to and generates the video signal for projection device $PD_I$ as shown in FIG. 8B. In addition, graphics system 112 may include a graphics board 113-0 which drives display device 84.

Figure 8C:
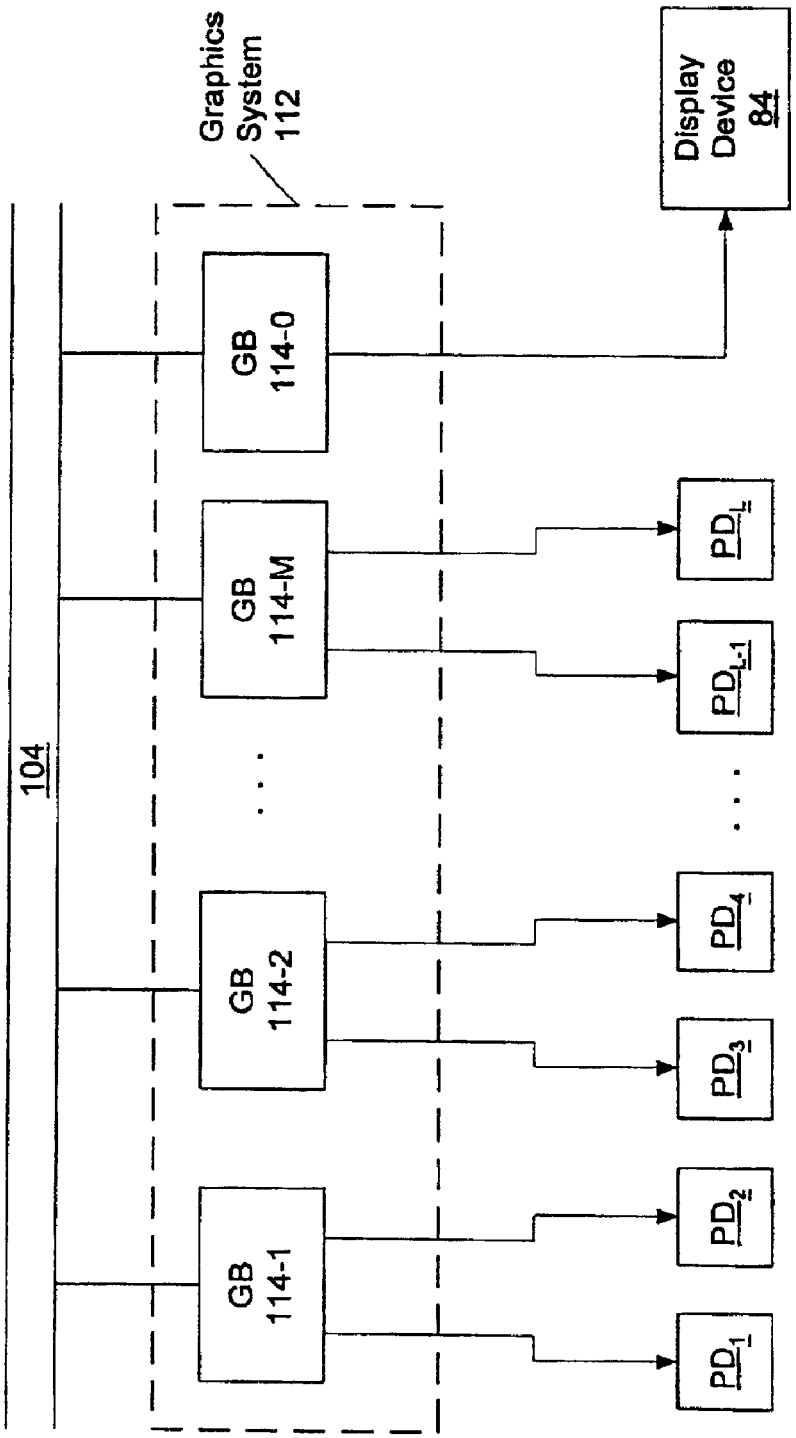
FIG. 8C illustrates another embodiment of graphics system 112 in which each graphics card drives two projection devices.

In a second embodiment, graphics system 112 comprises graphics boards 114-1 through 114-M which couple to projection devices $PD_1$–$PD_L$ in a one-to-two fashion, i.e. generic graphics board 114-I couples to and generates video signals for two projection devices $PD_I$ and $PD_{I+1}$ as shown in FIG. 8C. Thus, integer M equals L/2.

Figure 8D:
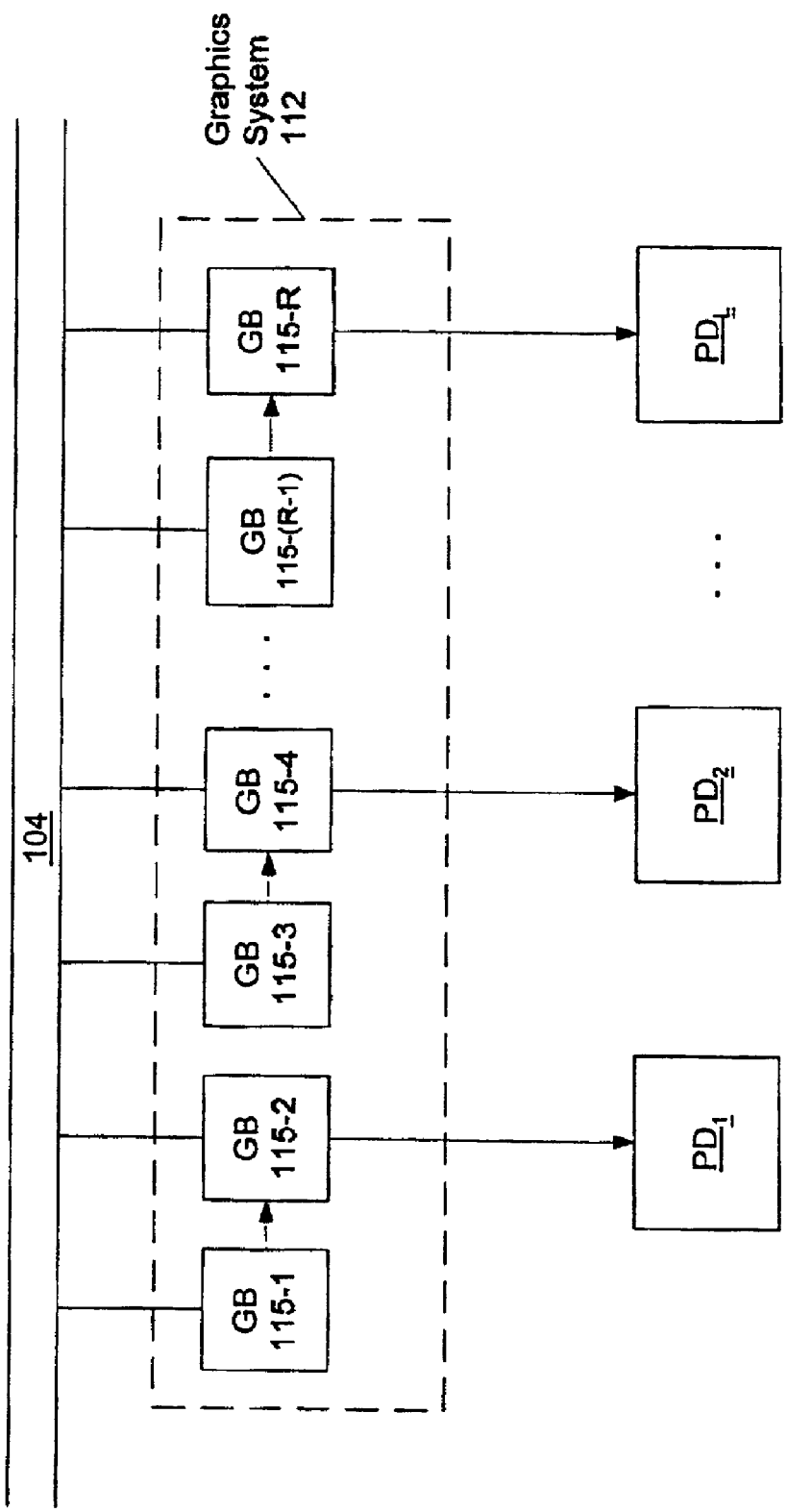
FIG. 8D illustrates yet another embodiment of graphics system 112 in two graphics cards collaborate to generate the video output for each projection device.

In a third embodiment, graphics system 112 comprises graphics boards 115-1 through 115-R which couple to projection devices $PD_1$–$PD_L$ in a two-to-one fashion, i.e. graphics boards 115-I and 115-(I+1) may be daisy chained together to generate a video signal for projection device $PD_I$ as shown in FIG. 8D. Thus, integer R equals 2L.

Graphics boards 113, 114, and 115 may be interchangeable between the three embodiments just described. In other words, graphics boards 113, 114 and 115 may be identical or substantially similar, and may be used in any of the above three embodiments subject to changes in software configuration. Alternatively, graphics boards 113, 114 and 115 may be optimized for their respective embodiments.

The present invention contemplates a wide distribution of possible mappings between graphics boards and projection devices. At one end of the distribution, a single graphics board may drive L projection devices, where the size of L is limited by the computational bandwidth of the graphics board. At the other end of the distribution, X graphics boards may drive a single projection device. The size of integer X is determined by the input video bandwidth of the projection device. The X graphics boards may be daisy-chained together, and partition the effort of generating the video signal for the single projection device.

In addition, X graphics boards may map to L projections devices where neither X nor L are equal to one. For example, three graphics boards may drive two projection devices. A first graphics board and half of the resources/bandwidth of a second graphics board may be used to generate a video signal for a first projection device $PD_1$, and a third graphics board together with the remaining half of the resources/bandwidth of the second graphics board may be used to generate a video signal for a second projection device $PD_2$.

A user may configure graphics system 112 with any combination of the board-to-projector mappings suggested above. For example, the user may have five projectors: one with large input bandwidth, two with moderate input bandwidth, and two with small input bandwidth. Thus, the user may choose to assign two or more graphics boards to the large bandwidth projector, one graphics board each to the moderate bandwidth projectors, and one graphics board to the two small bandwidth projectors.

It is noted that the graphics boards comprising 3-D graphics system 112 may couple to one or more busses of various types in addition to system bus 104. Furthermore, some or all of the graphics boards may couple to a communication port, and thereby, directly receive graphics data from an external source such as the Internet or a local area network.

Host CPU 102 may transfer information to/from graphics system 112 according to a programmed input/output (I/O) protocol over system bus 104. Alternately, graphics system 112 may access system memory 106 according to a direct memory access (DMA) protocol or through intelligent bus-mastering.

A graphics application program conforming to an application programming interface (API) such as OpenGL® or Java 3D may execute on host CPU 102 and generate commands and data that define a geometric primitive such as a polygon for output on projection devices $PD_1$ through $PD_L$ and/or display device 84. Host CPU 102 may transfer this graphics data to system memory 106. Thereafter, the host CPU 102 may transfer the graphics data to graphics system 112 over system bus 104. In another embodiment, graphics system 112 may read geometry data arrays from system memory 106 using DMA access cycles. In yet another embodiment, graphics system 112 may be coupled to system memory 106 through a direct port, such as an Advanced Graphics Port (AGP) promulgated by Intel Corporation.

Graphics system 112 may receive graphics data from any of various sources including host CPU 102, system memory 106 or any other memory, external sources such as a network (e.g., the Internet) or a broadcast medium (e.g. television).

As will be described below, graphics system 112 may be configured to allow more efficient microcode control, which results in increased performance for handling of incoming color values corresponding to the polygons generated by host CPU 102.

While graphics system 112 is depicted as part of computer system 80, graphics system 112 may also be configured as a stand-alone device. Graphics system 112 may also be configured as a single chip device or as part of a system-on-a-chip or a multi-chip module.

Graphics system 112 may be comprised in any of various systems, including a network PC, an Internet appliance, a television (including an HDTV system or an interactive television system), a personal digital assistant (PDA), or other devices which display 2D and/or 3D graphics.

Figure 9:
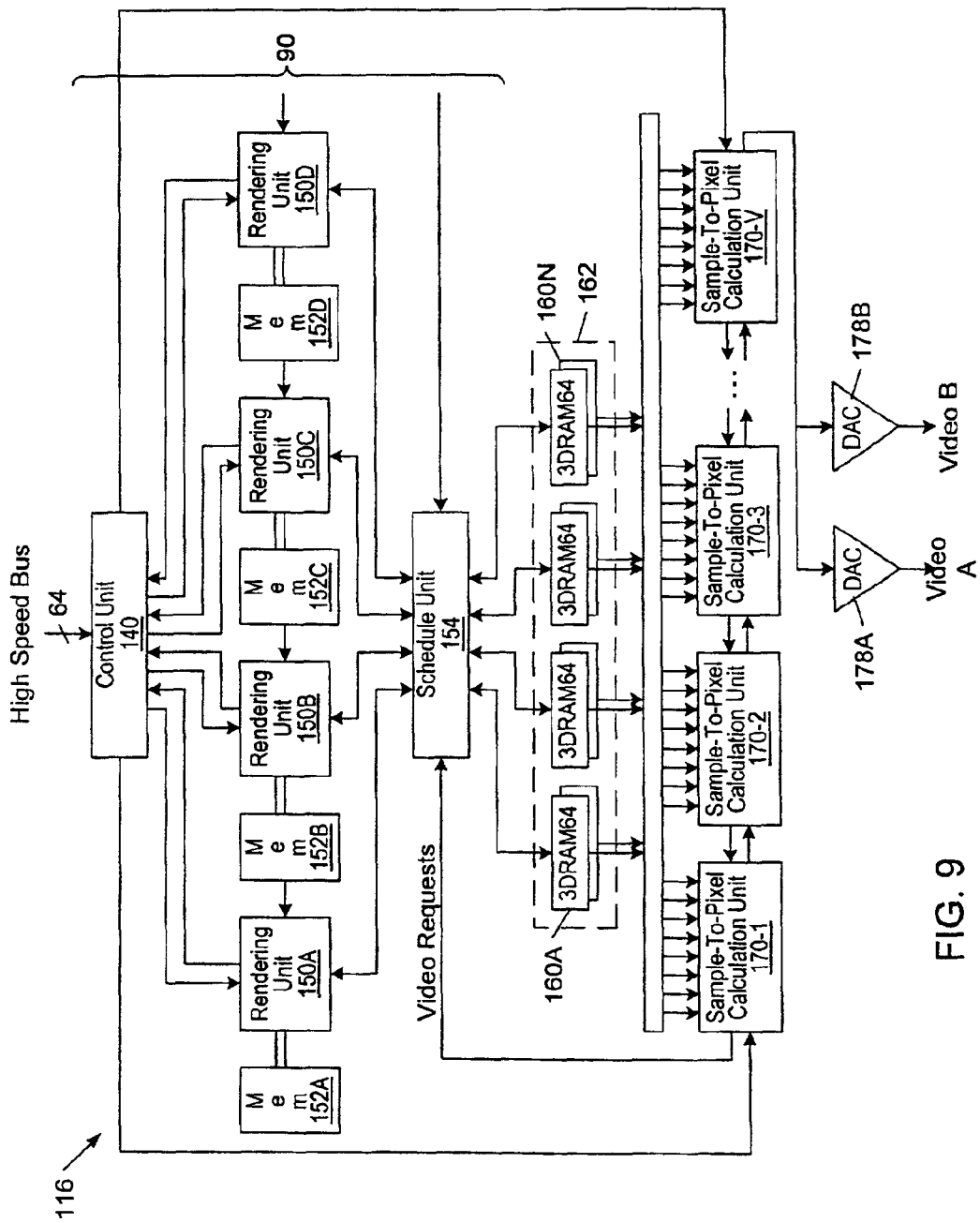
FIG. 9 is a block diagram illustrating one embodiment of a graphics card 116.

Graphics Board 116—FIG. 9

FIG. 9 presents a block diagram for one embodiment of graphics board 116 according to the present invention. The following description of graphics board 116 generically describes any of graphics boards 113, 114 and 115. Graphics board 116 may comprise a graphics processing unit (GPU) 90, one or more super-sampled sample buffers 162, and one or more sample-to-pixel calculation units 170-1 through 170-V. Graphics board 116 may also comprise two digital-to-analog converters (DACs) 178A and 178B. In other embodiments, graphics board 116 may comprise more than two digital-to-analog converters.

Graphics processing unit 90 may comprise any combination of processor technologies. For example, graphics processing unit 90 may comprise specialized graphics processors or calculation units, multimedia processors, DSPs, general purpose processors, programmable logic, reconfigurable logic, or discrete logic.

In one embodiment, graphics processing unit 90 may comprise one or more rendering units 150A–D. Graphics processing unit 90 may also comprise one or more control units 140, one or more data memories 152A–D, and one or more schedule units 154. Sample buffer 162 may comprise one or more sample memories 160A–160N.

A. Control Unit 140

Control unit 140 operates as the interface between graphics board 116 and computer system 80 by controlling the transfer of data between graphics board 116 and computer system 80. In embodiments of graphics board 116 that comprise two or more rendering units 150A–D, control unit 140 may also divide the stream of data received from computer system 80 into a corresponding number of parallel streams that are routed to the individual rendering units 150A–D. The graphics data may be received from computer system 80 in a compressed form. Graphics data compression may advantageously reduce the required transfer bandwidth between computer system 80 and graphics board 116. In one embodiment, control unit 140 may be configured to split and route the received data stream to rendering units 150A–D in compressed form.

The graphics data may comprise one or more graphics primitives. As used herein, the term graphics primitive includes polygons, parametric surfaces, splines, NURBS (non-uniform rational B-splines), sub-division surfaces, fractals, volume primitives, and particle systems. These graphics primitives are described in detail in the text book entitled "Computer Graphics: Principles and Practice" by James D. Foley, et al., published by Addison-Wesley Publishing Co., Inc., 1996.

It is noted that the embodiments and examples of the invention presented herein are described in terms of polygons for the sake of simplicity. However, any type of graphics primitive may be used instead of or in addition to polygons in these embodiments and examples.

B. Rendering Units

Rendering units 150A–D (also referred to herein as draw units) are configured to receive graphics instructions and data from control unit 140 and then perform a number of functions which depend on the exact implementation. For example, rendering units 150A–D may be configured to perform decompression (if the received graphics data is presented in compressed form), transformation, clipping, lighting, texturing, depth cueing, transparency processing, set-up, visible object determination, and virtual screen rendering of various graphics primitives occurring within the graphics data.

Depending upon the type of compressed graphics data received, rendering units 150A–D may be configured to perform arithmetic decoding, run-length decoding, Huffman decoding, and dictionary decoding (e.g., LZ77, LZSS, LZ78, and LZW). Rendering units 150A–D may also be configured to decode graphics data that has been compressed using geometric compression. Geometric compression of 3D graphics data may achieve significant reductions in data size while retaining most of the image quality. A number of methods for compressing and decompressing 3D geometry are described in:

U.S. Pat. No. 5,793,371, application Ser. No. 08/511,294, filed on Aug. 4, 1995, entitled "Method And Apparatus For Geometric Compression Of Three-Dimensional Graphics Data," and U.S. patent application Ser. No. 09/095,777, filed on Jun. 11, 1998, entitled "Compression of Three-Dimensional Geometry Data Representing a Regularly Tiled Surface Portion of a Graphical Object,".

In embodiments of graphics board 116 that support decompression, the graphics data received by each rendering unit 150 is decompressed into one or more graphics "primitives" which may then be rendered. The term primitive refers to components of objects that define its shape (e.g., points, lines, triangles, polygons in two or three dimensions, polyhedra, or free-form surfaces in three dimensions). Each rendering unit 150 may be any suitable type of high performance processor (e.g., a specialized graphics processor or calculation unit, a multimedia processor, a digital signal processor, or a general purpose processor).

Transformation refers to applying a geometric operation to a primitive or an object comprising a set of primitives. For example, an object represented by a set of vertices in a local coordinate system may be embedded with arbitrary position, orientation, and size in world space using an appropriate sequence of translation, rotation, and scaling transformations. Transformation may also comprise reflection, skewing, or any other affine transformation. More generally, transformations may comprise non-linear operations.

Lighting refers to calculating the illumination of the objects. Lighting computations result in an assignment of color and/or brightness to objects or to selected points (e.g. vertices) on objects. Depending upon the shading algorithm being used (e.g., constant, Gourand, or Phong shading), lighting may be evaluated at a number of different locations. For example, if constant shading is used (i.e., the lighted surface of a polygon is assigned a constant illumination value), then the lighting need only be calculated once per polygon. If Gourand shading is used, then the lighting is calculated once per vertex. Phong shading calculates the lighting on a per-sample basis.

Clipping refers to the elimination of graphics primitives or portions of graphics primitives which lie outside of a 3-D view volume in world space. The 3-D view volume may represent that portion of world space which is visible to a virtual observer situated in world space. For example, the view volume may be a solid cone generated by a 2-D view window and a view point located in world space. The solid cone may be imagined as the union of all rays emanating from the view point and passing through the view window. The view point may represent the world space location of the virtual observer. Primitives or portions of primitives which lie outside the 3-D view volume are not currently visible and may be eliminated from further processing. Primitives or portions of primitives which lie inside the 3-D view volume are candidates for projection onto the 2-D view window.

In order to simplify the clipping and projection computations, primitives may be transformed into a second, more convenient, coordinate system referred to herein as the viewport coordinate system. In viewport coordinates, the view volume maps to a canonical 3-D viewport which may be more convenient for clipping against.

Graphics primitives or portions of primitives which survive the clipping computation may be projected onto a 2-D viewport depending on the results of a visibility determination. Instead of clipping in 3-D, graphics primitives may be projected onto a 2-D view plane (which includes the 2-D viewport) and then clipped with respect to the 2-D viewport.

Virtual display rendering refers to calculations that are performed to generate samples for projected graphics primitives. For example, the vertices of a triangle in 3-D may be projected onto the 2-D viewport. The projected triangle may be populated with samples, and values (e.g. red, green, blue and z values) may be assigned to the samples based on the corresponding values already determined for the projected vertices. (For example, the red value for each sample in the projected triangle may be interpolated from the known red values of the vertices.) These sample values for the projected triangle may be stored in sample buffer 162. A virtual image accumulates in sample buffer 162 as successive primitives are rendered. Thus, the 2-D viewport is said to be a virtual screen on which the virtual image is rendered. The sample values comprising the virtual image are stored into sample buffer 162. Points in the 2-D viewport are described in terms of virtual screen coordinates X and Y, and are said to reside in virtual screen space.

When the virtual image is complete, e.g., when all graphics primitives have been rendered, sample-to-pixel calculation units 170 may access the samples comprising the virtual image, and may filter the samples to generate pixel values. In other words, the sample-to-pixel calculation units 170 may perform a spatial convolution of the virtual image with respect to a convolution kernel $C(X,Y)$ to generate pixel values. For example, a red value $R_p$ for a pixel P may be computed at any location $(X_p, Y_p)$ in virtual screen space based on the relation $$R_p = \frac{1}{E} \Sigma C(X_k - X_p, Y_k - Y_p) R(X_k, Y_k),$$

where the summation is evaluated at samples $(X_k, Y_k)$ in the neighborhood of location $(X_p, Y_p)$. Since convolution kernel $C(X,Y)$ is non-zero only in a neighborhood of the origin, the displaced kernel $C(X-X_p, Y-Y_p)$ may take non-zero values only in a neighborhood of location $(X_p, Y_p)$. Similar summations to compute green and blue pixel values in terms of the green and blue sample values respectively may be performed in parallel with the red pixel value summation.

The value E is a normalization value that may be computed according to the relation $$E=\Sigma C(X_k-X_p, Y_k-Y_p),$$

where the summation is evaluated for the same samples $(X_k, Y_k)$ as in the red pixel value summation above. The summation for the normalization value E may be performed in parallel with the red, green and/or blue pixel value summations. The location $(X_p, Y_p)$ may be referred to as a pixel center, or a pixel origin. In the case where the convolution kernel C(X,Y) is symmetric with respect to the origin (0,0), the term pixel center is favored.

The pixel values may be presented to one or more of projection devices $PD_1$ through $PD_L$ for display on projection screen SCR. The projection devices each generate a portion of integrated image IMG. Sample-to-pixel calculation units 170 may also generate pixel values for display on display device 84.

In the embodiment of graphics board 116 shown in FIG. 9, rendering units 150A–D calculate sample values instead of pixel values. This allows rendering units 150A–D to perform super-sampling, i.e. to calculate more than one sample per pixel. Super-sampling in the context of the present invention is discussed more thoroughly below. More details on super-sampling are discussed in the following books: "Principles of Digital Image Synthesis" by Andrew S. Glassner, 1995, Morgan Kaufman Publishing (Volume 1); "The Renderman Companion" by Steve Upstill, 1990, Addison Wesley Publishing; and "Advanced Renderman: Beyond the Companion" by Anthony A. Apodaca.

Sample buffer 162 may be double-buffered so that rendering units 150A–D may write samples for a first virtual image into a first portion of sample buffer 162, while a second virtual image is simultaneously read from a second portion of sample buffer 162 by sample-to-pixel calculation units 170.

It is noted that the 2-D viewport and the virtual image which is rendered with samples into sample buffer 162 may correspond to an area larger than that area which is physically displayed as integrated image IMG or display image DIM. For example, the 2-D viewport may include a viewable subwindow. The viewable subwindow may correspond to integrated image IMG and/or display image DIM, while the marginal area of the 2-D viewport (outside the viewable subwindow) may allow for various effects such as panning and zooming. In other words, only that portion of the virtual image which lies within the viewable subwindow gets physically displayed. In one embodiment, the viewable subwindow equals the whole of the 2-D viewport. In this case, all of the virtual image gets physically displayed.

C. Data Memories

Each of rendering units 150A–D may be coupled to a corresponding one of instruction and data memories 152A–D. In one embodiment, each of memories 152A–D may be configured to store both data and instructions for a corresponding one of rendering units 150A–D. While implementations may vary, in one embodiment, each data memory 152A–D may comprise two 8 MByte SDRAMs, providing a total of 16 MBytes of storage for each rendering unit 150A–D. In another embodiment, RDRAMs (Rambus DRAMs) may be used to support the decompression and set-up operations of each rendering unit, while SDRAMs may be used to support the draw functions of each rendering unit. Data memories 152A–D may also be referred to as texture and render memories 152A–D.

D. Schedule Unit

Schedule unit 154 may be coupled between rendering units 150A–D and sample memories 160A–N. Schedule unit 154 is configured to sequence the completed samples and store them in sample memories 160A–N. Note in larger configurations, multiple schedule units 154 may be used in parallel. In one embodiment, schedule unit 154 may be implemented as a crossbar switch.

E. Sample Memories

Super-sampled sample buffer 162 comprises sample memories 160A–160N, which are configured to store the plurality of samples generated by rendering units 150A–D. As used herein, the term "sample buffer" refers to one or more memories which store samples. As previously noted, samples may be filtered to form each output pixel value. Output pixel values may be provided to one or more of projection devices $PD_1$ through $PD_L$ for display on projection screen SCR. Output pixel values may also be provided to display device 84. Sample buffer 162 may be configured to support super-sampling, critical sampling, or sub-sampling with respect to pixel resolution. In other words, the average distance between samples $(X_k, Y_k)$ in the virtual image (stored in sample buffer 162) may be smaller than, equal to, or larger than the average distance between pixel centers in virtual screen space. Furthermore, because the convolution kernel C(X,Y) may take non-zero functional values over a neighborhood which spans several pixel centers, a single sample may contribute to several output pixel values.

Sample memories 160A–160N may comprise any of various types of memories (e.g., SDRAMs, SRAMs, RDRAMs, 3DRAMs, or next-generation 3DRAMs) in varying sizes. In one embodiment, each schedule unit 154 is coupled to four banks of sample memories, where each bank comprises four 3DRAM-64 memories. Together, the 3DRAM-64 memories may form a 116-bit deep super-sampled sample buffer that stores multiple samples per pixel. For example, in one embodiment, each sample memory 160A–160N may store up to sixteen samples per pixel.

3DRAM-64 memories are specialized memories configured to support full internal double buffering with single buffered Z in one chip. The double buffered portion comprises two RGBX buffers, where X is a fourth channel that can be used to store other information (e.g., alpha). 3DRAM-64 memories also have a lookup table that takes in window ID information and controls an internal 2-1 or 3-1 multiplexer that selects which buffer's contents will be output. 3DRAM-64 memories are next-generation 3DRAM memories that may soon be available from Mitsubishi Electric Corporation's Semiconductor Group. In one embodiment, 32 chips used in combination are sufficient to create a 1280×1024 double-buffered super-sampled sample buffer supporting sample densities up to eight samples per pixel.

Since the 3DRAM-64 memories are internally double-buffered, the input pins for each of the two frame buffers in the double-buffered system are time multiplexed (using multiplexers within the memories). The output pins may be similarly time multiplexed. This allows reduced pin count while still providing the benefits of double buffering. 3DRAM-64 memories further reduce pin count by not having z output pins. Since z comparison and memory buffer select on are dealt with internally, use of the 3DRAM-64 memories may simplify the configuration of sample buffer 162. For example, sample buffer 162 may require little or no selection logic on the output side of the 3DRAM-64 memories. The 3DRAM-64 memories also reduce memory bandwidth since information may be written into a 3DRAM-64 memory without the traditional process of reading data out, performing a z comparison, and then writing data back in. Instead, the data may be simply written into the 3DRAM-64 memory, with the memory performing the steps described above internally.

However, in other embodiments of graphics board 116, other memories (e.g., SDRAMs, SRAMs, RDRAMs, or current generation 3DRAMs) may be used to form sample buffer 162.

Graphics processing unit 90 may be configured to generate a plurality of sample positions according to a particular sample positioning scheme (e.g., a regular grid, a perturbed regular grid, etc.). Alternatively, the sample positions (or offsets that are added to regular grid positions to form the sample positions) may be read from a sample position memory (e.g., a RAM/ROM table). Upon receiving a polygon that is to be rendered, graphics processing unit 90 determines which samples fall within the polygon based upon the sample positions. Graphics processing unit 90 renders the samples that fall within the polygon and stores rendered samples in sample memories 160A–N. Note as used herein the terms render and draw are used interchangeably and refer to calculating color values for samples. Depth values, alpha values, and other per-sample values may also be calculated in the rendering or drawing process.

F. Sample-to-Pixel Calculation Units

Sample-to-pixel calculation units 170-1 through 170-V (collectively referred to as sample-to-pixel calculation units 170) may be coupled between sample memories 160A–N and DACs 178-1 through 178-L. Sample-to-pixel calculation units 170 are configured to read selected samples from sample memories 160A–N and then perform a filtering operation (e.g. a convolution) on the samples to generate the output pixel values which are provided to DACs 178-1 through 178-L. The sample-to-pixel calculation units 170 may be programmable to allow them to perform different filter functions at different times depending upon the type of output desired.

In one embodiment, the sample-to-pixel calculation units 170 may implement a super-sample reconstruction band-pass filter to convert the super-sampled sample buffer data (stored in sample memories 160A–N) to pixel values. The support of the band-pass filter may cover a rectangular area in virtual screen space which is $M_p$ pixels high and $N_p$ pixels wide. Thus, the number of samples covered by the band-pass filter is approximately equal to $M_p N_p S$, where S is the number of samples per pixel. A variety of values for $M_p$, $N_p$ and S are contemplated. For example, in one embodiment of the band-pass filter $M_p = N_p = 5$. It is noted that with certain sample positioning schemes (see the discussion attending FIGS. 10 & 11), the number of samples that fall within the filter support may vary as the filter center (i.e. pixel center) is moved in the virtual screen space.

In other embodiments, sample-to-pixel calculation units 170 may filter a selected number of samples to calculate an output pixel. The selected samples may be multiplied by a spatial weighting function that gives weights to samples based on their position with respect to the center of the pixel being calculated.

The filtering operations performed by sample-to-pixel calculation units 170 may use any of a variety of filters, either alone or in combination. For example, the filtering operations may comprise convolution with a box filter, a tent filter, a cylindrical filter, a cone filter, a Gaussian filter, a Catmull-Rom filter, a Mitchell-Netravali filter, a windowed sinc filter, etc. Furthermore, the support of the filters used by sample-to-pixel calculation units 170 may be circular, elliptical, rectangular (e.g. square), triangular, hexagonal, etc.

Sample-to-pixel calculation units 170 may also be configured with one or more of the following features: color look-up using pseudo color tables, direct color, inverse gamma correction, filtering of samples to pixels, and conversion of pixels to non-linear light space. Other features of sample-to-pixel calculation units 170 may include programmable video timing generators, programmable pixel clock synthesizers, cursor generators, and crossbar functions. Once the sample-to-pixel calculation units 170 have manipulated the timing and color of each pixel, the pixels are output to DACs 178A and 178B.

G. Digital-to-Analog Converters

Digital-to-Analog Converters (DACs) 178A and 178B—collectively referred to as DACs 178—operate as the final output stage of graphics board 116. DACs 178 translate digital pixel data received from calculation units 170 into analog video signals. DAC 178A couples to output video channel A, and DAC 178B couples to output video channel B. DAC 178A may receive a first stream of digital pixel data from one or more of calculation units 170, and converts the first stream into a first video signal which is asserted onto output video channel A. Similarly, DAC 178B may receive a second stream of digital pixel data from one or more of calculation units 170, and converts the second stream into a second video signal which is asserted onto output video channel B. Rather than fixing the allocation of calculation units 170 to output video channels, the preferred embodiment of graphics board 116 has a hardware architecture which allows each of the calculation units 170 to be assigned to either output video channel on a per session basis. For example, all of calculation units 170 may be assigned to video channel A where graphics board 116 is to be used in the one board per projector scenario depicted in FIG. 8B. In situations where graphics board is to be used in the "two projector per board" scenario of FIG. 18C, a first subset of the calculation units 170 may be assigned to video channel A, and the remaining calculation units assigned to video channel B.

In the preferred embodiment, sample-to-pixel calculation units 170 provide pixel values to DACs 178 without an intervening frame buffer. However, in one alternate embodiment, sample-to-pixel calculation units 170 output the pixel values to a conventional frame buffer prior to display.

Note in one embodiment DACs 178 may be bypassed or omitted completely in order to output digital pixel data in lieu of analog video signals. This may be useful where projection devices $PD_1$ through $PD_L$ are based on a digital technology (e.g., an LCD-type display, an LCOS display, or a digital micro-mirror display).

As alluded to above, multiple graphics boards may be chained together so that they share the effort of generating video data for a projection/display device. Thus, in the preferred embodiment, graphics board 116 includes a first interface for receiving two digital pixel data streams from any previous graphics board in the chain, and a second interface for transmitting two digital pixel data streams to any subsequent graphics board in the chain.

It is noted that various embodiment of graphics board 116 are contemplated with varying numbers of render units 150, varying numbers of calculation units 170, more than two video output channels, etc.

Figure 10:
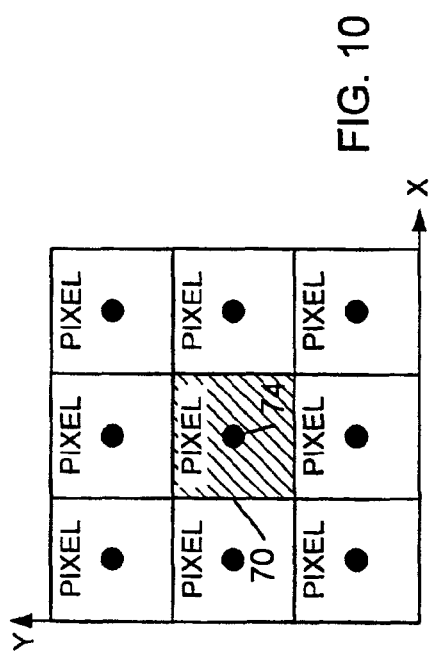
FIG. 10 illustrates a traditional configuration for computation of pixel values.

Super-Sampling: FIGS. 10–11

FIG. 10 illustrates a portion of virtual screen space in a non-super-sampled example. The dots denote sample locations, and the rectangular boxes superimposed on virtual screen space define pixel boundaries. One sample is located in the center of each pixel, and values of red, green, blue, z, etc. are computed for the sample. For example, sample 74 is assigned to the center of pixel 70. Although rendering units 150 may compute values for only one sample per pixel, sample-to-pixel calculation units 170 may still compute output pixel values based on multiple samples, e.g. by using a convolution filter whose support spans several pixels.

Figure 11B:
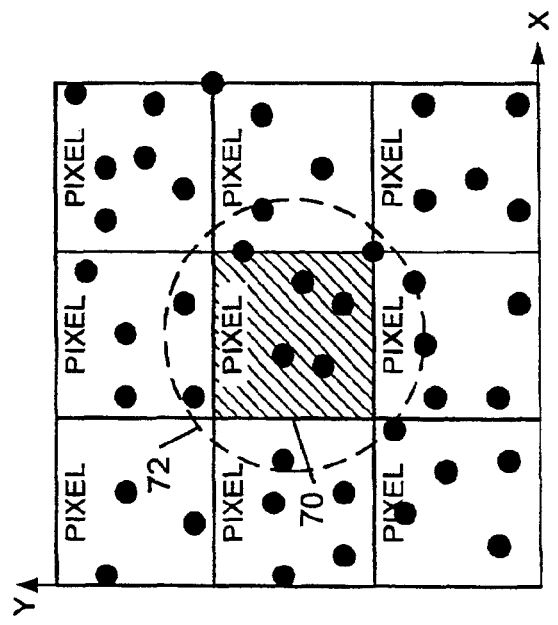
FIG. 11B illustrates a random distribution of samples in a two-dimensional viewport.
Figure 11A:
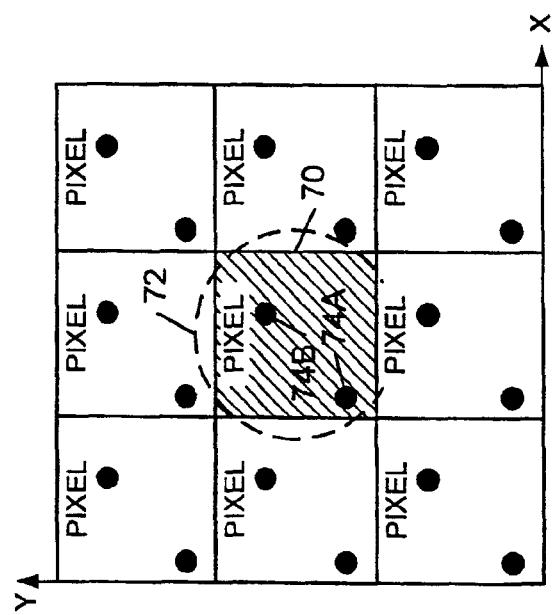
FIG. 11A illustrates one embodiment of super-sampling.

Turning now to FIG. 11A, an example of one embodiment of super-sampling is illustrated. In this embodiment, two samples are computed per pixel. The samples are distributed according to a regular grid. Even though there are more samples than pixels in the figure, output pixel values could be computed using one sample per pixel, e.g. by throwing out all but the sample nearest to the center of each pixel. However, a number of advantages arise from computing pixel values based on multiple samples.

A support region 72 is superimposed over pixel 70, and illustrates the support of a filter which is localized at pixel 70. The support of a filter is the set of locations over which the filter (i.e. the filter kernel) takes non-zero values. In this example, the support region 72 is a circular disc. The output pixel values (e.g. red, green, blue and z values) for pixel 70 are determined only by samples 74A and 74B, because these are the only samples which fall within support region 72. This filtering operation may advantageously improve the realism of a displayed image by smoothing abrupt edges in the displayed image (i.e., by performing anti-aliasing). The filtering operation may simply average the values of samples 74A–B to form the corresponding output values of pixel 70. More generally, the filtering operation may generate a weighted sum of the values of samples 74A–B, where the contribution of each sample is weighted according to some function of the sample's position (or distance) with respect to the center of pixel 70. The filter, and thus support region 72, may be repositioned for each output pixel being calculated. In other words, the filter center may visit the center of each output pixel for which pixel values are to be computed. Other filters and filter positioning schemes are also possible and contemplated.

In the example of FIG. 11A, there are two samples per pixel. In general, however, there is no requirement that the number of samples be related to the number of pixels. The number of samples may be completely independent of the number of pixels. For example, the number of samples may be smaller than the number of pixels.

Turning now to FIG. 11B, another embodiment of super-sampling is illustrated. In this embodiment, the samples are positioned randomly. Thus, the number of samples used to calculate output pixel values may vary from pixel to pixel. Render units 150A–D calculate color information at each sample position.

Super-Sampled Sample Buffer with Real-Time Convolution—FIGS. 12–19

Figure 12:
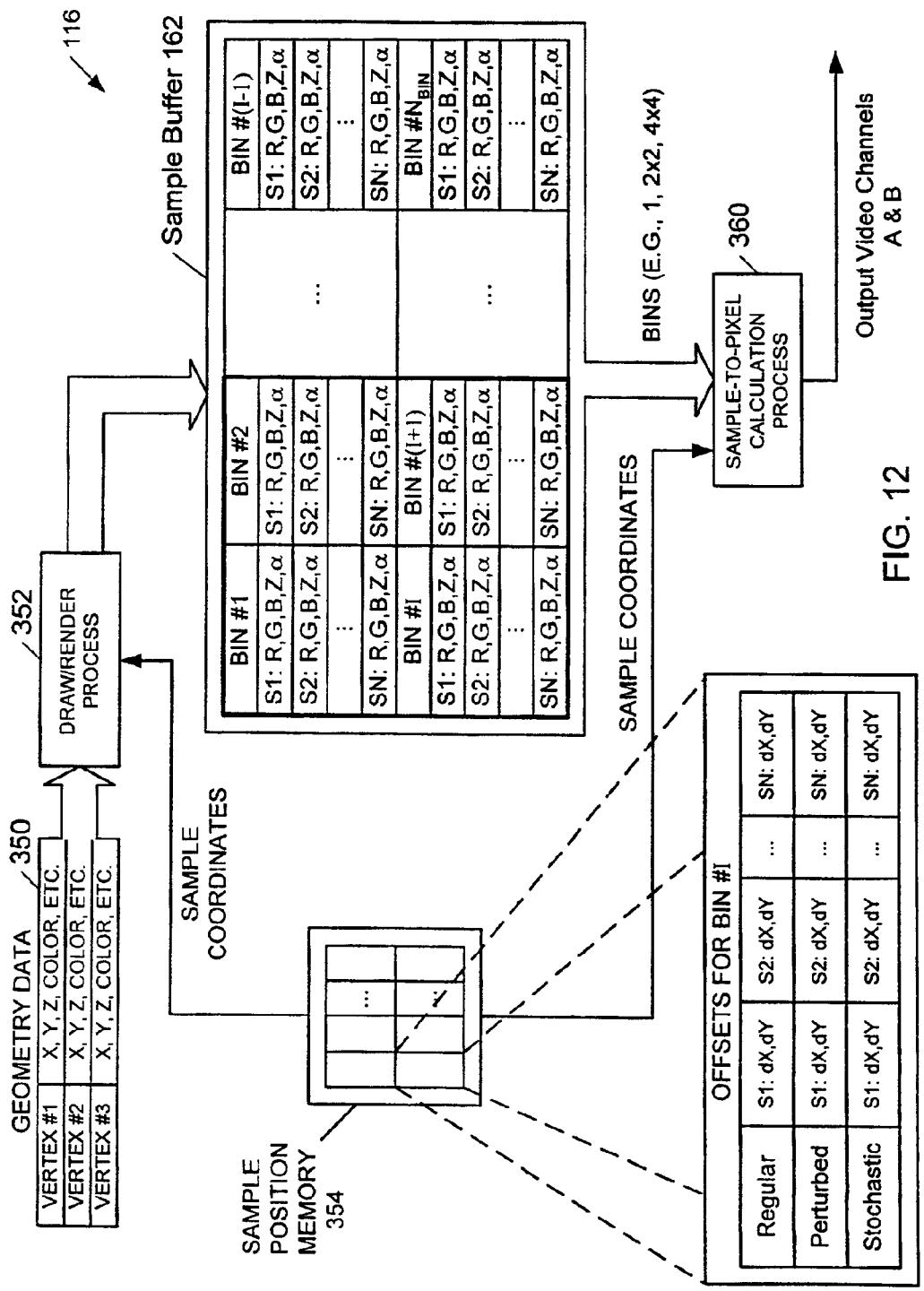
FIG. 12 illustrates one embodiment for the flow of data through graphics card 116.

FIG. 12 illustrates one possible configuration for the flow of data through one embodiment of graphics board 116. As the figure shows, geometry data 350 is received by graphics board 116 and used to perform draw process 352. The draw process 352 is implemented by one or more of control unit 140, rendering units 150, data memories 152, and schedule unit 154. Geometry data 350 comprises data for one or more polygons. Each polygon comprises a plurality of vertices (e.g., three vertices in the case of a triangle), some of which may be shared among multiple polygons. Data such as x, y, and z coordinates, color data, lighting data and texture map information may be included for each vertex.

In addition to the vertex data, draw process 352 (which may be performed by rendering units 150A–D) also receives sample position information from a sample position memory 354. The sample position information defines the location of samples in virtual screen space, i.e. in the 2-D viewport. Draw process 352 selects the samples that fall within the polygon currently being rendered, calculates a set of values (e.g. red, green, blue, z, alpha, and/or depth of field information) for each of these samples based on their respective positions within the polygon. For example, the z value of a sample that falls within a triangle may be interpolated from the known z values of the three vertices. Each set of computed sample values are stored into sample buffer 162.

In one embodiment, sample position memory 354 is embodied within rendering units 150A–D. In another embodiment, sample position memory 354 may be realized as part of memories 152A–152D, or as a separate memory.

Sample position memory 354 may store sample positions in terms of their virtual screen coordinates (X,Y). Alternatively, sample position memory 354 may be configured to store only offsets dX and dY for the samples with respect to positions on a regular grid. Storing only the offsets may use less storage space than storing the entire coordinates (X,Y) for each sample. The sample position information stored in sample position memory 354 may be read by a dedicated sample position calculation unit (not shown) and processed to calculate sample positions for graphics processing unit 90. More detailed information on the computation of sample positions is included below (see description of FIGS. 15 and 16).

In another embodiment, sample position memory 354 may be configured to store a table of random numbers. Sample position memory 354 may also comprise dedicated hardware to generate one or more different types of regular grids. This hardware may be programmable. The stored random numbers may be added as offsets to the regular grid positions generated by the hardware. In one embodiment, sample position memory 354 may be programmable to access or "unfold" the random number table in a number of different ways, and thus, may deliver more apparent randomness for a given length of the random number table. Thus, a smaller table may be used without generating the visual artifacts caused by simple repetition of sample position offsets.

Sample-to-pixel calculation process 360 uses the same sample positions as draw process 352. Thus, in one embodiment, sample position memory 354 may generate a sequence of random offsets to compute sample positions for draw process 352, and may subsequently regenerate the same sequence of random offsets to compute the same sample positions for sample-to-pixel calculation process 360. In other words, the unfolding of the random number table may be repeatable. Thus, it may not be necessary to store sample positions at the time of their generation for draw process 352.

As shown in FIG. 12, sample position memory 354 may be configured to store sample offsets generated according to a number of different schemes such as a regular square grid, a regular hexagonal grid, a perturbed regular grid, or a random (stochastic) distribution. Graphics board 116 may receive an indication from the operating system, device driver, or the geometry data 350 that indicates which type of sample positioning scheme is to be used. Thus, sample position memory 354 is configurable or programmable to generate position information according to one or more different schemes. More detailed information on several sample positioning schemes are described further below (see description of FIG. 14).

In one embodiment, sample position memory 354 may comprise a RAM/ROM that contains stochastically determined sample points or sample offsets. Thus, the density of samples in virtual screen space may not be uniform when observed at small scale. Two bins with equal area centered at different locations in virtual screen space may contain different numbers of samples. As used herein, the term "bin" refers to a region or area in virtual screen space.

An array of bins may be superimposed over virtual screen space, i.e. the 2-D viewport, and the storage of samples in sample buffer 162 may be organized in terms of bins. Sample buffer 162 may comprise an array of memory blocks which correspond to the bins. Each memory block may store the sample values (e.g. red, green, blue, z, alpha, etc.) for the samples that fall within the corresponding bin. The approximate location of a sample is given by the bin in which it resides. The memory blocks may have addresses which are easily computable from the corresponding bin locations in virtual screen space, and vice versa. Thus, the use of bins may simplify the storage and access of sample values in sample buffer 162.

Suppose (for the sake of discussion) that the 2-D viewport ranges from (0000,0000) to (FFFF,FFFF) in hexadecimal virtual screen coordinates. This 2-D viewport may be overlaid with a rectangular array of bins whose lower-left corners reside at the locations (XX00,YY00) where XX and YY independently run from 0x00 to 0xFF. Thus, there are 256 bins in each of the vertical and horizontal directions with each bin spanning a square in virtual screen space with side length of 256. Suppose that each memory block is configured to store sample values for up to 16 samples, and that the set of sample values for each sample comprises 4 bytes. In this case, the address of the memory block corresponding to the bin located at (XX00, YY00) may be simply computed by the relation BinAddr=(XX+YY*256)*16*4. For example, the sample S=(1C3B,23A7) resides in the bin located at (1C00,2300). The sample value set for sample S is then stored in the memory block residing at address 0x8C700=(0x231C)(0x40) in sample buffer 162.

The bins may tile the 2-D viewport in a regular array, e.g. in a square array, rectangular array, triangular array, hexagonal array, etc., or in an irregular array. Bins may occur in a variety of sizes and shapes. The sizes and shapes may be programmable. The maximum number of samples that may populate a bin is determined by the storage space allocated to the corresponding memory block. This maximum number of samples is referred to herein as the bin sample capacity, or simply, the bin capacity. The bin capacity may take any of a variety of values. The bin capacity value may be programmable. Henceforth, the memory blocks in sample buffer 162 which correspond to the bins in virtual screen space will be referred to as memory bins.

The specific position of each sample within a bin may be determined by looking up the sample's offset in the RAM/ROM table, i.e., the sample's offset with respect to the bin position (e.g. the lower-left corner or center of the bin, etc.). However, depending upon the implementation, not all choices for the bin capacity may have a unique set of offsets stored in the RAM/ROM table. Offsets for a first bin capacity value may be determined by accessing a subset of the offsets stored for a second larger bin capacity value. In one embodiment, each bin capacity value supports at least four different sample positioning schemes. The use of different sample positioning schemes may reduce final image artifacts that would arise in a scheme of naively repeating sample positions.

In one embodiment, sample position memory 354 may store pairs of 8-bit numbers, each pair comprising an x-offset and a y-offset. (Other offsets are also possible, e.g., a time offset, a z-offset, etc.) When added to a bin position, each pair defines a particular position in virtual screen space, i.e. the 2-D viewport. To improve read access times, sample position memory 354 may be constructed in a wide/parallel manner so as to allow the memory to output more than one sample location per read cycle.

Once the sample positions have been read from sample position memory 354, draw process 352 selects the samples that fall within the polygon currently being rendered. Draw process 352 then calculates the z and color information (which may include alpha or other depth of field information values) for each of these samples and stores the data into sample buffer 162. In one embodiment, sample buffer 162 may only single-buffer z values (and perhaps alpha values) while double-buffering other sample components such as color. Unlike prior art systems, graphics system 112 may use double-buffering for all samples (although not all components of samples may be double-buffered, i.e., the samples may have some components that are not double-buffered). In one embodiment, the samples are stored into sample buffer 162 in bins. In some embodiments, the bin capacity may vary from frame to frame. In addition, the bin capacity may vary spatially for bins within a single frame rendered into sample buffer 162. For example, bins on the edge of the 2-D viewport may have a smaller bin capacity than bins corresponding to the center of the 2-D viewport. Since viewers are likely to focus their attention mostly on the center of the screen SCR or display image DIM, more processing bandwidth may be dedicated to providing enhanced image quality in the center of 2-D viewport. Note that the size and shape of bins may also vary from region to region, or from frame to frame. The use of bins will be described in greater detail below in connection with FIG. 17.

In parallel and independently of draw process 352, filter process 360 is configured to: (a) read sample positions from sample position memory 354, (b) read corresponding sample values from sample buffer 162, (c) filter the sample values, and (d) output the resulting output pixel values onto video channels A and/or B. Sample-to-pixel calculation units 170 implement filter process 360. Filter process 360 is operable to generate the red, green, and blue values for an output pixel based on a spatial filtering of the corresponding data for a selected plurality of samples, e.g. samples falling in a neighborhood of the pixel center. Other values such as alpha may also be generated. In one embodiment, filter process 360 is configured to: (i) determine the distance of each sample from the pixel center; (ii) multiply each sample's attribute values (e.g., red, green, blue, alpha) by a filter weight that is a specific (programmable) function of the sample's distance; (iii) generate sums of the weighted attribute values, one sum per attribute (e.g. a sum for red, a sum for green, . . . ), and (iv) normalize the sums to generate the corresponding pixel attribute values. Filter process 360 is described in greater detail below (see description accompanying FIGS. 17, 18A, and 21).

In the embodiment just described, the filter kernel is a function of distance from the pixel center. However, in alternative embodiments, the filter kernel may be a more general function of X and Y displacements from the pixel center. Also, the support of the filter, i.e. the 2-D neighborhood over which the filter kernel takes non-zero values, may not be a circular disk. Any sample falling within the support of the filter kernel may affect the output pixel value being computed.

Figure 13:
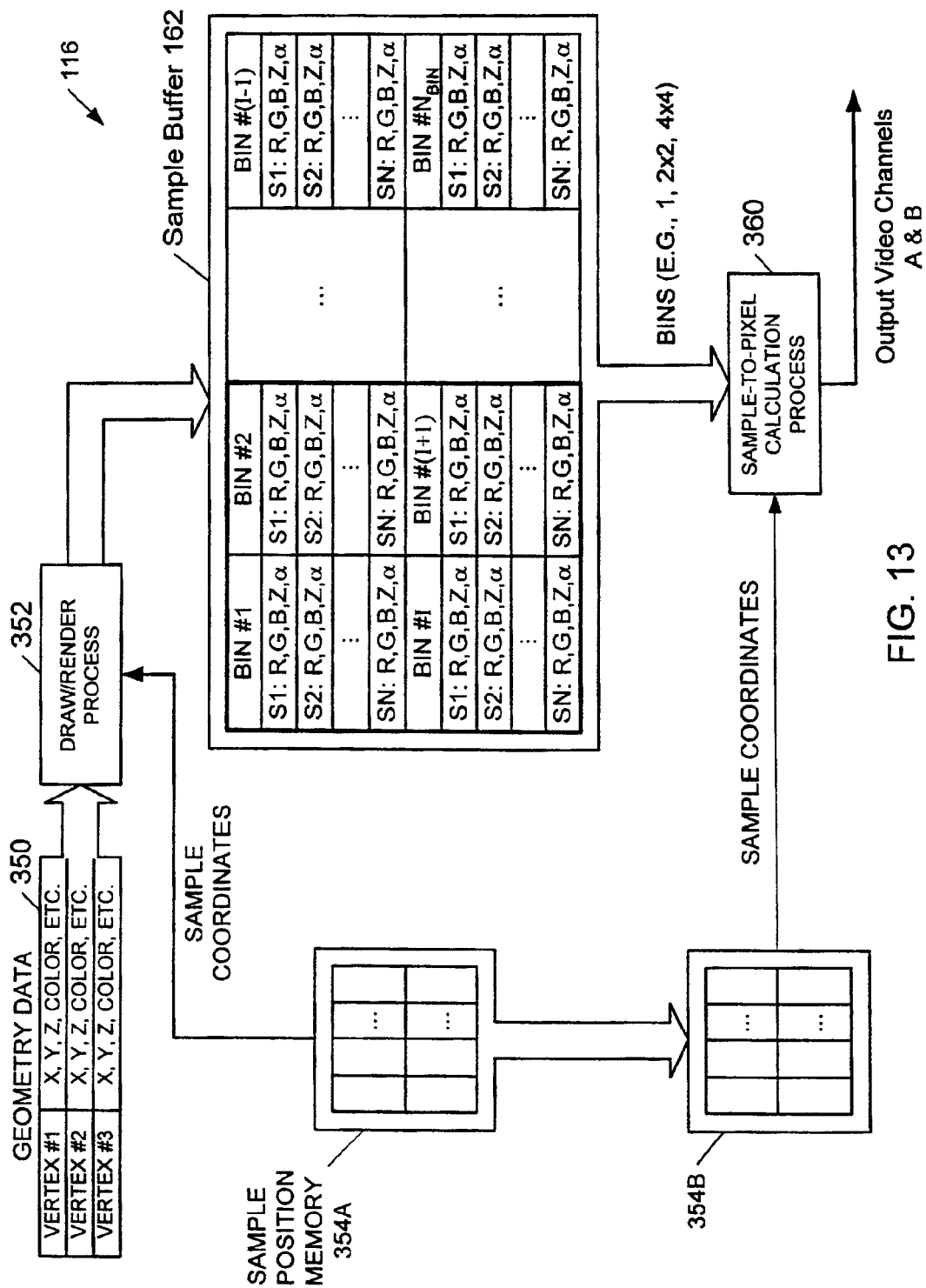
FIG. 13 illustrates another embodiment for the flow of data through graphics card 116.

FIG. 13 illustrates an alternate embodiment of graphics board 116. In this embodiment, two or more sample position memories 354A and 354B are utilized. Sample position memories 354A–B may be used to implement double-buffering of sample position data. If the sample positions remain the same from frame to frame, the sample positions may be single-buffered. However, if the sample positions vary from frame to frame, then graphics board 116 may be advantageously configured to double-buffer the sample positions. The sample positions may be double-buffered on the rendering side (i.e., memory 354A may be double-buffered) and/or the filter side (i.e., memory 354B may be double-buffered). Other combinations are also possible. For example, memory 354A may be single-buffered, while memory 354B is doubled-buffered. This configuration may allow one side of memory 354B to be updated by sample position memory 354A while the other side of memory 354B is accessed by filter process 360. In this configuration, graphics system 112 may change sample positioning schemes on a per-frame basis by shifting the sample positions (or offsets) from memory 354A to double-buffered memory 354B as each frame is rendered. Thus, the sample positions which are stored in memory 354A and used by draw process 352 to render sample values may be copied to memory 354B for use by filter process 360. Once the sample position information has been copied to memory 354B, position memory 354A may then be loaded with new sample positions (or offsets) to be used for a second frame to be rendered. In this way the sample position information follows the sample values from the draw 352 process to the filter process 360.

Yet another alternative embodiment may store tags to offsets with the sample values in super-sampled sample buffer 162. These tags may be used to look-up the offset (i.e. perturbations) dX and dY associated with each particular sample.

Sample Positioning Schemes

Figure 14:
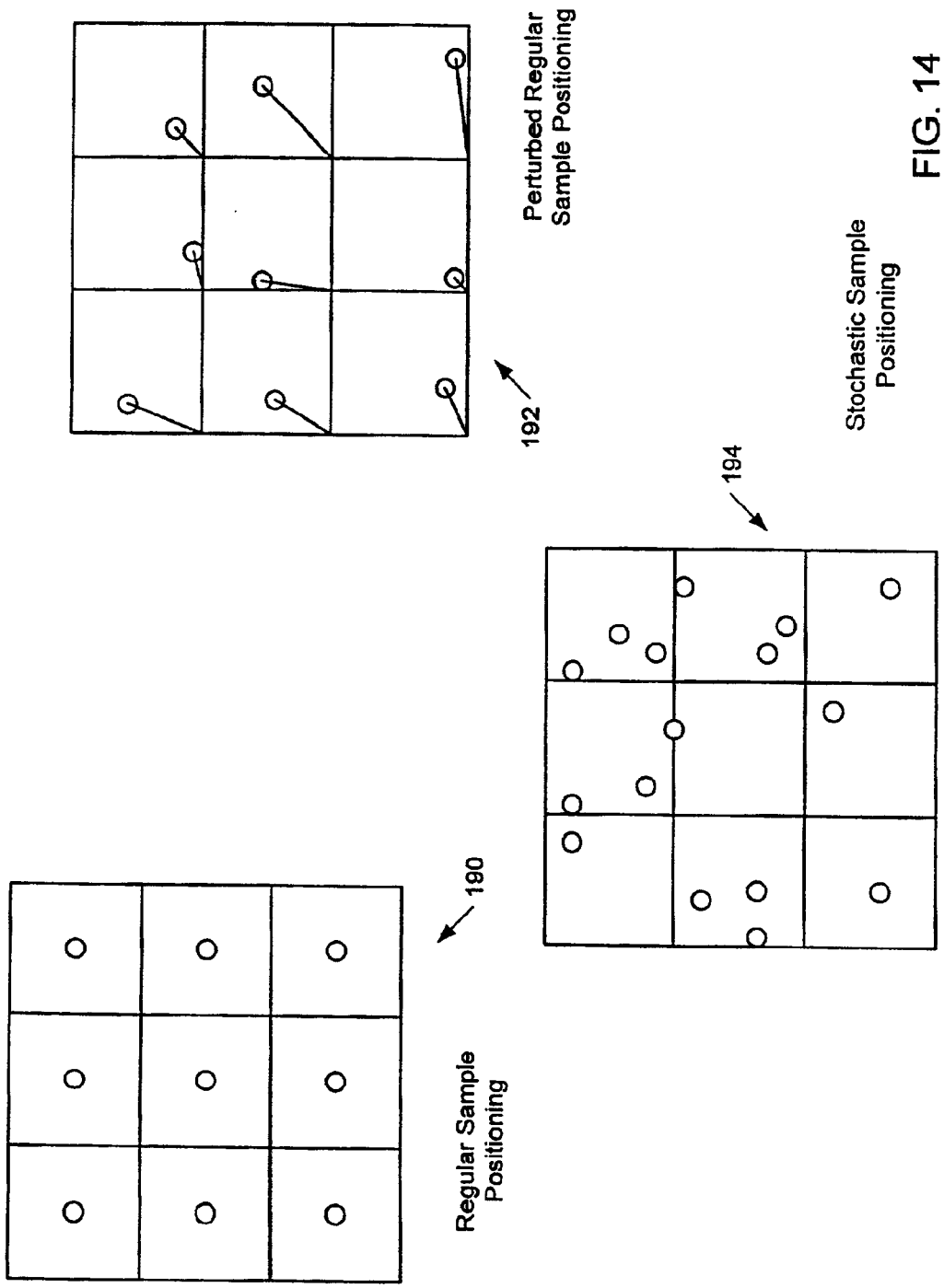
FIG. 14 illustrates three different sample positioning schemes.

FIG. 14 illustrates a number of different sample positioning schemes. In the regular positioning scheme 190, samples are positioned at fixed positions with respect to a regular grid which is superimposed on the 2-D viewport. For example, samples may be positioned at the center of the rectangles which are generated by the regular grid. More generally, any tiling of the 2-D viewport may generate a regular positioning scheme. For example, the 2-D viewport may be tiled with triangles, and thus, samples may be positioned at the centers (or vertices) of the triangular tiles. Hexagonal tilings, logarithmic tilings, and semi-regular tilings such as Penrose tilings are also contemplated.

In the perturbed regular positioning scheme 192, sample positions are defined in terms of perturbations from a set of fixed positions on a regular grid or tiling. In one embodiment, the samples may be displaced from their corresponding fixed grid positions by random x and y offsets, or by random angles (ranging from 0 to 360 degrees) and random radii (ranging from zero to a maximum radius). The offsets may be generated in a number of ways, e.g. by hardware based upon a small number of seeds, by reading a table of stored offsets, or by using a pseudo-random function. Once again, perturbed regular grid scheme 192 may be based on any type of regular grid or tiling. Samples generated by perturbation with respect to a grid or hexagonal tiling may be particularly desirable due to the geometric properties of these configurations.

Stochastic sample positioning scheme 194 represents a third potential type of scheme for positioning samples. Stochastic sample positioning involves randomly distributing the samples across the 2-D viewport. Random positioning of samples may be accomplished through a number of different methods, e.g., using a random number generator such as an internal clock to generate pseudo-random numbers. Random numbers or positions may also be pre-calculated and stored in memory.

Figure 15:
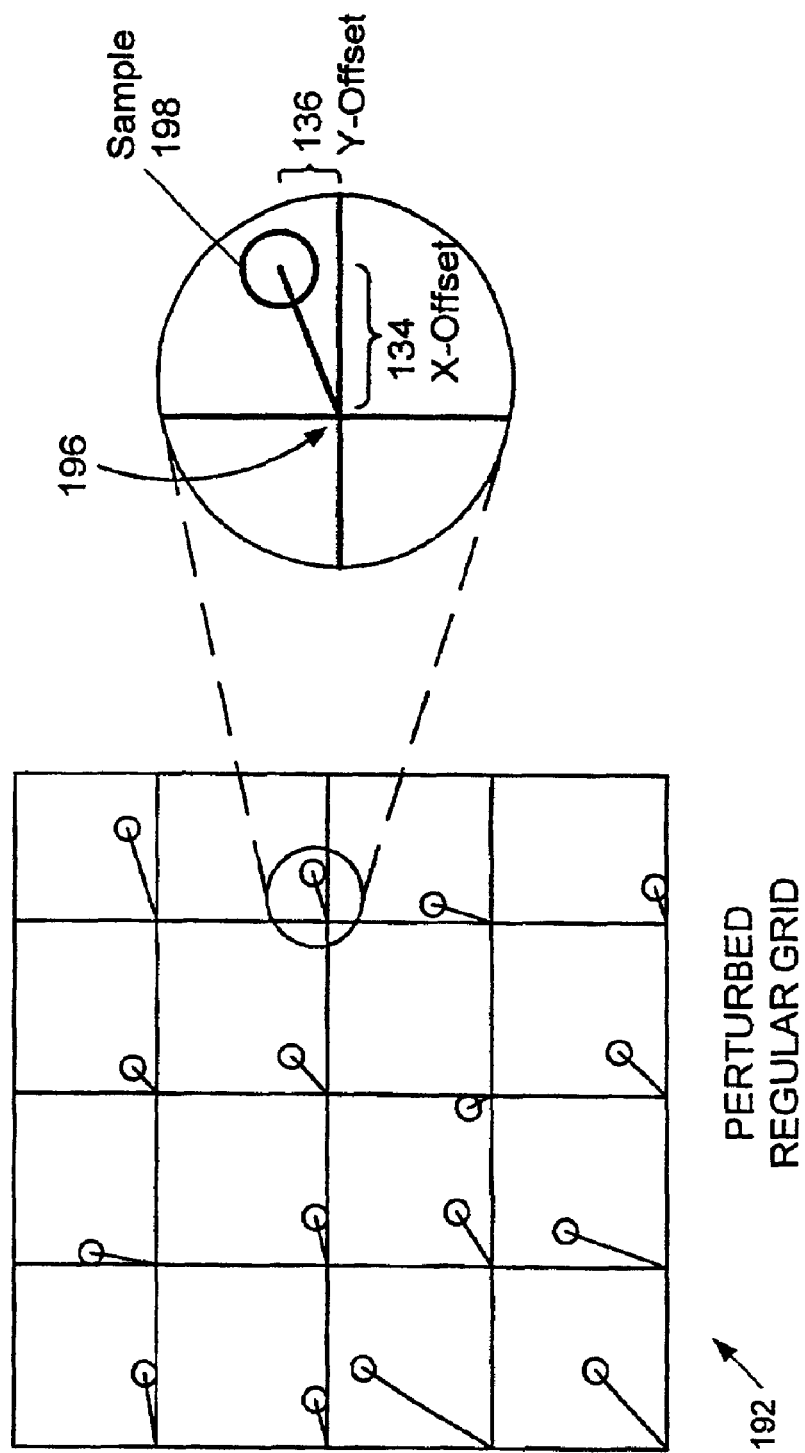
FIG. 15 illustrates one embodiment of a "perturbed regular" sample positioning scheme.

Turning now to FIG. 15, details of one embodiment of perturbed regular positioning scheme 192 are shown. In this embodiment, samples are randomly offset from a regular square grid by x- and y-offsets. As the enlarged area shows, sample 198 has an x-offset 134 that specifies its horizontal displacement from its corresponding grid intersection point 196. Similarly, sample 198 also has a y-offset 136 that specifies its vertical displacement from grid intersection point 196. The random x-offset 134 and y-offset 136 may be limited to a particular range of values. For example, the x-offset may be limited to the range from zero to $X_{max}$, where $X_{max}$ is the width of a grid rectangle. Similarly, the y-offset may be limited to the range from zero to $Y_{max}$, where $Y_{max}$ is the height of a grid rectangle. The random offset may also be specified by an angle and radius with respect to the grid intersection point 196.

Figure 16:
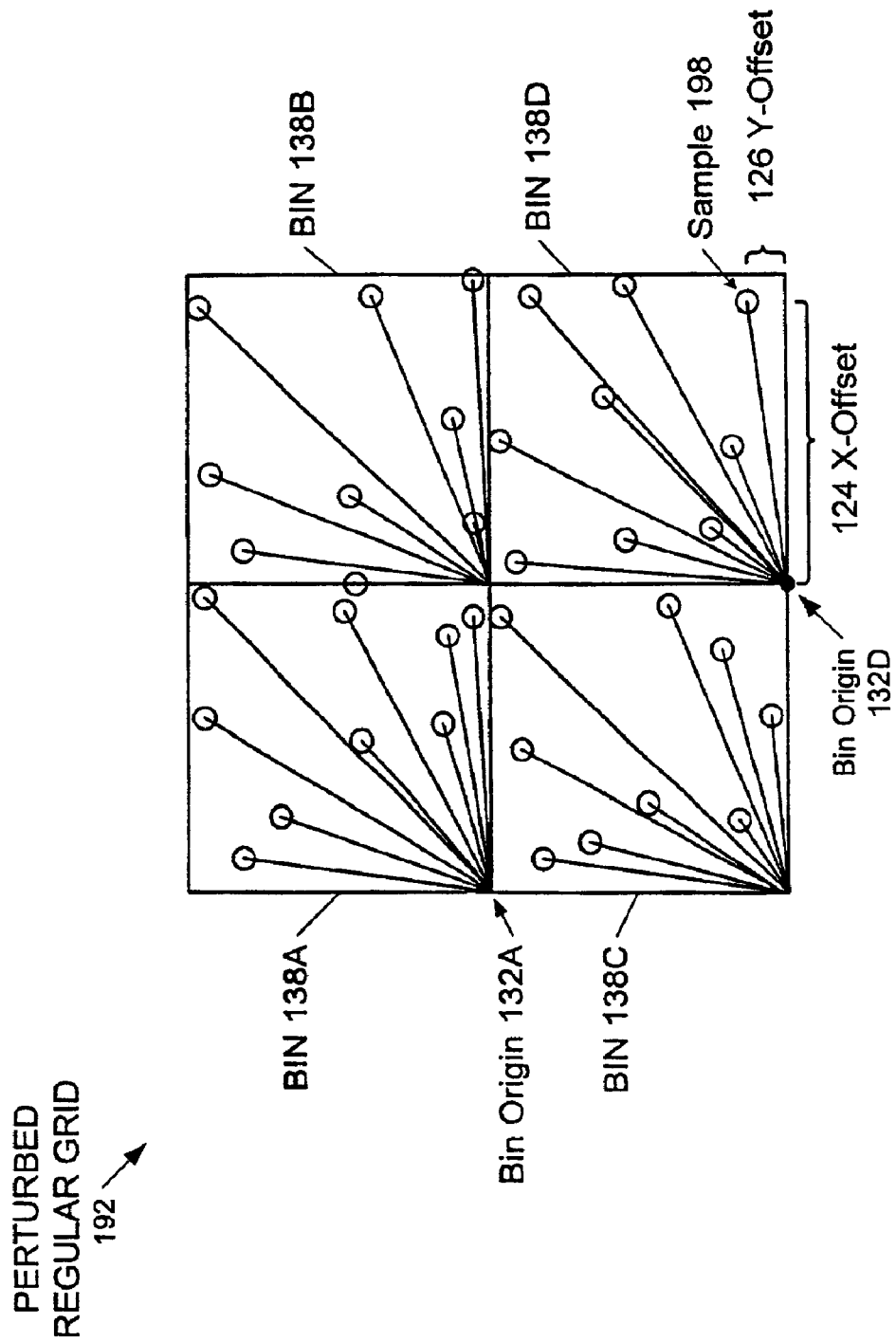
FIG. 16 illustrates another embodiment of the perturbed regular sample positioning scheme.

FIG. 16 illustrates details of another embodiment of the perturbed regular grid scheme 192. In this embodiment, the samples are grouped into rectangular bins 138A–D. In this embodiment, each bin comprises nine samples, i.e. has a bin capacity of nine. Different bin capacities may be used in other embodiments (e.g., bins storing four samples, 16 samples, etc.). Each sample's position may be determined by an x- and y-offset relative to the origin of the bin in which it resides. The origin of a bin may be chosen to be the lower-left corner of the bin (or any other convenient location within the bin). For example, the position of sample 198 is determined by summing x-offset 124 and y-offset 126 respectively to the x and y coordinates of the origin 132D of bin 138D. As previously noted, this may reduce the size of sample position memory 354 used in some embodiments.

Figure 17:
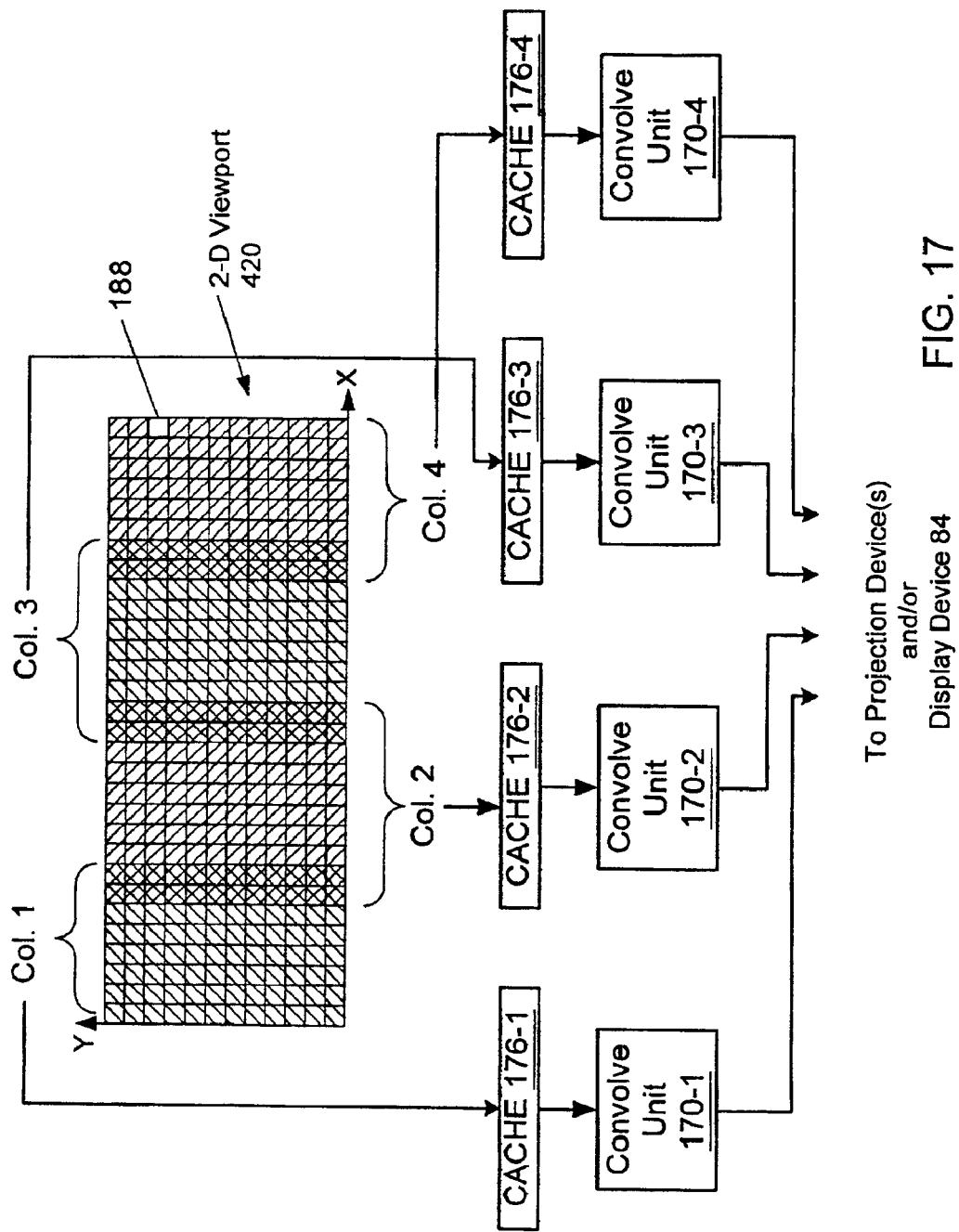
FIG. 17 illustrates a method of converting samples values to pixel values in parallel.

FIG. 17—Converting Samples into Pixels

As discussed earlier, the 2-D viewport may be covered with an array of spatial bins. Each spatial bin may be populated with samples whose positions are determined by sample position memory 354. Each spatial bin corresponds to a memory bin in sample buffer 162. A memory bin stores the sample values (e.g. red, green, blue, z, alpha, etc.) for the samples that reside in the corresponding spatial bin. Sample-to-pixel calculation units 170 (also referred to as convolve units 170) are configured to read memory bins from sample buffer 162 and to convert sample values contained within the memory bins into pixel values.

FIG. 17 illustrates one method for rapidly converting sample values stored in sample buffer 162 into pixel values. The spatial bins which cover the 2-D viewport may be organized into columns (e.g., Cols. 1–4). Each column comprises a two-dimensional subarray of spatial bins. The columns may be configured to horizontally overlap (e.g., by one or more spatial bins). Each of the sample-to-pixel calculation units 170-1 through 170-4 may be configured to access memory bins corresponding to one of the columns. For example, sample-to-pixel calculation unit 170-1 may be configured to access memory bins that correspond to the spatial bins of Column 1. The data pathways between sample buffer 162 and sample-to-pixel calculations unit 170 may be optimized to support this column-wise correspondence.

FIG. 17 shows four sample-to-pixel calculation units 170 for the sake of discussion. It is noted that graphics board 116 may include any number of the sample-to-pixel calculation units 170.

The amount of the overlap between columns may depend upon the horizontal diameter of the filter support for the filter kernel being used. The example shown in FIG. 17 illustrates an overlap of two bins. Each square (such as square 188) represents a single bin comprising one or more samples. Advantageously, this configuration may allow sample-to-pixel calculation units 170 to work independently and in parallel, with each of the sample-to-pixel calculation units 170 receiving and convolving samples residing in the memory bins of the corresponding column. Overlapping the columns will prevent visual bands or other artifacts from appearing at the column boundaries for any operators larger than a pixel in extent.

Furthermore, the embodiment of FIG. 17 may include a plurality of bin caches 176 which couple to sample buffer 162. In addition, each of bin caches 176 couples to a corresponding one of sample-to-pixel calculation units 170. Bin cache 176-I (where I takes any value from one to four) stores a collection of memory bins from Column I, and serves as a cache for sample-to-pixel calculation unit 170-I. Bin cache 176-I may have an optimized coupling to sample buffer 162 which facilitates access to the memory bins for Column I. Since the convolution calculation for two adjacent convolution centers may involve many of the same memory bins, bin caches 176 may increase the overall access bandwidth to sample buffer 162.

Figure 18A:
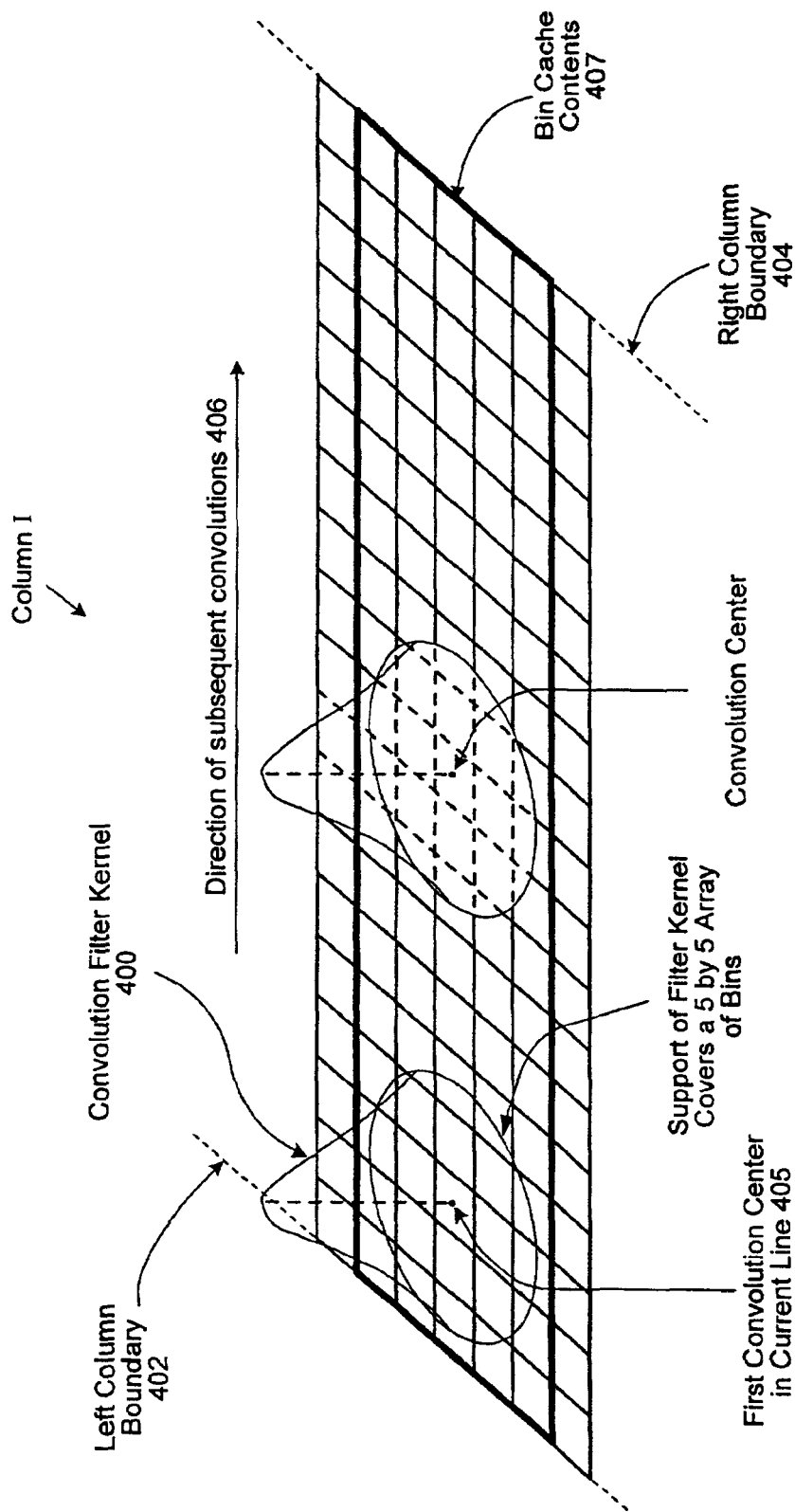
FIG. 18A illustrates the traversal of a filter kernel 400 across a generic Column I of FIG. 17.
Figure 18B:
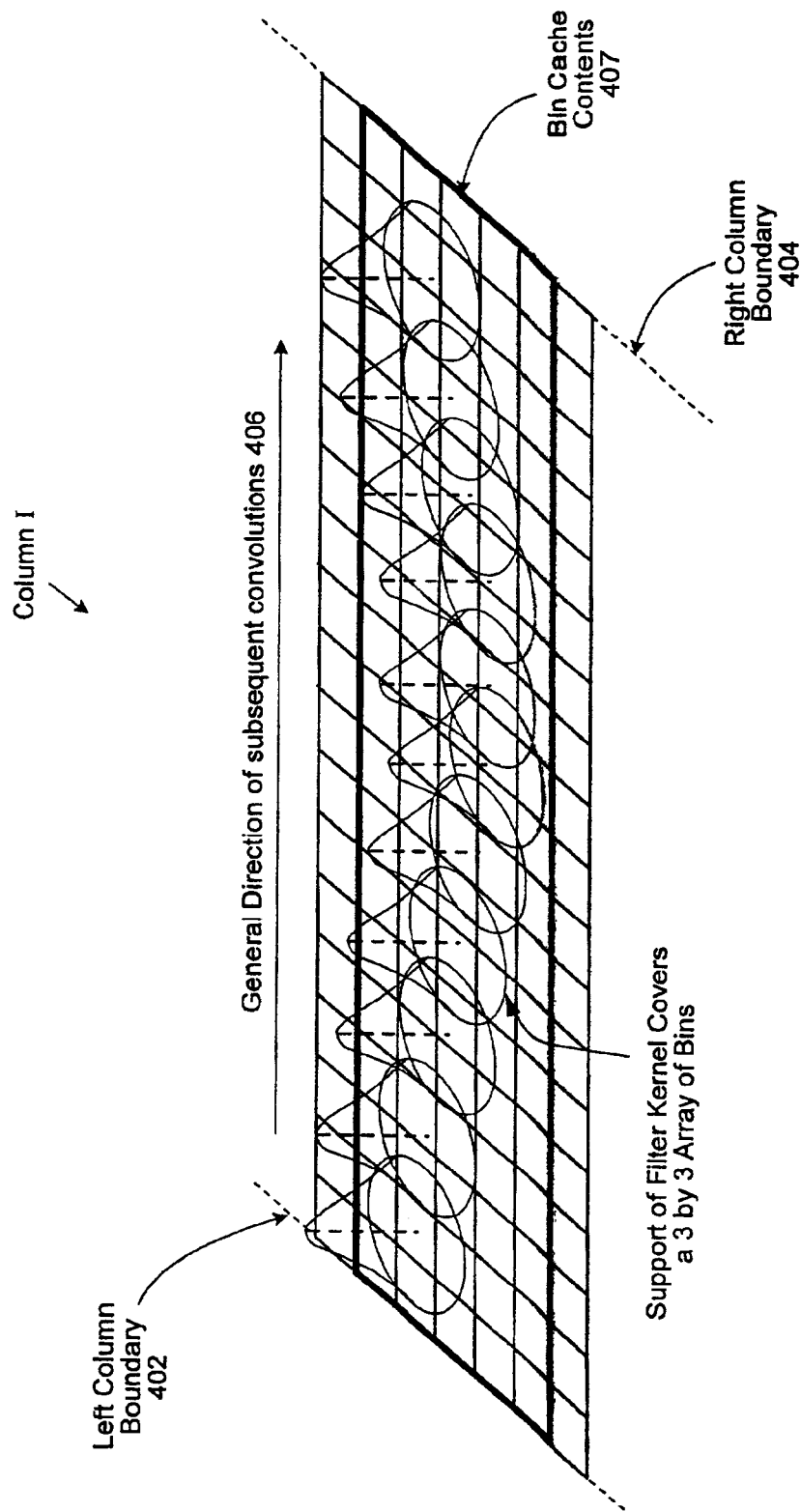
FIG. 18B illustrates a distorted traversal of filter kernel 400 across a generic Column I of FIG. 17.

FIG. 18A illustrates more details of one embodiment of a method for reading sample values from super-sampled sample buffer 162. As the figure illustrates, the convolution filter kernel 400 travels across Column I (in the direction of arrow 406) to generate output pixel values, where index I takes any value in the range from one to four. Sample-to-pixel calculation unit 170-I may implement the convolution filter kernel 400. Bin cache 176-I may be used to provide fast access to the memory bins corresponding to Column I. Column I comprises a plurality of bin rows. Each bin row is a horizontal line of spatial bins which stretches from the left column boundary 402 to the right column boundary 404 and spans one bin vertically. In one embodiment, bin cache 176-I has sufficient capacity to store $N_L$ bin rows of memory bins. The cache line-depth parameter $N_L$ may be chosen to accommodate the support of filter kernel 400. If the support of filter kernel 400 is expected to span no more than $N_y$ bins vertically (i.e. in the Y direction), the cache line-depth parameter $N_L$ may be set equal to $N_y$ or larger.

After completing convolution computations at a convolution center, convolution filter kernel 400 shifts to the next convolution center. Kernel 400 may be visualized as proceeding horizontally within Column I in the direction indicated by arrow 406. When kernel 400 reaches the right boundary 404 of Column I, it may shift down one or more bin rows, and then, proceed horizontally starting from the left column boundary 402. Thus the convolution operation proceeds in a scan line fashion, generating successive rows of output pixels for display.

In one embodiment, the cache line-depth parameter $N_L$ is set equal to $N_y+1$. In the example of FIG. 18A, the filter support covers $N_y=5$ bins vertically. Thus, the cache line-depth parameter $N_L=6=5+1$. The additional bin row in bin cache 176-I allows the processing of memory bins (accessed from bin cache 176-I) to be more substantially out of synchronization with the loading of memory bins (into bin cache 176-I) than if the cache line-depth parameter $N_L$ were set at the theoretical minimum value $N_y$.

In one embodiment, sample buffer 162 and bin cache 176-I may be configured for row-oriented burst transfers. If a request for a memory bin misses in bin cache 176-I, the entire bin row containing the requested memory bin may be fetched from sample buffer 162 in a burst transfer. Thus, the first convolution of a scan line may fill the bin cache 176-I with all the memory bins necessary for all subsequent convolutions in the scan line. For example, in performing the first convolution in the current scan line at the first convolution center 405, sample-to-pixel calculation unit 170-I may assert a series of requests for memory bins, i.e. for the memory bins corresponding to those spatial bins (rendered in shade) which intersect the support of filter kernel 400. Because the filter support 400 intersects five bin rows, in a worst case scenario, five of these memory bin requests will miss bin cache 176-I and induce loading of all five bin rows from sample buffer 162. Thus, after the first convolution of the current scan line is complete, bin cache 176-I may contain the memory bins indicated by the heavily outlined rectangle 407. Memory bin requests asserted by all subsequent convolutions in the current scan line may hit in bin cache 176-I, and thus, may experience significantly decreased bin access time.

In general, the first convolution in a given scan line may experience fewer than the worst case number of misses to bin cache 176-I because bin cache 176-I may already contain some or all of the bin rows necessary for the current scan line. For example, if convolution centers are located at the center of each spatial bin, the vertical distance between successive scan lines (of convolution centers) corresponds to the distance between successive bin rows, and thus, the first convolution of a scan line may induce loading of a single bin row, the remaining four bin rows having already been loaded in bin cache 176-I in response to convolutions in previous scan lines.

If the successive convolution centers in a scan line are expected to depart from a purely horizontal trajectory across Column I, the cache line-depth parameter $N_L$ may be set to accommodate the maximum expected vertical deviation of the convolution centers. For example, in FIG. 18B, the convolution centers follow a curved path across Column I. The curved path deviates from a horizontal path by approximately two bins vertically. Since the support of the filter kernel covers a 3 by 3 array of spatial bins, bin cache 176-I may advantageously have a cache line-depth $N_L$ of at least five (i.e. two plus three).

As mentioned above, Columns 1 through 4 of the 2-D viewport may be configured to overlap horizontally. The size of the overlap between adjacent Columns may be configured to accommodate the maximum expected horizontal deviation of convolution centers from nominal convolution centers on a rectangular grid.

Figure 18C:
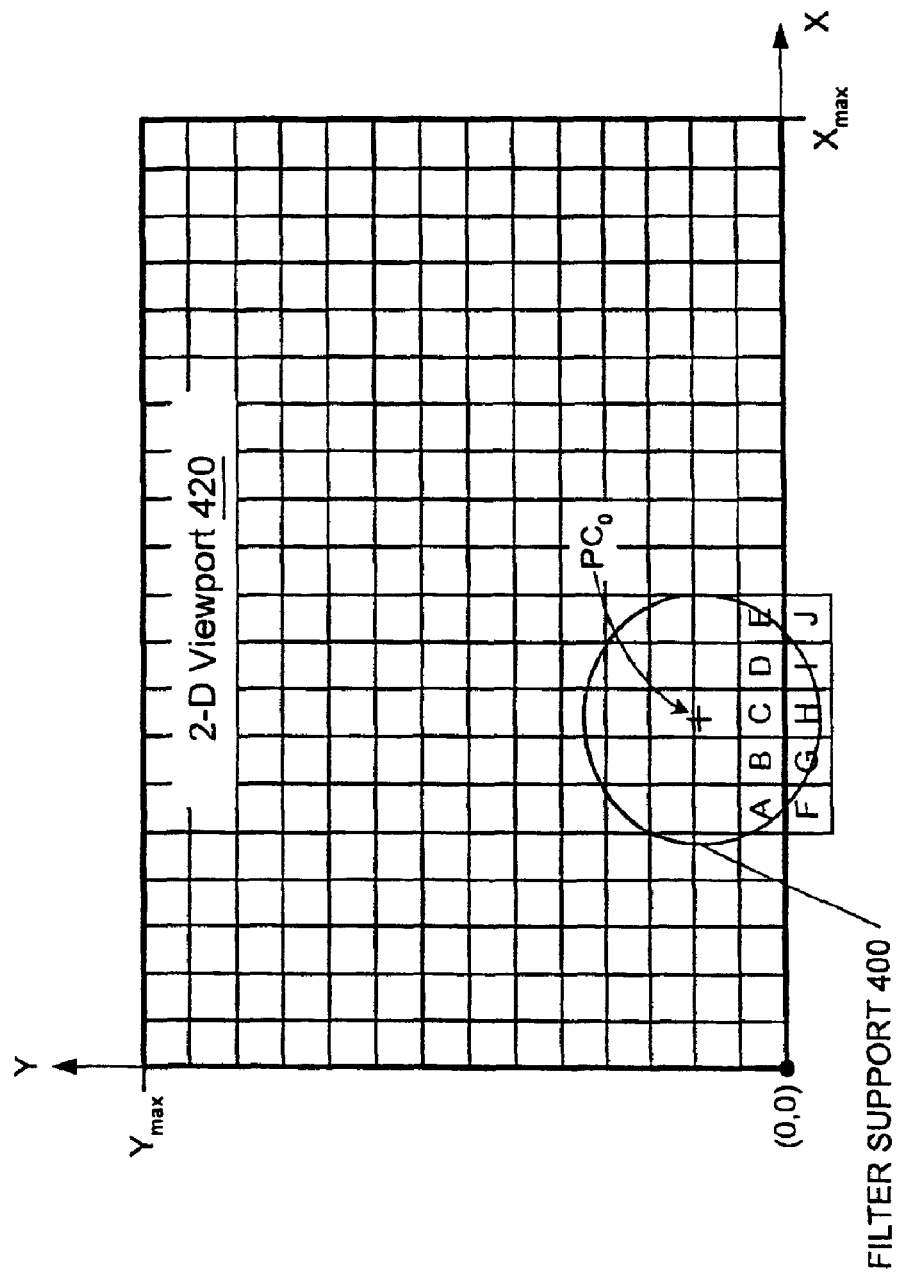
FIG. 18C illustrates one embodiment of a method for dealing with boundary conditions.

FIG. 18C illustrates potential border conditions in the computation of output pixel values. The 2-D viewport 420 is illustrated as a rectangle which is overlaid with a rectangular array of spatial bins. Recall that every spatial bin corresponds to a memory bin in sample buffer 162. The memory bin stores the sample values and/or sample positions for samples residing in the corresponding spatial bin. As described above, sample-to-pixel calculation units 170 filter samples in the neighborhood of a pixel center in order to generate output pixel values (e.g. red, green, blue, etc.). Pixel center $PC_0$ is close enough to the lower boundary (Y=0) of the 2-D viewport 420 that its filter support 400 is not entirely contained in the 2-D viewport. Sample-to-pixel calculation units 170 may generate sample positions and/or sample values for the marginal portion of filter support 400 (i.e. the portion which falls outside the 2-D viewport 420) according to a variety of methods.

In one embodiment, sample-to-pixel calculation units 170 may generate one or more dummy bins to cover the marginal area of the filter support 400. Sample positions for the dummy bins may be generated by reflecting the sample positions of spatial bins across the 2-D viewport boundary. For example, dummy bins F, G, H, I and J may be assigned sample positions by reflecting the sample positions corresponding to spatial bins A, B, C, D and E respectively across of the boundary line Y=0. The sample positions for dummy bins may also be generated by translating the sample positions corresponding to spatial bins across the viewport boundary, or perhaps, by generating sample positions on-the-fly according to a regular, a perturbed regular or stochastic sample positioning scheme.

Predetermined color values may be associated with these dummy samples in the dummy bins. For example, the value (0,0,0) for the RGB color vector may be assigned to each dummy sample. As pixel center $PC_0$ moves downward (i.e. toward the boundary Y=0 and through it), additional dummy bins with dummy samples may be generated to cover filter support 400 (which moves along with the pixel center $PC_0$). Within filter support 400, the number of dummy samples (having the background color) increases and the number of rendered samples (having arbitrary colors) decreases. When the filter support 400 has moved entirely outside of the 2-D viewport 420, filter support 400 is populated entirely with dummy samples. Thus, as pixel center $PC_0$ moves toward the boundary and through it, the color value computed with filter support 400 smoothly approaches the predetermined background color.

In one alternative embodiment, only samples which reside inside the 2-D view-port 420 (and inside the filter support 400) are allowed to contribute to the pixel's color computations. In other words, portions of filter support 400 which fall outside the 2-D viewport 420 may be ignored. As described later in connection with FIG. 21, the cumulative sums of weighted sample values are normalized by a cumulative sum of filter weights. This normalization compensates for the decreased number of samples which contribute to the cumulative sums at the boundary of the 2-D viewport 420.

Figure 18D:
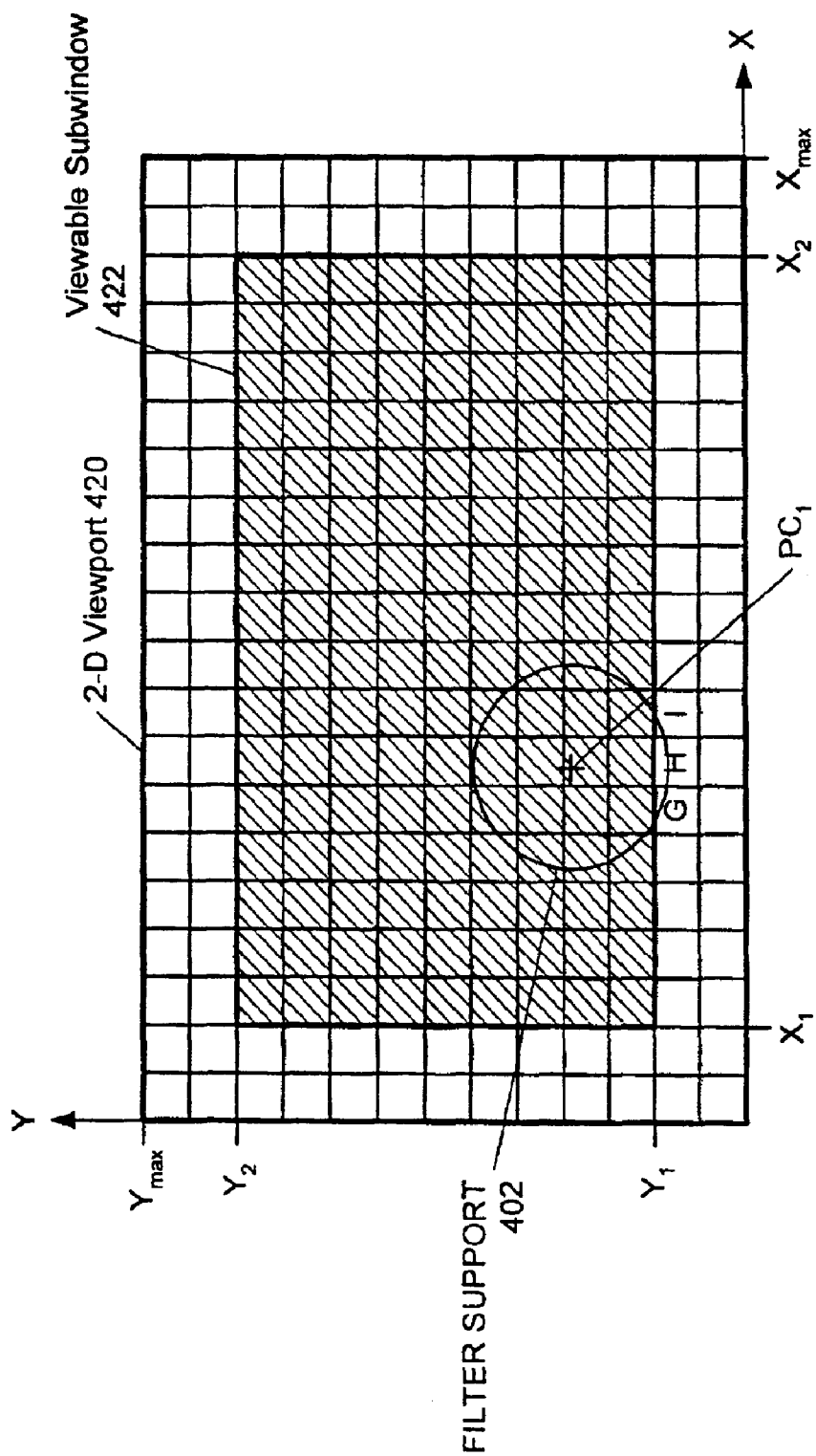
FIG. 18D illustrates an embodiment of a second method for dealing with boundary conditions.

FIG. 18D illustrates an alternate embodiment of a method for performing pixel value computations. Sample-to-pixel computation units 170 may perform pixel value computations using a viewable subwindow 422 of the 2-D viewport 420. The viewable subwindow is depicted as a rectangle with lower left corner at $(X_1, Y_1)$ and upper right corner at $(X_2, Y_2)$ in virtual screen space. Sample-to-pixel calculation units 170 are operable to compute a color value at a pixel center so that the color deviates from a background color depending on distance normal to the boundary of the viewable subwindow. Because sample position memory 354 generates sample positions for the entire 2-D viewport 420, it is not necessary to generate dummy sample positions when filter support 400 intersects the marginal area (i.e. the region outside the viewable subwindow 422 and inside the 2-D viewport 420). Instead, the samples positions already generated and stored in sample position memory 354 (or sample buffer 162) may be used in color computations. For example, filter support 402 located at pixel center $PC_1$ is close enough to the boundary of the viewable subwindow 402 that it intersects several spatial bins in the marginal area, i.e. spatial bins G, H and I. Sample positions in spatial bins G, H and I may be accessed from sample position memory (or sample buffer 162) to determine if they fall within filter support 402. The sample positions that do fall within filter support 402 contribute to the color computation as the background color. In particular, the rendered color values (stored in sample buffer 162) for these marginal sample positions are not used. Filter support 402 also intersects spatial bins interior to the viewable subwindow. The sample positions and corresponding rendered color values for these interior spatial bins are accessed from sample position memory and sample buffer 162 respectively. The sample positions which fall within filter support 402 contribute their corresponding rendered color values to the color computation. For filter support 402, the internal samples greatly outnumber the exterior sample positions. Thus, the color for pixel center $PC_1$ will be only slightly biased towards the background color. In general, as a pixel center approaches a boundary of the viewable subwindow 422 and moves through it, the relative number of marginal sample positions (which contribute as the background color) to interior sample positions which count according to the rendered color values decreases. Thus, the color smoothly transitions to the background color as the pixel center moves out of the viewable subwindow 422.

In another embodiment, samples outside the viewable subwindow 422 contribute their rendered color values instead of the background color values to the pixel value computations.

In one alternative embodiment, only samples inside the filter support 400 and inside the viewable subwindow 422 are allowed to contribute to a pixel's color computation. In other words, samples outside the viewable subwindow 422 are not used in the computation of color values.

Figure 19:
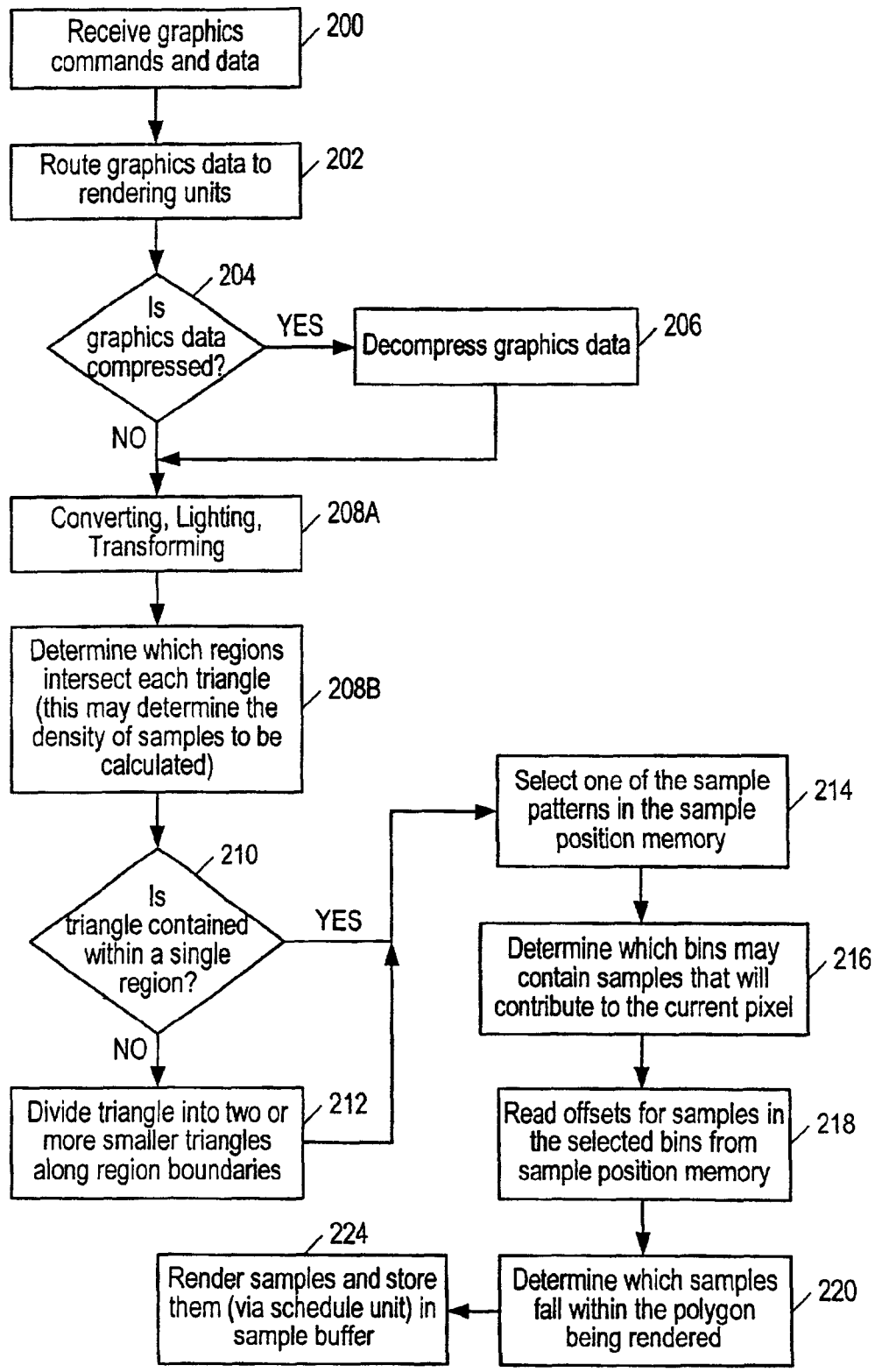
FIG. 19 is a flowchart illustrating one embodiment of a method for drawing samples into a super-sampled sample buffer.

FIG. 19—Rendering Samples into a Super-Sampled Sample Buffer

FIG. 19 is a flowchart of one embodiment of a method for drawing or rendering samples into a super-sampled sample buffer. Certain of the steps of FIG. 19 may occur concurrently or in different orders. In step 200, graphics board 116 receives graphics commands and graphics data from the host CPU 102 or directly from system memory 106. In step 202, the instructions and data are routed to one or more of rendering units 150A–D. In step 204, rendering units 150A–D determine if the graphics data is compressed. If the graphics data is compressed, rendering units 150A–D decompress the graphics data into a useable format, e.g., triangles, as shown in step 206. Next, the triangles are processed and converted to an appropriate space for lighting and clipping prior to the perspective divide and transform to screen space (as indicated in step 208A).

If the graphics system implements variable resolution super-sampling, then the triangles are compared with a set of sample-density region boundaries (step 208B). In variable-resolution super-sampling, different regions of the 2-D viewport may be allocated different sample densities based upon a number of factors (e.g., the center of the attention of an observer on projection screen SCR as determined by eye or head tracking). If the triangle crosses a sample-density region boundary (step 210), then the triangle may be divided into two smaller polygons along the region boundary (step 212). The polygons may be further subdivided into triangles if necessary (since the generic slicing of a triangle gives a triangle and a quadrilateral). Thus, each newly formed triangle may be assigned a single sample density. In one embodiment, graphics system 112 may be configured to render the original triangle twice, i.e. once with each sample density, and then, to clip the two versions to fit into the two respective sample density regions.

In step 214, one of the sample positioning schemes (e.g., regular, perturbed regular, or stochastic) is selected from sample position memory 354. The sample positioning scheme will generally have been pre-programmed into the sample position memory 354, but may also be selected "on the fly". In step 216, rendering units 150A–D may determine which spatial bins contain samples located within the triangle's boundaries, based upon the selected sample positioning scheme and the size and shape of the spatial bins. In step 218, the offsets dX and dY for the samples within these spatial bins are then read from sample position memory 354. In step 220, each sample's position is then calculated using the offsets dX and dY and the coordinates of the corresponding bin origin, and is compared with the triangle's vertices to determine if the sample is within the triangle. Step 220 is discussed in greater detail below.

For each sample that is determined to be within the triangle, the rendering unit draws the sample by calculating the sample's color, alpha and other attributes. This may involve a lighting calculation and an interpolation based upon the color and texture map information associated with the vertices of the triangle. Once the sample is rendered, it may be forwarded to schedule unit 154, which then stores the sample in sample buffer 162 (as indicated in step 224).

Note the embodiment of the rendering method described above is used for explanatory purposes only and is not meant to be limiting. For example, in some embodiments, the steps shown in FIG. 19 as occurring serially may be implemented in parallel. Furthermore, some steps may be reduced or eliminated in certain embodiments of the graphics system (e.g., steps 204–206 in embodiments that do not implement geometry compression, or steps 210–212 in embodiments that do not implement a variable resolution super-sampled sample buffer).

Determination of Which Samples Reside Within the Polygon Being Rendered

Figure 20:
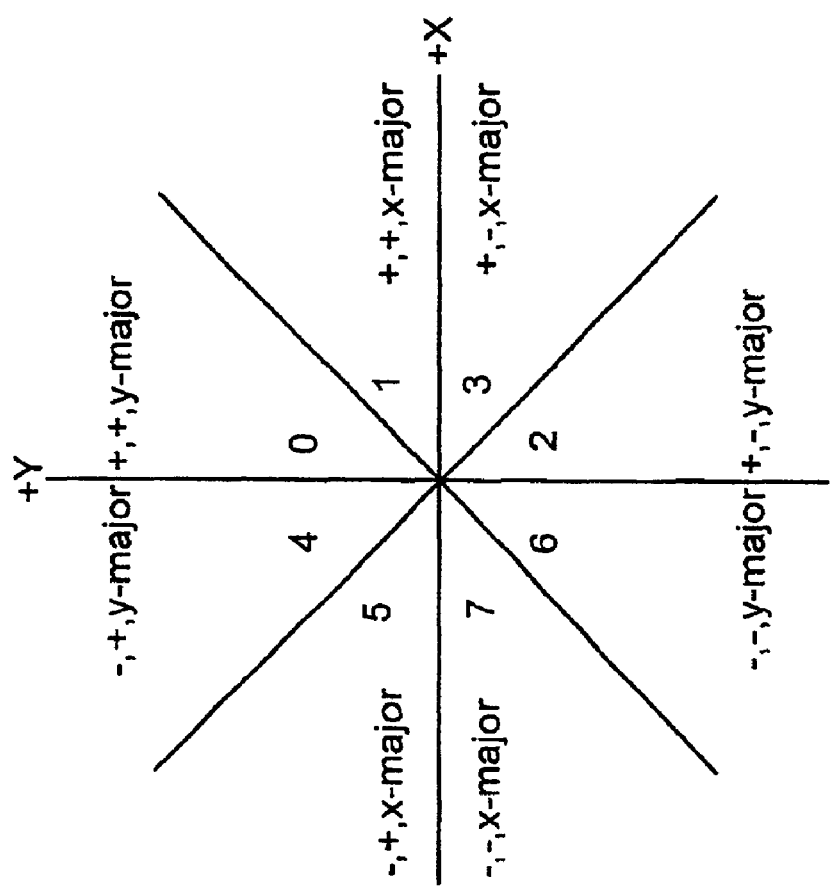
FIG. 20 illustrates one embodiment for coding triangle vertices.

The determination of which samples reside within the polygon being rendered may be performed in a number of different ways. In one embodiment, the deltas between the three vertices defining the triangle are first determined. For example, these deltas may be taken in the order of first to second vertex (v2–v1)=d12, second to third vertex (v3–v2)= d23, and third vertex back to the first vertex (v1–v3)=d31. These deltas form vectors, and each vector may be categorized as belonging to one of the four quadrants of the coordinate plane (e.g., by using the two sign bits of its delta X and Y components). A third condition may be added determining whether the vector is an X-major vector or Y-major vector. This may be determined by calculating whether abs(delta_x) is greater than abs(delta$_{13}$ y). Using these three bits of information, the vectors may each be categorized as belonging to one of eight different regions of the coordinate plane. If three bits are used to define these regions, then the X-sign bit (shifted left by two), the Y-sign bit (shifted left by one), and the X-major bit, may be used to create the eight regions as shown in FIG. 20.

Next, three edge inequalities may be used to define the interior of the triangle. The edges themselves may be described as lines in the either (or both) of the forms y=mx+b or x=ry+c, where rm=1. To reduce the numerical range needed to express the slope, either the X-major and Y-major equation form for an edge equation may be used (so that the absolute value of the slope may be in the range of 0 to 1). Thus, the edge (or half-plane) inequalities may be expressed in either of two corresponding forms:

X-major: y−m·x−b<0, when point (x,y) is below the edge;

Y-major: x−r·y−c<0, when point (x,y) is to the left of the edge.

The X-major inequality produces a logical true value (i.e. sign bit equal to one) when the point in question (x,y) is below the line defined by the an edge. The Y-major equation produces a logical true value when the point in question (x,y) is to the left of the line defined by an edge. The side which comprises the interior of the triangle is known for each of the linear inequalities, and may be specified by a Boolean variable referred to herein as the accept bit. Thus, a sample (x,y) is on the interior side of an edge if X-major: (y−m·x−b<0)<xor>accept=true;

Y-major: (x−m·y−b<0)<xor>accept=true.

The accept bit for a given edge may be calculated according to the following table based on (a) the region (zero through seven) in which the edge delta vector resides, and (b) the sense of edge traversal, where clockwise traversal is indicated by cw=1 and counter-clockwise traversal is indicated by cw=0. The notation "!" denotes the logical complement.

1: accept=!cw
0: accept=cw
4: accept=cw
5: accept=cw
7: accept=cw
6: accept=!cw
2: accept=!cw
3: accept=!cw Tie breaking rules for this representation may also be implemented (e.g., coordinate axes may be defined as belonging to the positive octant). Similarly, X-major may be defined as owning all points that tie on the slopes.

In an alternate embodiment, the accept side of an edge may be determined by applying the edge inequality to the third vertex of the triangle (i.e. the vertex that is not one of the two vertices forming the edge). This method may incur the additional cost of a multiply-add, which may be avoided by the technique described above.

To determine the "faced-ness" of a triangle (i.e., whether the triangle is clockwise or counter-clockwise), the delta-directions of two edges of the triangle may be checked and the slopes of the two edges may be compared. For example, assuming that edge12 has a delta-direction of 1 and the second edge (edge23) has a delta-direction of 0, 4, or 5, then the triangle is counter-clockwise. If, however, edge23 has a delta-direction of 3, 2, or 6, then the triangle is clockwise. If edge23 has a delta-direction of 1 (i.e., the same as edge12), then comparing the slopes of the two edges breaks the tie (both are x-major). If edge12 has a greater slope, then the triangle is clockwise. If edge23 has a delta-direction of 7 (the exact opposite of edge12), then again the slopes are compared, but with opposite results in terms of whether the triangle is clockwise or counter-clockwise.

The same analysis can be exhaustively applied to all combinations of edge12 and edge23 delta-directions, in every case determining the proper faced-ness. If the slopes are the same in the tie case, then the triangle is degenerate (i.e., with no interior area). It can be explicitly tested for and culled, or, with proper numerical care, it could be let through as it will cause no samples to render. One special case arises when a triangle splits the view plane. However, this case may be detected earlier in the pipeline (e.g., when front plane and back plane clipping are performed).

Note in most cases only one side of a triangle is rendered. Thus, if the faced-ness of a triangle determined by the analysis above is the one to be rejected, then the triangle can be culled (i.e., subject to no further processing with no samples generated). Further note that this determination of faced-ness only uses one additional comparison (i.e., of the slope of edge12 to that of edge23) beyond factors already computed. Many traditional approaches may utilize more complex computations (though at earlier stages of the set-up computation).

Figure 21:
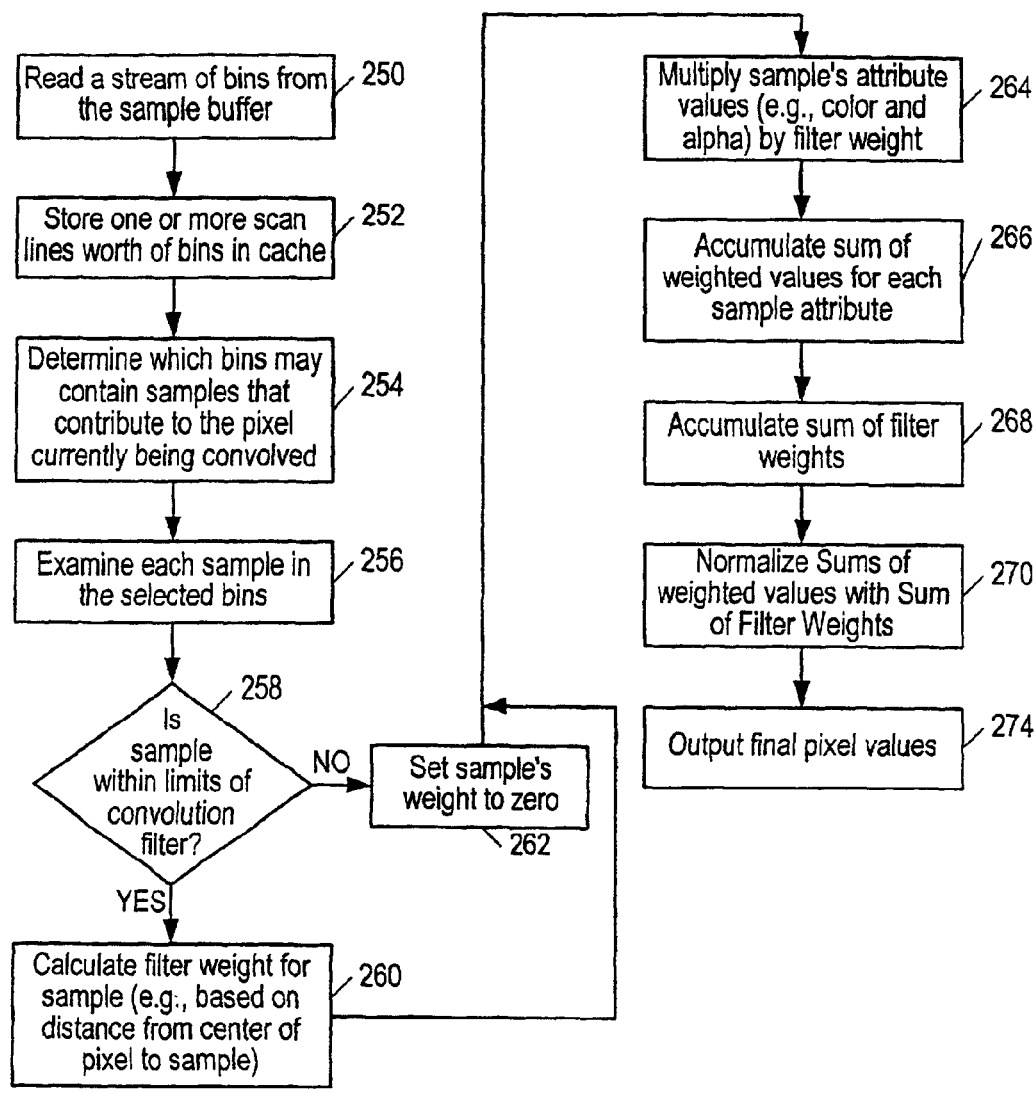
FIG. 21 illustrates one embodiment of a method for calculating pixel values from sample values.

FIG. 21—Generating Output Pixel Values from Sample Values

FIG. 21 is a flowchart of one embodiment of a method for selecting and filtering samples stored in super-sampled sample buffer 162 to generate output pixel values. In step 250, a stream of memory bins are read from the super-sampled sample buffer 162. In step 252, these memory bins may be stored in one or more of bin caches 176 to allow the sample-to-pixel calculation units 170 easy access to sample values during the convolution operation. In step 254, the memory bins are examined to determine which of the memory bins may contain samples that contribute to the output pixel value currently being generated. The support (i.e. footprint) of the filter kernel 400 (see FIG. 18A) intersects a collection of spatial bins. The memory bins corresponding to these spatial bins may contain sample values that contribute to the current output pixel.

Each sample in the selected bins (i.e. bins that have been identified in step 254) is then individually examined to determine if the sample does indeed contribute (as indicated in steps 256–258). This determination may be based upon the distance from the sample to the center of the output pixel being generated.

In one embodiment, the sample-to-pixel calculation units 170 may be configured to calculate this sample distance (i.e., the distance of the sample from the filter center) and then use it to index into a table storing filter weight values (as indicated in step 260). In another embodiment, however, the potentially expensive calculation for determining the distance from the center of the pixel to the sample (which typically involves a square root function) may be avoided by using distance squared to index into the table of filter weights. This squared-distance indexing scheme may be facilitated by using a floating-point format for the distance (e.g., four or five bits of mantissa and three bits of exponent), thereby allowing much of the accuracy to be maintained while compensating for the increased range in values. The table of filter weights may be implemented in ROM. However, RAM tables may also be used. Advantageously, RAM tables may, in some embodiments, allow the graphics system to vary the filter coefficients on a per-frame or per-session basis. For example, the filter coefficients may be varied to compensate for known shortcomings of the display/projection device or for the user's personal preferences. The graphics system may also vary the filter coefficients on a screen area basis within a frame, or on a per-output pixel basis. The samples falling outside the limits of the convolution filter may simply be multiplied by a filter weight of zero (step 262), or they may be removed from the calculation entirely. In one alternative embodiment, the sample-to-pixel calculation units 170 may use specialized hardware (e.g., multipliers and adders) to evaluate the filter kernel based on stored parameters (e.g. polynomial coefficients) defining the filter kernel. The evaluated filter kernel values serve as the filter weights for the samples.

In a second embodiment, a separate filter kernel may be used for filtering each color. Thus, the sample-to-pixel calculation units 170 may include a separate table of filter weights for each color. Alternatively, the sample-to-pixel calculation units 170 may include a separate kernel-evaluation hardware unit for each color.

In some situations, the filter kernel may not be expressible as a function of Euclidean distance with respect to the filter center. For example, a pyramidal tent filter is not expressible as a function of Euclidean distance from the filter center. Thus, filter weights may be tabulated (or computed) in terms of X and Y sample-displacements, or some non-Euclidean distance, with respect to the filter center.

Once the filter weight for a sample has been determined, the attribute values (e.g. red, green, blue, alpha, etc.) for the sample may then be multiplied by the filter weight (as indicated in step 264). Each of the weighted attribute values may then be added to a corresponding cumulative sum—one cumulative sum for each attribute—as indicated in step 266. The filter weight itself may be added to a cumulative sum of filter weights (as indicated in step 268). After all samples residing in the support of the filter have been processed, the cumulative sums of the weighted attribute values may be divided by the cumulative sum of filter weights (as indicated in step 270). It is noted that the number of samples which fall within the filter support may vary as the filter center moves within the 2-D viewport. The normalization step 270 compensates for the variable gain which is introduced by this nonuniformity in the number of included samples, and thus, prevents the computed pixel values from appearing too bright or too dark due to the sample number variation. Finally, the normalized output pixels may be output for gamma correction, digital-to-analog conversion (if necessary), and eventual display (step 274).

FIG. 22—Example Output Pixel Convolution

FIG. 22 illustrates a simplified example of an output pixel convolution with a filter kernel which is radially symmetric and piecewise constant. As the figure shows, four bins 288A–D contain samples that may possibly contribute to the output pixel convolution. In this example, the center of the output pixel is located at the shared corner of bins 288A–288D. Each bin comprises sixteen samples, and an array of four bins (2×2) is filtered to generate the attribute values (red, green, blue, alpha) for the output pixel. Since the filter kernel is radially symmetric, the distance of each sample from the pixel center determines the filter value which will be applied to the sample. For example, sample 296 is relatively close to the pixel center, and thus falls within the region of the filter having a filter value of 8. Similarly, samples 294 and 292 fall within the regions of the filter having filter values of 4 and 2, respectively. Sample 290, however, falls outside the maximum filter radius, and thus receives a filter value of 0. Thus, sample 290 will not contribute to the computed attribute values for the output pixel. Because the filter kernel is a decreasing function of distance from the pixel center, samples close to the pixel center contribute more to the computed attribute values than samples farther from the pixel center. This type of filtering may be used to perform image smoothing or anti-aliasing.

Example attribute values for samples 290–296 are illustrated in boxes 300–306. In this example, each sample comprises red, green, blue and alpha values, in addition to the sample's positional data. Block 310 illustrates the calculation of each pixel attribute value prior to normalization. As previously noted, the filter values may be summed to obtain a normalization value 308. Normalization value 308 is used to divide out the unwanted gain arising from the non-constancy of the number of samples captured by the filter support. Block 312 illustrates the normalization process and the final normalized pixel attribute values.

The filter presented in FIG. 22 has been chosen for descriptive purposes only and is not meant to be limiting. A wide variety of filters may be used for pixel value computations depending upon the desired filtering effect(s). It is a well known fact that the sinc filter realizes an ideal band-pass filter. However, the sinc filter takes non-zero values over the whole of the X-Y plane. Thus, various windowed approximations of the sinc filter have been developed. Some of these approximations such as the cone filter or Gaussian filter approximate only the central lobe of the sinc filter, and thus, achieve a smoothing effect on the sampled image. Better approximations such as the Mitchell-Netravali filter (including the Catmull-Rom filter as a special case) are obtained by approximating some of the negative lobes and positive lobes which surround the central positive lobe of the sinc filter. The negative lobes allow a filter to more effectively retain spatial frequencies up to the cutoff frequency and reject spatial frequencies beyond the cutoff frequency. A negative lobe is a portion of a filter where the filter values are negative. Thus, some of the samples residing in the support of a filter may be assigned negative filter values (i.e. filter weights).

A wide variety of filters may be used for the pixel value convolutions including filters such as a box filter, a tent filter, a cylinder filter, a cone filter, a Gaussian filter, a Catmull-Rom filter, a Mitchell-Netravali filter, any windowed approximation of a sinc filter, etc. Furthermore, the support of the filters used for the pixel value convolutions may be circular, elliptical, rectangular (e.g. square), triangular, hexagonal, etc.

The piecewise constant filter function shown in FIG. 22 with four constant regions is not meant to be limiting. For example, in one embodiment the convolution filter may have a large number of regions each with an assigned filter value (which may be positive, negative and/or zero). In another embodiment, the convolution filter may be a continuous function that is evaluated for each sample based on the sample's distance (or X and Y displacements) from the pixel center. Also note that floating point values may be used for increased precision.

Full-Screen Anti-Aliasing

The vast majority of current 3D graphics systems only provide real-time anti-aliasing for lines and dots. While some systems also allow the edge of a polygon to be "fuzzed", this technique typically works best when all polygons have been pre-sorted in depth. This may defeat the purpose of having general-purpose 3D rendering hardware for most applications (which do not depth pre-sort their polygons). In one embodiment, graphics system 112 may be configured to implement full-screen anti-aliasing by stochastically distributing up to sixteen samples per output pixel in 2-D viewport 420, and filtering the samples with a 5×5 convolution filter (i.e. a filter which covers a 5 by 5 area measured in pixel units).

Distortion Correction for a Single Projection Device

Figure 23A:
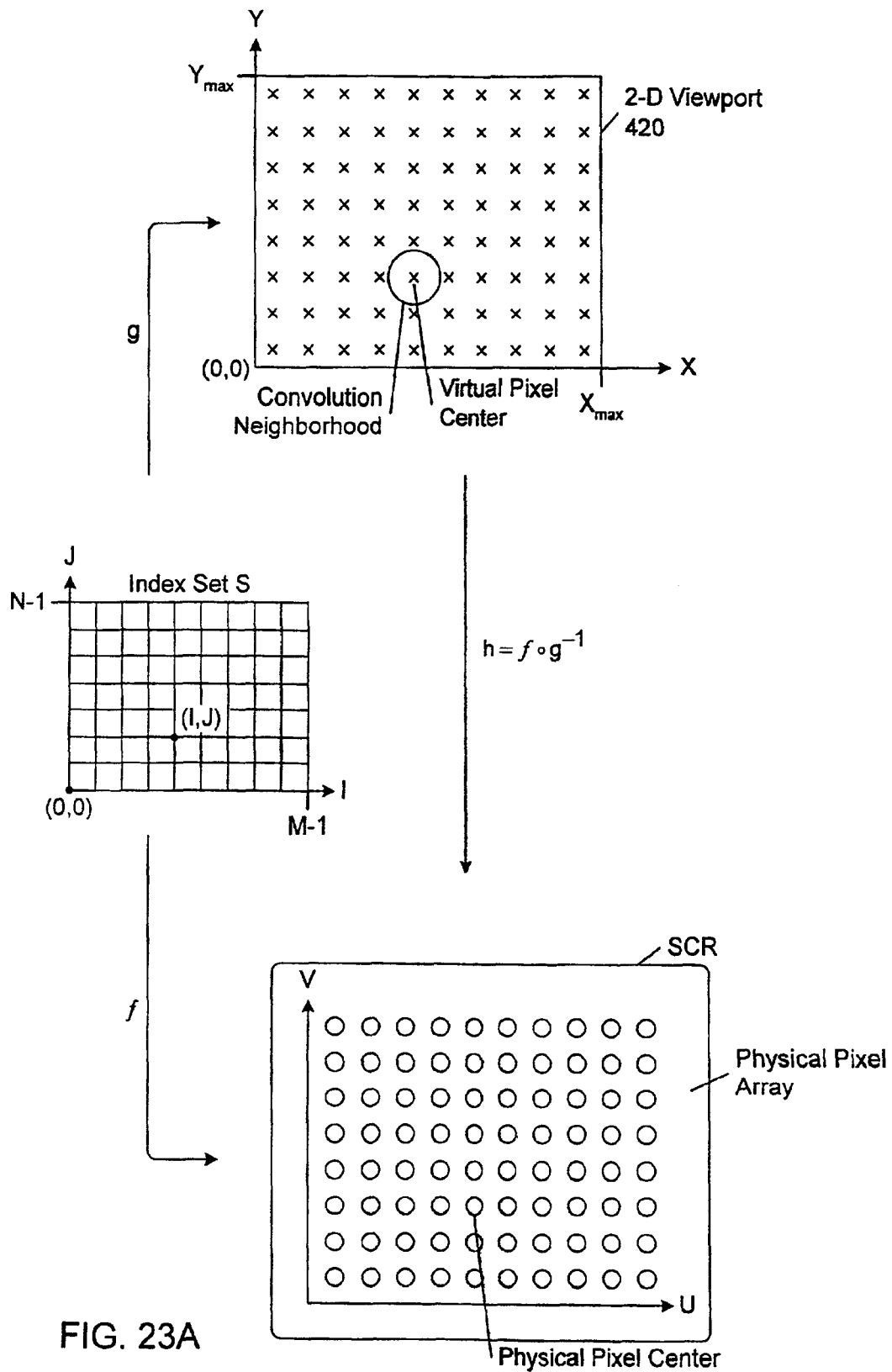
FIG. 23A illustrates an array of physical pixels generated on screen SCR by a single projection device in an ideal projection scenario, and simultaneously, an array of virtual pixels in the 2-D viewport configured in agreement with the structure of the physical pixel array.

In one embodiment of graphics system 112, a set of sample-to-pixel calculation units 170 (which may be comprised within one or more instances of graphics board 116) may generate a video signal which drives a single projection device $PD_1$. The single projection device $PD_1$ generates an array of physical pixels on screen SCR in response to the video signal as shown at the bottom of FIG. 23A. The color and intensity of each physical pixel may be determined by a set of pixel values (e.g. red, green and blue values) computed at a corresponding virtual pixel center in virtual screen space, i.e. the X-Y coordinate space. Thus, sample-to-pixel calculation units 170 generate an array of virtual pixel centers in the virtual screen space, one virtual pixel center per physical pixel. For each virtual pixel center, samples in a neighborhood of the virtual pixel center are filtered (i.e. convolved) in order to generate the pixel values for the corresponding physical pixel. Virtual pixel centers may be equivalently referred to herein as virtual pixel positions or convolution centers. Physical pixels may be equivalently referred to as viewable pixels.

It is noted that multiple graphics boards of the same (or similar) construction as graphics board 116 may be daisy-chained together to generate video output for projection device $PD_1$. The samples generated by the multiple graphics boards may be considered as residing in a common virtual screen space. Each of the multiple graphics boards may render samples for a corresponding region of 2-D viewport 420 in virtual screen space, and stores the rendered samples in a corresponding sample buffer 162.

The physical pixel array generated by projection device $PD_1$ is assumed to have N rows and M columns. Imagine a physical screen coordinate system with a physical-world horizontal axis U and a vertical axis V superimposed on the projection screen SCR. The center of each physical pixel on projection screen SCR may be determined by its physical screen coordinates U and V. In addition, each physical pixel may be described by a pair (I,J) of integer indices, where the index I takes a value in the range 0 to M−1, and index J takes a value in the range from 0 to N−1. Let S denote the set of index pairs, i.e.

S={(I,J): I=0,1,2, . . . , M−1, J=0,1,2, . . . , N−1}.

The index I is referred to as the horizontal pixel index, and the index J is referred to as the vertical pixel index. Let f denote the function which maps each index pair (I,J) in set S to its corresponding physical pixel center (U,V) on screen SCR. The function f may be referred to herein as the display function. Under ideal conditions (which may be impossible to realize practically), the display function f has the structure given by the component equations $$U=C_0 I+C_1,$$

$$V=C_2 J+C_3,$$

where $C_0$, $C_1$, $C_2$, and $C_3$ are constants. Any function having this functional form will be described herein as diagonally affine.

Sample-to-pixel calculation units 170 may be interpreted as traversing the set S of index pairs (I,J) once per video frame. For each pair (I,J) in the set S, one of the sample-to-pixel calculation units 170 (a) selects a virtual pixel center (X,Y) in the 2-D viewport 420, (b) performs a convolution of samples in the neighborhood of the virtual pixel center to determine a set of pixel values, and (c) transmits the set of pixels values to projection device $PD_1$ (perhaps in analog form). Projection device $PD_1$ uses the pixel values to determine the color and intensity of the corresponding physical pixel. Let g represent the function which defines a virtual pixel center (X,Y) for each index pair (I,J) in set S. Thus, a generic pixel center may be denoted as g(I,J). If the function g has a diagonally affine structure, e.g., $$X=D_0 I+D_1,$$

$$Y=D_2 J+D_3,$$

where $D_0$, $D_1$, $D_2$ and $D_3$ are constants, then the virtual-to-physical transition function $h=f \circ g^{-1}$ which maps virtual pixel centers (X,Y) to corresponding physical pixel centers (U,V) will also be diagonally affine, i.e.

$$U=E_0 X+E_1,$$

$$V=E_2 Y+E_3,$$

for some constants $E_0$, $E_1$, $E_2$ and $E_3$.

If the scaling constants $E_0$ and $E_2$ are equal, the function h preserves aspect ratio. Even if scaling constants $C_0$ and $C_2$ are not equal, constants $E_0$ and $E_2$ can be made equal by appropriate choice of constants $D_0$ and/or $D_2$. For example, constant $D_0$ may be chosen so that $$D_0 = \frac{C_0}{C_2} D_2.$$

Sample-to-pixel calculation units 170 may arrange the virtual pixel centers so that they cover the 2-D viewport. Suppose that the 2-D viewport 420 is a rectangle defined by X values ranging from zero to $X_{max}$, and Y values ranging from zero to $Y_{max}$. In this case, sample-to-pixel calculation units 170 may compute virtual pixel centers using the following definition for the function g:

$X=(X_{max}/M)I+(X_{max}/2M),$ $Y=(Y_{max}/N)J+(Y_{max}/2N).$ where index pair (I,J) runs through the set S.

Figure 23B:
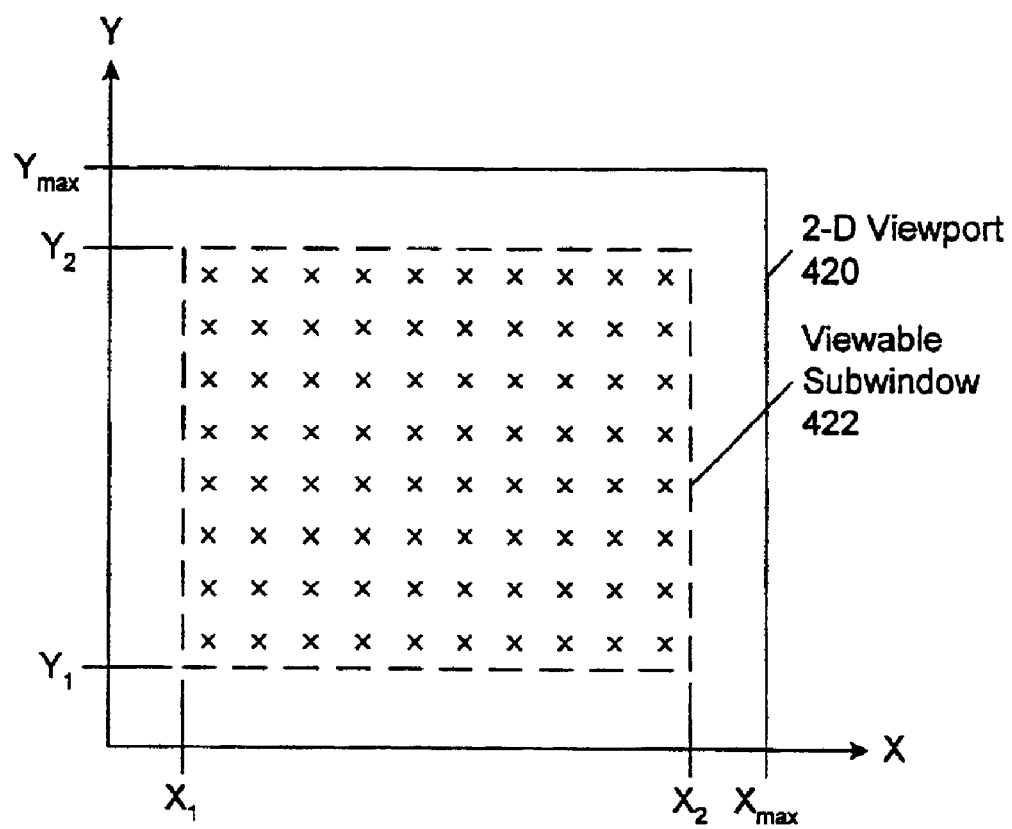
FIG. 23B illustrates a configuration of virtual pixel centers which cover a viewable subwindow of the 2-D viewport.

Alternatively, sample-to-pixel calculation units 170 may arrange the virtual pixel centers so that they cover a subwindow of the 2-D viewport 420 as shown in FIG. 23B. For example, suppose that a viewable subwindow 422 of the 2-D viewport is defined as a rectangle with lower-left corner at $(X_1,Y_1)$ and upper-right corner at $(X_2,Y_2)$. In this case, virtual pixel centers may be positioned according the coordinate relations $X=X_1+I(X_2-X_1)/M+(X_2-X_1)/2M,$ $Y=Y_1+J(Y_2-Y_1)/N+(Y_2-Y_1)/2N,$ where I runs from zero to M−1 and J runs from zero to N−1. Render units 150 (comprised in one or more instances of graphics board 116) may continuously render samples into the entire 2-D viewport. However, sample-to-pixel calculation units 170 may compute pixel values only at the virtual pixel centers which reside within the viewable subwindow 422. Thus, objects (or portions of objects) which are rendered outside the viewable subwindow may not be visible. The samples rendered into the marginal area (outside the viewable subwindow) may allow effects such as panning and zooming to be more efficiently implemented. A great variety of choices for the function g are contemplated. The above examples are not meant to be limiting.

In order to achieve a horizontal and/or vertical pan of the viewable subwindow with respect to the 2-D viewport, sample-to-pixel calculation units 170 may change subwindow coordinates $X_1$, $X_2$, $Y_1$ and $Y_2$ as a function of time t (e.g. as a function of frame number). For example, the equations $X_1(t)=X_1(0)+R_x t,$ $X_2(t)=X_2(0)+R_x t,$ $Y_1(t)=Y_1(0)+R_y t,$ $Y_2(t)=Y_2(0)+R_y t,$ may achieve a pan with horizontal pan rate $R_x$ and vertical pan rate $R_x$, where Z(t) denotes the value of variable Z at time t, and Z(0) denotes the value of variable Z at time zero. Sample-to-pixel calculation units 170 may implement the pan equations, and may dynamically recompute the virtual pixels centers. So the virtual pixel centers may translate along with the viewable subwindow. For example, sample-to-pixel calculation units 170 may compute subwindow boundary coordinates $X_1$, $X_2$, $Y_1$ and $Y_2$, and may recompute virtual pixel centers on a per frame basis, or perhaps, once every several frames.

In addition, a zooming effect may be created by changing the subwindow boundary coordinates as follows:

$X_1(t)=X_1(0)-R_z t$ $X_2(t)=X_2(0)+R_z t,$ $Y_1(t)=Y_1(0)-KR_z t,$ $Y_2(t)=Y_2(0)+KR_z t,$ where $R_z$ is a scalar zoom rate, and K is the aspect ratio, i.e.

$K=(Y_2(0)-Y_1(0))/(X_2(0)-X_1(0)).$

These zoom equations preserve the aspect ratio and the center point of the viewable subwindow throughout the zoom. However, other embodiments are contemplated where the aspect ratio of the viewable subwindow may change through a zoom. Sample-to-pixel calculation units 170 may implement the zoom equations. The virtual centers may be dynamically recomputed so that the virtual pixel centers expand (or contract) along with the viewable subwindow.

Sample-to-pixel calculation units 170 may change subwindow coordinates $X_1$, $X_2$, $Y_1$ and $Y_2$ according to any desired functions of time t. For example, sample-to-pixel calculation units 170 may perform simultaneous panning and zooming by combining the zooming equations and the panning equations given above.

As described above, sample-to-pixel calculation units 170 may partition the labor of generating a video frame. For example, sample-to-pixel calculation units 170 may organize the virtual pixel array into separate vertical strips. Generic sample-to-pixel calculation unit 170-K (where K equals 1, 2, 3 or 4) may compute pixel values for virtual pixel centers g(I,J) corresponding to I in the range from (K−1)M/4 to (KM/4)−1, and J in the range from zero to N−1. Thus, sample-to-pixel calculation units 170 may operate in parallel. The principle of partitioning the pixel value computations into vertical strips may be extended to an arbitrary number of sample-to-pixel calculation units 170.

In addition, generic sample-to-pixel calculation unit 170-K (where K equals 1, 2, 3 or 4) may store a start position $(X_S,Y_S)$, a horizontal step size ΔX and a vertical step size ΔY for generating successive virtual pixel centers. For example, sample-to-pixel calculation unit 170-K may generate virtual pixel centers (X,Y) as a series of rows. Within a row the Y coordinate may be held constant, and successive virtual pixel centers (X,Y) may be generated using the recursive relation X=X+ΔX. At the end of a row, the Y coordinate for the next row may be generated using the recursive relation Y=Y+ΔY. The start position $(X_S,Y_S)$ defines the position of the first virtual pixel center in the first row. The start position $(X_S,Y_S)$, vertical step size and horizontal step size may be programmable, and may be changed per frame. Thus, the array of virtual pixel centers may be translated, vertically scaled and/or horizontally scaled by changing the start position $(X_S,Y_S)$, horizontal step size ΔX and vertical step size ΔY for each sample-to-pixel calculation unit 170-K.

Figure 6A:
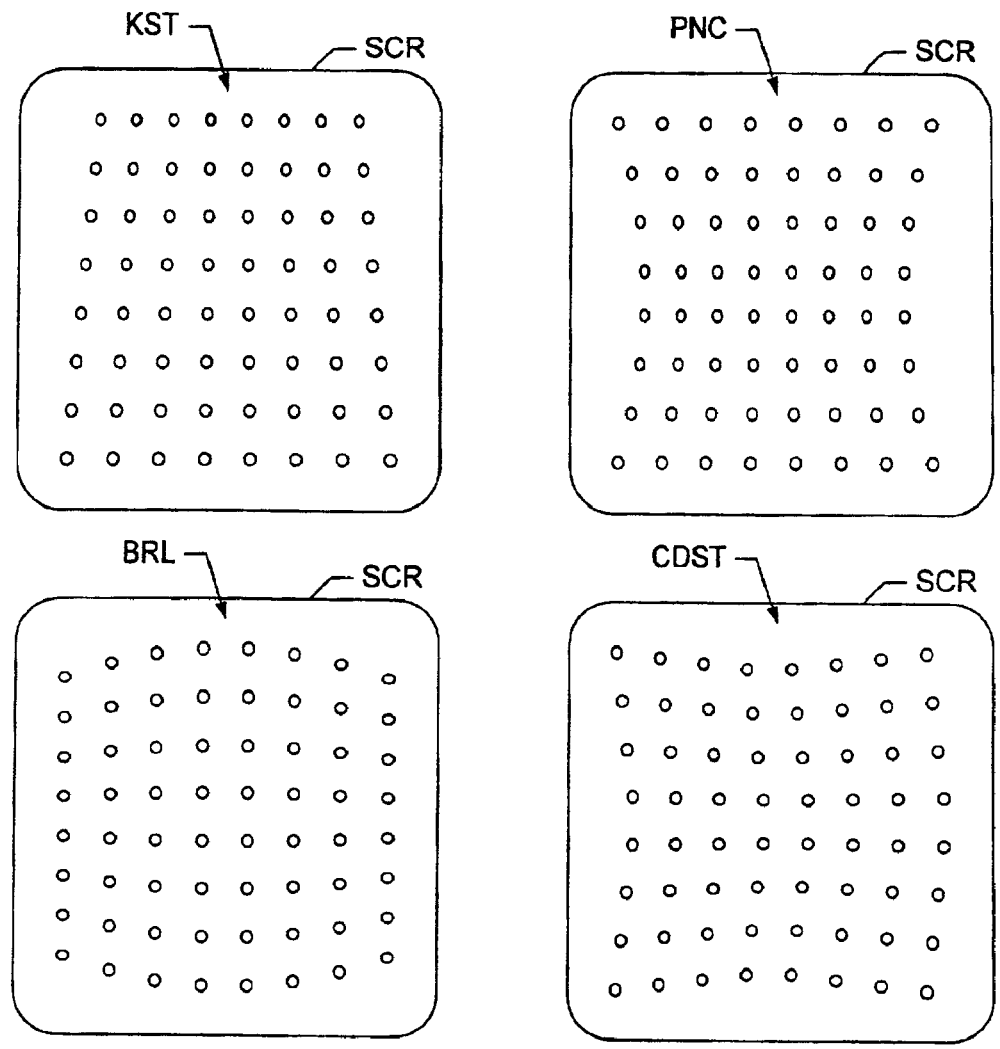
FIG. 6A illustrates several examples of the many different types of distortion which may be exhibited by a physical array of pixels on a screen SCR generated by a projection device.
Figure 6B:
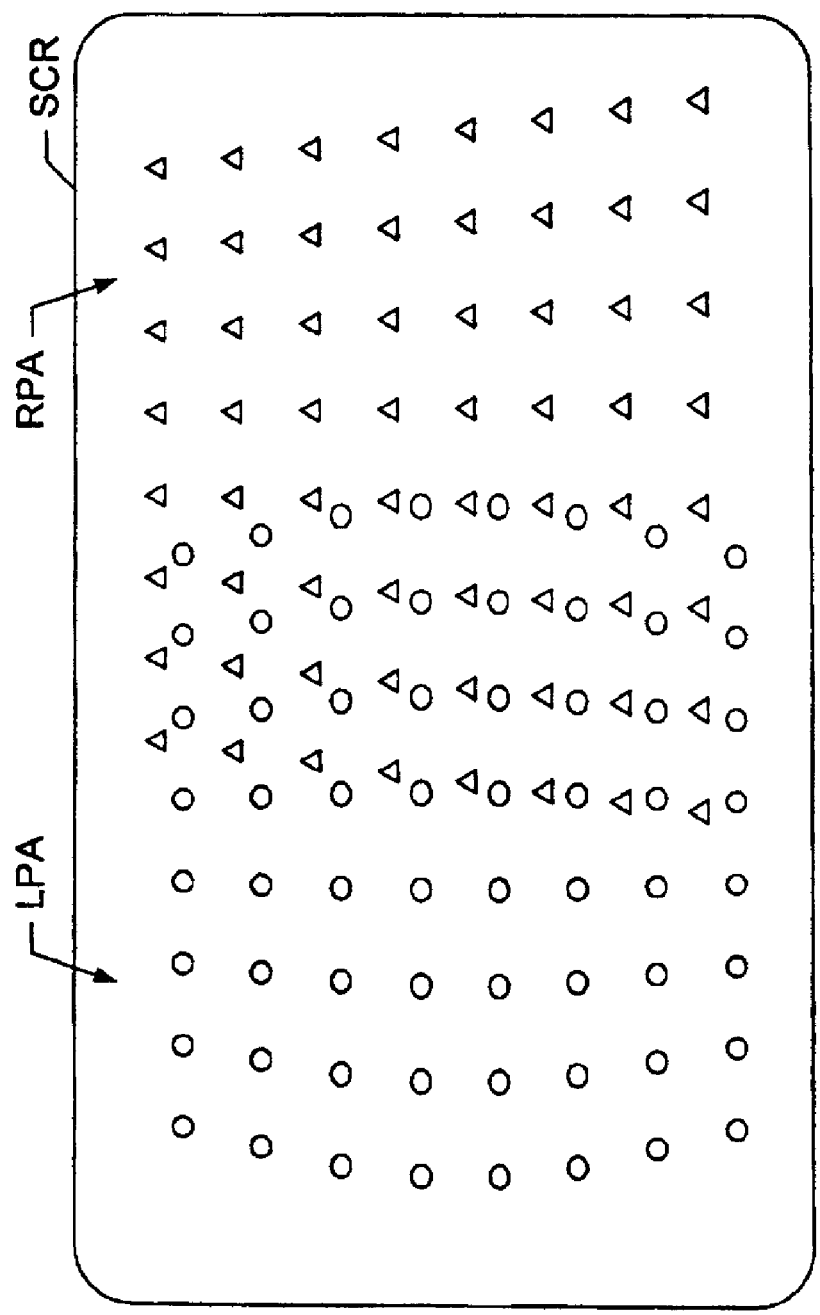
FIG. 6B illustrates an example of the overlap of distorted physical pixel arrays generated by two respective projection devices.

Real projection devices and projection screens depart from the ideal in a variety of ways, several of which are shown in FIG. 6A. For example, the physical pixel array displayed on screen SCR may exhibit a keystone distortion KST (also referred to as a trapezoidal distortion), a pincushion distortion PNC, a barrel distortion BRL, etc. In addition, fundamental distortion modes may combine to form more complex distortions as suggested by combined distortion CDST.

Thus, in general, the display function f which represents the mapping of index pairs (I,J) to physical pixel centers (U,V) will not have a diagonally affine structure. The physical display distortions may arise because (a) the screen is not flat, (b) the screen is not perpendicular to the axis of projection, (c) the optics (lenses/mirrors) in the projection device are spatially non-uniform, (d) the image display is offset with respect to the lens, (e) the display embedded in the projection device generates a distorted image, etc.

Since $h = f \circ g^{-1}$, it is possible to give function h any desired form by appropriate choice for function g. It is desirable for function h to be diagonally affine and aspect-ratio preserving because these conditions guarantee an undistorted presentation of objects on screen SCR in spite of the fact that the physical pixel array may be distorted. Let A represent a diagonally affine and aspect-ratio preserving map from virtual screen space to physical screen space (i.e. from XY to UV). If the function g is determined by the rule $g = A^{-1} \circ f$, then $h = f \circ g^{-1} = A$ as desired.

Figure 24A:
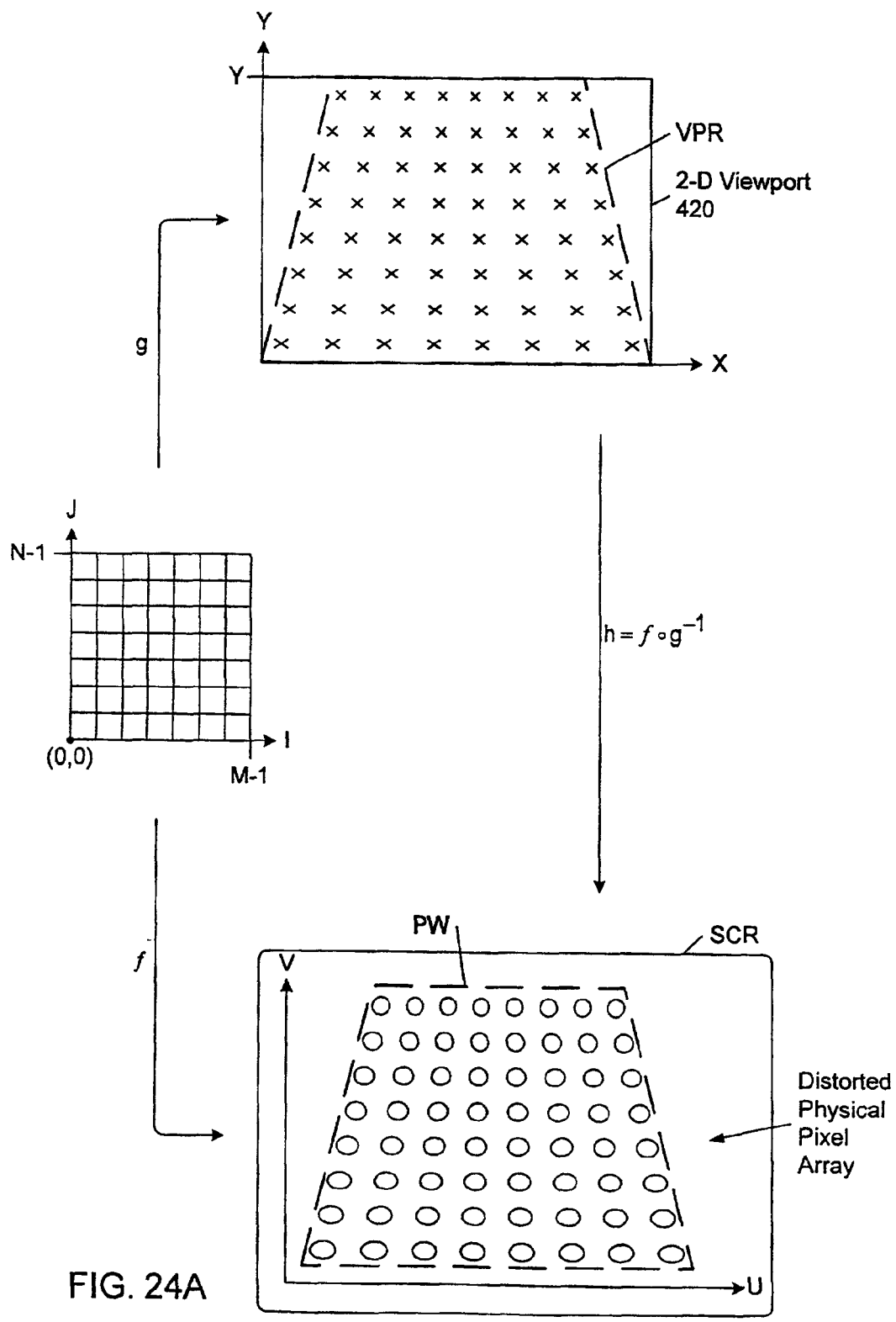
FIG. 24A illustrates a method of counteracting the distortion of physical pixels on screen SCR by distorting virtual pixel centers in the 2-D viewport in agreement with the physical pixel distortions.
Figure 24B:
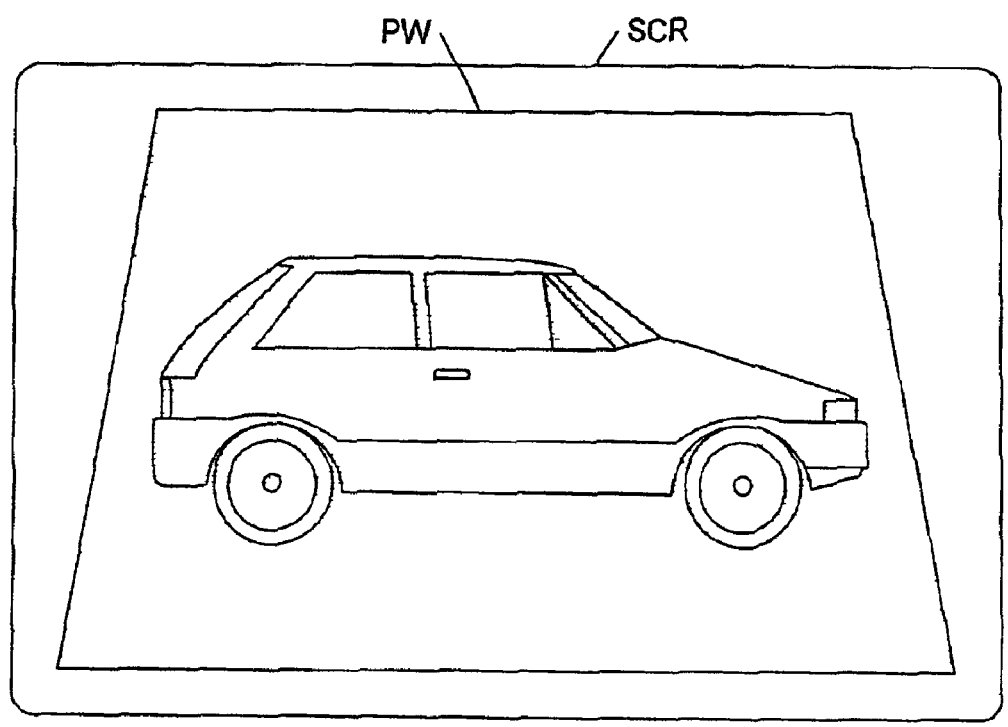
FIG. 24B illustrates an image displayed in physical window PW corresponding to the trapezoidal virtual pixel region (VPR) indicated in FIG. 24A.

The above choice for function g suggests that in order to correct for a given display distortion, sample-to-pixel calculation units 170 may implement the same kind of distortion (i.e. a geometrically similar distortion) in generating virtual pixel centers within the 2-D viewport 420. This is implied by the fact that function f is a compositional factor of function g. For example, FIG. 24A shows a physical pixel array which is distorted trapezoidally. Such a distortion may arise when the top edge of projection screen SCR is closer to the projection device $PD_1$ than the lower edge. Additionally, a display embedded within the projection device may generate such a distorted image. Thus, display function f maps the rectangle of index pairs (I,J) onto a trapezoidal physical window PW comprised of physical pixel centers. In this case, sample-to-pixel calculation units 170 may generate the virtual pixels centers with a similar trapezoidal pattern in the 2-D viewport. While an observer looking at screen SCR may perceive the trapezoidal distortion of the physical window PW, objects (and portions of objects) appearing in the physical window PW are not trapezoidally distorted (as shown in FIG. 24B) because the virtual pixel centers in virtual screen space have been trapezoidally distorted in anticipation of the trapezoidal physical distortion.

As a result of the above discussion, it was observed that the compensation of arbitrary physical pixel distortions may be achieved by an appropriate selection of virtual pixel centers in the 2D viewport. Thus, while many of the examples described herein involve display or projection devices which generate nominally rectangular pixel arrays, display/projection devices having any possible pixel array configuration may be supported. For example, some display/projection devices generate a nominally hexagonal pixel array. Thus, the virtual pixel centers may be (at least initially) positioned with a similar hexagonal configuration, i.e. every row of virtual pixels may be horizontally shifted plus or minus half a pixel distance with respect to the previous row. Also the aspect ratio $\Delta y / \Delta x$ may require adjustment to generate a symmetric hexagonal array, where $\Delta y$ is the distance between rows of virtual pixel centers. As another example, electronically-addressable LCD display/projection devices may allow pixels to be positioned on the screen according to a stochastic distribution. The graphics system may be configured to support such display/projection devices as long as the stochastic pattern is known so that the virtual pixels centers may be placed in a similar stochastic pattern.

The display function f may be estimated based on measurements obtained by a sensing device such as a video camera. For example, sample-to-pixel calculation units 170 may transmit to projection device $PD_1$ one or more calibration patterns for display on screen SCR. The projection device generates a physical image in response to each of the calibration pixel patterns. A video camera may capture the physical images displayed on screen SCR for each of the calibration patterns. Sample-to-pixel calculation units 170 (or a selected one of these units) may estimate the function f based on the known calibration patterns and the captured physical images. For example, sample-to-pixel units 170 may generate a piecewise linear approximation to the display function f, and thereby, a piecewise linear approximation to the virtual pixel selection function g.

Figures 25A, 25B:
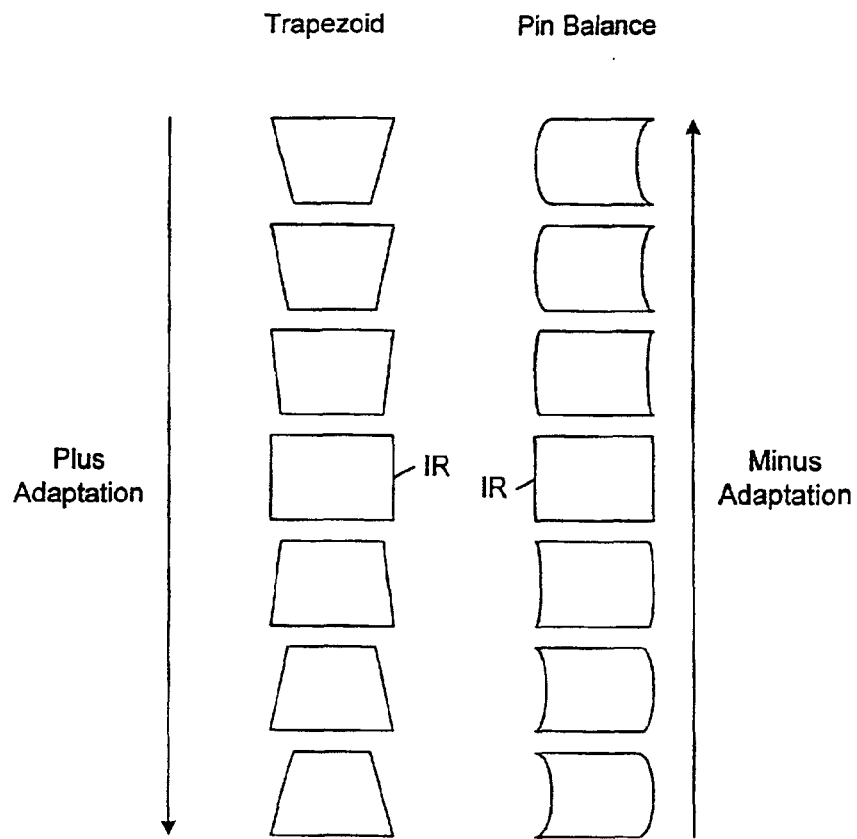
FIGS. 25A & 25B illustrate contractive morphing of virtual pixel centers in the 2-D viewport along a one parameter family of trapezoids, and a one parameter family of pin balance distortions, in response to user plus/minus adaptation signals.

In another embodiment, sample-to-pixel calculation units 170 receive calibration input from a user. The user may be situated in front of screen SCR and observing the screen SCR. The user may identify the type of distortion manifested by the physical window PW. A list (e.g. menu) of distortion types may be presented to the user on monitor 84. For the example illustrated in FIGS. 24A & 24B, the user may specify that the distortion is trapezoidal. In response to this selection, sample-to-pixel calculation units 170 may enter a trapezoidal calibration mode. In the trapezoidal calibration mode, sample-to-pixel calculation units 170 are responsive to plus and minus adaptation signals asserted by the user perhaps through a graphical user interface (GUI). In response to the plus adaptation signal, sample-to-pixel units 170 may dynamically adapt the function g so that the virtual pixel region VPR, i.e. the region of the 2-D viewport which is covered by virtual pixel centers, morphs along a one parameter family of trapezoids as shown in FIG. 25A. The plus adaptation signal may cause the VPR to morph in the direction of increasing ratio of lower edge length to upper edge length. The minus adaptation signal may cause the VPR to morph in the opposite direction, i.e. the direction of decreasing lower edge length to upper edge length. The user controls the plus and minus adaptation signals until objects (such as the automobile of FIG. 24B) displayed in the physical window PW appear undistorted. It is noted that sample-to-pixel calculation units 170 continue to generate successive frames of output pixel values during the adaptation process so the user can see the effect of the plus/minus adaptations on screen SCR.

The adaptation process may start from the state described above where the virtual pixel region VPR is a rectangle which covers the 2-D viewport (or the viewable subwindow). The user may select from any of a variety of distortion types such as trapezoidal distortion, pin cushion distortion, pin balance distortion, shear distortion, rotational distortion, etc., and thus, enter into a corresponding calibration mode. FIG. 25A also illustrates a one-parameter family of pin balance distortions. The calibration procedure for the pin balance calibration mode may be similar to the procedure just described for trapezoidal distortions. The user may successively perform several different calibrations to correct for more complex distortions. In a second calibration, the function g (and thus, the VPR) may start adapting from its state at the end of the first calibration, and so on.

In one embodiment, the one parameter family of distortions (for some or all of the calibration modes) may be configured so that each member (e.g. trapezoid) of the family is neatly (i.e. maximally) inscribed inside an initial rectangle IR as illustrated in FIG. 25B. This implies that the virtual pixel region VPR which starts off, in a first calibration, agreeing with the 2-D viewport (or viewable subwindow) morphs to a final form which is neatly inscribed in the 2-D viewport (or viewable subwindow). Thus, the final state of the VPR after one or more calibrations is contained within the 2-D viewport (or viewable subwindow)

and covers as much of the 2-D viewport (or viewable subwindow) as possible for the given set of distortions. Thus, the whole physical window PW may be used to display a graphical image as illustrated in FIG. 24B.

Figure 25C:
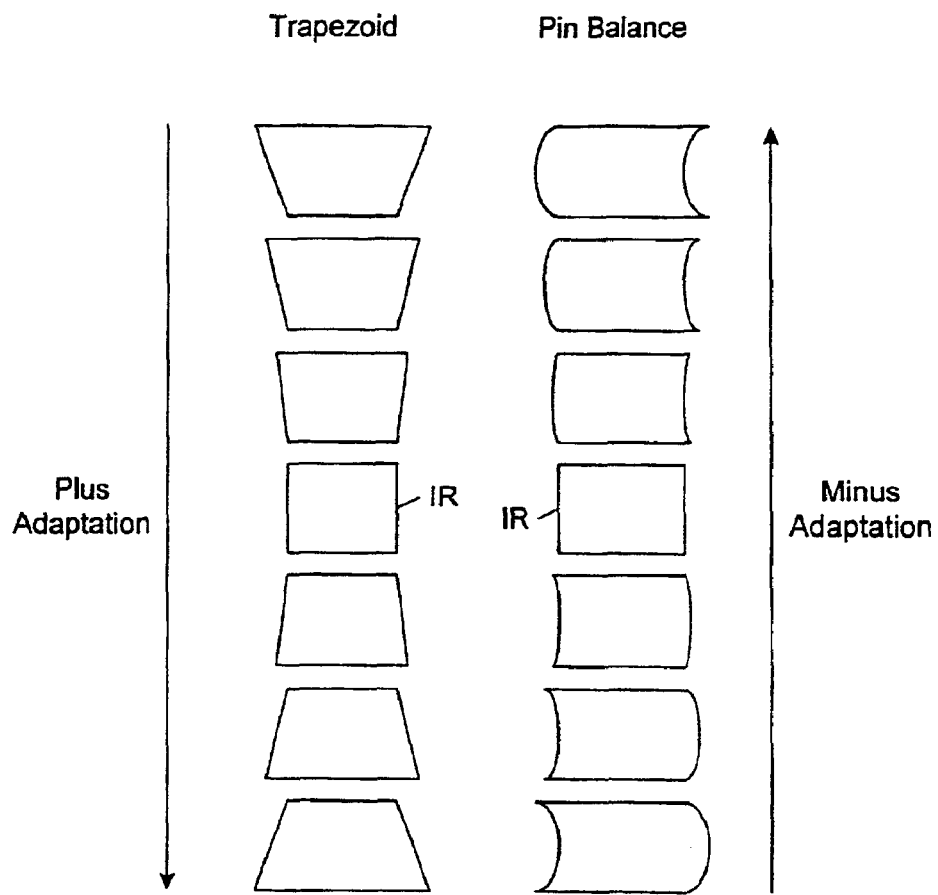
FIGS. 25C & 25D illustrate expansive morphing of virtual pixel centers in the 2-D viewport along a one parameter family of trapezoids, and a one parameter family of pin balance distortions, in response to user plus/minus adaptation signals.
Figure 25D:
Figure 26A:
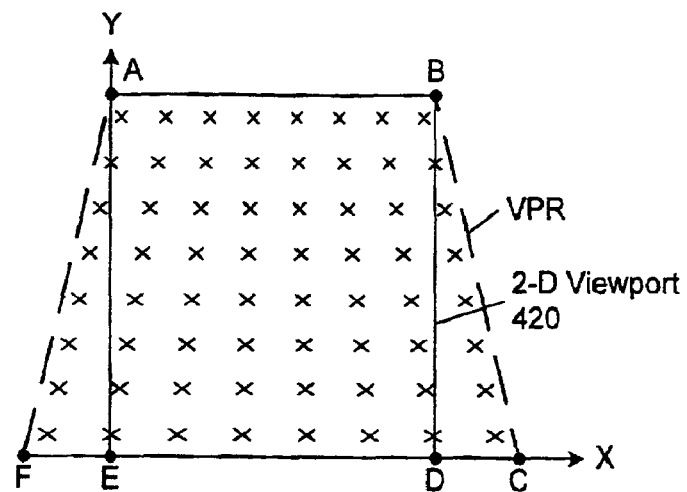
FIG. 26A illustrates a virtual pixel region (VRP) which represents the result of an expansive morphing of an initially rectangular VPR.

In a second embodiment, the one parameter family of distortions (for each calibration mode) is configured so that each member (e.g. trapezoid) of the family neatly contains an initial rectangle IR as shown in FIGS. 25C & 25D. This implies that the virtual pixel region VPR which starts off, in a first calibration, agreeing with the 2-D viewport (or viewable subwindow) morphs to a final form which contains the 2-D viewport (or viewable subwindow). Thus, the final state of the VPR (after one or more calibrations) includes the 2-D viewport (or viewable subwindow). For example, after the trapezoidal calibration suggested by FIGS. 25C & 25D, the VPR may be a trapezoid ABCF which neatly contains the 2-D viewport ABDE as illustrated in FIG. 26A.

Figure 26B:
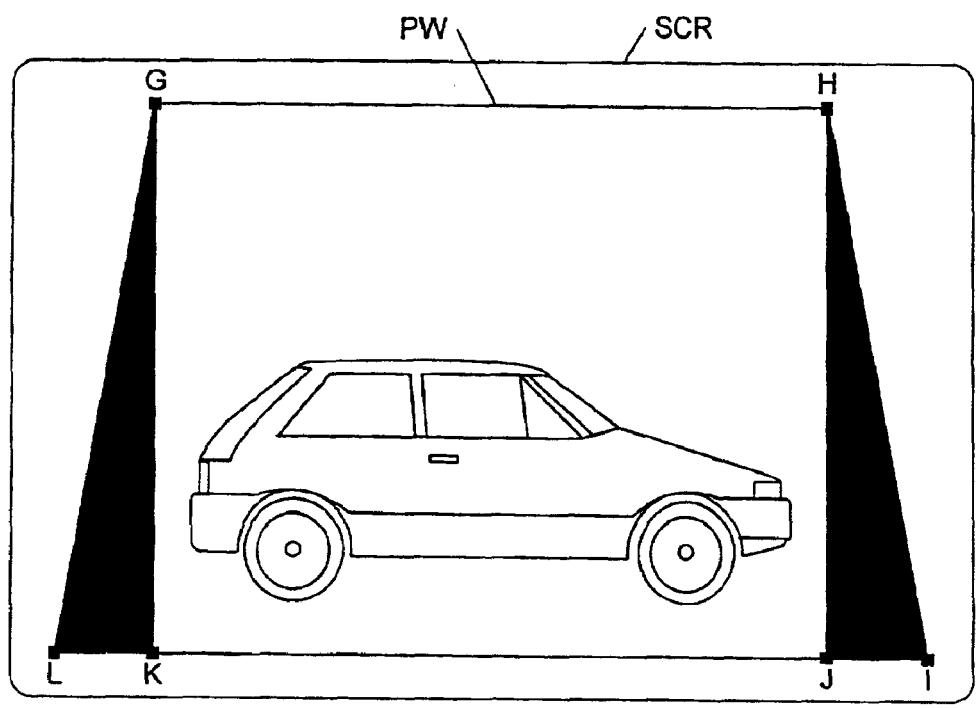
FIG. 26B presents a rectangular viewing area GHJK inscribed within physical window GHIL, where the rectangular viewing area GHJK corresponds to the 2-D viewport ABDE of FIG. 26A.

As described above in connection with FIG. 18C, a virtual pixel center which falls outside of the 2-D viewport, i.e. in marginal regions AEF or BCD, may have a filter support which contains (a) a majority of dummy samples set to the background color and (b) a minority (perhaps none) of the rendered samples from inside the 2-D viewport. Therefore, such a marginal virtual pixel will be assigned (by filtration) a color value which is equal to or close to the background color depending on the fraction of dummy samples versus rendered samples that intersect the filter support. For this reason, as shown in FIG. 26B, the marginal areas GKL and HIJ of the physical window PW will appear to have the background color (e.g. black). Conversely, virtual pixel centers which fall inside the 2-D viewport may have a filter support which contains (c) a majority of rendered samples from inside the 2-D viewport, and (d) a minority (perhaps none) of the dummy samples which are generated outside the 2-D viewport. Therefore, such an internal virtual pixel will be assigned a color value that is equal to (or approximately equal to) an average of rendered samples. If calibration has been performed successfully, the translation map h from virtual pixels to physical pixels may be diagonally affine and aspect ratio preserving. Thus, the virtual pixels inside the 2-D viewport ABDE map onto a rectangle GHJK in the physical window PW. Viewers may be more comfortable with a rectangular viewing area, and therefore, may be willing to suffer the loss of marginal areas GKL and HIJ in physical window PW for image viewing.

In one alternative embodiment, sample-to-pixel calculation units 170 may advantageously skip the convolution computations for virtual pixel centers which fall outside the 2-D viewport 420. Sample-to-pixel calculation units 170 may assign the background color vector (e.g. RGB=[0,0,0] representing black) to the pixel color values for such externally residing virtual pixel centers.

A manufacturer of display devices (e.g. monitors or projectors) may calibrate the virtual pixel centers for a display device at manufacture time. The set of calibrated virtual pixel centers for the display device may be stored on a memory medium such as a disk or CD-ROM. Alternatively, the memory medium may be a portion of RAM and/or ROM located in the display device. The manufacturer may ship the memory medium to a user along with the display device. The user may transfer the set of calibrated virtual pixel centers from the memory medium to graphics system 112. (Alternatively, the transfer process may be automated.) The calibrated virtual pixel centers may allow the user to immediately (or more quickly) achieve undistorted presentation of images on the display device using graphics system 112. It is noted that the manufacturer may allow the user to download the calibrated virtual pixel centers over the Internet.

A trained worker at a manufacturing facility may calibrate the virtual pixel centers by selecting one or more calibration modes (e.g. keystone mode, barrel mode, pincushion mode, etc.), and supplying plus/minus adaptation inputs for each calibration mode, until objects appear as undistorted as possible in each mode as described above. Alternatively, the manufacturer's calibration may be automated. For example, an adaptive control system may be configured to replace the trained worker.

The manufacturer's calibration may be especially important when the display distortions vary significantly from unit to unit. If display distortions are stable, i.e. do not change significantly in time, graphics system 112 may not need to provide a mechanism for user calibration. Conversely, the variation of display distortions over time may be significant. Thus, graphics system 112 may provide a mechanism (such as those described above) for user calibration.

If the time variation of display distortion is large, graphics system 112 may be configured for continuous (e.g. real-time) calibration. For example, graphics system 112 may be configured to intermittently display subliminal calibration patterns. A video camera may monitor the presentation of the calibration patterns on the display device (or screen SCR). Graphics system 112 may analyze the video images, and may generate corrected virtual pixel centers in the 2-D viewport 420 in response to the video images. Such continuous calibration may facilitate the use of high-drift display devices which would otherwise be disturbing to viewers.

The present invention contemplates various embodiments of graphics system 112 where any combination of user calibration and/or continuous calibration may be supported. Furthermore, graphics system 112 may be (or may not be) configured to support download of virtual pixel centers which have been computed/determined externally such as in a manufacturer's calibration.

Sample-to-pixel calculation units 170 may support localized calibrations. In one embodiment, the user may select a local region (e.g. a quadrant, an arbitrary rectangle, arbitrary disk, an edge, corner, etc.) of the 2-D viewport 420 for which calibration is to be performed. Render units 150 may render samples for a rectangular grid (or some other calibration pattern) into the 2-D viewport 420 during the localized calibration. Sample-to-pixel calculation units 170 may adjust the locations of virtual pixel centers corresponding to the local region in response to user input signals, and may leave the virtual pixel centers outside the local region relatively unperturbed. Sample-to-pixel calculation units 170 may implement a transition region around the local region, where the sensitivity of virtual pixel centers to calibration adjustments transitions from 100% at the interior boundary of the transition region to 0% at the exterior boundary of the transition region. Conceptually, any distortion pattern may be corrected by a sufficient number of local calibrations.

The localized calibration feature may be especially advantageous when different portions of the physical pixel array express different types of positional distortions. For example, the screen SCR may be deformed at one or more locations, or may be continuously deformed.

In one embodiment, a distance measuring device may be situated at or near the projection device $PD_1$. The distance measuring device may measure the distance of points on screen SCR from the distance measuring device. The distance measurement device may provide vector displacements of the points on the screen with respect to the distance measuring device. These measurements may be used to estimate a surface function for screen SCR. In addition, an observer's position with respect to the projector/screen system may be measured. The surface function and observer's position may be supplied to a geometric modeling and/or ray-tracing program which determines an optimal set of virtual pixel centers for the given scenario. Thus, graphics system 112 may correct for arbitrary image distortions due to the curvature of the projection surface.

As described above in connection with FIGS. 23A and 23B, each of sample-to-pixel calculation units 170 may store a start position $(X_S, Y_S)$, a horizontal step size $\Delta X$ and a vertical step size $\Delta Y$ for generating a rectangular array of virtual pixel centers $(X,Y)$ in the 2-D viewport. A distorted array of virtual pixel centers may be described in terms of vector displacements from the corresponding virtual pixel centers in a rectangular array. For example, let function $g^o:(I,J) \rightarrow (X,Y)$ represent a rectangular array of virtual pixel centers, and let function $g^d:(I,J) \rightarrow (X,Y)$ represent a distorted array of virtual pixel centers. A displacement function $\Delta g$ may be generated by subtracting $g^o$ from $g^d$. The displacement function values $\Delta g(I,J)$ may be stored per pixel. However, it may be more efficient to store a piecewise linear approximation to the displacement function $\Delta g$, and interpolate the per-pixel displacement values $\Delta g(I,J)$. Sample-to-pixel calculation units 170 may generate the distorted virtual pixel centers and corresponding pixel values according to the following pseudo-code fragment.

```
I=0;
J=0;
X^r=X_s;
Y^r=Y_s;
while (J<N) {
    while (I < M) {
        (X^d,Y^d) = (X^r,Y^r) + Δg(I,J) ;
        Pixel Values = Convolve (X^d,Y^d);
        Output Pixel Values;
        X^r = X^r + ΔX ;
        I = I + 1;
    }
    X^r=X_s;
    Y^r=Y^r+ΔY ;
    J=J+1;
}
```

Each distorted virtual pixel center $(X^d, Y^d)$ is generated by adding vector displacement value $\Delta g(I,J)$ to a corresponding rectangular virtual pixel center $(X^r, Y^r)$. A convolution function is invoked to compute pixel values (e.g. red, green, blue and alpha values) at the distorted center $(X^d, Y^d)$. Once computed, the pixel values are transmitted to projection device $PD_1$ through a video channel. The inner while loop generates successive distorted centers $(X^d, Y^d)$ within a single row. The outer while loop generate successive rows. The rectangular centers $(X^r, Y^r)$ are spaced with distance $\Delta X$ horizontally and $\Delta Y$ vertically. The start position $(X_S, Y_S)$ controls the location of the first rectangular pixel in the first row, and thus, determines the position of the whole rectangular array. The above fragment may be executed once per video frame.

In the example above, triads of red, green and blue are computed at each virtual pixel center. However, as will be described in more detail below, a distinct set of virtual positions (in the 2D viewport) may be used to compute the red, green and blue pixel values. Furthermore, the three colors may be computed with unequal spatial densities. For example, in a hexagonal array of virtual pixel centers, one out of every six virtual pixels centers may be blue centers (at which only blue values are computed). Of the remaining five out of every six virtual pixel centers, three may be red centers and two may be green centers. Blue may be given less spatial density since the eye is less sensitive to blue than to red or green.

As noted above, each sample-to-pixel calculation unit 170-K may operate independently and generate output pixel values corresponding to a corresponding vertical strip of the virtual pixel array. For example, sample-to-pixel calculation unit 170-K (where K equals 1, 2, 3 or 4) may operate in accordance with the following code fragment:

```
I=0;
J=0;
X^r=X_s(K)
Y^r=Y_s(K);
while (J<N) {
    while (I < M/4) {
        (X^d, Y^d) = (X^r, Y^r) + Δg(I + (K−1)M/4, J);

Pixel Values = Convolve (X^d,Y^d);
        Output Pixel Values;
        X^r = X^r + ΔX(K);
        I = I + 1;
    }
    X^r=X_s;
    Y^r=Y^r+ΔY(K);
    J=J+1;
}
``` where $X_S(K)$ and $Y_S(K)$ represent the start position for sample-to-pixel calculation unit 170-K. Similarly, $\Delta X(K)$ and $\Delta Y(K)$ represent the horizontal and vertical step size respectively used by sample-to-pixel calculation unit 170-K. The pseudo-code fragments presented here and elsewhere in this specification serve to describe the arrangement of computations performed by the sample-to-pixel calculation unit 170 in various embodiments. These computations may be implemented in dedicated hardware and/or programmable hardware responsive to program code.

Chromatic Distortion Compensation

Any distortion mechanism (or combination of mechanisms) which results in a separation of the color components of physical pixels presented by a display device (such as a monitor or projection device) will be referred to herein as chromatic distortion. In one embodiment, graphics system 112 may be configured to compensate for chromatic distortion by appropriate choice of separate virtual pixel centers for each color component.

Figure 27A:
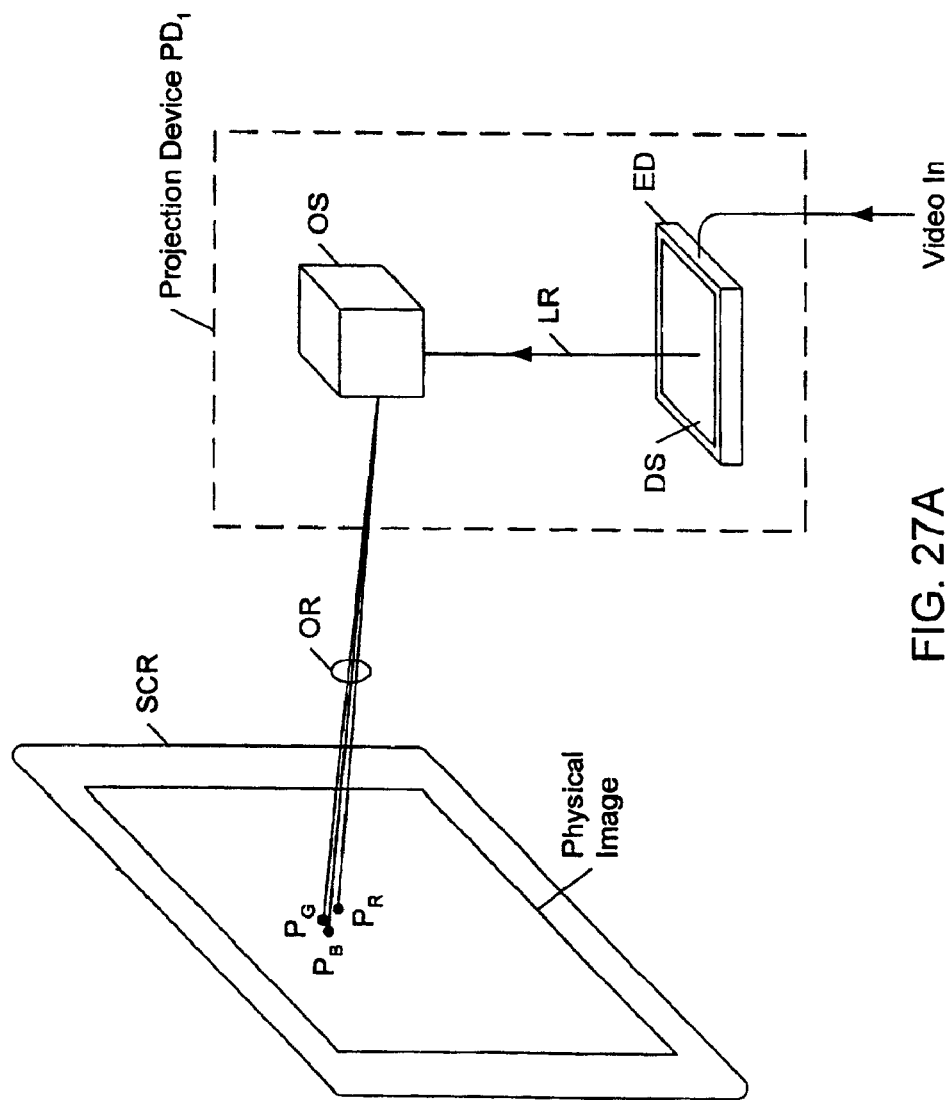
FIG. 27A illustrates the effect of chromatic aberration on a physical image generated by a projection device.
Figure 27B:
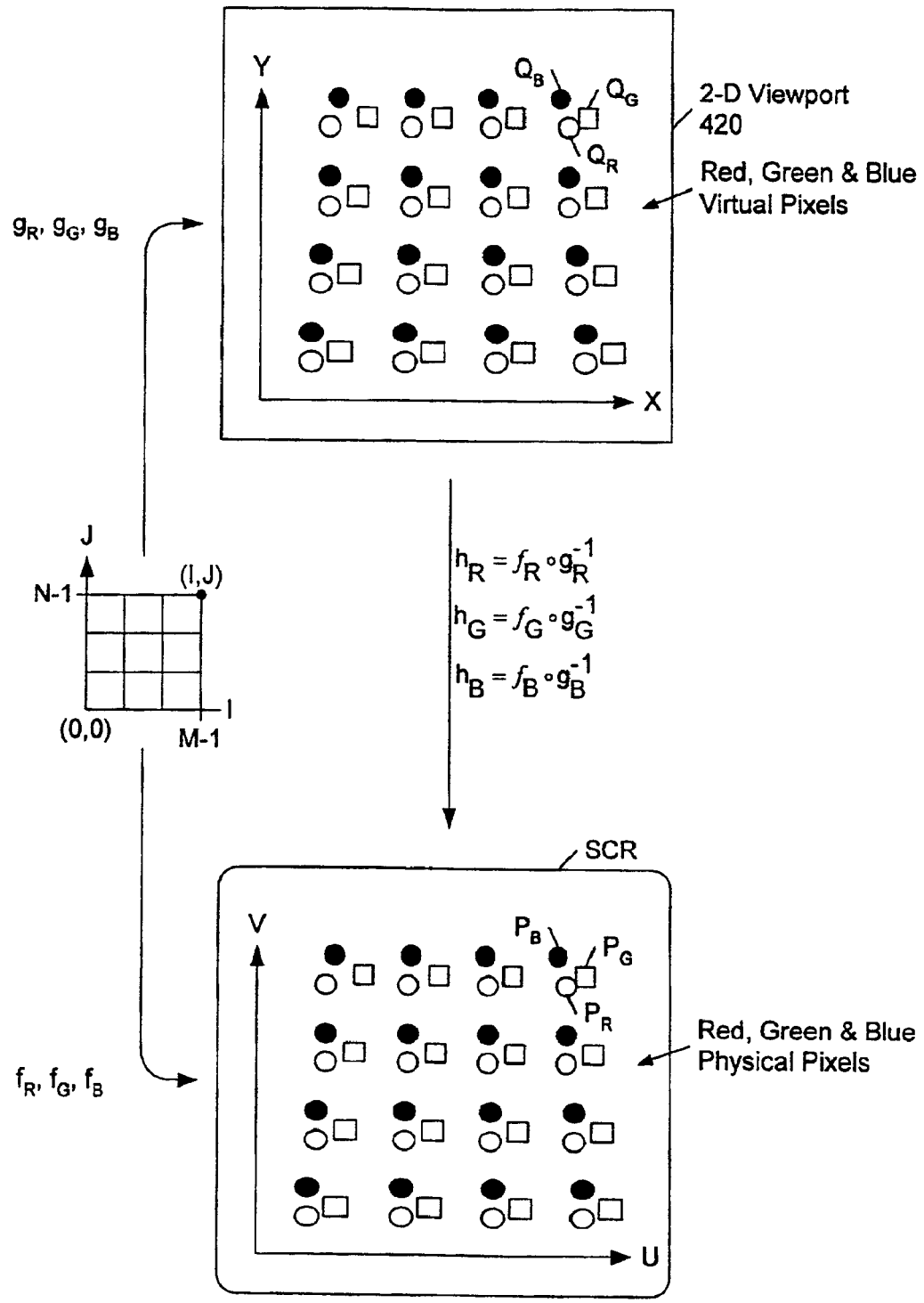
FIG. 27B illustrates a method for counteracting the effect of chromatic aberration by appropriate choice of separate locations for red, blue, and green virtual pixel centers in the 2-D viewport.

FIG. 27A illustrates an example of chromatic aberration which represents one mode of chromatic distortion. As shown, a projection device $PD_1$ may include an embedded display ED and an optical subsystem OS. The embedded display ED may generate successive video frames on display screen DS in response to a video input signal provided by graphics system 112. The video frames are projected onto projection screen SCR by optical subsystem OS. The optical subsystem OS may include optical devices such as lenses, prisms, etc. Since the index of refraction of optical materials depends on wavelength, different colors are bent through different angles in optical subsystem OS. This wavelength dependent bending is commonly referred to as chromatic aberration. Consider a light ray LR emanating from a single source pixel on display screen DS. The light ray LR may be a mixture of red, blue, and green components. When the light ray LR passes through optical subsystem OS, the red, blue and green components of light ray LR may be separated into a spectrum of colors. Thus, the physical image generated on screen SCR may appear blurred. If the source pixel (and thus, light ray LR) is alternately driven with only red, only green, and only blue, then separate red, green and blue output rays OR may be observed emerging from optical subsystem OS. The output rays OR impinge on screen SCR at points $P_R=(U_R,V_R)$, $P_B=(U_B,V_B)$ and $P_G=(U_G,V_G)$ respectively. These points are referred to herein as the red physical pixel center, the green physical pixel center and the blue physical pixel center respectively. Each source pixel on display screen DS generates such a triad of red, green and blue physical pixel centers as illustrated at the bottom of FIG. 27B. Note that FIG. 27B illustrates an exaggeratedly small (4×4) array for the sake of simplicity.

The red physical pixel centers (denoted by small white disks) on screen SCR form a red physical array. The green physical pixel centers (denoted by small white rectangles) on screen SCR form a green physical array. The blue physical pixel centers (denoted by small black disks) form a blue physical array. These colored physical arrays fail to line up, in this case due to the chromatic aberration. Furthermore, each of the colored physical arrays are distorted as discussed earlier. For example, each may have a pincushion distortion, a trapezoidal distortion, etc.

It is noted that chromatic aberration is only one form of chromatic distortion. For a more detailed discussion of chromatic distortion modes in various projection technologies, please refer to the "Background of the Invention" section. The chromatic distortion compensation embodiments described below may be used to compensate for arbitrary chromatic distortions regardless of the mechanism(s) by which they arise.

The red physical array may be described by a red display function $f_R$ which maps each index pair (I,J) in set S to a corresponding red physical pixel center $P_R=(U_R,V_R)$ on screen SCR. Similarly, the ensemble of green physical pixel centers $P_G=(U_G,V_G)$ may be described by a green display function $f_G$, and the ensemble of blue physical pixel centers $P_B=(U_B,V_B)$ may be described by a blue display function $f_B$.

In the embodiments discussed above, sample-to-pixel calculation units 170 select a single array of virtual pixel centers in the 2-D viewport, and all three colors values are computed at each virtual pixel center. In the present embodiment, sample-to-pixel calculation units 170 may select distinct locations in the 2-D viewport for the computation of each color. For example, sample-to-pixel calculation units 170 may select a first array of virtual pixel centers for computation of green pixel values, a second array of virtual pixel centers for computation of red pixel values, and a third array of virtual pixel centers for computation of blue pixel values. Let function $g_G$ represent the selection of "green" virtual pixel centers. Thus, for each index pair (I,J) in set S, the functional value $g_G(I,J)$ specifies the location $(X_G,Y_G)$ of a green virtual pixel center $Q_G$ in the 2D viewport. Let function $g_R$ represent the selection of red virtual pixel centers. Thus, for each index pair (I,J) in set S, the functional value $g_R(I,J)$ defines the location $(X_R,Y_R)$ of a red virtual pixel center $Q_R$. Let function $g_B$ represent the selection of blue virtual pixel centers. Thus, for each index pair (I,J) in set S, the functional value $g_B(I,J)$ defines the location $(X_B,Y_B)$ of a blue virtual pixel center $Q_B$.

The functions $h_G=f_G \circ g_G^{-1}$, $h_R=f_R \circ g_R^{-1}$ and $h_B=f_B \circ g_B^{-1}$ map from virtual screen space to physical screen space (i.e. from XY to UV). It is desirable that these three functions be diagonally affine, aspect-ratio preserving and equal. Let A be a diagonally affine and aspect-ratio preserving map from virtual screen space to physical screen space. If the color-wise virtual pixel selection functions are chosen so that $$g_G = A^{-1} \circ f_G,$$

$$g_R = A^{-1} \circ f_R,$$

$$g_B = A^{-1} \circ f_B,$$

it follows that $h_G=h_R=h_B=A$ as desired. The above choice for the green selection function $g_G$ suggests that in order to correct for the distortion expressed in the green physical pixel centers $P_G$, sample-to-pixel calculation units 170 may implement the same kind of distortion in generating the green virtual pixel centers $Q_G$ as suggested by FIG. 27B. This is implied by the fact that function $f_G$ is a compositional factor of function $g_G$. Similarly, in order to correct for the distortion expressed by the red and blue physical arrays, sample-to-pixel calculation units 170 may implement the same kinds of distortions in generating the red and blue virtual pixel centers respectively.

The red, green and blue display functions may be estimated using a sensing device such as a video camera. Sample-to-pixel calculation units 170 may display a red test pattern such as an array of red dots or a grid of red lines. The video camera may capture images of the red test pattern displayed on screen SCR. The captured images may be analyzed to estimate the red display function $f_R$. The red test patterns may be displayed subliminally, i.e. between normal video frames. Thus, calibration may be performed as often as needed. The green display function and blue display function may be similarly estimated.

In one embodiment, the red, green, and blue virtual pixel selection functions may be determined based on user calibration inputs as described above. For example, the user may invoke a green calibration mode in which the green virtual pixel centers may be calibrated. In the green calibration mode, sample-to-pixel calculation units 170 may set red and blue pixel values to zero, and may compute only green pixel values. Thus, only the green physical array (denoted by the small rectangles) will be visible on screen SCR. Render units 150 may render samples for a white rectangular grid on a black background into sample buffer 162. Because the red and blue pixel value computations are suppressed in the green calibration mode, the rectangular grid will appear green on screen SCR. Sample-to-pixel calculation units 170 may adapt the green selection function $g_G$, i.e. the locations of the green virtual pixel centers $Q_G$ in the 2-D viewport, in response to user calibration inputs until the grid of green lines appears rectangular on screen SCR. For example, if the green lines initially appear to be trapezoidally distorted on screen SCR, the user may invoke a trapezoidal calibration mode to morph the green virtual pixel centers along a one parameter family of trapezoids until the green grid lines appear rectangular within the green physical pixel array on screen SCR. The user may invoke any of a variety of distortion correction modes in succession as discussed above. After the green calibration mode is complete the grid of green lines may appear undistorted and rectangular.

After completion of the green calibration mode, the user may invoke a red calibration mode. In the red calibration mode, sample-to-pixel calculation units 170 may (a) suppress the blue pixel value computation and set all blue pixel values to zero, (b) compute green pixel values based on the green virtual pixel centers previously calibrated, (c) compute red pixel values based on the red virtual pixel centers which are to be presently adjusted. Thus, the rectangular grid of white lines rendered with samples in sample buffer 162 may appear as two separate grids on screen SCR, i.e. a green grid and a red grid. The green grid should appear undistorted and rectangular since the green calibration will have already been completed. Initially, the red grid may appear distorted and non-rectangular. Sample-to-pixel calculation units 170 may adjust the red selection function $g_R$, i.e. the locations of the red virtual pixel centers in the 2-D viewport, until the red grid lines line up with (i.e. are neatly superimposed over) the green grid lines on screen SCR. The user may invoke a succession of distortion correction modes as discussed above. After the red calibration mode is complete, the red and green grid lines should appear undistorted, rectangular, and aligned.

In one embodiment, the red virtual pixel centers may be initialized at the location of the green virtual pixel centers. Since it is likely that the red physical pixel centers may be distorted in approximately the same way as the green physical pixel centers, this initialization may save the user time by instantly advancing the red virtual pixel centers closer to their ultimate destinations in the 2-D viewport.

After completion of the red calibration mode, the user may invoke a blue calibration mode. In the red calibration mode, sample-to-pixel calculation units 170 may (a) suppress the red pixel value computation and set all red pixel values to zero, (b) compute green pixel values based on the green virtual pixel centers previously calibrated, (c) compute blue pixel values based on the blue virtual pixel centers which are to be presently adjusted. Thus, the rectangular grid of white lines rendered with samples in sample buffer 162 may appear as two separate grids on screen SCR, i.e. a green grid and a blue grid. The green grid should appear undistorted and rectangular since the green calibration will have already been completed. Initially, the blue grid may appear distorted and non-rectangular. Sample-to-pixel calculation units 170 may adjust the blue selection function $g_B$, i.e. the locations of the blue virtual pixel centers in the 2-D viewport, until the blue grid lines line up with (i.e. are neatly superimposed over) the green grid lines on screen SCR. The user may invoke a succession of distortion correction modes for the blue virtual pixel centers as discussed above.

In one embodiment, the blue virtual pixel centers may be initialized at the location of the green virtual pixel centers. Since it is likely that the blue physical pixel centers may be distorted in the approximately same way as the green physical pixel centers, this initialization may save the user time by instantly advancing the blue virtual pixel centers closer to their ultimate destinations in the 2-D viewport.

It is noted that the calibrations just discussed do not change the locations of the green, red and blue physical pixel centers on screen SCR. Rather, these calibrations manipulate the locations of green, red and blue virtual pixel centers (i.e. convolution centers) in the 2-D viewport so that the green, red and blue layers of rendered objects align properly on screen SCR in spite of physical distortions expressed by the green, red and blue physical pixel centers.

Figure 27C:
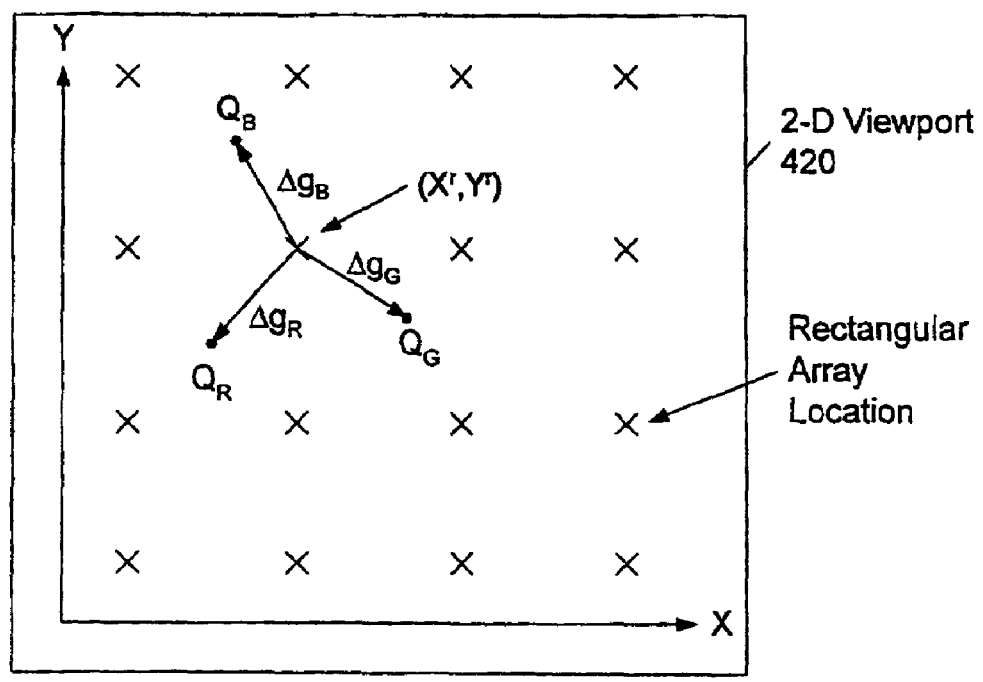
FIG. 27C illustrates the representation of red, blue and green virtual pixel centers by means of displacements with respect to nominal locations on a rectangular grid.

As described above in connection with FIGS. 23A and 23B, each of sample-to-pixel calculation units 170 may store a start position $(X_S, Y_S)$, a horizontal step size $\Delta X$ and a vertical step size $\Delta Y$ for efficiently generating a rectangular array of locations $(X,Y)$ in the 2-D viewport. The calibrated array of green virtual pixel centers may be described in terms of vector displacements from the corresponding rectangular array locations as suggested by FIG. 27C. For example, let function $g^0:(I,J) \rightarrow (X,Y)$ represent a rectangular array of locations $(X^r, Y^r)$ in the 2-D viewport, and recall that selection function $g_G:(I,J) \rightarrow (X,Y)$ represents the green virtual pixel centers $Q_G$. A displacement function $\Delta g_G$ may be generated by subtracting $g^0$ from $g_G$. The displacement function values $\Delta g_G(I,J)$ may be stored per pixel. However, it may be more efficient to store a piece-wise linear approximation to the displacement function $\Delta g_G$, and interpolate the per-pixel displacement values $\Delta g_G(I,J)$. Similarly, the calibrated array of red virtual pixel centers may be represented in terms of a displacement function $\Delta g_R = g_R - g^0$, and the calibrated array of blue virtual pixel centers may be represented by a displacement function $\Delta g_B = g_B - g^0$.

Sample-to-pixel calculation units 170 may generate the green, red and blue virtual pixel centers and corresponding green, red and blue pixel values according to the following pseudo-code fragment.

```
I=0;
J=0;
X^r=X_s;
Y^r=Y_s;
while (J<N) {
    while (I < M) {
        (X_R,Y_R) = (X^r,Y^r) + Δg_R (I,J) ;
        (X_G,Y_G) = (X^r,Y^r) + Δg_G (I,J) ;
        (X_B,Y_B) = (X^r,Y^r) + Δg_B (I,J) ;
        RedValue = RedConvolve (X_R,Y_R);
        GrnValue = GrnConvolve (X_G,Y_G);
        BluValue = BluConvolve (X_B,Y_B);
        Output ColorValues;
        X^r = X^r + ΔX ;
        I = I + 1;
    }
    X^r=X_s;
    Y^r=Y^r + ΔY ;
    J=J+1;
}
```

Each red virtual pixel center $(X_R, Y_R)$ is generated by adding red displacement vector $\Delta g_R(I,J)$ to a corresponding rectangular array location $(X^r, Y^r)$. Each green virtual pixel center $(X_G, Y_G)$ is generated by adding green displacement vector $\Delta g_G(I,J)$ to the corresponding rectangular array location $(X^r, Y^r)$. Each blue virtual pixel center $(X_B, Y_B)$ is generated by adding blue displacement vector $\Delta g_B(I,J)$ to the corresponding rectangular array location $(X^r, Y^r)$. A red convolution function is invoked to compute a red pixel value at the red virtual pixel center $(X_R, Y_R)$. A green convolution function is invoked to compute a green pixel value at the green virtual pixel center $(X_G, Y_G)$. A blue convolution function is invoked to compute a blue pixel value at the blue virtual pixel center $(X_B, Y_B)$. The locations of the green, red and blue virtual pixel centers in the 2-D viewport are selected to correct for the physical distortions of the green, red and blue physical pixels respectively on screen SCR.

The red, blue and green convolutions may use the same or different filter kernels. Thus, the support (i.e. footprint) of the three color filters may be different in size and/or shape. The green convolution function filters the green component of samples in a neighborhood of the green virtual pixel center $(X_G, Y_G)$. The red convolution function filters the red component of samples in a neighborhood of the red virtual pixel center $(X_R, Y_R)$. The blue convolution function filters the blue component of samples in a neighborhood of the blue virtual pixel center $(X_B, Y_B)$.

The displacement vectors, $\Delta g_G(I,J)$, $\Delta g_R(I,J)$, and $\Delta g_B(I,J)$ may be interpolated from piecewise linear approximations of the corresponding displacement functions. For example, the green displacement function $\Delta g_G$ may be computed and stored for a 16×16 grid of positions $(I,J)$ in set S. The green displacement vector $\Delta g_G(I,J)$ for arbitrary positions (I,J) may be interpolated based on the stored green displacement vector at nearest neighbor grid positions. The 16×16 grid may be generalized to an $N_1 \times N_2$ grid. If more precision is needed in green distortion correction, the numbers $N_1$ and/or $N_2$ defining the size of the grid may be increased. The red and blue displacement functions may also be computed and stored at a similar grid of locations, and used for interpolation of red and blue displacement vectors respectively. Once computed, the color values are transmitted to projection device $PD_1$ through a video channel. The above fragment may be executed once per video frame.

In the preferred embodiment, each sample-to-pixel calculation unit 170-K (where K equals 1, 2, . . . , $N_{max}$) may operate independently and generate color values corresponding to a vertical strip of the index set S. Thus, the above code fragment may be executed by each sample-to-pixel calculation unit 170-K with index I constrained to the corresponding vertical strip.

A manufacturer of display devices (e.g. monitors or projectors) may calibrate the red, green and blue virtual pixel centers for a display device at manufacture time. The calibrated red, green and blue virtual pixel centers for the display device may be stored on a memory medium internal to or external to the display device. The manufacturer may ship the memory medium to a user along with the display device. The user may transfer the set of calibrated virtual pixel centers from the memory medium to graphics system 112. Alternatively, the user may download the calibrated red, green and blue virtual pixel centers over the Internet from the manufacturer's web site. The calibrated red, green and blue virtual pixel centers may allow the user to immediately (or more rapidly) achieve undistorted presentation of color images on the display device using graphics system 112.

The manufacturer's calibration may be especially important when the chromatic display distortions vary significantly from unit to unit. If display distortions are stable, i.e. do not change significantly in time, graphics system 112 may not need to provide a mechanism for user calibration. Conversely, the variation of display distortions over time may be significant. Thus, graphics system 112 may provide a mechanism (such as those described above) for user calibration.

If the time variation of display distortion is large, graphics system 112 may be configured for continuous (e.g. real-time) calibration. For example, graphics system 112 may be configured to intermittently display subliminal calibration patterns for each color. A video camera may monitor the presentation of the colored calibration patterns on the display device (or screen SCR). Graphics system 112 may analyze the video images, and may generate corrected red, green and blue virtual pixel centers in the 2-D viewport 420 in response to the video images. Such continuous calibration may facilitate the use of high-drift display devices which would otherwise be disturbing to viewers.

The present invention contemplates various embodiments of graphics system 112 where any combination of user calibration and/or continuous calibration may be supported. Furthermore, graphics system 112 may be (or may not be) configured to support download of red, green and blue virtual pixel centers which have been computed/determined externally such as in a manufacturer's calibration.

Distortion Correction with Two Projection Devices

In one embodiment of the present invention, two projection devices $PD_1$ and $PD_2$ are coupled to graphics system 112. Each projection device receives a corresponding video signal from graphics system 112, and generates a physical image on screen SCR in response to the corresponding video signal. Referring momentarily to FIG. 17, sample-to-pixel calculation units 170-1 and 170-2 may supply pixel values for projection device $PD_1$, while sample-to-pixel calculation units 170-3 and 170-4 may supply pixel values for projection device $PD_2$. If higher bandwidth is needed, more than two sample-to-pixel calculation units may be assigned to each projection device. Conversely, if the processing capacity of each sample-to-pixel calculation unit is high enough, only one sample-to-pixel calculation unit may be assigned to each projection device. It is noted that the sample-to-pixel calculation units 170 which drive the two projection devices may be comprised within one or more graphics boards of the same (or similar) configuration as graphics board 116.

Figure 28:
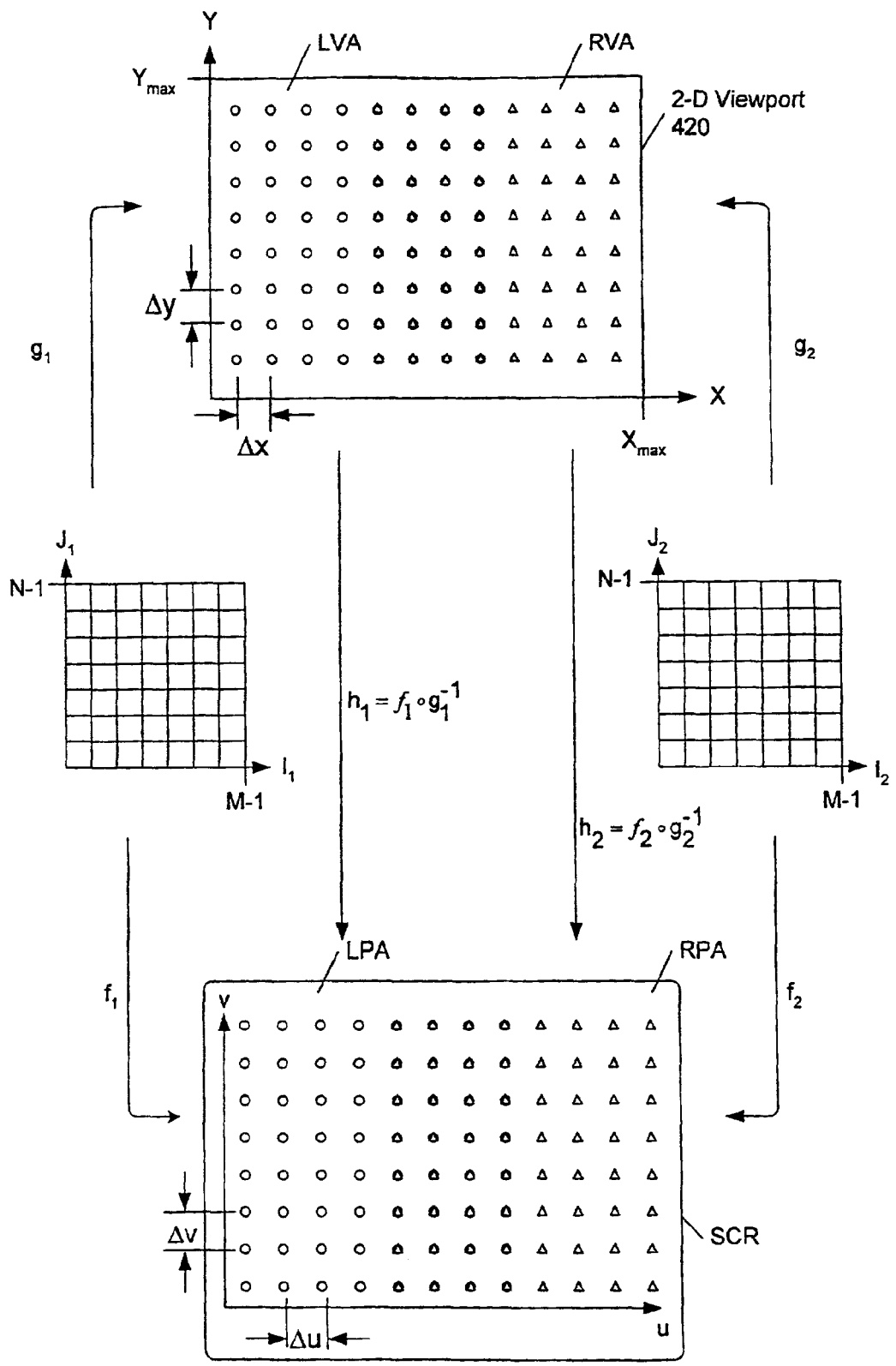
FIG. 28 illustrates two arrays of physical pixels generated on screen SCR by two corresponding projection devices in an ideal and overlapping configuration, and simultaneously, two arrays of virtual pixels in the 2-D viewport configured in agreement with the structure of the physical pixel arrays.

FIG. 28 presents a dual view of physical pixels on screen SCR and corresponding virtual pixels in the 2-D viewport 420 in the case where two projection devices $PD_1$ and $PD_2$ are being used. The physical pixels shown on screen SCR represent an idealized projection scenario. Projection device $PD_1$ generates a rectangular array of physical pixels on the left side of the screen SCR. This left rectangular array is referred to herein as the left physical array LPA. The centers of the physical pixels comprising the left physical array LPA are represented by small circles. Similarly, projection device $PD_2$ generates a rectangular array of physical pixels on the right side of the screen SCR. This second rectangular array is referred to herein as the right physical array RPA. The centers of the physical pixels comprising the right physical array RPA are represented by small triangles. The left physical array LPA and right physical array RPA are overlapped. The overlap region is illustrated as being four physical pixels wide. However, it should be understood that the overlap region may have any desired width. For example, the overlap region may span hundreds of physical pixels horizontally. Although it may be difficult or impossible to realize, assume for the sake of discussion that the left physical array LPA and right physical array RPA are perfectly aligned, i.e. the physical pixel centers from the two arrays exactly coincide in the overlap region, as shown in the figure.

A physical screen coordinate system with a horizontal axis U and a vertical axis V may be superimposed on the projection screen SCR. The center of each physical pixel on projection screen SCR may be determined by its physical screen coordinates U and V. The horizontal distance and vertical distance between physical pixel centers may be denoted $\Delta u$ and $\Delta v$ respectively. Each physical pixel in the left physical array LPA may also be described by a pair $(I_1, J_1)$ of integer indices, where the index $I_1$ takes a value in the range 0 to M−1, and index $J_1$ takes a value in the range from 0 to N−1. It is noted that the left physical array LPA and right physical array RPA may have different sizes, i.e. $N_1 \times M_1$ and $N_2 \times M_2$ respectively. However, for the sake of simplicity, both are given the same size N×M. Let S denote the set of index pairs, i.e.

$S = \{(I_1, J_1): I_1 = 0, 1, 2, \ldots, M-1, J_1 = 0, 1, 2, \ldots, N-1\}$.

Similarly, each physical pixel in the right physical array RPA may be described by a pair $(I_2, J_2)$ of integer indices, where the index $I_2$ takes a value in the range 0 to M−1, and index $J_2$ takes a value in the range from 0 to N−1.

Under the idealized conditions depicted, the function $f_1$ which maps index pairs $(I_1, J_1)$ to physical pixel centers $(U, V)$ in the left physical array LPA has a diagonally affine structure. Similarly, the function $f_2$ which maps index pairs $(I_2, J_2)$ to physical pixel centers $(U, V)$ in the right physical array RPA has a diagonally affine structure. Furthermore, functions $f_1$ and $f_2$ may be equal up to a horizontal translation.

Sample-to-pixel calculation units 170-1 and 170-2 generate virtual pixels centers in the 2-D viewport 420 corresponding to the physical pixels of the left physical array LPA. The virtual pixel centers so generated are referred to herein as the left virtual array LVA. Let function $g_1$ represent the choices of virtual pixel centers comprising the left virtual array. Thus, for each index pair $(I_1,J_1)$ in the set S, function $g_1$ defines a virtual pixel center (X,Y) in the 2-D viewport, where X and Y are the virtual screen coordinates of the virtual pixel center. Samples in the neighborhood of a virtual pixel center (X,Y) in the left virtual array are used to generate a set of pixel values (e.g. red, green, blue, etc.) which determine the color and intensity of the corresponding physical pixel in the left physical array LPA. Sample-to-pixel calculation units 170-1 and 170-2 may partition the effort of computing pixel values at the pixel centers of the left virtual array. For example, sample-to-pixel calculation unit 170-1 may perform pixel value computations for virtual pixel centers with horizontal index $I_1$ less than or equal to (M/2)−1, while sample-to-pixel calculation unit 170-2 performs pixel value computations for virtual pixel centers with horizontal index $I_1$ greater than or equal to M/2.

Sample-to-pixel calculation units 170-3 and 170-4 generate virtual pixels centers in the 2-D viewport 420 corresponding to the physical pixels of the right physical array RPA. The virtual pixel centers so generated are referred to herein as the right virtual array RVA. Let function $g_2$ represent the choice of virtual pixel centers comprising the right virtual array RVA. Thus, for each index pair $(I_2,J_2)$ in the set S, function $g_2$ defines a virtual pixel center (X,Y) of the right virtual array in the 2-D viewport. Samples in the neighborhood of a virtual pixel center (X,Y) in the right virtual array are used to generate a set of pixel values (e.g. red, green, blue, etc.) which determine the color and intensity of the corresponding physical pixel in the right physical array RPA. Sample-to-pixel calculation units 170-3 and 170-4 may partition the effort of computing pixel values at the pixel centers of the right virtual array. For example, sample-to-pixel calculation unit 170-3 may perform pixel value computations for virtual pixel centers with horizontal index $I_2$ less than or equal to (M/2)−1, while sample-to-pixel calculation unit 170-4 performs pixel value computations for virtual pixel centers with horizontal index $I_2$ greater than or equal to M/2.

The functions $h_1 = f_1 \circ g_1^{-1}$ and $h_2 = f_2 \circ g_2^{-1}$ map points (X,Y) in virtual screen space to points (U,V) in physical screen space, and, in particular, virtual pixel centers to their corresponding physical pixel centers. It is desirable that these two functions be diagonally affine, aspect-ratio preserving and equal so that objects displayed on both sides of screen SCR may appear undistorted and consistent in size, especially in the overlap region. Let A be an aspect-ratio preserving and diagonally affine map from virtual screen space to physical screen space. For example, map A may be defined by the equations $$U = F_0 X + F_1 \text{ and}$$

$$V = F_2 Y + F_3,$$

where $F_0 = F_2$. If functions $g_1$ and $g_2$ are chosen so that $$g_1 = A^{-1} \circ f_1, \text{ and}$$

$$g_2 = A^{-1} \circ f_2,$$

then $h_1 = h_2 = A$ as desired. The expressions for $g_1$ and $g_2$ imply that the left virtual array and right virtual array are uniformly scaled versions of the left physical array and right physical array respectively. Furthermore, because $f_1$ and $f_2$ are equal up to a horizontal translation, it follows that functions $g_1$ and $g_2$ are equal up to a horizontal translation.

Sample-to-pixel calculation units 170-1 through 170-4 may arrange the virtual pixel centers of the left virtual array LVA and the right virtual array RVA so that the combined virtual array covers the 2-D viewport as suggested by FIG. 28.

Figure 29:
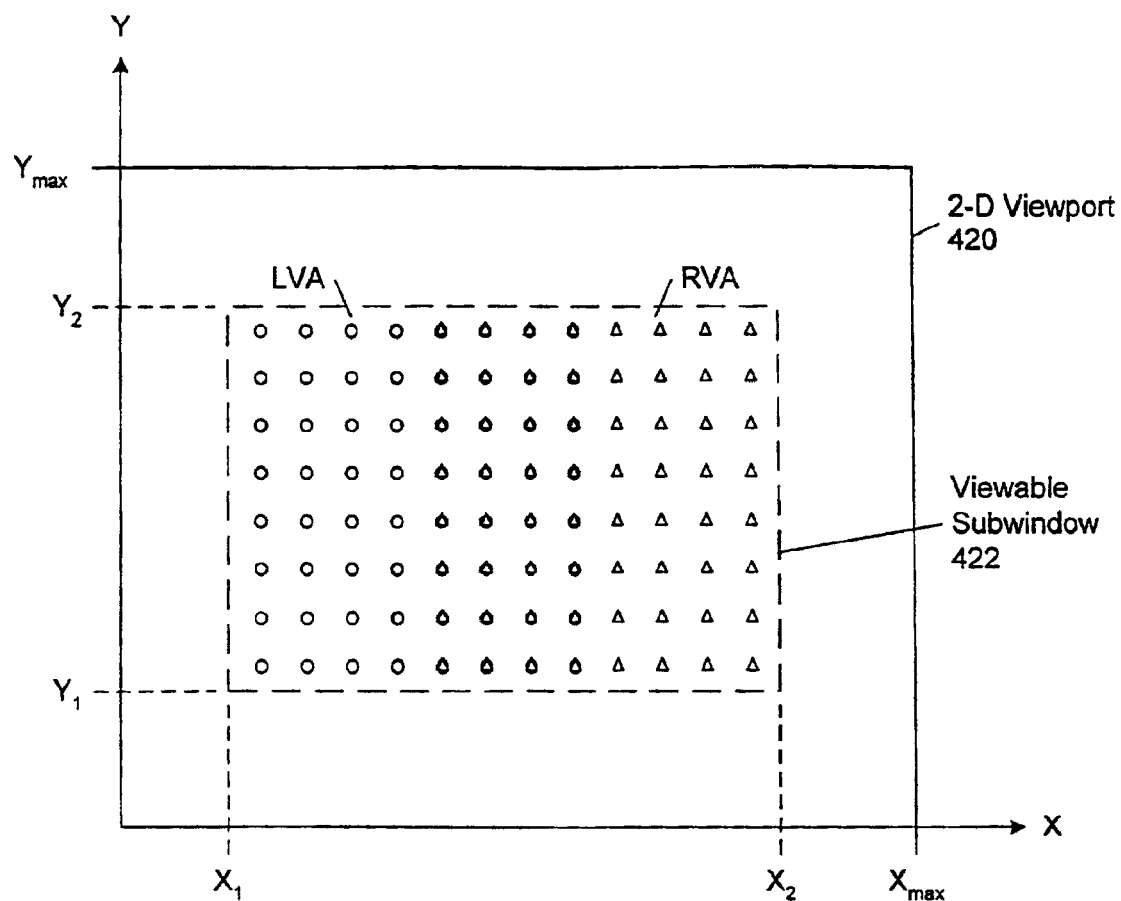
FIG. 29 illustrates two sets of virtual pixel centers (i.e. convolution centers), one set for each of two projection device, which cover a viewable subwindow 422 of the 2-D viewport 420.

Alternatively, sample-to-pixel calculation units 170-1 through 170-4 may arrange the virtual pixel centers so that the combined virtual array covers subwindow 422 of the 2-D viewport as suggested by FIG. 29. (See FIG. 18D and the attending text for a discussion of the viewable subwindow and its use in pixel value computations.) Render units 150 may continuously render samples into the entire 2-D viewport. However, the sample positions outside the viewable subwindow 422 may contribute to color computations as the background color as discussed in connection with FIG. 18D. The color values rendered into the marginal area (outside the viewable subwindow) may allow effects such as panning and zooming to be more efficiently implemented. According to another methodology, only sample positions inside the viewable subwindow are allowed to contribute to the pixel value convolutions.

In order to achieve a horizontal and/or vertical pan, sample-to-pixel calculation units 170 may change subwindow coordinates $X_1$, $X_2$, $Y_1$ and $Y_2$ as a function of time t. For example, the equations $$X_1(t) = X_1(0) + R_x t,$$

$$X_2(t) = X_2(0) + R_x t,$$

$$Y_1(t) = Y_1(0) + R_y t,$$

$$Y_2(t) = Y_2(0) + R_y t,$$

achieve a pan in direction of vector $(R_x, R_y)$ with horizontal pan rate $R_x$ and vertical pan rate $R_x$, where Z(t) denotes the value of variable Z at time t, and Z(0) denotes the value of variable X at time zero. Sample-to-pixel calculation units 170-1 through 170-4 may implement the pan equations, and may dynamically adjust the pixels centers of the left virtual array and the right virtual array so that the pixel centers stay within the viewable subwindow as the subwindow translates in time. For example, sample-to-pixel calculation units 170-1 through 170-4 may compute subwindow boundary coordinates $X_1$, $X_2$, $Y_1$ and $Y_2$, and may recompute pixel centers so as to cover the subwindow on a per frame basis or per multiple frame basis.

In addition, the equations $$X_1(t) = X_1(0) - R_z t,$$

$$X_2(t) = X_2(0) + R_z t,$$

$$Y_1(t) = Y_1(0) - KR_z t,$$

$$Y_2(t) = Y_2(0) + KR_z t,$$

achieve a zooming effect, where $R_z$ is a zooming rate, and K is the initial aspect ratio, i.e.

$$K = (Y_2(0) - Y_1(0))/(X_2(0) - X_1(0)).$$

These zooming equations preserve the aspect ratio and the center point of the viewable subwindow throughout the zoom. Sample-to-pixel calculation units 170-1 through 170-4 may implement these zoom equations, and may dynamically expand (or contract) the virtual pixel centers of the combined virtual array so that they stay within the viewable subwindow 422 as the viewable subwindow expands (or contracts) in time.

As discussed above, each sample-to-pixel calculation unit 170-K (where K equals 1, 2, 3 or 4) may store a start position $(X_S(K), Y_S(K))$, a horizontal step size $\Delta X(K)$ and a vertical step size $\Delta Y(K)$ for generating a rectangular array of virtual pixel centers in the 2-D viewport 420. In one embodiment, panning and zooming may be accomplished by changing these stored values with respect to time. For example, panning may be accomplished by changing the start positions. Zooming may be accomplished by changing the step sizes and start positions.

In the discussion of FIG. 28, it was assumed that left physical array LPA and right physical array RPA (of physical pixels) generated by projection devices $PD_1$ and $PD_2$ respectively were rectangular and that they were perfectly aligned in the overlap regions. In practice, this assumption is difficult or impossible to realize because of various distortion mechanisms inherent in the projection devices and screen SCR and because of positional and angular misalignments of the projection devices with respect to the screen. In general, the left physical array and right physical array are distorted, and perhaps, independently distorted.

Figure 30A:
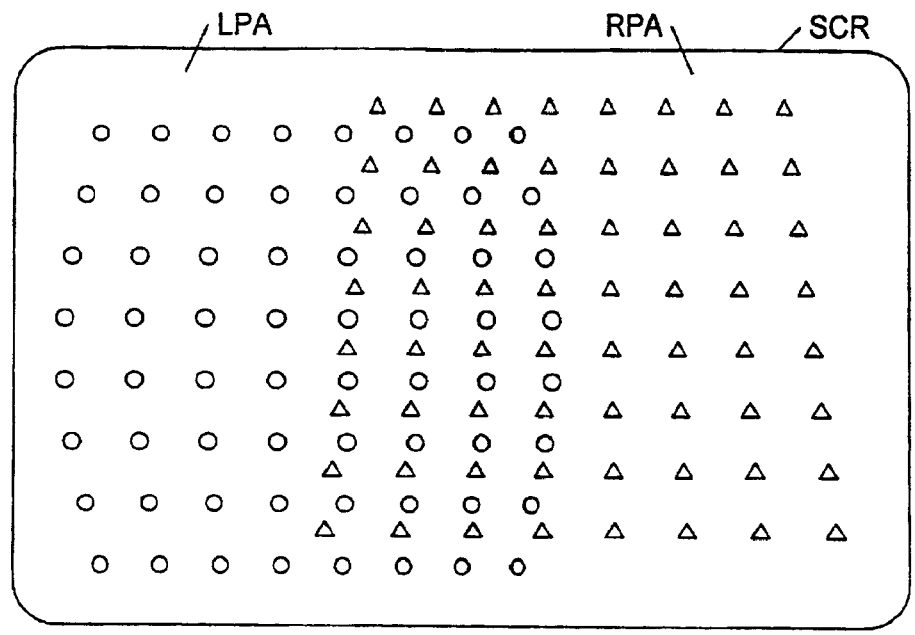
FIGS. 30A and 30B provide examples of two physical pixel arrays generated respectively by two projection devices on screen SCR in a side by side overlapped configuration.
Figure 30B:
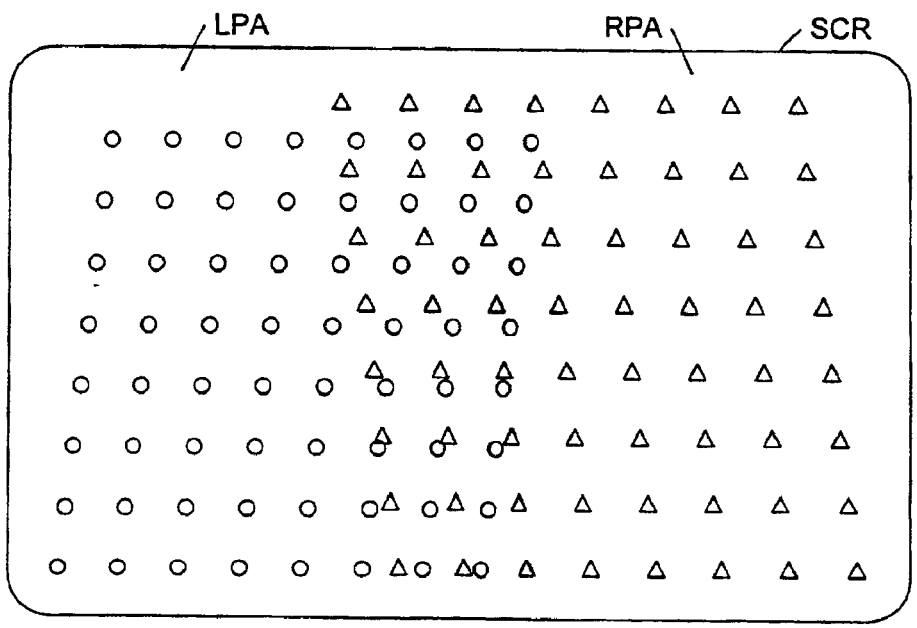

FIGS. 30A & 30B present examples of the types of physical distortion that may arise when using two projection devices to project onto a common screen SCR. In FIG. 30A, the left physical array LPA expresses a barrel distortion while the right physical array RPA expresses a trapezoidal distortion. In addition, the horizontal rows of the left physical array do not line up with the rows of the right physical array. The rows of the right physical array appear to be translated up with respect to the rows of the left physical array. In FIG. 30B, both the left physical array LPA and the right physical array RPA express a shear distortion. Also, the right physical array appears to be stretched vertically with respect to the left physical array, i.e. the right physical array is taller. In FIGS. 30A & 30B, the overlap regions are depicted as being a few pixels wide. However, it is noted that the overlap regions may be of arbitrary width.

Figure 31:
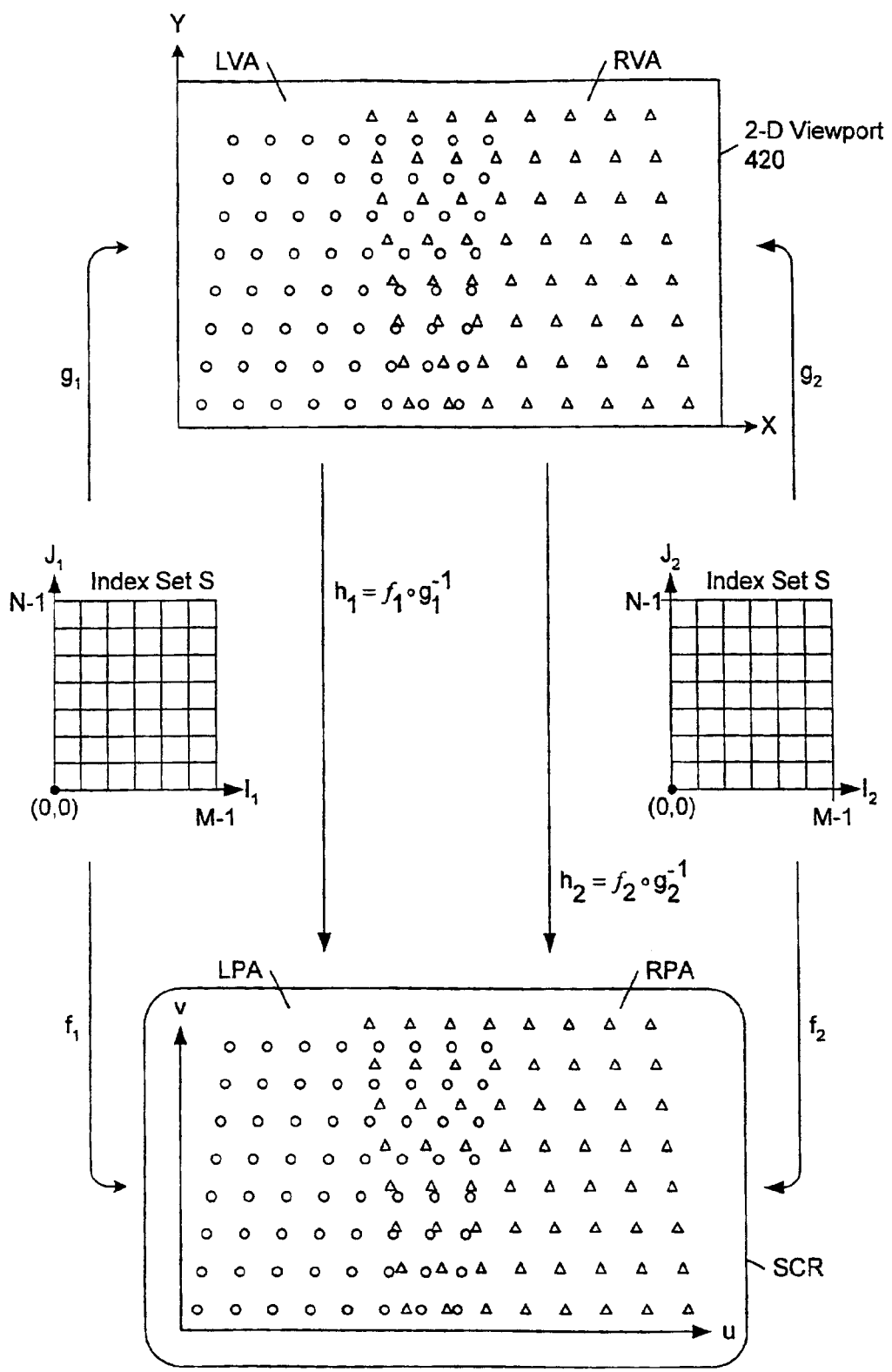
FIG. 31 illustrates a method for counteracting physical distortions (inherent in the physical pixels generated by two projection devices) by proper selection of the virtual pixel centers in the 2-D viewport.

In one embodiment of graphics system 112, sample-to-pixel calculation units 170 are configured to adjust the virtual pixel centers (i.e. convolution centers) in the 2-D viewport in order to correct for display distortions, i.e. for physical distortions in the locations of physical pixels on screen SCR. FIG. 31 presents a dual view of virtual pixels in the 2-D viewport 420 and physical pixels on screen SCR, and assists in the explanation of the present embodiment which operates with two projection devices. For the sake of discussion, left physical array LPA and right physical array RPA are assumed to be N×M arrays, i.e., each having N pixels vertically and M pixels horizontally. Thus, each physical pixel in the left physical array LPA may be described by a pair $(I_1, J_1)$ of integer indices where the index $I_1$ takes a value in the range 0 to M−1, and index $J_1$ takes a value in the range from 0 to N−1. Similarly, each physical pixel in the right physical array RPA may be described by a pair $(I_2, J_2)$ of integer indices where the index $I_2$ takes a value in the range 0 to M−1, and index $J_2$ takes a value in the range from 0 to N−1. Let S denote the set of index pairs, i.e.

$S = \{(I,J) : I=0,1,2,\ldots, M-1, J=0,1,2,\ldots, N-1\}$.

The function $f_1$ maps index pairs $(I_1, J_1)$ in set S to physical pixel centers (U,V) comprising the left physical array LPA, and describes an arbitrary distortion of the left physical array. Similarly, the function $f_2$ maps index pairs $(I_2, J_2)$ in set S to physical pixel centers (U,V) comprising the right physical array RPA, and describes an arbitrary distortion of the right physical array.

Sample-to-pixel calculation units 170-1 and 170-2 may be interpreted as traversing the set S of index pairs once for each video frame. For each pair $(I_1, J_1)$ in the set S, sample-to-pixel calculation units 170-1 and 170-2 select a virtual pixel center (X,Y) in the 2-D viewport. The collection of virtual pixel centers so generated are referred to herein as the left virtual array LVA. Samples in the neighborhood of a virtual pixel center of the left virtual array are used to generate a set of pixel values (e.g. red, green, blue, etc.) for the corresponding physical pixel in the left physical array LPA. The function $g_1$ represents the mapping of index pairs $(I_1, J_1)$ to virtual pixel centers (X,Y) comprising the left virtual array LVA.

Sample-to-pixel calculation units 170-3 and 170-4 may be interpreted as traversing the set S of index pairs once per video frame. For each pair $(I_2, J_2)$ in the set S, sample-to-pixel calculation units 170-3 and 170-4 select a virtual pixel center (X,Y) in the 2-D viewport. The collection of virtual pixel centers thus generated is referred to herein as the right virtual array RVA. Samples in the neighborhood of a virtual pixel center in the right virtual array are used to compute a set of pixel values (e.g. red, green, blue, etc.) for the corresponding physical pixel in the right physical array RPA. The function $g_2$ represents the mapping of index pairs $(I_2, J_2)$ to virtual pixel centers (X,Y) comprising the right virtual array RVA.

The functions $h_1 = f_1 \circ g_1^{-1}$ and $h_2 = f_2 \circ g_2^{-1}$ map points (X,Y) in virtual screen space to points (U,V) in physical screen space, and, in particular, virtual pixels centers to their corresponding physical pixel centers. It is desirable that these two functions be diagonally affine, aspect-ratio preserving and equal so that objects displayed in the overlap region of screen SCR may appear undistorted and consistent. According to the present invention, the functions $h_1$ and $h_2$ may be given the desired structure if $g_1 = A^{-1} \circ f_1$ and $g_2 = A^{-1} \circ f_2$, where A is a diagonally affine and aspect-ratio preserving map from XY to UV.

The above choices for functions $g_1$ and $g_2$ suggest that in order to correct for the distortions inherent in left physical array LPA and right physical array RPA, sample-to-pixel calculation units 170 may implement the same distortions in generating virtual pixel centers of the left virtual array and right virtual array respectively. In other words, the left virtual array LVA may be chosen to be a scaled version (sitting in virtual screen space) of the left physical array LPA. Similarly, the right virtual array RVA may be chosen to be a scaled version (sitting in virtual screen space) of the right physical array RPA. In FIG. 31, the left physical array is depicted as a parallelogram which leans to the right, and the tight physical array is depicted as a parallelogram which leans to the left. Thus, the optimal choice for the left virtual array LVA may be a parallelogram which leans to the right just like the LPA. Similarly, the optimal choice for the right virtual array RVA may be a parallelogram which leans to the left just like the RPA.

The functions $f_1$ and $f_2$ may be estimated based on measurements provided by a sensing device such as a video camera. For example, sample-to-pixel calculation units 170 may transmit to projection devices $PD_1$ and $PD_2$ one or more calibration pixel patterns for display on screen SCR. The projection devices may generate physical images in response to each of the calibration pixel patterns. A video camera may capture the physical images displayed on screen SCR for each of the calibration patterns. Sample-to-pixel calculation units 170 (or a selected subset of these units) may estimate the functions $f_1$ and $f_2$ based on the known calibration patterns and the captured physical images. Sample-to-pixel units 170 may estimate piecewise linear approximations to the display functions $f_1$ and $f_2$, and using these approximations, may compute piecewise linear approximations to the functions $g_1$ and $g_2$ respectively.

In another embodiment, sample-to-pixel calculation units 170 receive calibration inputs from a user. The user may be situated in front of screen SCR and observing the screen SCR. The user may identify the type of distortion manifested by each physical pixel array, and perform a separate calibration for each physical pixel array. The user may be presented with a list (e.g. a menu) of distortion types. For example, the user may specify that the left physical array LPA has a shear distortion as shown in FIG. 31. In response to this selection, sample-to-pixel calculation units 170-1 and 170-2 may enter a shear calibration mode. In the shear calibration mode, sample-to-pixel calculation units 170-1 and 170-2 are responsive to plus and minus adaptation signals asserted by the user. In response to the plus/minus adaptation signals, sample-to-pixel units 170-1 and 170-2 dynamically adapt the selection function $g_1$ so that the left virtual array LVA morphs along a one parameter family of parallelograms. The plus adaptation signal causes the left virtual array LVA to shear to the right. The minus adaptation signal causes the LVA to shear to the left. The user controls the plus and minus adaptation signals until the objects appearing in the left physical array LPA appear undistorted. It is noted that sample-to-pixel calculation units 170-1 and 170-2 continue to generate successive frames of output pixel values during the adaptation process so the user can see the effect of the plus/minus adaptations in the left physical array LPA. The calibration procedure just described does not change the shape of the left physical array LPA. The shape of the left physical array LPA is determined by projection device $PD_1$ and screen SCR.

In the example of FIG. 31, the left physical array LPA expresses only one type of distortion (i.e. the shear distortion). However, in general, the left physical image may express a mixture of distortion types. Thus, the user may perform one or more distortion corrections by repeatedly selecting different distortion modes, and performing the plus/minus adaptation until the objects displayed in left physical image appear as undistorted as possible for each mode. For example, for the complex distortion CDST shown in FIG. 6A, the user may perform a horizontal pin balance correction followed by a vertical pin cushion correction.

When the user has completed distortion corrections for the left physical array LPA, the user may specify the type(s) of distortion expressed by the right physical array RPA, and may perform distortion correction using a plus/minus adaptation procedure similar to that described above. However, in this case, the virtual pixel centers comprising the right virtual array RVA are morphed. In other words, the function $g_2$ is adapted. For example, the right physical image RPA in FIG. 31 expresses a shear distortion. Thus, the user may invoke a shear calibration mode to shear the right virtual array RVA until objects displayed in the right physical array RPA appear undistorted (or as undistorted as possible).

As just described, calibrations may be performed to separately and independently correct distortions expressed in the left physical array and right physical array. After these calibrations, objects displayed in either the left physical array or right physical array may appear undistorted. However, if one of the physical arrays is even slightly scaled or translated with respect to the other physical array, objects displayed in the overlap region of screen SCR will appear fuzzy. Thus, additional calibrations which address the relationship (e.g. the relative scale and position) of the two physical arrays may be necessary. For example, the right physical array RPA in FIG. 31 has a larger height than the left physical array LPA. Thus, the user may invoke a vertical scaling mode to correct the vertical scale mismatch between the two physical arrays. In the vertical scaling mode, sample-to-pixel calculation units 170-3 and 170-4 are responsive to the plus/minus adaptation signals asserted by the user. In response to the plus adaptation signal, sample-to-pixel calculation units 170-3 and 170-4 may morph the right virtual array RVA in the direction of increasing vertical height. In response to the minus adaptation signal, sample-to-pixel calculation units 170-1 and 170-2 may morph the left virtual array LVA in the direction of increasing vertical height. Render units 150 may generate samples for one or more horizontal lines into sample buffer 162 during the vertical scaling mode. Simultaneously, sample-to-pixel calculation units 170 may generate pixel values which are displayed in the left physical array and right physical array. The amount of mismatch in these horizontal lines when displayed in left physical array LPA and right physical array RPA provides the user with an indication of the direction in which vertical scaling correction should proceed in order to minimize the mismatch.

In view of the discussion of expansive morphing and contractive morphing surrounding FIGS. 25A–D, the vertical scaling mode just described may be implemented in contractive realization in addition to (or instead of) the expansive realization described above.

Sample-to-pixel calculation units 170 may provide modes for performing vertical scaling, horizontal scaling, vertical translation, horizontal translation, and rotation on left virtual array LVA and the right virtual array RVA.

A manufacturer of multi-projector display systems may calibrate the virtual pixel centers for each projection device at manufacture time. The set of calibrated virtual pixel centers for each projection device in the multi-projector display system may be stored in a memory such as a disk or CD-ROM. Alternatively, the calibrated virtual pixel centers for each projection device may be stored in a memory resident within the projection device. The manufacturer may ship the memory medium to a user along with the display system. The user may transfer each set of calibrated virtual pixel centers from the memory medium to graphics system 112. (The transfer process may be automated.) The sets of calibrated virtual pixel centers may allow the user to immediately (or more rapidly) achieve undistorted presentation of integrated images on screen SCR using graphics system 112 to drive the multiple projection devices. It is noted that the manufacturer may allow the user to download the sets of calibrated virtual pixel centers over the Internet.

The manufacturer's calibration may be especially important when the physical pixel distortions generated by any of the projection devices in the display system vary significantly from unit to unit. If the physical pixel distortions of projection devices comprising the display system are stable, i.e. do not change significantly in time, graphics system 112 may not need to provide a mechanism for user calibration. Conversely, the variation of physical pixel distortions over time may be significant. Thus, graphics system 112 may provide a mechanism (such as those described above) for user calibration of the virtual pixel centers for each projection device.

If the time variation of physical pixel distortions is large, graphics system 112 may be configured for continuous (e.g. real-time) calibration of the virtual pixel centers for each projection device. For example, graphics system 112 may be configured to intermittently display subliminal calibration patterns through each of the projection devices. A video camera may monitor the distorted presentation of the calibration patterns on screen SCR. Graphics system 112 may analyze the video images, and may generate a corrected set of virtual pixel centers for each projection device in response to the video images.

The present invention contemplates various embodiments of graphics system 112 where any combination of user calibration and/or continuous calibration may be supported. Furthermore, graphics system 112 may be (or may not be) configured to support download of sets of virtual pixel centers, one set per projection device, which have been computed/determined externally, such as in a manufacturer's calibration.

Image Stacking

As discussed above, multiple projection devices may generate physical images which partially overlap. However, in many situations it is desirable to stack the physical images (generated by multiple projection devices) on top of each other, i.e. so as to nominally cover the same region on screen SCR. For example, in a stereo application, one projector may generate images for the right eye, and a second projector may generate images for the left eye. Small misalignments in pixels of the right eye image and left eye image may induce false depth perceptions. In a quad-video application, two stereo projectors may project onto the same region of screen SCR to generate stereo video for two viewers. In some situations, the physical images from one or more projection devices may be stacked to increase the brightness of the displayed video. There are a wide variety of situations in which one may wish to stack the physical images from two or more projection devices, and in many of these situations, even small misalignments in corresponding pixels of the multiple physical images are undesirable.

Stacked images may be viewed as a special case of overlapping images where the region of overlap has been maximized. Thus, the inventive principles discussed above for correcting individual and relative image distortions in the case of two overlapping images (generated by two corresponding projection devices) naturally extend to the case of two or more stacked images generated by two or more projection devices. Each projection device is associated with a set of sample-to-pixel calculation units which generate the pixel values for the projection device. In one embodiment, each set of sample-to-pixel calculation units may use a separate set of virtual pixel centers in the 2D viewport. A first set of virtual pixel centers may be chosen to compensate for the positional distortion of the first array of pixels generated on screen SCR by the first projection device). The $K^{th}$ set of virtual pixels centers, where K is greater than one, may be chosen to compensate for (a) the positional distortions of the $K^{th}$ physical array of pixels generated by the $K^{th}$ projection device and (b) the relative distortion (e.g. the relative scale and position) of the $K^{th}$ array with respect to the first array.

The sample-to-pixel calculation unit 170 may receive calibration inputs which determine each set of virtual pixel centers. A first set of calibrations may be performed to adjust the first set of virtual pixel centers until the images displayed by the first projection device appear undistorted. A $K^{th}$ set of calibrations may be performed to adjust the $K^{th}$ set of virtual pixel centers until the images displayed by the $K^{th}$ projection device appear (1) undistorted and (2) consistent with the images displayed by the first projection device. For example, the calibration procedure described above for the compensation of chromatic distortions associated with a color projector is similar to the procedure required to compensate for the physical distortions of three stacked physical arrays associated with three monochrome projectors.

In another embodiment, the graphics system may be further configured to compensate for the chromatic distortion associated with each projection device in the "stacked configuration". Thus, the $K^{th}$ set of sample-to-pixel calculation units associated with the $K^{th}$ projection device may use a separate set of virtual pixel centers for each color displayed by the $K^{th}$ projection device. The methodology for selecting/calibrating each set of virtual pixel centers to compensate for chromatic distortions in a single projection device has already been discussed. After applying this methodology separately for each of the stacked projection devices, the color image displayed by each projection device may appear clear and undistorted when considered in isolation. However, these individually-rectified color images may not overlay neatly on screen SCR because of differences in vertical and/or horizontal scale, and/or, vertical and/or horizontal position. Thus, an additional series of calibration adjustments may be performed to compensate for these differences.

In yet another embodiment, the graphics system may select a set of virtual pixel positions for each color of each stacked projection device in response to measurements obtained by a camera. As used herein, the term "stacked projection device" implies that the image generated by the projection device is stacked onto top of the image(s) generated by other projection device(s).

Edge Blending

As described above in connection with FIGS. 28–31, the left physical array LPA and right physical array RPA may overlap on screen SCR. In the overlap regions, the density of physical pixels is higher than in the non-overlap regions. Thus, the average intensity of the overlap region may be larger than the average intensity of the non-overlap regions. Thus, even if all the spatial distortions inherent in the left physical array LPA and right physical array RPA are compensated for as described above (by appropriate selection of virtual pixel centers in the 2-D viewport), the user may yet perceive an annoying brightness in the overlap region.

Figure 32B:
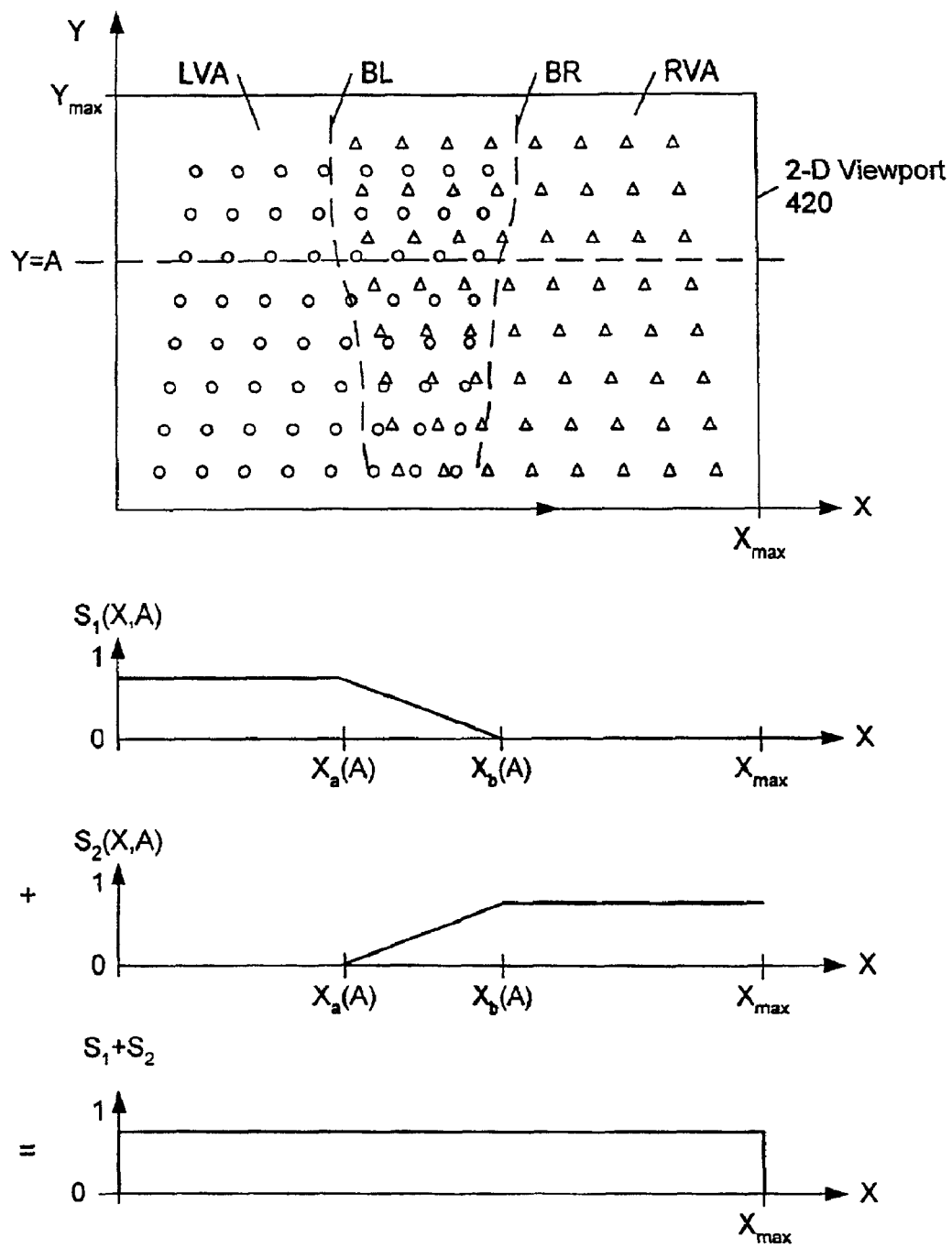
FIG. 32B illustrates the definition of scaling functions used in another embodiment of graphics system 112 configured for performing edge blending over a distorted overlap region.

In one embodiment of the present invention, sample-to-pixel calculation units 170 may be configured to correct the brightness of the overlap region by scaling down the intensity of computed pixel values in the overlap region. For example, sample-to-pixel calculation units 170 may be configured to scale computed pixel color values of the left virtual array LVA with a first scaling function $S_1$, and to scale computed color values of the right virtual array RVA with a second scaling function $S_2$. In FIG. 32A, the left virtual array LVA (denoted by small circles) extends from zero to $X_b$ in coordinate X. The right virtual array RVA (denoted by small triangles) extends from $X_a$ to $X_{max}$ in coordinate X. Thus, the left virtual array LVA and the right virtual array RVA overlap in the band of X values ranging from $X_a$ to $X_b$. The first scaling function $S_1$ may equal one for coordinate X ranging from zero to $X_a$, and may transition from one to zero as X increases from $X_a$ to $X_b$. The second scaling function $S_2$ may transition from zero to one as X increases from $X_a$ to $X_b$, and may equal one from X ranging from $X_b$ to $X_{max}$. It is noted that the sum of the scaling functions equals one on the overlap region of the 2-D viewport. Thus, even though there is a higher density of physical pixels in the overlap region of screen SCR, the intensity of the physical pixels will have been scaled down so that the average intensity of the overlap region (on screen SCR) is more consistent with the average intensity of the non-overlap regions. The transitions in scaling function $S_1$ and $S_2$ may be linear, raised cosine, piecewise linear with two or more linear segments, piecewise polynomial, etc.

For each virtual pixel center (X,Y) of the left virtual array, the color values (red, green and blue) resulting from the color convolutions at (X,Y) may be multiplied by scaling value $S_1(X)$ which is a number between zero and one. If the virtual pixel center (X,Y) is in the unambiguous interior (i.e. unshared interior) of the left virtual array LVA, i.e. X is between zero and $X_a$, then the color values are unaffected since the scaling value $S_1(X)$ equals one. In this case, the multiplication may be bypassed to save compute time. The color values are transmitted to projection device $PD_1$ and drive a corresponding physical pixel in the unambiguous interior of the left physical array on screen SCR. If the virtual pixel center (X,Y) lives in the overlap region, i.e. X is between $X_a$ and $X_b$, the color values may be multiplied by scaling value $S_1(X)$ which approaches zero as the virtual pixel center (X,Y) approaches $X_b$. The scaled color values are transmitted to projection device $PD_1$ and drive a corresponding physical pixel of the left physical array in the overlap region of screen SCR. Sample-to-pixel calculation units 170-1 and 170-2 may implement the color value computations and the scaling of color values for the left virtual array LVA.

Similarly, for each virtual pixel center (X,Y) of the right virtual array, the color values (red, green and blue) resulting from the color convolutions at (X,Y) may be multiplied by scaling value $S_2(X)$ which is a number between zero and one. If the virtual pixel center (X,Y) is in the unambiguous interior of the right virtual array LVA, i.e. X is between $X_b$ and $X_{max}$, then the color values are unaffected since the scaling value $S_2(X)$ equals one. In this case, the multiplication may be bypassed to save compute time. The color values are transmitted to projection device $PD_2$ and drive a corresponding physical pixel in the unambiguous interior of the right physical array on screen SCR. If the virtual pixel center (X,Y) lives in the overlap region, i.e. X is between $X_a$ and $X_b$, the color values may be multiplied by scaling value $S_2(X)$ which transitions from one to zero as the virtual pixel center (X,Y) moves from $X_b$ to $X_a$. The scaled color values are transmitted to projection device $PD_2$ and drive a corresponding physical pixel of the right physical array in the overlap region of screen SCR. Sample-to-pixel calculation units 170-3 and 170-4 may implement the color value computations and the scaling of color values for the right virtual array LVA.

It is noted that the left virtual array LVA and right virtual array RVA may be distorted so that the overlap region in the 2-D viewport 420 is more complicated than a vertical band. For example, in FIG. 32B, the left virtual array LVA and right virtual array RVA express shear distortions which complicate the shape of the overlap region. The left boundary BL and the right boundary BR of the overlap region may be described by boundary functions $X_a(Y)$ and $X_b(Y)$ respectively. The boundary functions specify the start and stop X coordinates for the overlap region along each horizontal line Y=A (or along a selected subset of horizontal lines). The scaling functions $S_1$ and $S_2$ may be functions of X and Y. Along each horizontal line Y=A, the scaling function $S_1$ may equal one for X ranging from zero to $X_a(A)$, and may transition from one to zero as X progresses from $X_a(A)$ to $X_b(A)$. Similarly, along each horizontal line Y=A, the scaling function $S_2$ may transition from zero to one as X progresses from $X_a(A)$ to $X_b(A)$, and may equal one as X ranges from $X_b(A)$ to $X_{max}$. The sum of functions $S_1$ and $S_2$ are equal to one on the overlap region in the 2-D viewport.

At each virtual pixel center (X,Y) of the left virtual array, sample-to-pixel calculation units 170-1 and 170-2 may multiply the color values computed at (X,Y) by the first scaling value $S_1(X,Y)$. The scaled color values are transmitted to projection device $PD_1$ and are used to drive a corresponding physical pixel of the left physical array LPA. In the unambiguous interior of the left virtual array LVA, the first scaling value $S_1(X,Y)$ is one, and thus, the multiplication may be bypassed to save compute time.

At each virtual pixel center (X,Y) of the right virtual array, sample-to-pixel calculation units 170-1 and 170-2 may multiply the color values computed at (X,Y) by the second scaling value $S_2(X,Y)$. The scaled color values are transmitted to projection device $PD_2$ and are used to drive a corresponding physical pixel of the right physical array RPA. In the unambiguous interior of the right virtual array RVA, the second scaling value $S_2(X,Y)$ is one, and thus, the multiplication may be bypassed to save compute time.

The following pseudo-code fragment illustrates one possible embodiment of the color value computations and the edge blending performed by sample-to-pixel calculation units 170-1 and 170-2 for the left virtual array LVA.

```
I=0;
J=0;
X^r=X_s;
Y^r=Y_s;
while (J<N) {
    while (I < M) {
        (X^d,Y^d) = (X^r,Y^r) + Δg_1(I,J) ;
        Red = RedConvolve (X^d,Y^d);
        Grn = GrnConvolve (X^d,Y^d);
        Blu = BluConvolve (X^d,Y^d);
        Red = Red*S_1(X^d,Y^d);
        Grn = Grn*S_1(X^d,Y^d);
        Blu = Blu*S_1(X^d,Y^d);
        Output ColorValues;
        X^r = X^r+ΔX ;
        I = I + 1;
    }
    X^r=X_s;
    Y^r=Y^r+ΔY ;
    J=J+1;
}
```

Each distorted virtual pixel center $(X^d, Y^d)$ is generated by adding vector displacement value $\Delta g_1(I,J)$ to a corresponding rectangular array location $(X^r, Y^r)$. Red, green and blue convolution functions are invoked to compute red, green and blue color values respectively at the distorted center $(X^d, Y^d)$. Once computed, the color values are multiplied by the first scaling value $S_1$ evaluated at (or interpolated for) distorted center $(X^d, Y^d)$. The scaled color values are transmitted to projection device $PD_1$ through a video channel.

In the preferred embodiment, each of sample-to-pixel calculation units 170-1 and 170-2 may operate independently and generate scaled color values for a corresponding vertical strip of the index set S. Thus, the above code fragment may be executed by each sample-to-pixel calculation unit 170-K with index I constrained to the corresponding vertical strip.

Sample-to-pixel calculation units 170-3 and 170-4 may use a similar methodology (as described in the pseudo-code fragment above) to compute color values and scale color values for the right virtual array RVA. However, the second scaling function $S_2(X,Y)$ is used in place of the first scaling function $S_1(X,Y)$.

Graphics system 112 may be configured to provide a calibration mode. In calibration mode, graphics system 112 may receive calibration inputs from a user. The calibration inputs may define the extent of the overlap region on screen SCR. For example, render units 150 may render a pair of vertical lines into the sample buffer 162. The user may provide horizontal adjustment inputs to drag the vertical lines so that they line up with the left and right boundaries respectively of the overlap region on screen SCR, i.e. the overlap region between the left physical array LPA and the right physical array RPA. After user adjustment, the X coordinates $X_a$ and $X_b$ of the two vertical lines in virtual screen space may be used to construct scaling functions $S_1(X)$ and $S_2(X)$.

In other embodiments, graphics system 112 may be configured to provide calibration for non-rectangular overlap regions. For example, render units 150 render a cursor pattern into sample buffer 162. The user may drag the cursor and select multiple positions along the left boundary of the overlap region on screen SCR. Render units 150 may store the selected (X,Y) positions. The stored positions may be used to estimate (or tabulate) left boundary function $X_a(Y)$. The same selection procedure may be repeated for the right boundary of the overlap region. This second set of stored positions may be used to estimate (or tabulate) right boundary function $X_b(Y)$.

A manufacturer of multi-projector display systems may calibrate the boundary functions, which define the region(s) of overlap between projected images, for a display system at manufacture time. The boundary functions (or samples thereof) may be encoded and stored in a memory medium such as a disk or CD-ROM. The manufacturer may ship the memory medium to a user along with the display system. The user may transfer the boundary function data to graphics system 112. (The transfer process may be automated.) The boundary function data may allow graphics system 112 to attenuate the light intensity of pixel values computed in the overlap region(s). It is noted that the manufacturer may allow the user to download the boundary function data over the Internet.

The manufacturer's calibration may be especially important when the boundary functions vary significantly from unit to unit (i.e. from one display system to the next in the manufacturing line). If the boundary functions are stable, i.e. do not change significantly in time, graphics system 112 may not need to provide a mechanism for user calibration. Conversely, the variation of the boundary functions over time may be significant. Thus, graphics system 112 may provide a mechanism (such as those described above) for user calibration of the boundary functions.

If the time variation of the boundary functions is large, graphics system 112 may be configured for continuous (e.g. real-time) calibration of the boundary functions. For example, graphics system 112 may be configured to intermittently display subliminal calibration patterns through each of the projection devices. A video camera may capture the calibration patterns displayed on screen SCR. Graphics system 112 may analyze the video images, and may generate a set of boundary functions identifying the boundaries of the overlap region(s) in response to the video images.

The present invention contemplates various embodiments of graphics system 112 where any combination of user calibration and/or continuous calibration may be supported. Furthermore, graphics system 112 may be (or may not be) configured to support the download of boundary function data which has been determined externally, such as in a manufacturer's calibration.

Two Projection Devices Generate Non-Overlapping Images: Idealized Case

Figure 33:
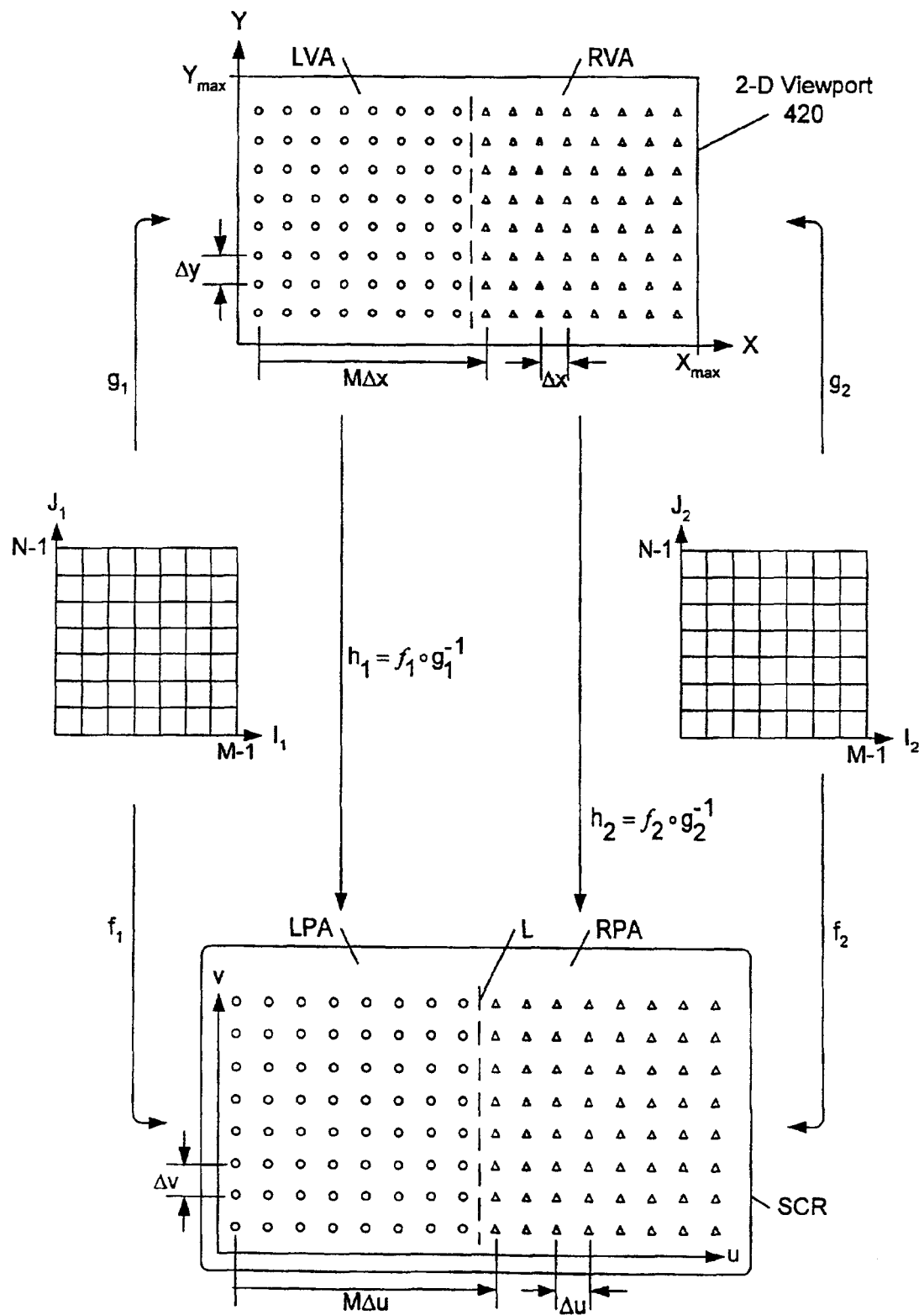
FIG. 33 presents a dual view of virtual pixel centers in the 2-D viewport and physical pixels on screen SCR assuming an ideal non-overlapped configuration of two projection devices.

FIG. 33 presents a dual view of physical pixels on screen SCR and corresponding virtual pixels in the 2-D viewport 420 in the case where two projection devices $PD_1$ and $PD_2$ are being used in a non-overlapping configuration. The physical pixels shown on screen SCR represent an idealized projection scenario. Projection device $PD_1$ generates a rectangular array of physical pixels on the left side of the screen SCR. This rectangular array is referred to herein as the left physical array LPA. The centers of the physical pixels comprising the left physical array LPA are represented by small circles. Similarly, projection device $PD_2$ generates a rectangular array of physical pixels on the right side of the screen. This second rectangular array is referred to herein as the right physical array RPA. The centers of the physical pixels comprising the right physical RPA are represented by small triangles. Line L marks the physical boundary between the left physical array LPA and the right physical array RPA. Although it may be difficult or impossible to realize, assume for the sake of discussion that the left physical array LPA and right physical array RPA are aligned so as to form one combined rectangular array as shown in the figure.

The center of each physical pixel on projection screen SCR may be determined by its physical screen coordinates U and V. The horizontal distance and vertical distance between physical pixel centers may be denoted $\Delta u$ and $\Delta v$ respectively. Each physical pixel in the left physical array LPA may be described by a pair $(I_1, J_1)$ of integer indices, where the index $I_1$ takes a value in the range 0 to M−1, and index $J_1$ takes a value in the range from 0 to N−1. As before, let S denote the set of index pairs, i.e.

$S = \{(I_1, J_1) : I_1 = 0, 1, 2, \ldots, M-1, J_1 = 0, 1, 2, \ldots, N-1\}.$

Similarly, each physical pixel in the right physical array RPA may be described by a pair $(I_2, J_2)$ of integer indices, where the index $I_2$ takes a value in the range 0 to M−1, and index $J_2$ takes a value in the range from 0 to N−1.

Under the idealized conditions depicted, the function $f_1$ which maps index pairs $(I_1, J_1)$ to physical pixel centers (U,V) in the left physical array LPA has a diagonally affine structure. Similarly, the function $f_2$ which maps index pairs $(I_2, J_2)$ to physical pixel centers (U,V) in the right physical array RPA has a diagonally affine structure. Furthermore, functions $f_1$ and $f_2$ may be equal up to a horizontal translation of distance $M\Delta u$.

Sample-to-pixel calculation units 170-1 and 170-2 generate virtual pixels centers in the 2-D viewport corresponding to the physical pixels of the left physical array LPA. The virtual pixel centers so generated are referred to herein as the left virtual array LVA. Let function $g_1$ represent the choices of virtual pixel centers comprising the left virtual array. Thus, for each index pair $(I_1, J_1)$ in the set S, function $g_1$ defines a virtual pixel center (X,Y) in the 2-D viewport, where X and Y are the virtual screen coordinates of the virtual pixel center. Samples in the neighborhood of a virtual pixel center (X,Y) in the left virtual array are used to generate a set of pixel values (e.g. red, green, blue, etc.) which determine the color and intensity of the corresponding physical pixel in the left physical array LPA. Sample-to-pixel calculation units 170-1 and 170-2 may partition the effort of computing pixel values at the pixel centers of the left virtual array. For example, sample-to-pixel calculation unit 170-1 may perform pixel value computations for virtual pixel centers with horizontal index $I_1$ less than or equal to (M/2)−1, while sample-to-pixel calculation unit 170-2 performs pixel value computations for virtual pixel centers with horizontal index $I_1$ greater than or equal to M/2.

Sample-to-pixel calculation units 170-3 and 170-4 generate virtual pixels centers in the 2-D viewport corresponding to the physical pixels of the right physical array RPA.

The virtual pixel centers so generated are referred to herein as the right virtual array RVA. Let function $g_2$ represent the choices of virtual pixel centers comprising the right virtual array. Thus, for each index pair $(I_2,J_2)$ in the set S, function $g_2$ defines a virtual pixel center $(X,Y)$ in the 2-D viewport. Samples in the neighborhood of a virtual pixel center $(X,Y)$ in the right virtual array are used to generate a set of pixel values (e.g. red, green, blue, etc.) which determine the color and intensity of the corresponding physical pixel in the right physical array RPA. Sample-to-pixel calculation units 170-3 and 170-4 may partition the effort of computing pixel values at the pixel centers of the right virtual array. For example, sample-to-pixel calculation unit 170-3 may perform pixel value computations for virtual pixel centers with horizontal index $I_2$ less than or equal to $(M/2)-1$, while sample-to-pixel calculation unit 170-4 performs pixel value computations for virtual pixel centers with horizontal index $I_2$ greater than or equal to $M/2$.

If higher bandwidth is needed more than two sample-to-pixel calculation units may be assigned to each projection device. Conversely, if the processing capacity of each sample-to-pixel calculation unit is high enough, only one sample-to-pixel calculation unit may be assigned to each projection device. Furthermore, differing numbers of sample-to-pixel calculation units may be assigned to each projection device. It is noted that the sample-to-pixel calculation units 170 which drive the two projection devices may be comprised within one or more graphics boards of the same (or similar) configuration as graphics board 116.

The functions $h_1=f_1 \circ g_1^{-1}$ and $h_2=f_2 \circ g_2^{-1}$ map points $(X,Y)$ in virtual screen space to points $(U,V)$ in physical screen space, and, in particular, virtual pixel centers to their corresponding physical pixel centers. It is desirable that these two functions be diagonally affine, aspect-ratio preserving and equal so that objects displayed on both sides of screen SCR may appear undistorted and consistent in size. Let A be an aspect-ratio preserving and diagonally affine map from virtual screen space to physical screen space. If functions $g_1$ and $g_2$ are chosen so that $$g_1 = A^{-1} \circ f_1, \text{ and}$$

$$g_2 = A^{-1} \circ f_2,$$

then $h_1=h_2=A$ as desired. The expressions for $g_1$ and $g_2$ imply that the left virtual array and right virtual array are uniformly scaled versions of the left physical array and right physical array respectively. Furthermore, because $f_1$ and $f_2$ are equal up to a horizontal translation, it follows that functions $g_1$ and $g_2$ are equal up to a horizontal translation.

Sample-to-pixel calculation units 170-1 through 170-4 may arrange the virtual pixel centers so that the combined virtual array covers the 2-D viewport. For example, suppose that the 2-D viewport is a rectangle defined by X values ranging from zero to $X_{max}$, and Y values ranging from zero to $Y_{max}$. Sample-to-pixel calculation units 170-1 and 170-2 may compute virtual pixel centers of the left virtual array using the following definition for the function $g_1$:

$$X=(X_{max}/2M)I_1+(X_{max}/4M),$$

$$Y=(Y_{max}/2N)J_1+(Y_{max}/4N).$$

for $(I_1,J_1)$ running through the set S. Similarly, sample-to-pixel calculation units 170-3 and 170-4 may compute virtual pixel centers of the right virtual array using the following definition for function $g_2$:

$$X=(X_{max}/2M)I_2+(X_{max}/2)+(X_{max}/4M),$$

$$Y=(Y_{max}/2N)J_2+(Y_{max}/4N),$$

for $(I_2,J_2)$ running through the set S.

Figure 34:
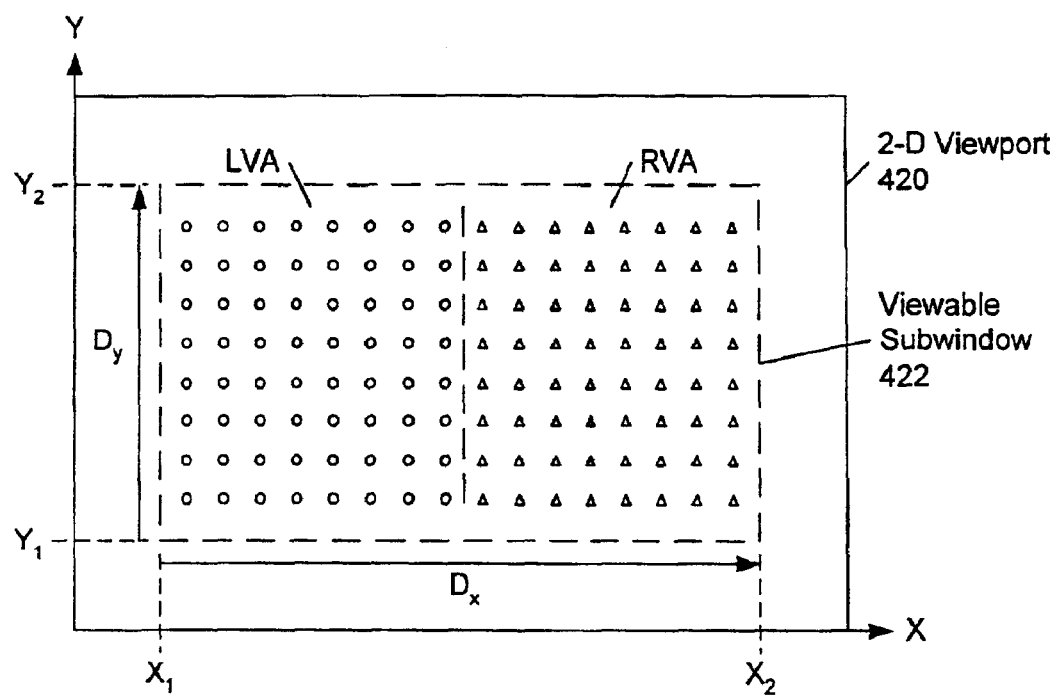
FIG. 34 illustrates a configuration of virtual pixel centers (i.e. convolution centers) which cover a viewable subwindow 422 of the 2-D viewport under the assumption of two projection devices.

Alternatively, sample-to-pixel calculation units 170-1 through 170-4 may arrange the virtual pixel centers so that the combined virtual array covers a subwindow of the 2-D viewport as shown in FIG. 34. (See FIG. 18D and the attending text for a discussion of the viewable subwindow and its use in pixel value computations.) For example, suppose that viewable subwindow 422 of the 2-D viewport 420 is defined as a rectangle with lower-left corner defined by $(X_1,Y_1)$ and upper-right corner defined by $(X_2,Y_2)$. In this case, virtual pixel centers of the left virtual array may be defined by the relations $$X=X_1+I_1D_x/2M+D_x/4M,$$

$$Y=Y_1+J_1D_y/2N+D_y/4N,$$

where $I_1$ runs from zero to $M-1$ and $J_1$ runs from zero to $N-1$, where $D_x=X_2-X_1$ and $D_y=Y_2-Y_1$. Similarly, the virtual pixel centers of the right virtual array may be defined by the relations $$X=X_1+D_x/2+I_2D_x/2M+D_x/4M,$$

$$Y=Y_1+J_2D_y/2N+D_y/4N,$$

where $I_2$ runs from zero to $M-1$ and $J_2$ runs from zero to $N-1$. A great variety of choices for the function g are contemplated. The above examples are not meant to be limiting.

Render units 150 may continuously render samples into the entire 2-D viewport. However, sample positions outside the viewable subwindow 422 may contribute to color computations as the background color as discussed in connection with FIG. 18D. The color values rendered into the marginal area (outside the viewable subwindow) may allow effects such as panning and zooming to be more efficiently implemented. As described above, panning or zooming may be implemented by changing the coordinates $X_1$, $X_2$, $Y_1$ and $Y_2$ of the viewable subwindow 422 as a function of time t. According to another methodology, only sample positions inside the viewable subwindow 422 are allowed to contribute to color computations (i.e. pixel value convolutions).

In one embodiment, panning and zooming may be accomplished by changing the start position $(X_S(K),Y_S(K))$, horizontal step size $\Delta X(K)$ and a vertical step size $\Delta Y(K)$ for each sample-to-pixel calculation unit 170-K as a function of time. For example, panning may be accomplished by changing the start positions. Zooming may be accomplished by changing the step sizes and start positions.

Edge Matching

Figure 35A:
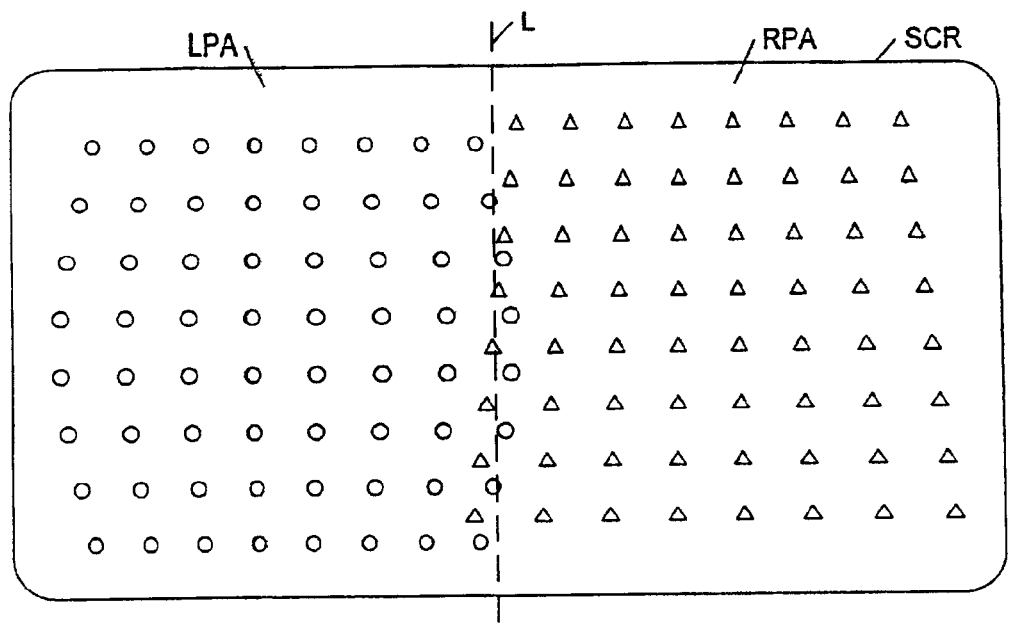
FIGS. 35A and 35B provide examples of minimal overlap between the physical pixel arrays generated by two projection devices on screen SCR in a side by side configuration.
Figure 35B:
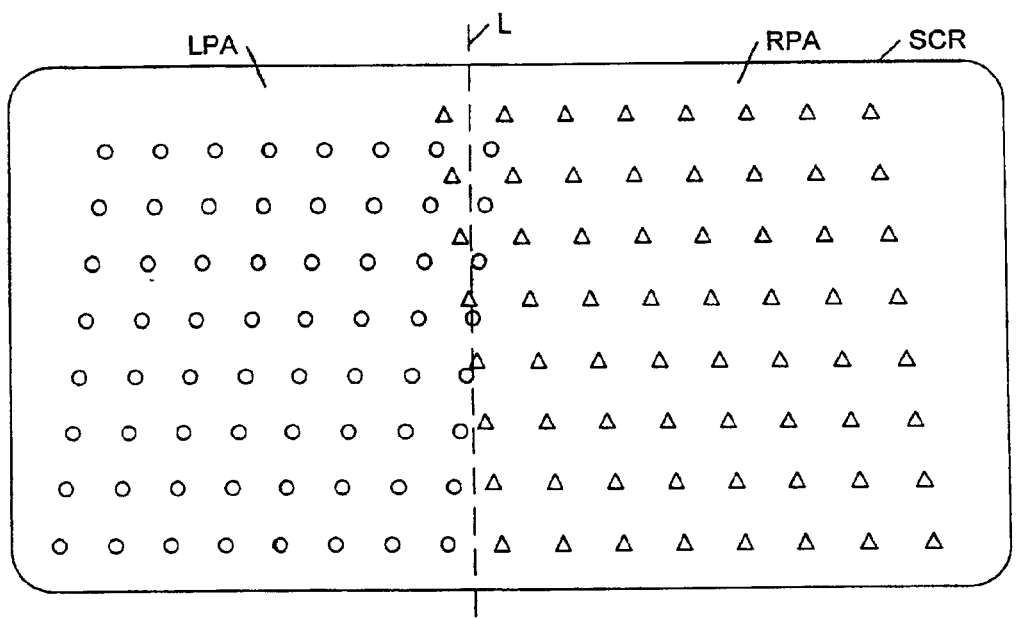

In the discussion of FIG. 33, it was assumed that left physical array LPA and right physical array RPA (of physical pixels) generated by projection devices $PD_1$ and $PD_2$ respectively were aligned without overlap to form one uniform rectangular array on screen SCR. In practice, this assumption is difficult or impossible to realize because of various distortion mechanisms inherent in the projection devices and screen SCR. Any attempt to line up the edges of the two physical arrays without overlap fails because the edges are distorted as suggested in the examples of FIGS. 35A and 35B. Thus, it is necessary to at least partially overlap the two physical arrays in order to avoid a gap at the interface of the two physical arrays. It is desirable to minimize the amount of overlap so that the amount of screen area covered by the left physical array LPA and right physical array RPA is maximized. If the left physical array LPA and right physical array RPA are minimally overlapped as suggested in FIGS. 35A and 35B, the overlap region appears as an uneven line L of distortion due to the misalignment of pixels from the two physical arrays. Furthermore, the line L of distortion will appear relatively brighter due to the higher density of physical pixels in the overlap region.

Figure 36:
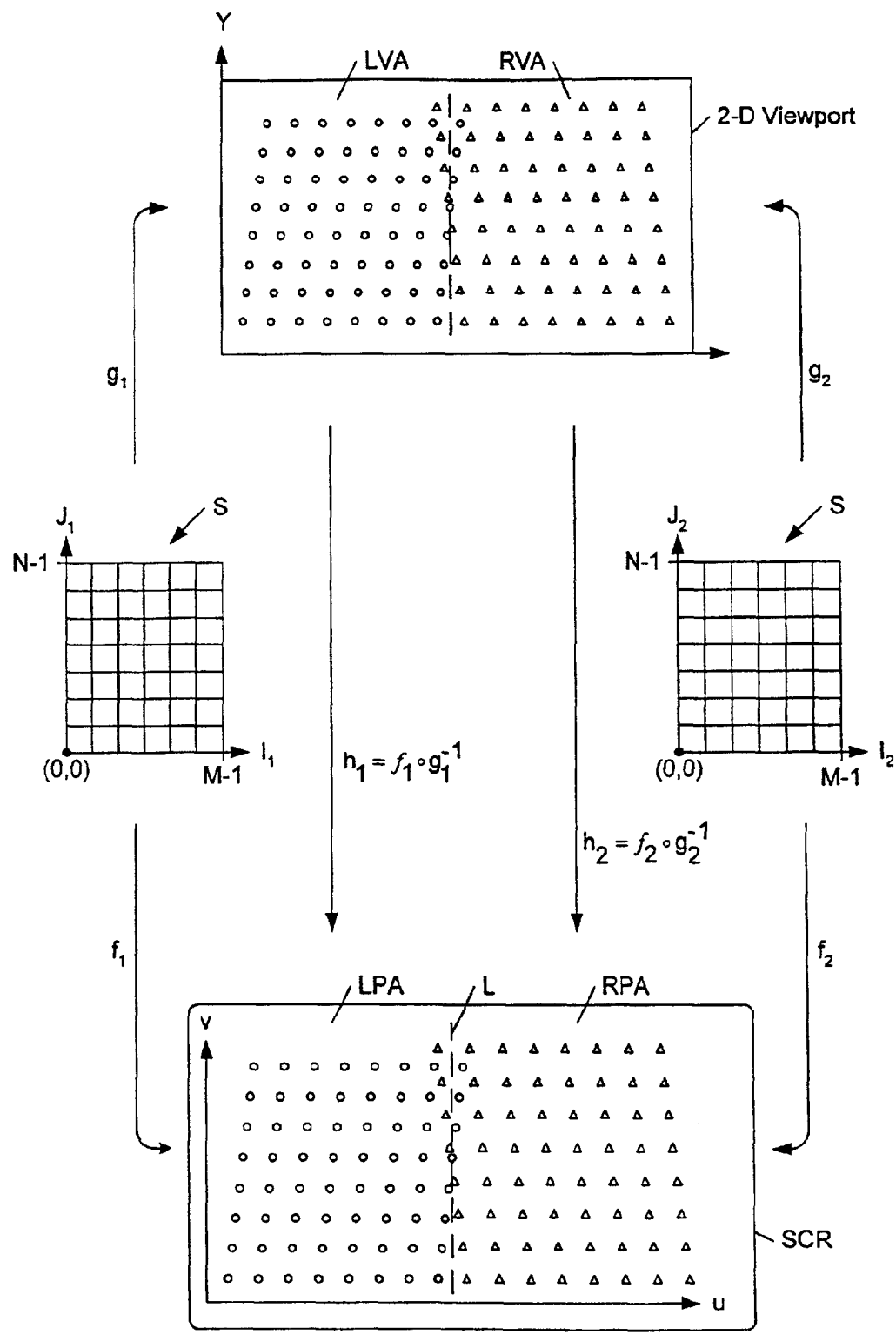
FIG. 36 illustrates a dual view of virtual pixel centers in the 2-D viewport and physical pixels on screen SCR assuming a minimally overlapped (or slightly overlapped) configuration of two projection devices.

In one embodiment of graphics system 112, sample-to-pixel calculation units 170 are configured to adjust the virtual pixel centers (i.e. the centers of convolution) in the 2-D viewport in order to correct for display distortions, i.e. physical distortions in the locations of physical pixels on screen SCR. FIG. 36 presents a simultaneous view of virtual pixels in the 2-D viewport (which is part of virtual screen space) and physical pixels on screen SCR, and assists in the explanation of the present embodiment which operates with two projection devices in a minimal (or small) overlap configuration. For the sake of discussion, left physical array LPA and right physical array RPA are assumed to be N×M arrays, i.e., each having N pixels vertically and M pixels horizontally.

The function $f_1$ maps index pairs $(I_1,J_1)$ in set S to physical pixel centers (U,V) comprising the left physical array LPA, and describes an arbitrary distortion of the left physical array. Similarly, the function $f_2$ maps index pairs $(I_2,J_2)$ in set S to physical pixel centers (U,V) comprising the right physical array RPA, and describes an arbitrary distortion of the right physical array.

Sample-to-pixel calculation units 170-1 and 170-2 may be interpreted as traversing the set S of index pairs once per video frame. For each pair $(I_1,J_1)$ in the set S, sample-to-pixel calculation units 170-1 and 170-2 select a virtual pixel center (X,Y) in the 2-D viewport. The collection of virtual pixel centers so generated is referred to herein as the left virtual array LVA. Samples in the neighborhood of the virtual pixel center are used to generate a set of pixel values (e.g. red, green, blue, etc.) for the corresponding physical pixel in the left physical array LPA. The function $g_1$ represents the mapping of index pairs $(I_1, J_1)$ to virtual pixel centers (X,Y) comprising the left virtual array LVA.

Sample-to-pixel calculation units 170-3 and 170-4 may be interpreted as traversing the set S of index pairs. For each pair $(I_2,J_2)$ in the set S, sample-to-pixel calculation units 170-3 and 170-4 select a virtual pixel center (X,Y) in the 2-D viewport. The collection of virtual pixel centers so generated is referred to herein as the right virtual array RVA. Samples in the neighborhood of the virtual pixel center are used to generate a set of pixel values (e.g. red, green, blue, etc.) for the corresponding physical pixel in the right physical array RPA. The function $g_2$ represents the mapping of index pairs $(I_2,J_2)$ to virtual pixel centers (X,Y) comprising the right virtual array RVA.

The functions $h_1 = f_1 \circ g_1^{-1}$ and $h_2 = f_2 \circ g_2^{-1}$ map points (X,Y) in virtual screen space to points (U,V) in physical screen space, and, in particular, virtual pixels centers to their corresponding physical pixel centers. It is desirable that these two functions be diagonally affine, aspect-ratio preserving and equal so that objects displayed on both sides of screen SCR may appear undistorted and consistent. According to the present invention, the functions $h_1$ and $h_2$ may be given the desired structure if $g_1 = A^{-1} \circ f_1$ and $g_2 = A^{-1} \circ f_2$, where A is a diagonally affine and aspect-ratio preserving map from XY to UV.

The above choices for functions $g_1$ and $g_2$ suggest that in order to correct for the distortions inherent in left physical array LPA and right physical array RPA, sample-to-pixel calculation units 170 may implement the same kind of distortions in generating virtual pixel centers of the left virtual array and right virtual array respectively. In other words, the left virtual array LVA may be chosen to be a scaled version of the left physical array LPA. Similarly, the right virtual array RVA may be chosen to be a scaled version of the right physical array RPA. In FIG. 36, the left physical array is depicted as a parallelogram which leans to the right, and the right physical array is depicted as a parallelogram which leans to the left. Thus, the optimal choice for the left virtual array LVA may be a parallelogram which leans to the right just like the LPA. Similarly, the optimal choice for the right virtual array RVA may be a parallelogram which leans to the left just like the RPA.

The functions $f_1$ and $f_2$ may be estimated based on measurements provided by a sensing device such as a video camera. For example, sample-to-pixel calculation units 170 may transmit to the projection devices $PD_1$ and $PD_2$ one or more calibration pixel patterns for display on screen SCR. The projection devices may generate physical images in response to each of the calibration pixel patterns. A video camera may capture the physical images displayed on screen SCR for each of the calibration patterns. Sample-to-pixel calculation units 170 (or a selected subset of these units) may estimate the functions $f_1$ and $f_2$ based on the known calibration patterns and the captured physical images. For example, sample-to-pixel units 170 may generate piecewise linear approximations to the functions $f_1$ and $f_2$, and from these, piecewise linear approximations to the selection functions $g_1$ and $g_2$.

In another embodiment, sample-to-pixel calculation units 170 may receive calibration inputs from a user. The user may be situated in front of screen SCR and observing the screen SCR. The user may identify the type of distortion manifested by each physical pixel array, and perform a separate calibration for each physical pixel array as described above in connection with FIGS. 25A–D. It is noted that the morphing of left virtual array LVA and right virtual array RVA in these calibrations may start from the non-overlapping rectangular configurations indicated by FIG. 33 or FIG. 34. After these calibrations, objects displayed in either the left physical array or right physical array may appear undistorted. However, if one of the physical arrays is even slightly scaled or translated with respect to the other physical array, the observer may still notice a fuzziness along boundary line L. Thus, additional calibrations which address the relationship (e.g. the relative scale and position) of the two physical arrays may be necessary. For example, the right physical array RPA in FIG. 36 has a larger height than the left physical array LPA. Thus, the user may invoke a vertical scaling mode to correct the vertical scale mismatch between the two physical arrays. In the vertical scaling mode, sample-to-pixel calculation units 170-3 and 170-4 are responsive to the plus/minus adaptation signals asserted by the user. In response to the plus adaptation signal, sample-to-pixel calculation units 170-3 and 170-4 may morph the right virtual array RVA in the direction of increasing vertical height. In response to the minus adaptation signal, sample-to-pixel calculation units 170-3 and 170-4 may morph the left virtual array RVA in the direction of increasing vertical height. Render units 150 may generate samples for one or more horizontal lines into sample buffer 162 during the vertical scaling mode, i.e. horizontal lines that cross over the boundary line L. Simultaneously, sample-to-pixel calculation units 170 may generate pixel values which are displayed in the left physical array and right physical array. The amount of mismatch in these horizontal lines when displayed in left physical array LPA and right physical array RPA provides the user with an indication of the direction in which vertical scaling correction should proceed in order to minimize the mismatch.

Sample-to-pixel calculation units 170 may provide modes for performing vertical scaling, horizontal scaling, vertical translation, horizontal translation and rotation on the left virtual array LVA and/or the right virtual array RVA.

As noted above, the present invention contemplates various embodiments of graphics system 112 where any combination of user calibration and/or continuous calibration of virtual pixel arrays may be supported. Furthermore, graphics system 112 may be (or may not be) configured to support download of virtual pixel arrays which have been computed/determined externally such as in a manufacturer's calibration.

Light Spillage Control

In general, the overlap of the left physical array LPA and the right physical array RPA implies that the density of physical pixels at the boundary line L is higher than elsewhere. Thus, the average intensity of the integrated image IMG will be higher along the boundary line L. Thus, even if all the distortions including relative distortions between physical arrays are corrected by the techniques discussed above, the user may perceive a bright line along the interface of the two images. In one embodiment of the present invention, a physical barrier PB is positioned normal to the screen SCR and over the boundary line L as shown in FIGS. 37A & 37B. FIG. 37A presents a front view of the physical arrays projected onto screen SCR. FIG. 37B presents a top view of the projection system including projections devices $PD_1$ and $PD_2$, and screen SCR. Rays which are emitted by left projection device $PD_1$ and which would hit the screen SCR on the right side of boundary line L may be blocked by physical barrier PB. Thus, physical pixels (or portions thereof) belonging to the left physical array LPA which would have hit the right side of boundary line L are intercepted by the physical barrier PB, and do not appear on screen SCR, as indicated by the small shaded circles on the right of the boundary line L. Similarly, rays which are emitted by right projection device $PD_2$ and which would hit screen SCR on the left side of the boundary line L may be blocked by physical barrier PB. Thus, physical pixels (or portions thereof) belonging to the right physical array RPA which would have hit the left side of the boundary line L are intercepted by the physical barrier PB, and do not appear on screen SCR, as indicated the small shaded triangles on the left of the boundary line L. Physical barrier may be a thin strip of material that extends from the top of the screen to the bottom of the screen. The physical barrier may be constructed of a material which absorbs light. With the physical barrier PB in place, the density of physical pixels which are visible (i.e. which appear on screen SCR) near the boundary line L is lowered. Thus, the bright line (or band) along boundary line L may be eliminated (or ameliorated) by physical barrier PB. The physical barrier PB may be used in a front projection or rear projection scenario.

It is noted that the physical barrier PB may be used to control cross-over spillage of light in large overlap situations in addition to the small or minimal overlap situations described above. For example, if the physical arrays are non-uniform or highly distorted at their edges, the amount of overlap may be increased so that the non-uniform edge portions spill over boundary line L, and are controlled by the physical barrier PB. In general, as the horizontal width of the overlap regions increases, the height of the physical barrier PB required to control the spillage also increases.

Hot Spot Correction

In one embodiment of the present invention, sample-to-pixel calculation units 170 may be configured to correct for hot spots, and more generally, for non-uniformity in the light intensity received by a viewer from a screen image.

Sample-to-pixel calculation units 170 may be configured to receive geometric information such as the position/orientation of the projection devices $PD_1$ and $PD_2$, the position and orientation of the screen SCR with respect to the projection devices, and the position of a viewer (especially the viewer's eye or eyes) with respect to the projection devices and/or screen SCR. Based on the geometric information, sample-to-pixel calculation units 170 may be configured to compute (or approximate) an intensity function H(U,V) which represents the intensity of light received from points (U,V) on screen SCR at the viewer's position (e.g. head position). A local maximum of the intensity function indicates a position where the viewer will perceive a hotspot. The intensity function H(U,V) generally changes as the viewer moves with respect to the screen SCR and/or projection devices. Sample-to-pixel calculation units 170 may include ray tracing and optical modeling software which is executed to generate the intensity function H(U,V).

In one alternate embodiment, the intensity function may be derived from measurements by a sensing device attached to the viewer (e.g. to the viewer's head). The sensing device may measure received light intensity as a function of angle of arrival. Sample-to-pixel calculation units 170 may operate on the measurement data to generate an intensity function H(U,V) based on a known distance and orientation of the screen SCR with respect to the viewer.

The intensity function H(U,V) may be translated into a corresponding function H(X,Y) of virtual screen coordinates X and Y. The absolute minimum of the intensity function H(X,Y) may be normalized to one, i.e. $H_n(X,Y)=H(X,Y)/HX_{min}$. The normalized intensity function $H_n(X,Y)$ may be reciprocated to generate an intensity correction function $J(X,Y)=1/H_n(X,Y)$. It is noted that the intensity correction function J(X,Y) may also be computed by first reciprocating and then normalizing the absolute maximum of the reciprocated function to one.

In a second alternate embodiment, a viewer may invoke a hotspot calibration mode. In the hotspot calibration mode, render units 150 may render a first marker pattern (e.g. a pair of crosshairs) with samples into sample buffer 162. The first marker pattern may be localized at a position $(X_{hs},Y_{hs})$ in the 2-D viewport 420. Furthermore, render units 150 may move the first marker pattern within the 2-D viewport 420 in response to horizontal and vertical adjustment inputs provided by the viewer. In response to plus/minus horizontal inputs, render units 150 may move the first marker pattern in the direction of increasing/decreasing X coordinate in 2-D viewport 420. In response to plus/minus vertical inputs, render units 150 may move the first marker pattern in the direction of increasing/decreasing Y coordinate in 2-D viewport 420. Sample-to-pixel calculation units 170 operate on the samples in sample buffer 162 and generate pixel values for successive frames of video output which are transmitted to projection devices $PD_1$ and $PD_2$. Thus, the first marker pattern appears on screen SCR localized at some physical position. The viewer looks at screen SCR, and uses the horizontal and vertical adjustment inputs to move the first marker pattern until it is centered on a first hotspot on screen SCR. After identifying the center of the first hotspot, the viewer may provide further inputs which define the size, shape and/or intensity of the first hotspot. Additional hotspots may be identified and characterized in a similar fashion. Sample-to-pixel calculation units 170 may operate on the position $(X_{hs},Y_{hs})$, size, shape, and intensity data for one or more hotspots, and generate an intensity function H(X,Y) to model the hotspot configuration. An intensity correction function J(X,Y) may be generated from the intensity function H(X,Y) as described above.

Sample-to-pixel calculation units 170 may scale down the intensity of computed pixel color values using the intensity correction function J(X,Y). For example, the intensity of color values computed at arbitrary virtual pixel center (X,Y) may be multiplied by correction value J(X,Y). Thus, the corresponding physical pixel center (U,V) which would have had intensity H(U,V), now experiences intensity H(U,V)J(U,V)=$H_{min}$. Thus, the screen image as perceived by the viewer is made uniformly intense with intensity equal to the minimum intensity prior to correction.

In contrast to the scaling operations performed for edge blending of overlapped images, the intensity correction function J(X,Y) may be applied for all virtual pixels in the 2-D viewport. The scaling functions $S_1$ and $S_2$ are applied separately (and in parallel) to virtual pixels of the left virtual array LVA and right virtual array RVA respectively. However, the intensity correction function J(X,Y) may be combined with each of the scaling functions $S_1$ and $S_2$ so that one multiplication may be performed per color per pixel instead of two. Thus, composite scaling function $J_1(X,Y)$= $J(X,Y)*S_1(X,Y)$ may be used to scale the pixel values which are determined for the left virtual array LVA, and composite scaling function $J_2(X,Y)=J(X,Y)*S_2(X,Y)$ may be used to scale the pixel values determined for the right virtual array RVA.

The following pseudo-code fragment illustrates one possible embodiment of a combined edge blend and hotspot correction performed by sample-to-pixel calculation units 170-1 and 170-2 for the virtual pixel centers of the left virtual array LVA.

```
I=0;
J=0;
X^r=X_s;
Y^r=Y_s;
while (J<N) {
    while (I < M) {
        (X^d,Y^d) = (X^r,Y^r) + Δg_1 (I,J) ;
        Red = RedConvolve (X^d,Y^d);
        Grn = GrnConvolve (X^d,Y^d);
        Blu = BluConvolve (X^d,Y^d);
        Red = Red*J_1(X^d,Y^d);
        Grn = Grn*J_1(X^d,Y^d);
        Blu = Blu*J_1(X^d,Y^d);
        Output ColorValues;
        X^r = X^r+ΔX ;
        I = I + 1;
    }
    X^r=X_s;
    Y^r=Y^r+ΔY ;
    J=J+1;
}
```

Each distorted virtual pixel center $(X^d,Y^d)$ may be generated by adding vector displacement value $\Delta g_1(I,J)$ to a corresponding rectangular array location $(X^r,Y^r)$. Red, green and blue convolution functions are invoked to compute red, green and blue color values respectively at the distorted center $(X^d,Y^d)$. Once computed, the color values are multiplied by composite scaling value $J_1(X^d,Y^d)$ evaluated at (or interpolated for) distorted center $(X^d,Y^d)$. The scaled color values are transmitted to projection device $PD_1$ through a video channel.

In the preferred embodiment, each of sample-to-pixel calculation units 170-1 and 170-2 may operate independently and generate scaled color values for a corresponding vertical strip of the index set S. Thus, the above code fragment may be executed by each of sample-to-pixel calculation units 170-1 and 170-2 with the horizontal pixel index I constrained to the corresponding vertical strip.

Sample-to-pixel calculation units 170-3 and 170-4 may use a similar methodology (as described in the pseudo-code fragment above) to compute color values and scale color values for the right virtual array RVA. However, the second composite scaling function $J_2(X,Y)$ is used in place of the first composite scaling function $J_1(X,Y)$.

If necessary, more than two sample-to-pixel calculation units may be assigned to projection device $PD_1$ (or projection device $PD_2$). Conversely, one sample-to-pixel calculation unit may be assigned to projection device $PD_1$ (or projection device $PD_2$), if the video bandwidth of the sample-to-pixel calculation unit is large enough to source the projection device.

It is noted that the composite scaling function $J_1(X,Y)$ may be computed on a grid of locations $(X_k,Y_k)$ in 2-D viewport 420. These composite scaling values $J_1(X_k,Y_k)$ at the grid locations may be stored in a memory which is accessible by sample-to-pixel calculation units 170-1 and 170-2. Sample-to-pixel calculation units 170-1 and 170-2 may use the stored values to interpolate composite scaling values for virtual pixel centers (X,Y) which fall in intermediate locations.

Similarly, composite scaling values $J_2(X,Y)$ may be computed on a second grid of locations $(X_j,Y_j)$ in 2-D viewport 420. The computed values may be stored in a second memory accessible by sample-to-pixel calculation units 170-3 and 170-4. Sample-to-pixel calculation units 170-3 and 170-4 may use these stored values to interpolate composite scaling values $J_2(X,Y)$ for locations (X,Y) off the second grid.

In one embodiment, the graphics system 112 couples to a display device (e.g. a CRT display) which has non-uniform brightness across its screen surface. The intensity correction function J(X,Y) may be configured to compensate for the non-uniform brightness. A typical CRT screen may be twice as bright at the screen center as compared to the screen edges. Thus, the intensity correction function may have a minimum value (which is positive and less than one) at the center of the screen to attenuate the center brightness to values consistent with the edges.

In one alternate embodiment, the intensity correction function J(X,Y) may be applied to samples values instead of pixel values. After having computed a color value V for a sample positioned at (X,Y) in the 2D-viewport 420, graphics processing unit 90 may multiply the color value by the intensity correction function J(X,Y) evaluated at the sample's position. The scaled color value J(X,Y)*V may be stored into sample buffer 162. Similarly, the scaling functions $S_1$ and $S_2$ used in edge blending may be applied to sample values instead of pixel values.

Figure 38:
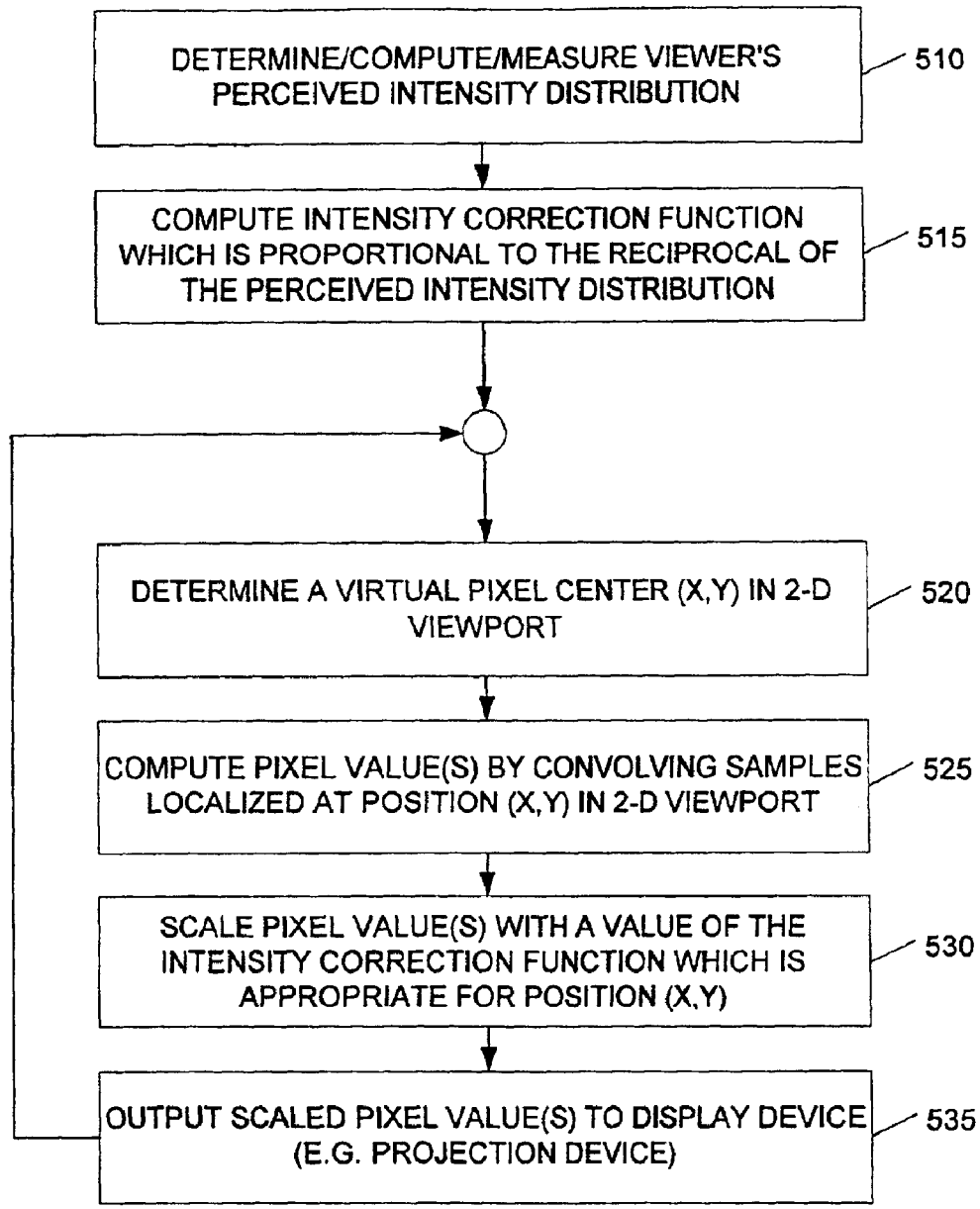
FIG. 38 illustrates one embodiment of a method for performing hot spot correction according to the present invention.

FIG. 38 illustrates one embodiment of a method for performing hot spot correction according to the present invention. In step 510, an envelope processor comprised within computer system 80 estimates, computes, and/or measures the viewer's perceived intensity distribution. The envelope processor may be realized by sample-to-pixel calculation units 170 (or any subset thereof, comprised with one or more instance of graphics board 116). In one alternative embodiment, the envelope processor may be realized by host CPU 102. In step 515, the envelope processor computes an intensity correction function (or table) which is proportional to the reciprocal of the perceived intensity distribution.

In step 520, generic sample-to-pixel calculation unit 170-K determines a virtual pixel center (X,Y) in the 2-D viewport 420. In step 525, sample-to-pixel calculation unit 170-K computes pixel value(s) by convolving samples localized at position (X,Y) in the 2-D viewport 420.

In step 530, generic sample-to-pixel calculation unit 170-K scales the pixel value(s) with a value of the intensity correction function which is appropriate for the position (X,Y) in the 2-D viewport 420. In step 535, generic sample-to-pixel calculation unit 170-K may output the scaled pixel value(s) to a display device (e.g. a projection device). Generic sample-to-pixel calculation unit 170-K may repetitively perform steps 520 through 535 for (a) successive virtual pixel centers (X,Y) in a scan line, (b) successive scan lines in a frame, and (c) for successive frames in a video sequence.

Arbitrary Numbers of Projection Devices

Figure 3:
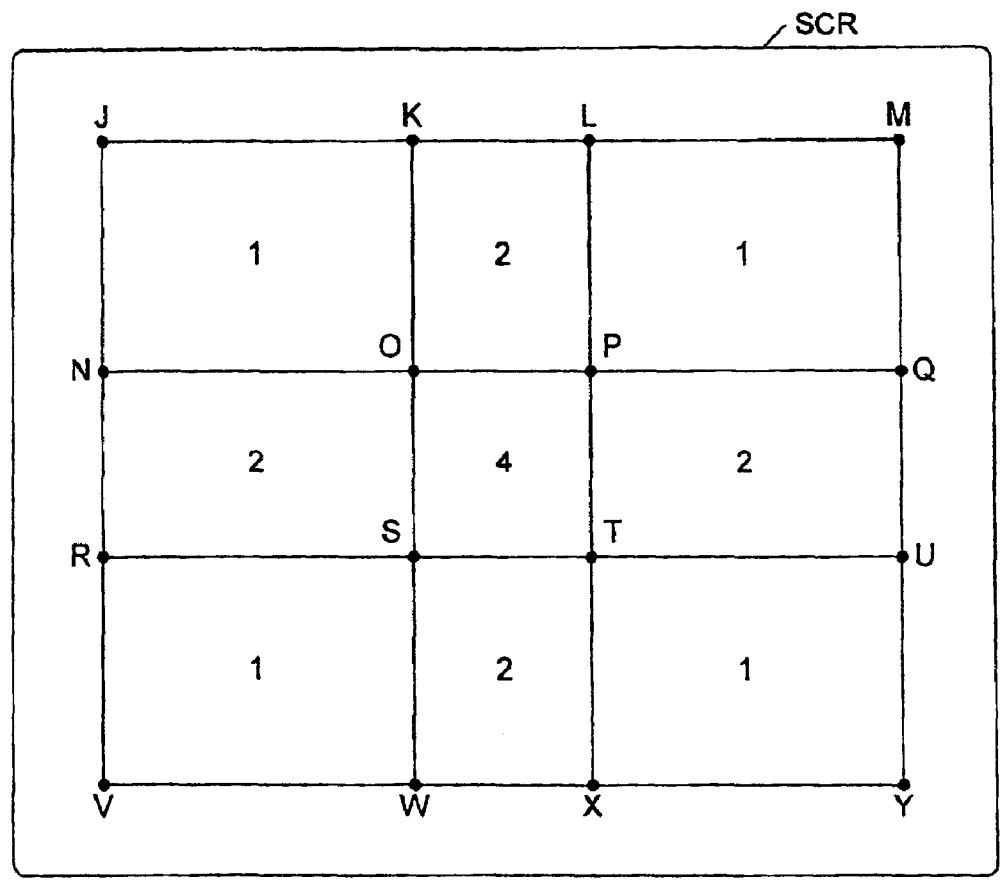
FIG. 3 illustrates the overlapping of four images generated by four projection devices in a "2 by 2" configuration.
Figure 5A:
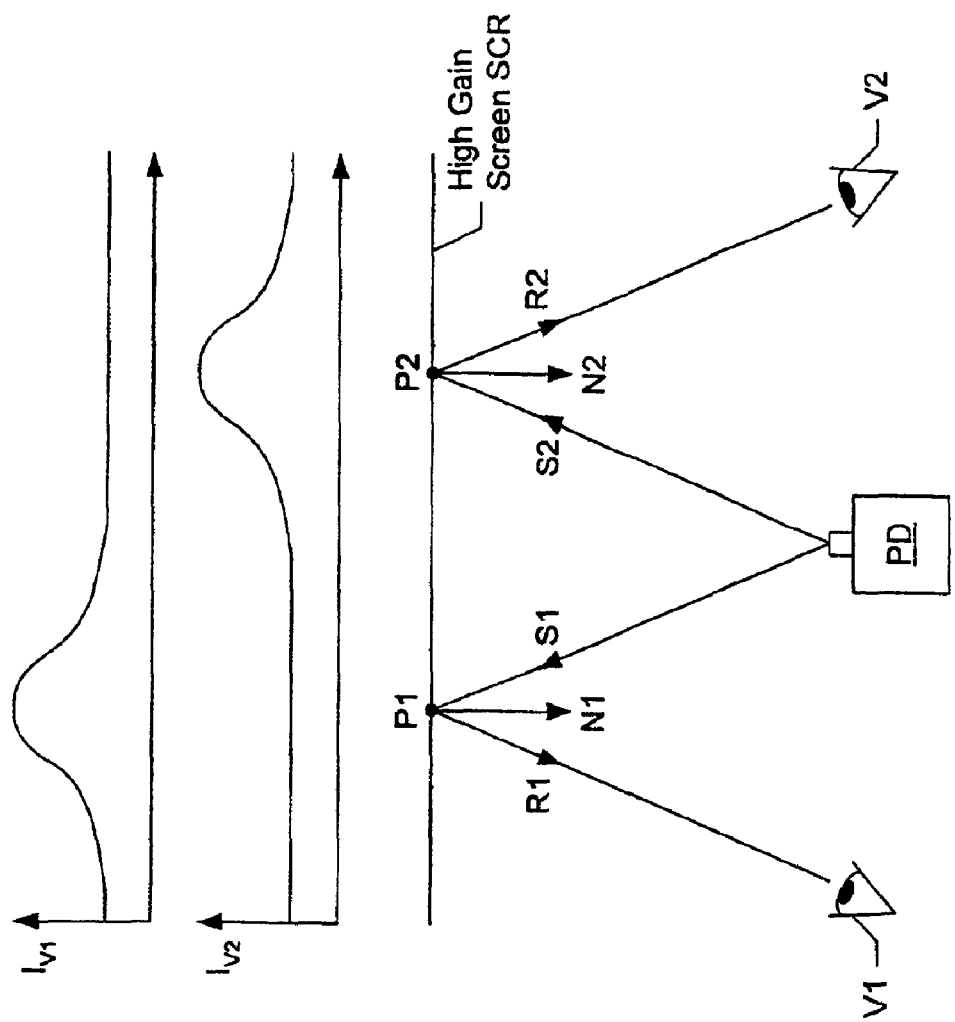
FIG. 5A illustrates the received intensity pattern for two viewers situated at different positions with respect to a front projection.
Figure 5B:
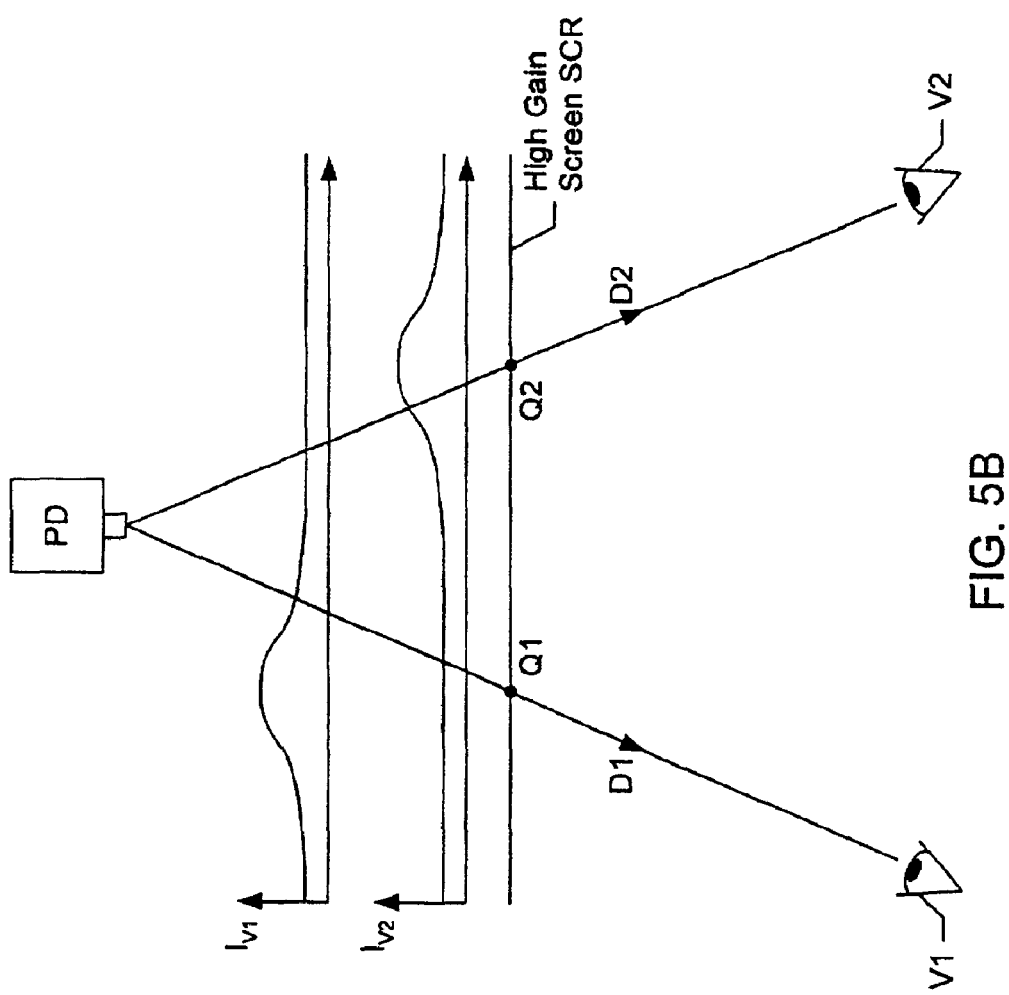
FIG. 5B illustrates the received intensity pattern for two viewers situated at different positions with respect to a rear projection system.
Figure 39:
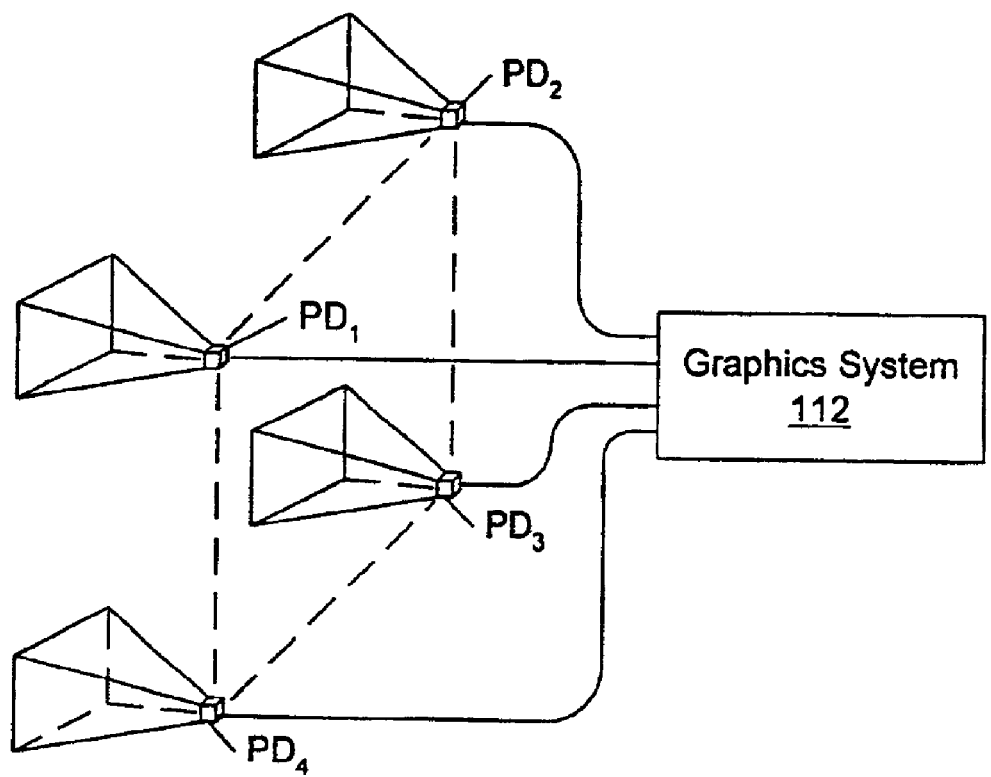
FIG. 39 illustrates a "2 by 2" configuration of four projection devices driven by graphics system 112 according to the present invention.

The embodiments of the present invention described above naturally generalize to an arbitrary number of projection devices $PD_1$ through $PD_L$. For example, four projection devices $PD_1$ through $PD_4$ may be configured in a 2-by-2 configuration as suggested by FIG. 39. The four projection devices may be coupled to graphics system 112 through four video signal buses. Each projection device radiates a cone of light which impinges on screen SCR as a rectangle (approximately). The four rectangles may overlap as suggested by FIG. 3.

In one embodiment of the present invention, a set of 4N sample-to-pixel calculation units 170 are configured to perform distortion correction, edge blending, chromatic distortion compensation (including chromatic aberration compensation), edge matching, and/or hot spot correction using four projection devices $PD_1$ through $PD_4$. A subset of N sample-to-pixel calculation units 170 may be dedicated to each projection device. The set of 4N sample-to-pixel calculation units 170 may be comprised within multiple graphics boards of similar configuration as graphics board 116.

Figure 40:
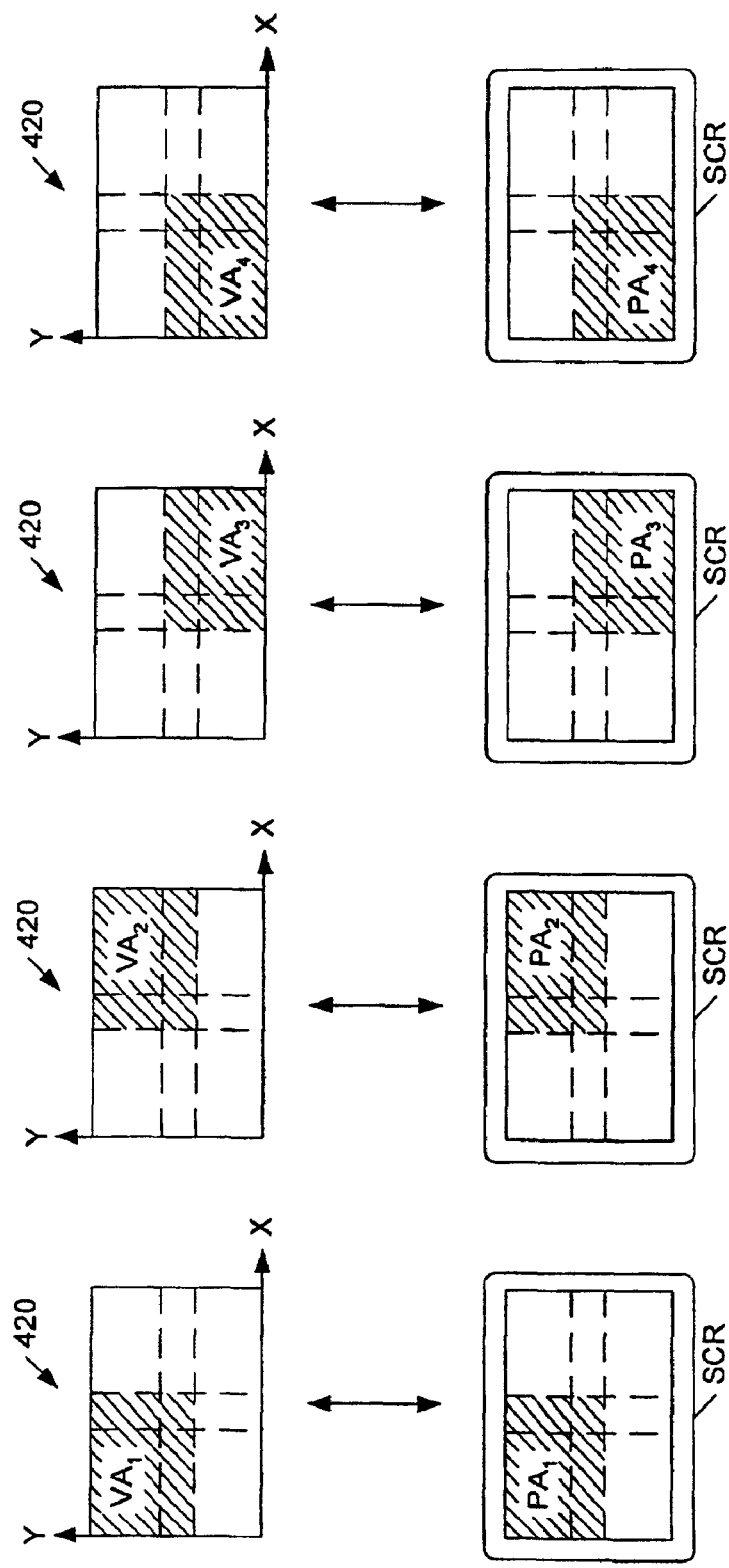
FIG. 40 illustrates the correspondence between virtual pixel arrays in the 2-D viewport 420 and physical arrays on screen SCR in one embodiment of graphics system 112 where four projection devices are used in an overlapped "2 by 2" configuration.

As suggested in FIG. 40, a first subset of sample-to-pixel calculation units 170 may select virtual pixel centers comprising virtual array $VA_1$ to compensate for distortions inherent in physical array $PA_1$ generated by projection device $PD_1$. A second subset of sample-to-pixel calculation units 170 may select virtual pixel centers comprising virtual array $VA_2$ to compensate for distortions inherent in physical array $PA_2$ generated by projection device $PD_2$. A third subset of sample-to-pixel calculation units 170 may select virtual pixel centers comprising virtual array $VA_3$ to compensate for distortions inherent in physical array $PA_3$ generated by projection device $PD_3$. A fourth subset of sample-to-pixel calculation units 170 may select virtual pixel centers comprising virtual array $VA_4$ to compensate for distortions inherent in physical array $PA_4$ generated by projection device $PD_4$.

The first subset of sample-to-pixel calculation units 170 may compute pixel values (e.g. color values) at each virtual pixel center of the virtual array $VA_1$. The pixel values drive corresponding physical pixels of the physical array $PA_1$. The second subset of sample-to-pixel calculation units 170 may compute pixel values (e.g. color values) at each virtual pixel center of the virtual array $VA_2$. The pixel values drive corresponding physical pixels of the physical array $PA_2$. The third subset of sample-to-pixel calculation units 170 may compute pixel values (e.g. color values) at each virtual pixel center of the virtual array $VA_3$. The pixel values drive corresponding physical pixels of the physical array $PA_3$. The fourth subset of sample-to-pixel calculation units 170 may compute pixel values (e.g. color values) at each virtual pixel center of the virtual array $VA_4$. The pixel values drive corresponding physical pixels of the physical array $PA_4$.

All four subsets of sample-to-pixel calculation units 170 may operate in parallel. It is noted that the virtual arrays VA and physical arrays PA are illustrated in separate panels to emphasize the correspondence between virtual arrays VA in the 2-D viewport and physical arrays PA on screen SCR.

In addition, each subset of N sample-to-pixel calculation units 170 may partition the effort of computing the pixel values for the corresponding virtual array. For example, each sample-to-pixel calculation unit 170-K of the subset may operate on a column of the virtual array as described above in previous embodiments.

The positions of the virtual arrays VA in the 2-D viewport may be similar to the positions of the physical arrays PA on screen SCR. For example, virtual array $VA_1$ may be in the upper left corner of the 2-D viewport 420 since the physical array $PA_1$ occupies the upper-left corner of the screen SCR. Furthermore, the virtual arrays VA may be distorted similarly to their corresponding physical array PA as discussed above in order to compensate for the physical distortions. Also, the virtual arrays VA may overlap each other in the same way that the physical arrays PA overlap.

The virtual pixel centers comprising each virtual array $VA_i$ may be selected based on an estimation of the corresponding display function $f_i$. The display function may be estimated based on physical measurement with a sensing device (e.g. a video camera) as discussed above.

In addition, virtual pixel centers comprising each virtual array $VA_i$ may be determined from calibrations as described above in the embodiments dealing with two projection devices. A series of calibrations may be performed on each virtual array individually. Subsequently, additional calibrations, which address the relative distortion of each virtual array with its neighboring virtual arrays, may be performed.

Chromatic distortion (e.g. chromatic aberration) induced by each of the projection devices $PD_1$ through $PD_4$ may be compensated by using different sets of virtual pixel centers for each color. Each subset $SS_i$ of sample-to-pixel calculation units 170 may select three arrays of virtual pixel centers, one array for each color. The positions of the virtual pixel centers in each virtual color array may be chosen to compensate for the chromatic distortion induced by projection device $PD_i$ on the corresponding color. The positions of the virtual pixel centers in each virtual color array may be chosen based on user calibration, physical measurements, etc.

Figure 41:
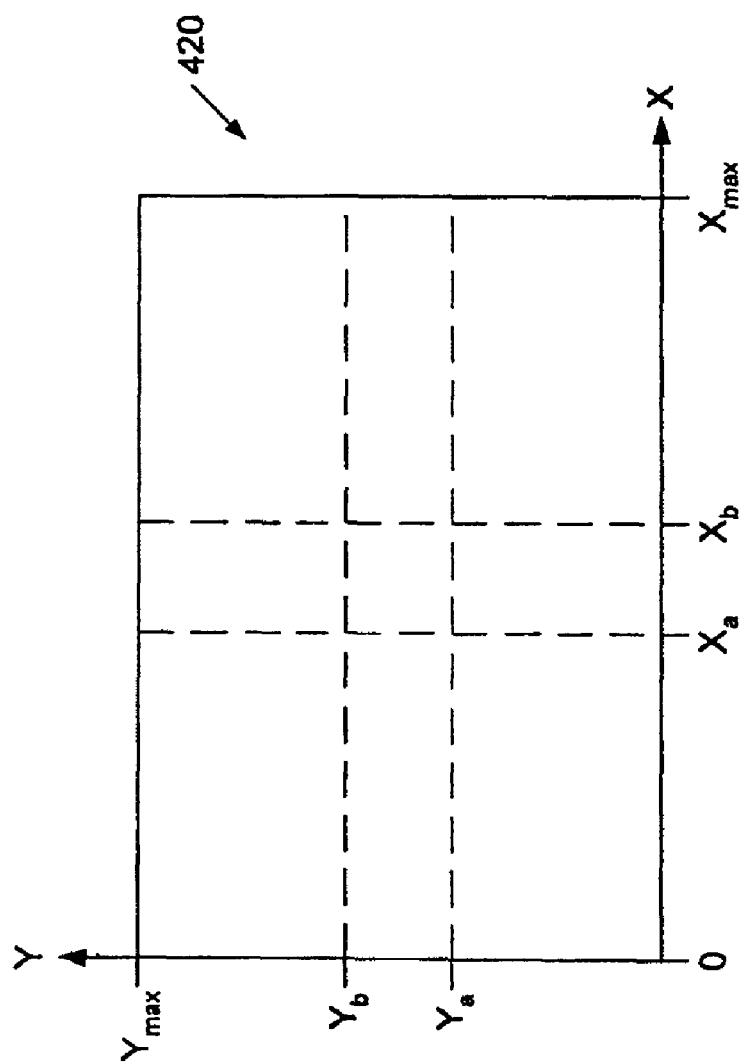
FIG. 41 illustrates the coordinates of boundary lines for overlap regions in the 2-D viewport 420 for one embodiment of graphics system 112 where four projection devices are used in an overlapped "2 by 2" configuration.

Scaling functions $S_1$, $S_2$, $S_3$ and $S_4$ may be used to perform edge blending. For example, the scaling function $S_1$ may be a product of a vertical scaling function $V_1(Y)$ and a horizontal scaling function $H_1(X)$. In the notation of FIG. 41, the horizontal scaling function $H_1(X)$ may equal one for X ranging from zero to $X_a$, and may transition from one to zero as X increases through the horizontal overlap region, i.e. from $X_a$ to $X_b$. The vertical scaling function $V_1(Y)$ may equal one for Y values between $Y_b$ and $Y_{max}$, and may transition from one to zero as Y decreases through the overlap region from $Y_b$ to $Y_a$. The scaling function $S_1(X,Y)=V_1(Y)H_1(X)$ is equal to one on the unshared interior of the virtual array $VA_1$, and transitions to zero in the overlap regions. Each of the scaling functions $S_i$ may be similarly defined. Thus, the sum of the scaling functions on the overlap regions is equal to one. In the central overlap region (i.e. $X_a<X<X_b$, and $Y_a<Y<Y_b$), all four virtual arrays VA overlap, and correspondingly, the four scaling functions add up to one.

Each subset of sample-to-pixel calculation units 170 may use the corresponding scaling function $S_i$ to scale pixel values (e.g. color values) before transmission to the corresponding projection device $PD_i$.

Hot spot correction may be performed by multiplying color values by an intensity correction function $J(X,Y)$. As discussed above in the embodiments dealing with two projection devices, the intensity correction function $J(X,Y)$ may be computed based on physical measurement, geometric modeling, user input, or any combination thereof. Each subset of sample-to-pixel calculation units 170 generates color values at virtual pixel centers $(X,Y)$ of the corresponding virtual array $VA_i$, and may multiply each color value by the intensity correction function $J(X,Y)$ evaluated (or interpolated) at the corresponding virtual pixel center $(X,Y)$. It is noted that the intensity correction function $J(X,Y)$ may be combined with each of the scaling functions $S_i(X,Y)$ so that one multiplication may be performed per color per pixel instead of two as described above.

Figure 42:
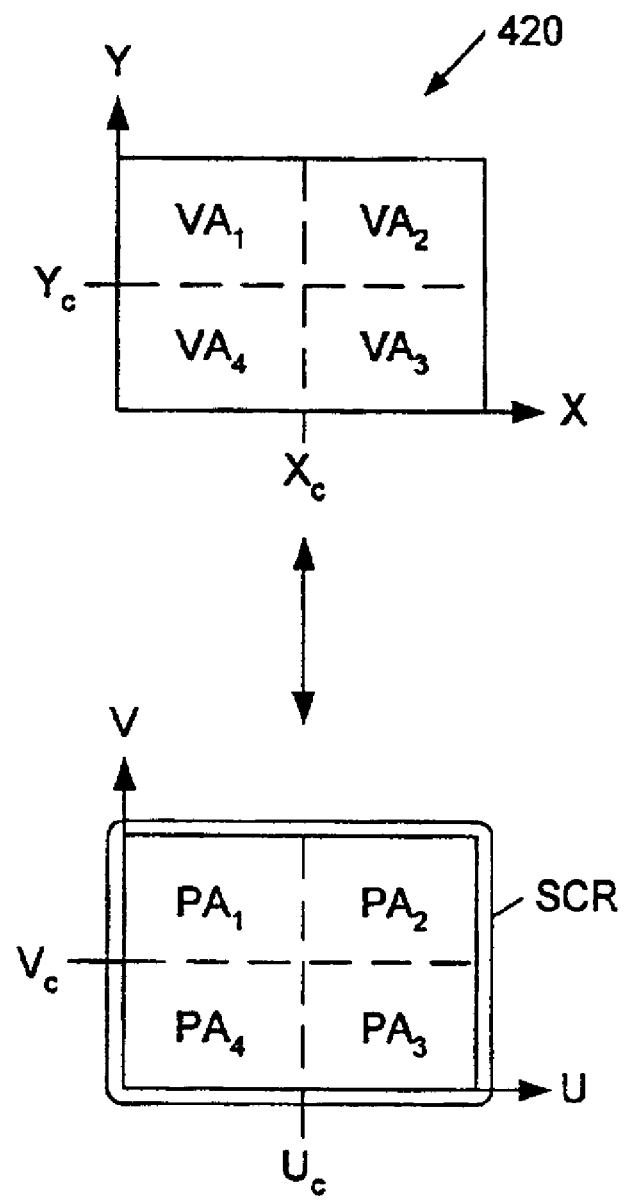
FIG. 42 illustrates the correspondence between virtual pixel arrays in the 2-D viewport and physical arrays on screen SCR in an alternate embodiment of graphics system 112 where four projection device are used in a minimally overlapped (or small overlap, or perhaps, non-overlapped) 2 by 2 configuration.

Edge matching may be performed by configuring projection devices $PD_1$ through $PD_4$ so that their physical arrays PA overlap minimally (or by a small amount). The virtual pixel center calibrations discussed above may be performed to ensure that objects displayed in the distorted physical arrays PA are undistorted and consistent in size especially in the overlap regions. Calibration of the virtual arrays $VA_1$ through $VA_4$ may start from the non-overlapping initial configuration suggested in FIG. 42. A vertical physical barrier may be used to control light spillage in the X direction, and a horizontal physical barrier may be used to control light spillage in the Y direction. The vertical physical barrier may be positioned $X=X_c$. The horizontal physical barrier may be positioned at $Y=Y_c$.

The various embodiments presented herein have discussed color in terms of red, green and blue components. However, the principles of the present invention may be used with any model of color. For example, other embodiments are contemplated where colors are expressed in terms of more than three spectral basis functions.

Many other projection configurations are contemplated for use with graphics system 112. For example, a set of K*L projection devices may be configured so that they generate a K by L pattern of rectangles on screen SCR, K rectangles vertically and L rectangles horizontally, with or without overlap. Other geometries are also contemplated. For example, projection devices may be configured to generate a hexagonal tiling of screen SCR. Each projection device may generate one hexagonal image.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system for compensating for chromatic distortion in a display device, wherein the graphics system comprises:

a first calculation unit operable (a) to compute first pixel values at a first plurality of first virtual pixel positions in a two-dimensional viewport, and (b) to provide the first pixel values as output to a first display device;

wherein the first calculation unit is further operable (c) to compute second pixel values at a second plurality of second virtual pixel positions, and (d) to provide the second pixel values as output to the first display device;

wherein the first calculation unit is further operable to select the first virtual pixel positions in the two-dimensional viewport in order to compensate for a first positional distortion of first physical pixels having a first color generated by the first display device on a display surface in response to the first pixel values;

wherein the first calculation unit is configured to select the second virtual pixel positions in the two-dimensional viewport in order to compensate for a second positional distortion of second physical pixels having a second color generated by the first display device on the display surface in response to the second pixel values;

a graphics processor which is operable to receive graphics data, to select supersample positions in the two-dimensional viewport, and to compute supersample values at the supersample positions based on the received graphics data;

a supersample buffer coupled to the graphics processor and configured to store the supersample values;

wherein the first calculation unit is coupled to the supersample buffer and operable to compute the first pixel values by filtering the supersamples at each of the first virtual pixel positions in the two-dimensional viewport, and to compute the second pixel values by filtering the supersamples at each of the second virtual pixel positions in the two-dimensional viewport.

2. The graphics system of claim 1, wherein the first calculation unit is operable to receive first sensor data indicating first positions of the first physical pixels on the display surface, and to select the first virtual pixel positions in response to the first sensor data.

3. The graphics system of claim 2, wherein the first calculation unit is operable to assign zero to the second pixel values while a sensing device is acquiring the first sensor data.

4. The graphics system of claim 2, wherein the first calculation unit is operable to select the first plurality of first virtual pixel positions with a first distortion pattern which is approximately geometrically similar to the first positional distortion of the first physical pixels having the first color on the display device.

5. The graphics system of claim 2, wherein the first calculation unit is operable to receive second sensor data indicating second positions of the second physical pixels on the display surface, and to select the second virtual pixel positions in response to the second sensor data.

6. The graphics system of claim 5, wherein the first sensor data and second sensor data are acquired by a video camera.

7. The graphics system of claim 1 wherein, for each of the first pixel values, the first calculation unit is operable:

to access a first subset of the supersample values corresponding to a first neighborhood of a corresponding one of the first virtual pixel positions;

to filter the first subset of the supersample values to generate the first pixel value.

8. The graphics system of claim 1, wherein the first calculation unit is operable to receive first calibration inputs from a user, and to adapt the first plurality of first virtual pixel positions in the two-dimensional viewport in response to the first calibration inputs.

9. The graphics system of claim 8, wherein the first calculation unit is operable to assign zero to the second pixel values while the user is providing the first calibration inputs.

10. The graphics system of claim 8, wherein the first calculation unit is configured to adapt the first virtual pixel positions in the two-dimensional viewport along a one-parameter family of geometric distortions in response to the first calibration inputs.

11. The graphics system of claim 8, wherein the first calculation unit is configured to expansively adapt the first virtual pixel positions in the two-dimensional viewport in response to the first calibration input.

12. The graphics system of claim 8, wherein the first calculation unit is configured to contractively adapt the first plurality of first virtual pixel positions in the two-dimensional viewport in response to the first calibration inputs.

13. The graphics system of claim 8, wherein the first calculation unit is further operable to receive second calibration inputs from the user, and to adapt the second plurality of second virtual pixel positions in the two-dimensional viewport in response to the second calibration inputs.

14. The graphics system of claim 13, wherein the first calculation unit is operable to assign zero to the first pixel values while the user is providing the second calibration inputs.

15. The graphics system of claim 13, wherein the first calculation unit is operable to initiate adaptation of the second virtual pixel positions from a final calibrated state of the first virtual pixel positions.

16. The graphics system of claim 1, wherein the first display device is a first projection device.

17. The graphics system of claim 1, wherein the first calculation unit is configured to perform (a) and (b) in parallel with (c) and (d).

18. A method for compensating chromatic distortion in a display device, the method comprising:

a graphics processor receiving graphics data, selecting supersample positions in a two-dimensional viewport, and computing supersample values at the supersample positions based on the received graphics data;

storing the supersample values in a sample buffer;

(a) computing first pixel values at a first plurality of first virtual pixel positions in the two-dimensional viewport by filtering a first color component of the supersample values at each of the first virtual pixel positions in the two-dimensional viewport;

(b) providing the first pixel values as output to a first display device;

(c) computing second pixel values at a second plurality of second virtual pixel positions by filtering a second color component of the supersample values at each of the second virtual pixel positions in the two-dimensional viewport;

(d) providing the second pixel values as output to the first display device;

(e) selecting the first virtual pixel positions in the two-dimensional viewport in order to compensate for a first positional distortion of first physical pixels having a first color generated by the first display device on a display surface in response to the first pixel values;

(f) selecting the second virtual pixel positions in the two-dimensional viewport in order to compensate for a second positional distortion of second physical pixels having a second color generated by the first display device on the display surface in response to the second pixel values;

wherein (a) and (c) are performed in parallel.

19. The method of claim 18 further comprising receiving first sensor data indicating first positions of the first physical pixels on the display surface, and selecting the first virtual pixel positions in response to the first sensor data.

20. The method of claim 18 further comprising:

receiving first calibration inputs from a user, and adapting the first plurality of first virtual pixel positions in the two-dimensional viewport in response to the first calibration inputs.

21. The method of claim 20 further comprising:

assigning the value zero to the second pixel values while the user is providing the first calibration inputs.

22. The method of claim 20, wherein said adapting comprises:

adapting the first virtual pixel positions in the two-dimensional viewport along a one-parameter family of geometric distortions in response to the first calibration inputs.

23. The method of claim 20, wherein said adapting comprises:

expansively adapting the first virtual pixel positions in the two-dimensional viewport in response to the first calibration inputs.

24. The method of claim 20, wherein said adapting comprises:

contractively adapting the first plurality of first virtual pixel positions in the two-dimensional viewport in response to the first calibration inputs.

25. The method of claim 20 further comprising:

receiving second calibration inputs from the user, and adapting the second plurality of second virtual pixel positions in the two-dimensional viewport in response to the second calibration inputs.

26. The method of claim 25 further comprising:

assigning the value zero to the first pixel values while the user is providing the second calibration inputs.

27. The method of claim 25, wherein said adapting of the second virtual pixel positions is initiated from a final calibrated state of the first virtual pixel positions.

\* \* \* \* \*

UNITED STATES PATENT AND TRADEMARK OFFICE
CERTIFICATE OF CORRECTION

PATENT NO. : 6,924,816 B2
DATED : August 2, 2005
INVENTOR(S) : Michael F. Deering It is certified that error appears in the above-identified patent and that said Letters Patent is hereby corrected as shown below:

Column 83,
Line 9, please delete "input" and substitute -- inputs --.

Signed and Sealed this

Thirteenth Day of September, 2005

JON W. DUDAS
*Director of the United States Patent and Trademark Office*